US008433585B2

(12) United States Patent
Sr et al.

(10) Patent No.: US 8,433,585 B2
(45) Date of Patent: Apr. 30, 2013

(54) MANAGING CONSISTENT INTERFACES FOR BUSINESS OBJECTS ACROSS HETEROGENEOUS SYSTEMS

(75) Inventors: Arun Sr, Kerala (IN); Pragya Sharma, Bangalore (IN); Abhinava Pratap Singh, Uttarpara (IN); Christian Baust, Rauenberg (DE); Karsten Hauschild, Princeton, NJ (US); Martin Janssen, Binau (DE)

(73) Assignee: SAP AG, Walldorf (DE)

( * ) Notice: Subject to any disclaimer, the term of this patent is extended or adjusted under 35 U.S.C. 154(b) by 476 days.

(21) Appl. No.: 12/060,178

(22) Filed: Mar. 31, 2008

(65) Prior Publication Data

US 2009/0248558 A1 Oct. 1, 2009

(51) Int. Cl.
*G06Q 10/00* (2006.01)
*G06F 17/50* (2006.01)

(52) U.S. Cl.
USPC ................................................ 705/1; 705/29

(58) Field of Classification Search ................ 705/1, 29, 705/35
See application file for complete search history.

(56) References Cited

U.S. PATENT DOCUMENTS 3,223,321 A 12/1965 Baumgartner
5,126,936 A 6/1992 Champion et al.
5,210,686 A 5/1993 Jernigan
5,247,575 A 9/1993 Sprague et al.
5,255,181 A 10/1993 Chapman et al.
5,321,605 A 6/1994 Chapman et al.
5,463,555 A 10/1995 Ward et al.
5,787,237 A 7/1998 Reilly
5,812,987 A 9/1998 Luskin et al.
5,966,695 A 10/1999 Melchione et al.
5,970,465 A 10/1999 Dietrich et al.
5,970,475 A 10/1999 Barnes et al.
5,983,284 A 11/1999 Argade
6,047,264 A 4/2000 Fisher et al.
6,073,137 A 6/2000 Brown et al.
6,092,196 A 7/2000 Reiche
6,104,393 A 8/2000 Santos-Gomez
6,115,690 A 9/2000 Wong
6,125,391 A 9/2000 Meltzer et al.
6,138,118 A 10/2000 Koppstein et al.

(Continued)

FOREIGN PATENT DOCUMENTS

CN 1501296 6/2004
CN 1609866 4/2005

(Continued)

OTHER PUBLICATIONS

"Header." Newton's Telecom Dictionary. 12th ed. 2004, pp. 389-390 (4 pages).*

(Continued)

*Primary Examiner* — Elda Milef
(74) *Attorney, Agent, or Firm* — Fish & Richardson P.C.

(57) ABSTRACT

A business object model, which reflects data that is used during a given business transaction, is utilized to generate interfaces. This business object model facilitates commercial transactions by providing consistent interfaces that are suitable for use across industries, across businesses, and across different departments within a business during a business transaction. In some operations, software creates, updates, or otherwise processes information related to a funds management center, an individual material, and/or a measuring device business object.

10 Claims, 253 Drawing Sheets

U.S. PATENT DOCUMENTS 6,154,732 A 11/2000 Tarbox
6,222,533 B1 4/2001 Notani et al.
6,226,675 B1 5/2001 Meltzer et al.
6,229,551 B1 5/2001 Huang
6,327,700 B1 12/2001 Chen et al.
6,331,972 B1 12/2001 Harris et al.
6,332,163 B1 12/2001 Bowman-Amuah
6,424,979 B1 * 7/2002 Livingston et al. ........... 715/206
6,434,159 B1 8/2002 Woodward et al.
6,438,594 B1 8/2002 Bowman-Amuah
6,542,912 B2 4/2003 Meltzer et al.
6,591,260 B1 7/2003 Schwartzhoff et al.
6,725,122 B2 4/2004 Mori et al.
6,738,747 B1 5/2004 Tanaka et al.
6,745,229 B1 6/2004 Gobin et al.
6,763,353 B2 7/2004 Li et al.
6,775,647 B1 8/2004 Evans et al.
6,868,370 B1 * 3/2005 Burbridge et al. ................ 703/1
6,937,992 B1 8/2005 Benda et al.
6,970,844 B1 11/2005 Bierenbaum
7,039,606 B2 5/2006 Hoffman et al.
7,076,449 B2 7/2006 Tsunenari et al.
7,131,069 B1 10/2006 Rush et al.
7,206,768 B1 4/2007 deGroeve et al.
7,249,157 B2 7/2007 Stewart et al.
7,269,569 B2 * 9/2007 Spira et al. ........................ 705/7
7,292,965 B1 11/2007 Mehta et al.
7,321,864 B1 1/2008 Gendler
7,363,271 B2 4/2008 Morimoto
7,379,931 B2 5/2008 Morinville
7,383,990 B2 6/2008 Veit
7,406,358 B2 7/2008 Preiss
7,481,367 B2 1/2009 Fees et al.
7,509,278 B2 3/2009 Jones
7,515,697 B2 4/2009 Eng et al.
7,516,088 B2 4/2009 Johnson et al.
7,574,383 B1 8/2009 Parasnis et al.
7,627,504 B2 12/2009 Brady et al.
7,634,482 B2 * 12/2009 Mukherjee et al. .................. 1/1
7,788,319 B2 8/2010 Schmidt et al.
7,805,383 B2 9/2010 Veit et al.
7,853,491 B2 12/2010 Wittmer et al.
7,865,426 B2 1/2011 Volpert
7,873,965 B2 1/2011 Hayton et al.
7,941,236 B2 5/2011 Spearman
2001/0042032 A1 11/2001 Crawshaw et al.
2002/0013721 A1 1/2002 Dabbiere et al.
2002/0026394 A1 2/2002 Savage et al.
2002/0046053 A1 4/2002 Hare et al.
2002/0052754 A1 5/2002 Joyce et al.
2002/0072988 A1 6/2002 Aram
2002/0087481 A1 7/2002 Harif
2002/0087483 A1 7/2002 Harif
2002/0107765 A1 8/2002 Walker
2002/0112171 A1 8/2002 Ginter et al.
2002/0138318 A1 9/2002 Ellis et al.
2002/0147668 A1 10/2002 Smith et al.
2002/0152104 A1 10/2002 Ojha et al.
2002/0152145 A1 10/2002 Wanta et al.
2002/0156693 A1 10/2002 Stewart et al.
2002/0156930 A1 10/2002 Velasquez
2002/0157017 A1 10/2002 Mi et al.
2002/0169657 A1 11/2002 Singh et al.
2002/0184070 A1 12/2002 Chen et al.
2002/0186876 A1 12/2002 Jones et al.
2002/0194045 A1 12/2002 Shay et al.
2003/0004799 A1 1/2003 Kish
2003/0069648 A1 * 4/2003 Douglas et al. .................. 700/2
2003/0086594 A1 5/2003 Gross
2003/0120502 A1 6/2003 Robb et al.
2003/0126077 A1 7/2003 Kantor et al.
2003/0167193 A1 9/2003 Jones et al.
2003/0171962 A1 9/2003 Hirth et al.
2003/0172007 A1 9/2003 Helmolt et al.
2003/0172135 A1 9/2003 Bobick et al.
2003/0195815 A1 10/2003 Li et al.
2003/0204452 A1 10/2003 Wheeler
2003/0208389 A1 11/2003 Kurihara et al.
2003/0212614 A1 11/2003 Chu et al.
2003/0216978 A1 11/2003 Sweeney et al.
2003/0229550 A1 12/2003 DiPrima et al.
2003/0233295 A1 12/2003 Tozawa et al.
2003/0236748 A1 12/2003 Gressel et al.
2004/0024662 A1 * 2/2004 Gray et al. ...................... 705/29
2004/0034577 A1 2/2004 Van Hoose et al.
2004/0039665 A1 2/2004 Ouchi
2004/0073510 A1 4/2004 Logan
2004/0083201 A1 4/2004 Sholl et al.
2004/0083233 A1 4/2004 Willoughby
2004/0138942 A1 * 7/2004 Pearson et al. ................. 705/10
2004/0148227 A1 7/2004 Tabuchi et al.
2004/0172360 A1 9/2004 Mabrey et al.
2004/0220910 A1 11/2004 Zang et al.
2004/0254945 A1 12/2004 Schmidt et al.
2004/0267714 A1 12/2004 Frid et al.
2005/0015273 A1 * 1/2005 Iyer .................................. 705/1
2005/0021366 A1 1/2005 Pool et al.
2005/0033588 A1 2/2005 Ruiz et al.
2005/0038744 A1 2/2005 Viijoen
2005/0049903 A1 3/2005 Raja
2005/0071262 A1 3/2005 Kobeh et al.
2005/0080640 A1 4/2005 Bhaskaran et al.
2005/0108085 A1 5/2005 Dakar et al.
2005/0131947 A1 6/2005 Laub et al.
2005/0159997 A1 7/2005 John
2005/0171833 A1 8/2005 Jost et al.
2005/0182639 A1 8/2005 Dale
2005/0187797 A1 8/2005 Johnson
2005/0187866 A1 8/2005 Lee
2005/0194431 A1 9/2005 Fees et al.
2005/0194439 A1 9/2005 Zuerl et al.
2005/0197849 A1 9/2005 Fotteler et al.
2005/0197851 A1 9/2005 Veit
2005/0197878 A1 9/2005 Fotteler et al.
2005/0197881 A1 9/2005 Fotteler et al.
2005/0197882 A1 9/2005 Fotteler et al.
2005/0197886 A1 9/2005 Veit
2005/0197887 A1 9/2005 Zuerl et al.
2005/0197896 A1 9/2005 Veit et al.
2005/0197897 A1 9/2005 Veit et al.
2005/0197898 A1 9/2005 Veit et al.
2005/0197899 A1 9/2005 Veit et al.
2005/0197900 A1 9/2005 Veit
2005/0197901 A1 9/2005 Veit et al.
2005/0197902 A1 9/2005 Veit
2005/0197928 A1 9/2005 Fotteler et al.
2005/0197941 A1 9/2005 Veit
2005/0209732 A1 9/2005 Audimoolam et al.
2005/0210406 A1 9/2005 Biwer et al.
2005/0216321 A1 9/2005 Veit
2005/0216371 A1 9/2005 Fotteler et al.
2005/0222888 A1 10/2005 Hosoda et al.
2005/0222896 A1 10/2005 Rhyne et al.
2005/0222945 A1 10/2005 Pannicke et al.
2005/0228821 A1 10/2005 Gold
2005/0234754 A1 10/2005 Veit
2005/0246240 A1 11/2005 Padilla
2005/0256753 A1 11/2005 Veit et al.
2006/0004934 A1 1/2006 Guldner et al.
2006/0005098 A1 1/2006 Lotz et al.
2006/0020515 A1 1/2006 Lee et al.
2006/0026586 A1 2/2006 Remmel et al.
2006/0047574 A1 3/2006 Sundaram et al.
2006/0047598 A1 3/2006 Hansen
2006/0059005 A1 3/2006 Horn et al.
2006/0059059 A1 3/2006 Horn et al.
2006/0059060 A1 3/2006 Horn et al.
2006/0069598 A1 3/2006 Schweitzer et al.
2006/0069629 A1 3/2006 Schweitzer et al.
2006/0069632 A1 3/2006 Kahn et al.
2006/0074728 A1 4/2006 Schweitzer et al.
2006/0080338 A1 4/2006 Seubert et al.
2006/0085336 A1 4/2006 Seubert et al.
2006/0085412 A1 4/2006 Johnson et al.
2006/0085450 A1 4/2006 Seubert et al.
2006/0089885 A1 4/2006 Finke et al.
2006/0095373 A1 5/2006 Venkatasubramanian et al.

| | | | | |
|---|---|---|---|---|
| 2006/0184435 | A1 | 8/2006 | Mostowfi | |
| 2006/0212376 | A1 | 9/2006 | Snyder et al. | |
| 2006/0280302 | A1 | 12/2006 | Baumann et al. | |
| 2006/0282360 | A1 | 12/2006 | Kahn et al. | |
| 2007/0027742 | A1 | 2/2007 | Emuchay et al. | |
| 2007/0043583 | A1 | 2/2007 | Davulcu et al. | |
| 2007/0078799 | A1 | 4/2007 | Huber-Buschbeck et al. | |
| 2007/0112574 | A1 | 5/2007 | Greene | |
| 2007/0124227 | A1 | 5/2007 | Dembo et al. | |
| 2007/0129978 | A1 | 6/2007 | Shirasu et al. | |
| 2007/0132585 | A1 | 6/2007 | Llorca et al. | |
| 2007/0150387 | A1 | 6/2007 | Seubert et al. | |
| 2007/0150836 | A1 | 6/2007 | Deggelmann et al. | |
| 2007/0156428 | A1 | 7/2007 | Brecht-Tillinger et al. | |
| 2007/0156545 | A1 | 7/2007 | Lin | |
| 2007/0156690 | A1 | 7/2007 | Moser et al. | |
| 2007/0165622 | A1 | 7/2007 | O'Rourke et al. | |
| 2007/0214065 | A1 | 9/2007 | Kahlon et al. | |
| 2007/0225949 | A1 | 9/2007 | Sundararajan et al. | |
| 2007/0226090 | A1 | 9/2007 | Stratton | |
| 2007/0255639 | A1 | 11/2007 | Seifert | |
| 2007/0265860 | A1 | 11/2007 | Herrmann et al. | |
| 2007/0265862 | A1 | 11/2007 | Freund et al. | |
| 2007/0294159 | A1 | 12/2007 | Cottle | |
| 2008/0005012 | A1 | 1/2008 | Deneef | |
| 2008/0021754 | A1 | 1/2008 | Horn et al. | |
| 2008/0040243 | A1 | 2/2008 | Chang et al. | |
| 2008/0046104 | A1 * | 2/2008 | Van Camp et al. | 700/90 |
| 2008/0046421 | A1 | 2/2008 | Bhatia et al. | |
| 2008/0120129 | A1 | 5/2008 | Seubert et al. | |
| 2008/0120190 | A1 | 5/2008 | Joao et al. | |
| 2008/0120204 | A1 * | 5/2008 | Conner et al. | 705/28 |
| 2008/0133303 | A1 | 6/2008 | Singh et al. | |
| 2008/0154969 | A1 | 6/2008 | DeBie | |
| 2008/0162266 | A1 | 7/2008 | Griessmann et al. | |
| 2008/0196108 | A1 | 8/2008 | Dent et al. | |
| 2008/0215354 | A1 | 9/2008 | Halverson et al. | |
| 2008/0243578 | A1 | 10/2008 | Veit | |
| 2008/0288317 | A1 | 11/2008 | Kakar | |
| 2009/0063287 | A1 | 3/2009 | Tribout et al. | |
| 2009/0077074 | A1 | 3/2009 | Hosokawa | |
| 2009/0089198 | A1 | 4/2009 | Kroutik | |
| 2009/0192926 | A1 | 7/2009 | Tarapata | |
| 2009/0222360 | A1 | 9/2009 | Schmitt et al. | |
| 2009/0248431 | A1 | 10/2009 | Schoknecht et al. | |
| 2009/0248547 | A1 | 10/2009 | Doenig et al. | |
| 2009/0271245 | A1 | 10/2009 | Joshi et al. | |
| 2009/0326988 | A1 | 12/2009 | Barth et al. | |
| 2010/0014510 | A1 | 1/2010 | Boreli et al. | |
| 2010/0070391 | A1 | 3/2010 | Storr et al. | |
| 2010/0070395 | A1 | 3/2010 | Elkeles et al. | |
| 2010/0106555 | A1 | 4/2010 | Mneimneh et al. | |
| 2010/0161425 | A1 | 6/2010 | Sideman | |
| 2011/0046775 | A1 | 2/2011 | Bailey et al. | |

FOREIGN PATENT DOCUMENTS

| | | |
|---|---|---|
| CN | 1632806 | 6/2005 |
| CN | 1767537 | 5/2006 |
| CN | 101174957 | 5/2008 |

OTHER PUBLICATIONS

"UML in the .com Enterprise: Modeling CORBA, Compenents, XML/XMI and Metadata Workshop"; http://www.omg.org/news/meetings/workshops/uml_presentations.htm (Retrieved Mar. 17, 2005).(4 pages).*

Proceedings of OMG Workshops; http://www.omg.org/news/meetings/workshops/proceedings.htm; pp. 1-3. (Retrieved Mar. 17, 2005). (3 pages).*

Jager, Dirk et al.; "Using UML for Software Process Modeling"; pp. 91-108 (1999) (18 pages).*

He, Ning et al.; "B2B Contract Implementation Using Windows DNS"; 2001; pp. 71-79.

FSML-Financial Services Markup Language (Jul. 14, 1999) http://xml.coverpages.org/FSML-v1500a.pdf; pp. 1-159 (2 parts).

Webster's Revised Unabridged Dictionary (1913+1828); Def. "merchandise".

Statement in Accordance with the Notice from the European Patent Office dated Oct. 1, 2007 Concerning Business Methods—EPC; Official Journal of the European Patent Office; Munich; Nov. 1, 2007; pp. 592-593.

Lynn, Chris; "Sony Enters Brand Asset Management Market"; The Seybold Report; Analyzing Publishing Technologies; Aug. 4, 2004; <www.Seybold365.com>; 3 pages.

Office Action issued in related U.S. Appl. No. 11/640,422 on Apr. 2, 2009; 13 pages.

Office Action issued in related U.S. Appl. No. 11/640,422 on Dec. 30, 2009; 9 pages.

Office Action issued in related U.S. Appl. No. 11/803,178 on Jun. 29, 2009; 5 pages.

Office Action issued in related U.S. Appl. No. 11/803,178 on Mar. 4, 2010; 43 pages.

Office Action issued in related U.S. Appl. No. 11/775,821 on Jan. 22, 2010; 16 pages.

Office Action issued in related U.S. Appl. No. 11/364,538 on Aug. 4, 2009; 5 pages.

Office Action issued in related U.S. Appl. No. 11/364,538 on Mar. 4, 2010; 40 pages.

Office Action issued in related U.S. Appl. No. 11/731,857 on May 15, 2009; 11 pages.

Office Action issued in related U.S. Appl. No. 11/731,857 on Feb. 4, 2010; 22 pages.

Office Action issued in related U.S. Appl. No. 11/864,786 on Jun. 22, 2009; 7 pages.

Office Action issued in related U.S. Appl. No. 11/864,786 on Mar. 3, 2010; 12 pages.

Office Action issued in related U.S. Appl. No. 11/864,832 on Sep. 18, 2009; 14 pages.

Notice of Allowance issued in related U.S. Appl. No. 11/864,832 on Mar. 24, 2010; 11 pages.

Office Action issued in related U.S. Appl. No. 12/059,867 on Aug. 18, 2009; 37 pages.

Office Action issued in related U.S. Appl. No. 12/059,867 on Feb. 22, 2010; 24 pages.

Office Action issued in related U.S. Appl. No. 12/060,171 on Aug. 11, 2009; 11 pages.

Office Action issued in related U.S. Appl. No. 12/060,171 on Mar. 19, 2010; 10 pages.

Office Action issued in related U.S. Appl. No. 11/145,464 on Aug. 5, 2009; 31 pages.

Office Action issued in related U.S. Appl. No. 11/145,464 on Feb. 5, 2010; 57 pages.

Office Action issued in related U.S. Appl. No. 11/155,368 on May 14, 2009; 6 pages.

Office Action issued in related U.S. Appl. No. 11/155,368 on Dec. 10, 2009; 43 pages.

Office Action issued in related U.S. Appl. No. 11/166,065 on Jun. 24, 2009; 6 pages.

Office Action issued in related U.S. Appl. No. 11/166,065 on Mar. 3, 2010; 25 pages.

Communication Pursuant to Article 94(3) EPC issued in related European Application No. 05757432.9 on Jan. 26, 2009; 4 pages.

Supplementary European Search Report issued in related European Application No. 05823434.5 on Sep. 28, 2009; 3 pages.

Supplementary European Search Report issued in related European Application No. 05766672.9 on Oct. 6, 2009; 3 pages.

SAP Structured Entity Relationship Model (SAP-SERM) for R/3 System Release 4.0 Introduction and Index; Dec. 1998; 26 pages.

SAP Structured Entity Relationship Model (SAP-SERM) for R/3 System Release 4.0 (Part 1); Dec. 1998; 5954 pages.

SAP Structured Entity Relationship Model (SAP-SERM) for R/3 System Release 4.0 (Part 2); Dec. 1998; 7838 pages.

Zencke, Peter; "Engineering a Business Platform"; SAP AG 2005; Engineering BPP; [Online] previously available at URL www.sap.com/community/pub/webcast/2006_01_16_Analyst_Summit_Vegas/2006_01_16_Analyst_Summit_Vegas_009.pdf ; 36 pages.

"UML in the .com Enterprise: Modeling CORBA, Components, XML/XMI and Metadata Workshop"; http://www.omg.org/news/meetings/workshops/uml_presentation.htm.

Medjahed, Brahim et al; "Business-to-Business Interactions: Issues and Enabling Technologies"; The VLDB Journal; vol. 12, No. 1; Apr. 3, 2003; pp. 59-89.
Medjahed, Brahim et al.; "Composing Web Services on the Semantic Web"; The VLDB Journal; vol. 12, No. 4, Sep. 23, 2003; pp. 333-351.
Born, Marc et al.; "Customizing UML for Component Design"; www.dot-profile.de; UML Workshop, Palm Springs, CA; Nov. 2000.
Kappel, Gerti et al.; "A Framework for Workflow Management Systems Based on Objects, Rules, and Roles"; ACM Computing Surveys; ACM Press; vol. 32; Mar. 2000; 5 pages.
Skonnard, Aaron et al.; "BizTalk Server 2000: Architecture and Tools for Trading Partner Integration"; MSDn Magazine; 2000; ms-help://ms.msdnqtr.2003apr.1033/dnmag00/htmal/biztalk.htm; 7 pages.
Microsoft; "Creating an XML Web Service Proxy"; 2001; mshelp://ms.msdnqtr.2003apr.1033/cpguide/html/cpconcreatingwebserviceproxy.htm; 3 pages.
Proceedings of OMG Workshops; http://www.omg.org/news/meetings/workshops/proceedings.htm; pp. 1-3.
Meltzer, Bart et al.; "XML and Electronic Commerce: Enabling the Network Economy"; SIGMOD Record; ACM Press; vol. 27, No. 4; Dec. 1998; pp. 21-24.
Huhns, Michael N. et al.; "Automating Supply-Chain Mangement"; Jul. 15-19, 2002; pp. 1017-1024.
Soederstroem, Eva; "Standardising the Business Vocabulary of Standards"; SAC, Madrid, Spain; 2002; pp. 1048-1052.
Bastide, Remi et al.; "Formal Specification of CORBA Services: Experience and Lessons Learned"; 2000; pp. 105-117.
Glushko, Robert J. et al.; "An XML Framework for Agent-Based E-Commerce"; Communications of the ACM; vol. 42, No. 3; Mar. 1999; pp. 106-114.
Coen-Porisini, Alberto et al.; "A Formal Approach for Designing CORBA-Based Applications"; ACM Transactions on Software Engineering and Methodology; vol. 12, No. 2; Apr. 2003; pp. 107-151.
Yang, J. et al.; "Service Deployment for Virtual Enterprises"; IEEE; 2001; pp. 107-115.
Karp, Alan H.; "E-speak E-xplained"; Communications of the ACM; vol. 46, No. 7; Jul. 2003; pp. 113-118.
Gillibrand, David; "Essential Business Object Design"; Communications of the ACM; vol. 43, No. 2; Feb. 2000; pp. 117-119.
Cole, James et al.; "Extending Support for Contracts in ebXML"; IEEE; 2001; pp. 119-127.
DiNitto, Elisabetta et al.; "Deriving Executable Process Descriptions from UML"; ICSE '02; May 19-25, 2002; pp. 155-165.
Stumptner, Markus et al.; "On the Road to Behavior-Based Integration"; First Asia-Pacific Conferences on Conceptual Modelling; Dunedin, New Zealand; Jan. 2004; pp. 15-22.
Gosain, Sanjay et al.; "The Impact of Common E-Business Interfaces"; Communications of the ACM; vol. 46, No. 2; Dec. 2003; pp. 186-195.
Damodaran, Suresh; "B2B Integration over the Internet with XML—RosettaNet Successes and Challenges"; WWW2004; May 17-22, 2004; pp. 188-195.
Schulze, Wolfgang et al.; "Standardising on Workflow-Management—The OMG Workflow Management Facility"; SIGGROUP Bulletin; vol. 19, No. 1; Apr. 1998; pp. 24-30.
Sutherland, Jeff; "Business Objects in Corporate Information Systems"; ACM Computing Surveys; vol. 27, No. 2; Jun. 1995; pp. 274-276.
Arsanjani, Ali; "Developing and Integrating Enterprise Components and Services"; Communications of the ACM; vol. 45, No. 10; Oct. 2002; pp. 31-34.
Kim, Dan Jong et al.; "A Comparison of B2B E-Service Solutions"; Communications of the ACM; vol. 46, No. 12; Dec. 2003; pp. 317-324.
Hasselbring, Wilhelm; "Information System Integration"; Communications of the ACM; vol. 43, No. 6; Jun. 2000; pp. 33-38.
Khosravi, Navid et al.; "An Approach to Building Model Driven Enterprise Systems in Nebras Enterprise Framework"; OOPSLA '02: Companion of the $17^{th}$ Annual ACM SIGPLAN Conference on Object-Oriented Programming, Systems, Languages, and Applications; Nov. 4-8, 2002; pp. 32-33.
Hogg, K. et al.; "An Evaluation of Web Services in the Design of a B2B Application"; $27^{th}$ Australasian Computer Science Conference; Dunedin, New Zealand; 2004; pp. 331-340.
Gruhn, Volker et al.; "Workflow Management Based on Process Model Repositories"; IEEE 1998; pp. 379-388.
Kim, HyoungDo; "Conceptual Modeling and Specification Generation for B2B Business Processes Based on ebXML"; SIGMOD Record; vol. 31, No. 1; Mar. 2002; pp. 37-42.
Siegel, Jon; "OMG Overview: CORBA and the OMA in Enterprise Computing"; Communications of the ACM; vol. 41, No. 10; Oct. 1998; pp. 37-43.
Yang, Jian et al.; "Interoperation Support for Electronic Business"; Communications of the ACM; vol. 43, No. 6; Jun. 2000; pp. 39-47.
Levi, Keith et al.; "A Goal-Driven Approach to Enterprise Component Identification and Specification"; Communications of the ACM; vol. 45, No. 10; Oct. 2002; pp. 45-52.
Terai, Koichi et al.; "Coordinating Web Services Based on Business Models"; 2003; pp. 473-478.
Aversano, Lerina et al.; "Introducing eServices in Business Process Models"; SEKE '02; Ischia Italy; Jul. 15-19, 2002; pp. 481-488.
Quix, Christoph et al.; "Business Data Management for Business-to-Business Electronic Commerce"; SIGMOD Record; vol. 31, No. 1; Mar. 2002; pp. 49-54.
Sutherland, Jeff; "Why I Love the OMG: Emergence of a Business Object Component Architecture"; StandardView; vol. 6, No. 1; Mar. 1998; pp. 4-13.
Dogac, Asuman et al.; "An ebXML Infrastructure Implementation through UDDI Registries and RosettaNet PIPs"; ACM SIGMOD; Madison, Wisconsin; Jun. 4-6, 2002; pp. 512-523.
Lee, Jinyoul et al.; "Enterprise Integration with ERP and EAI"; Communications of the ACM; vol. 46, No. 2; Feb. 2003; pp. 54-60.
Bratthall, Lars G. et al.; "Integrating Hundreds of Products through One Architecture—The Industrial IT Architecture"; ICSE '02; Orlando, Florida; May 19-25, 2002; pp. 604-614.
Fingar, Peter; "Component-Based Frameworks for E-Commerce"; Communications of the ACM; vol. 43, No. 10; Oct. 2000; pp. 61-66.
Sprott, David; "Componentizing the Enterprise Application Packages"; Communications of the ACM; vol. 43, No. 4; Apr. 2000; pp. 63-69.
Gokhale, Aniruddha et al.; "Applying Model-Integrated Computing to Component Middleware and Enterprise Applications"; Communications of the ACM; vol. 45, No. 10; Oct. 2002; pp. 65-70.
Bussler, Christoph; "The Role of B2B Engines in B2B Integration Architectures"; SIGMOD Record; vol. 31, No. 1; Mar. 2002; pp. 67-72.
Fremantle, Paul et al.; "Enterprise Services"; Communications of the ACM; vol. 45, No. 10; Oct. 2002; pp. 77-79.
Trastour, David et al.; "Semantic Web Support for the Business-to-Business E-Commerce Lifecycle"; WWW2002, Honolulu, Hawaii; May 7-11, 2002; pp. 89-98.
Jaeger, Dirl et al.; "Using UML for Software Process Modeling"; pp. 91-108.
Han, Zaw Z. et al.; "Interoperability from Electronic Commerce to Litigation Using XML Rules"; 2003; pp. 93-94.
Carlson, David A.; "Designing XML Vocabularies with UML"; OOPSLA 2000 Companion; Minneapolis, Minnesota; 2000; pp. 95-96.
Stonebraker, Michael; "Too Much Middleware"; SIGMOD Record; vol. 31, No. 1; Mar. 2002; pp. 97-106.
Maamar, Zakaria et al.; "Toward Intelligent Business Objects"; Communications of the ACM; vol. 43, No. 10; Oct. 2000; pp. 99-101.
Tenenbaum, Jay M. et al.; "Eco System: An Internet Commerce Architecture"; IEEE; May 1997; pp. 48-55.
Eyal, Anat et al.; "Integrating and Customizing Heterogeneous E-Commerce Applications"; The VLDB Journal; Aug. 2001; pp. 16-38.
Office Action issued in related U.S. Appl. No. 11/145,464 on Jan. 22, 2009; 49 pages.
International Search Report and Written Opinion of the International Searching Authority issued in International Application No. PCT/US2007/011378 on Apr. 30, 2008; 17 pages.

International Preliminary Report on Patentability under Chapter I issued in International Application No. PCT/US2007/011378 on Nov. 17, 2008; 11 pages.
International Search Report and Written Opinion of the International Searching Authority issued in International Application No. PCT/IB2006/001401 on Aug. 27, 2008; 8 pages.
International Search Report and Written Opinion of the International Searching Authority issued in International Application No. PCT/US2005/019961 on Sep. 22, 2005; 8 pages.
International Preliminary Report on Patentability under Chapter I issued in International Application No. PCT/US2005/019961 on Dec. 4, 2006; 6 pages.
International Search Report and Written Opinion of the International Searching Authority issued in International Application No. PCT/US2005/021481 on Apr. 11, 2006; 7 pages.
International Search Report and Written Opinion of the International Searching Authority issued in International Application No. PCT/US2005/021481 on May 29, 2007; 6 pages.
International Preliminary Report on Patentability under Chapter I issued in International Application No. PCT/US2005/021481 on Dec. 20, 2006; 6 pages.
International Preliminary Report on Patentability under Chapter I issued in International Application No. PCT/US2005/021481 on Jul. 15, 2008; 5 pages.
International Search Report and Written Opinion of the International Searching Authority issued in International Application No. PCT/US2005/022137 on Sep. 23, 2005; 7 pages.
International Search Report and Written Opinion of the International Searching Authority issued in International Application No. PCT/US2005/022137 on May 12, 2006; 7 pages.
International Preliminary Report on Patentability under Chapter I issued in International Application No. PCT/US2005/022137 on Dec. 28, 2006; 5 pages.
Newton's Telecom Dictionary; 18th Edition; pp. 347, 454.
Office Action issued in U.S. Appl. No. 11/640,422 on May 14, 2010; 12 pages.
Notice of Allowance issued in related U.S. Appl. No. 11/775,821 on Jul. 16, 2010; 4 pages.
Notice of Allowance issued in related U.S. Appl. No. 11/864,832 on Aug. 23, 2010; 4 pages.
Office Action issued in related U.S. Appl. No. 11/864,871 on Apr. 21, 2010; 20 pages.
Advisory Action issued in U.S. Appl. No. 11/155,368 on Mar. 31, 2010; 3 pages.
Office Action issued in related U.S. Appl. No. 12/060,149 on Aug. 26, 2010; 15 pages.
Office Action issued in related U.S. Appl. No. 12/060,171 on Jul. 1, 2010; 19 pages.
Notice of Allowance issued in related U.S. Appl. No. 11/166,065 on Sep. 20, 2010; 6 pages.
Baker, Stacy; "Benefits of Assortment Planning"; Assortment Planning for Apparel Retailers—2005 Management Briefing; Just Style; Jun. 2005; 3 pages.
"Visual and Quantitative Assortment Planning Applications Drive Partnership and Profit"; PR Newswire; Jan. 12, 2006; 3 pages.
"DOTS Inc. Selects Compass Software's smartmerchandising for Merchandise Planning and Assortment Planning"; PR Newswire; Dec. 11, 2002; 2 pages.
Annevelink et al.; "Heterogeneous Database Intergration in a Physician Workstation"; 1992; 5 pages.
Ketabchi et al.; "Object-Oriented Database Management Support for Software Maintenance and Reverse Engineering"; Department of Electrical Engineering and Computer Science, Santa Clara University; 1989; 4 pages.
International Search Report and Written Opinion of the International Searching Authority issued in International Application No. PCT/CN2010/073856 on Mar. 17, 2011; 8 pages.
International Search Report and Written Opinion of the International Searching Authority issued in International Application No. PCT/CN2010/073864 on Mar. 3, 2011; 8 pages.
International Search Report and Written Opinion of the International Searching Authority issued in International Application No. PCT/CN2010/073868 on Mar. 17, 2011; 10 pages.
Communication Pursuant to Rules 70(2) and 70a(2) EPC issued in related European Application No. 07835755.5 on Feb. 28, 2011; 6 pages.
Communication Pursuant to Article 94(3) issued in European Application No. 05757432.9 on Apr. 12, 2011; 5 pages.
Notice of Allowance issued in U.S. Appl. No. 12/147,395 on May 4, 2011; 10 pages.
Notice of Allowance issued in related U.S. Appl. No. 12/147,449 on Apr. 28, 2011; 9 pages.
Office Action issued in related U.S. Appl. No. 12/334,175 on May 27, 2011; 12 pages.
Notice of Allowance issued in related U.S. Appl. No. 11/731,857 on Apr. 11, 2011; 8 pages.
Office Action issued in U.S. Appl. No. 12/147,414 on Apr. 14, 2011; 30 pages.
Office Action issued in U.S. Appl. No. 12/147,378 on Jun. 17, 2011; 10 pages.
Notice of Allowance issued in U.S. Appl. No. 12/323,139 on Mar. 4, 2011; 13 pages.
Office Action issued in related U.S. Appl. No. 12/059,971 on May 18, 2011; 13 pages.
Office Action issued in related U.S. Appl. No. 12/060,054 on Jun. 29, 2011; 15 pages.
Office Action issued in U.S. Appl. No. 12/060,144 on Jun. 23, 2011; 16 pages.
Office Action issued in related U.S. Appl. No. 12/059,804 on Apr. 28, 2011; 14 pages.
Office Action issued in related U.S. Appl. No. 12/060,192 on Apr. 14, 2011; 18 pages.
Office Action issued in related U.S. Appl. No. 12/060,062 on Jul. 13, 2011; 16 pages.
Office Action issued in related U.S. Appl. No. 12/060,155 on May 10, 2011; 8 pages.
Notice of Allowance issued in related U.S. Appl. No. 11/145,464 on Feb. 23, 2011; 7 pages.
Notice of Allowance issued in U.S. Appl. No. 11/155,368 on Mar. 14, 2011; 7 pages.
Notice of Allowance issued in U.S. Appl. No. 11/166,065 on Mar. 8, 2011; 5 pages.
Notice of Allowance issued in related U.S. Appl. No. 11/864,866 on Jul. 22, 2011; 6 pages.
Notice of Allowance issued in related U.S. Appl. No. 11/364,538 on Jul. 26, 2011; 6 pages.
Office Action issued in U.S. Appl. No. 11/864,811 on Mar. 18, 2011; 10 pages.
Office Action issued in U.S. Appl. No. 11/864,811 on Jul. 26, 2011; 7 pages.
Notice of Allowance issued in related U.S. Appl. No. 11/864,832 on Jul. 7, 2011;11 pages.
Office Action issued in related U.S. Appl. No. 11/864,863 on Jul. 21, 2011; 29 pages.
Notice of Allowance issued in related U.S. Appl. No. 11/803,178 on May 17, 2011; 13 pages.
Notice of Allowance issued in related U.S. Appl. No. 12/147,395 on Oct. 26, 2010; 10 pages.
Office Action issued in related U.S. Appl. No. 12/147,399 on Jan. 26, 2011; 16 pages.
Notice of Allowance issued in related U.S. Appl. No. 11/775,821 on Oct. 22, 2010; 4 pages.
Notice of Allowance issued in related U.S. Appl. No. 11/775,821 on Feb. 4, 2011; 4 pages.
Notice of Allowance issued in related U.S. Appl. No. 11/364,538 on Dec. 13, 2010; 5 pages.
Notice of Allowance issued in related U.S. Appl. No. 11/731,857 on Nov. 29, 2010; 4 pages.
Notice of Allowance issued in related U.S. Appl. No. 11/864,832 on Dec. 3, 2010; 9 pages.
Office Action issued in related U.S. Appl. No. 11/864,871 on Oct. 1, 2010; 30 pages.
Office Action issued in related U.S. Appl. No. 12/059,971 on Nov. 4, 2010; 20 pages.
Office Action issued in related U.S. Appl. No. 12/060,149 on Feb. 4, 2011; 19 pages.

Office Action issued in related U.S. Appl. No. 12/060,171 on Jan. 26, 2011; 17 pages.
Notice of Allowance issued in related U.S. Appl. No. 11/145,464 on Nov. 1, 2010; 4 pages.
Notice of Allowance issued in U.S. Appl. No. 11/155,368 on Oct. 7, 2010; 4 pages.
Office Action issued in related U.S. Appl. No. 11/864,866 on Feb. 3, 2011; 20 pages.
Communication Pursuant to Article 94(3) issued in European Application No. 05766672.9 on Jul. 14, 2011; 4 pages.
Office Action issued in U.S. Appl. No. 12/147,414 on Oct. 26, 2011; 27 pages.
Office Action issued in U.S. Appl. No. 12/323,116 on Sep. 6, 2011; 8 pages.
Office Action issued in U.S. Appl. No. 12/571,140 on Sep. 26, 2011; 14 pages.
Office Action issued in related U.S. Appl. No. 12/059,860 on Aug. 3, 2011; 15 pages.
Office Action issued in related U.S. Appl. No. 12/060,192 on Sep. 6, 2011; 18 pages.
Office Action issued in related U.S. Appl. No. 12/060,155 on Oct. 31, 2011; 15 pages.
Notice of Allowance issued in U.S. Appl. No. 11/775,821 on Sep. 21, 2011; 5 pages.
Notice of Allowance issued in U.S. Appl. No. 11/640,422 on Sep. 29, 2011; 7 pages.

* cited by examiner

FIG. 27E
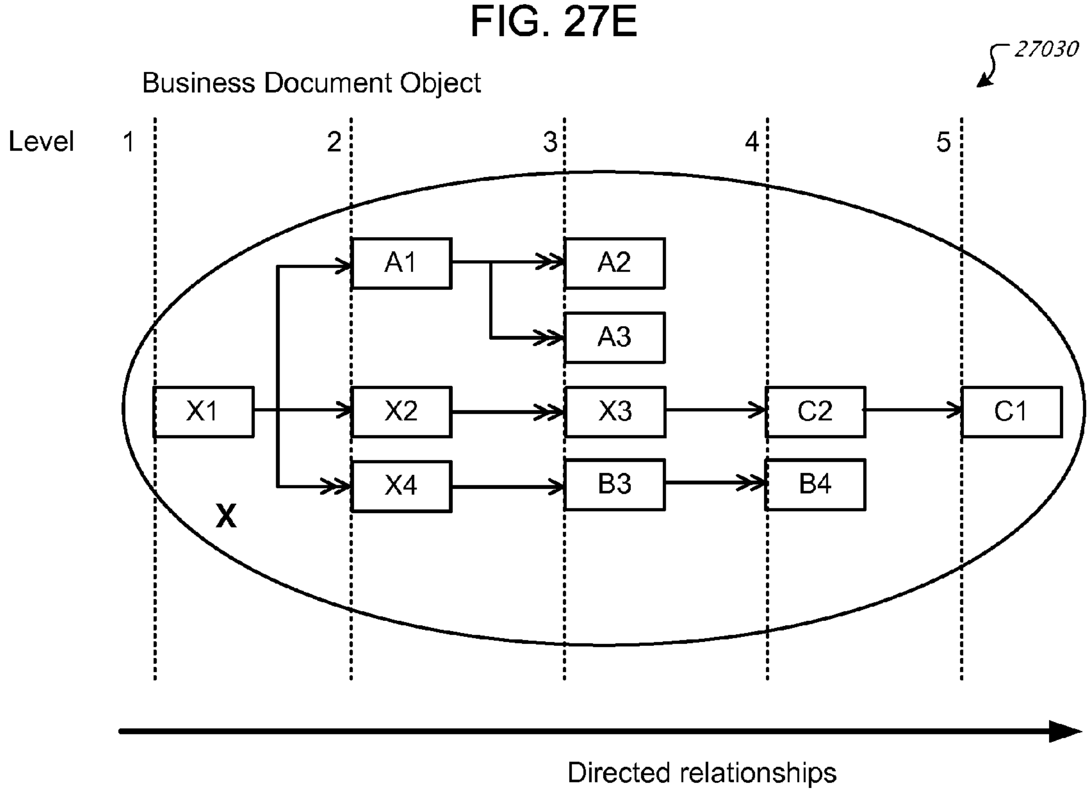
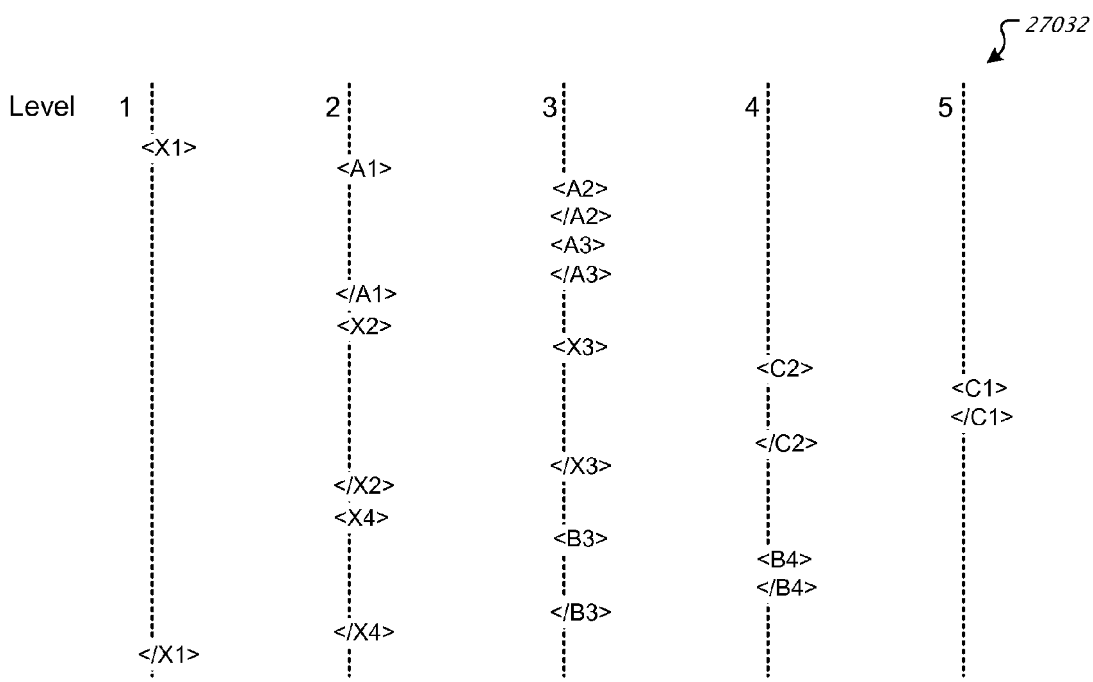

FIG. 43-1

| Package | level1 | level2 | level3 | level4 | Data Type Name |
|---|---|---|---|---|---|
| FundsManagementCentreERPMessage_sync 43000 | FundsManagementCentreERPMessage_sync 43002 | | | | FundsManagementCentreERPMessage_sync 43004 |
| MessageHeader 43006 | | MessageHeader 43008 | | | BasicBusinessDocumentMessageHeader 43010 |
| FundsManagementCentre 43012 | | FundsManagementCentre 43014 | | | |
| | | | FundsManagementAreaID 43016 | | FundsManagementAreaID 43018 |
| | | | ID 43020 | | FundsManagementCentreID 43022 |
| | | | SuperordinateFundsManagementCentreID 43024 | | FundsManagementCentreID 43026 |

FIG. 43-2

| Package | level1 | level2 | level3 | level4 | Data Type Name |
|---|---|---|---|---|---|
| | | | ChangeStateID 43028 | | ChangeStateID 43030 |
| | | | ValidityPeriod 43032 | | CLOSED_DatePeriod 43034 |
| AuthorisationGroup 43036 | | | AuthorisationGroup 43038 | | |
| | | | | AuthorisationGroupCode 43040 | AuthorisationGroupCode 43042 |
| | | | | ValidityPeriod 43044 | CLOSED_DatePeriod 43046 |
| Contact 43048 | | | Contact 43050 | | |
| | | | | UserAccountID 43052 | UserAccountID 43054 |

FIG. 43-3

| Package | level1 | level2 | level3 | level4 | Data Type Name |
|---|---|---|---|---|---|
| | | | | ValidityPeriod 43056 | CLOSED_DatePeriod 43058 |
| | | | | PersonFormattedName 43060 | PersonFormattedName 43062 |
| FundsManagement-CentreName 43064 | | | FundsManagementCentre-Name 43066 | | |
| | | | | ValidityPeriod 43068 | CLOSED_DatePeriod 43070 |
| | | | | Name 43072 | FundsManagementCentreName 43074 |
| | | | | Description 43076 | FundsManagementCentreDescrip-tion 43078 |

| Package | level1 | level2 | level3 | level4 | Data Type Name |
|---|---|---|---|---|---|
| Log 43080 | | Log 43082 | | | Log 43084 |

| Package | level1 | level2 | level3 | level4 | Cardinality |
|---|---|---|---|---|---|
| FundsManagementCentreERPCreateRequestMessage_sync 44000 | FundsManagementCentreERPCreateRequestMessage_sync 44002 | | | | |
| MessageHeader 44004 | | MessageHeader 44006 | | | 0..1 44008 |
| FundsManagementCentre 44010 | | FundsManagementCentre 44012 | | | 1 44014 |
| | | | FundsManagementAreaID 44016 | | 1 44018 |
| | | | ID 44020 | | 1 44022 |
| | | | SuperordinateFundsManagementCentreID 44024 | | 0..1 44026 |

FIG. 44-2

| Package | level1 | level2 | level3 | level4 | Cardinality |
|---|---|---|---|---|---|
| | | | ValidityPeriod 44028 | | 1 44030 |
| AuthorisationGroup 44032 | | | AuthorisationGroup 44034 | | 0..n 44036 |
| | | | | AuthorisationGroupCode 44038 | 1 44040 |
| | | | | ValidityPeriod 44042 | 1 44044 |
| Contact 44046 | | | Contact 44048 | | 1..n 44050 |
| | | | | UserAccountID 44052 | 1 44054 |
| | | | | ValidityPeriod 44056 | 1 44058 |

FIG. 44-3

| Package | level1 | level2 | level3 | level4 | Cardinality |
|---|---|---|---|---|---|
| | | | | PersonFormattedName 44060 | 0..1 44062 |
| FundsManagementCentreName 44064 | | | FundsManagementCentreName 44066 | | 1..n 44068 |
| | | | | ValidityPeriod 44070 | 1 44072 |
| | | | | Name 44074 | 1 44076 |
| | | | | Description 44078 | 0..1 44080 |

FIG. 45-1

| Package | | level1 | level2 | level3 | Cardinality |
|---|---|---|---|---|---|
| FundsManagementCentreERPCreateConfirmationMessage_sync 45000 | | FundsManagementCentreERPCreateConfirmationMessage_sync 45002 | | | |
| | MessageHeader 45004 | | MessageHeader 45006 | | 0..1 45008 |
| | FundsManagementCentre 45010 | | FundsManagementCentre 45012 | | 0..1 45014 |
| | | | | FundsManagementAreaID 45016 | 1 45018 |
| | | | | ID 45020 | 1 45022 |
| | | | | ValidityPeriod 45024 | 1 45026 |

FIG. 45-2

| Package | | level1 | level2 | level3 | Cardinality |
| --- | --- | --- | --- | --- | --- |
| | Log | | Log | | 1 |

| Package | | level1 | level2 | level3 | level4 | Cardinality |
|---|---|---|---|---|---|---|
| FundsManagementCentreERPUpdateRequestMessage_sync 46000 | | FundsManagementCentreERPUpdateRequestMessage_sync 46002 | | | | |
| | FundsManagementCentre 46004 | | FundsManagementCentre 46006 | | | 1 46008 |
| | | | | FundsManagementAreaID 46010 | | 1 46012 |
| | | | | ID 46014 | | 1 46016 |
| | | | | ChangeStateID 46018 | | 1 46020 |
| | | | | ValidityPeriod 46022 | | 0..1 46024 |

FIG. 46-2

| Package | | | level1 | level2 | level3 | level4 | Cardinality |
|---|---|---|---|---|---|---|---|
| | | Authorisation-Group 46026 | | | Authorisation-Group 46028 | | 0..1 46030 |
| | | | | | | Authorisation-GroupCode 46032 | 1 46034 |
| | | | | | | ValidityPeriod 46036 | 1 46038 |
| | | Contact 46040 | | | Contact 46042 | | 0..1 46044 |
| | | | | | | UserAccountID 46046 | 0..1 46048 |
| | | | | | | ValidityPeriod 46050 | 1 46052 |

FIG. 46-3

| Package | | | level1 | level2 | level3 | level4 | Cardinality |
|---|---|---|---|---|---|---|---|
| | | | | | | PersonFormatted-Name 46054 | 0..1 46056 |
| | | FundsManage-mentCentreName 46058 | | | FundsManage-mentCentreName 46060 | | 0..1 46062 |
| | | | | | | ValidityPeriod 46064 | 1 46066 |
| | | | | | | Name 46068 | 0..1 46070 |
| | | | | | | Description 46072 | 0..1 46074 |

FIG. 47-1

| Package | | level1 | level2 | level3 | Cardinality |
|---|---|---|---|---|---|
| FundsManagementCentreERPUpdateConfirmationMessage_sync 47000 | | FundsManagementCentreERPUpdateConfirmationMessage_sync 47002 | | | |
| | MessageHeader 47004 | | MessageHeader 47006 | | 0..1 47008 |
| | FundsManagementCentre 47010 | | FundsManagementCentre 47012 | | 0..1 47014 |
| | | | | FundsManagementAreaID 47016 | 1 47018 |
| | | | | ID 47020 | 1 47022 |
| | | | | ValidityPeriod 47024 | 1 47026 |

FIG. 47-2

| Package | | level1 | level2 | level3 | Cardinality |
|---|---|---|---|---|---|
| | Log 47028 | | Log 47030 | | 1 47032 |

FIG. 48-1

| Package | | level1 | level2 | level3 | level4 | Cardinality |
|---|---|---|---|---|---|---|
| FundsManagementCentreERPChangeRequestMessage_sync 48000 | | FundsManagementCentreERPChangeRequestMessage_sync 48002 | | | | |
| | FundsManagementCentre 48004 | | FundsManagementCentre 48006 | | | 1 48008 |
| | | | | FundsManagementAreaID 48010 | | 1 48012 |
| | | | | ID 48014 | | 1 48016 |
| | | | | ValidityPeriod 48018 | | 0..1 48020 |

FIG. 48-2

| Package | | | level1 | level2 | level3 | level4 | Cardinality |
|---|---|---|---|---|---|---|---|
| | | Authorisation-Group 48022 | | | Authorisation-Group 48024 | | 0..1 48026 |
| | | | | | | Authorisation-GroupCode 48028 | 1 48030 |
| | | | | | | ValidityPeriod 48032 | 1 48034 |
| | | Contact 48036 | | | Contact 48038 | | 0..1 48040 |
| | | | | | | UserAccountID 48042 | 0..1 48044 |
| | | | | | | ValidityPeriod 48046 | 1 48048 |

FIG. 48-3

| Package | | | level1 | level2 | level3 | level4 | Cardinality |
|---|---|---|---|---|---|---|---|
| | | | | | | PersonFormatted-Name 48050 | 0..1 48052 |
| | | FundsManage-mentCentreName 48054 | | | FundsManage-mentCentreName 48056 | | 0..1 48058 |
| | | | | | | ValidityPeriod 48060 | 1 48062 |
| | | | | | | Name 48064 | 0..1 48066 |
| | | | | | | Description 48068 | 0..1 48070 |

FIG. 49-1

| Package | | level1 | level2 | level3 | Cardinality |
|---|---|---|---|---|---|
| FundsManagementCentreERPChnageConfirmationMessage_sync 49000 | | FundsManagementCentreERPChnageConfirmationMessage_sync 49002 | | | |
| | MessageHeader 49004 | | MessageHeader 49006 | | 0..1 49008 |
| | FundsManagementCentre 49010 | | FundsManagementCentre 49012 | | 0..1 49014 |
| | | | | FundsManagementAreaID 49016 | 1 49018 |
| | | | | ID 49020 | 1 49022 |
| | | | | ValidityPeriod 49024 | 1 49026 |

FIG. 49-2

| Package | | level1 | level2 | level3 | Cardinality |
|---|---|---|---|---|---|
| | Log 49028 | | Log 49030 | | 1 49032 |

FIG. 50

| Package | | level1 | level2 | level3 | Cardinality |
|---|---|---|---|---|---|
| FundsManagementCentreERPByIDQueryMessage_sync 50000 | | FundsManagementCentreERPByIDQueryMessage_sync 50002 | | | |
| | Selection 50004 | | FundsManagementCentreSelectionByID 50006 | | 1 50008 |
| | | | | FundsManagementAreaID 50010 | 1 50012 |
| | | | | ID 50014 | 1 50016 |
| | | | | KeyDate 50018 | 1 50020 |

FIG. 51-1

| Package | | level1 | level2 | level3 | level4 | Cardinality |
|---|---|---|---|---|---|---|
| FundsManagementCentreERPByIDResponseMessage_sync 51000 | | FundsManagementCentreERPByIDResponseMessage_sync 51002 | | | | |
| | FundsManagementCentre 51004 | | FundsManagementCentre 51006 | | | 0..1 51008 |
| | | | | FundsManagementAreaID 51010 | | 1 51012 |
| | | | | ID 51014 | | 1 51016 |
| | | | | ChangeStateID 51018 | | 1 51020 |

FIG. 51-2

| Package | | | level1 | level2 | level3 | level4 | Cardinality |
|---|---|---|---|---|---|---|---|
| | | | | | SuperordinateFundsManagementCentreID 51022 | | 0..1 51024 |
| | | | | | ValidityPeriod 51026 | | 1 51028 |
| | | Authorisation-Group 51030 | | | Authorisation-Group 51032 | | 1 51034 |
| | | | | | | Authorisation-GroupCode 51036 | 0..1 51038 |
| | | | | | | ValidityPeriod 51040 | 1 51042 |
| | | Contact 51044 | | | Contact 51046 | | 1 51048 |

FIG. 51-3

| Package | | | level1 | level2 | level3 | level4 | Cardinality |
|---|---|---|---|---|---|---|---|
| | | | | | | UserAccountID 51050 | 1 51052 |
| | | | | | | ValidityPeriod 51054 | 1 51056 |
| | | | | | | PersonFormatted-Name 51058 | 0..1 51060 |
| | | FundsManag-mentCentreName 51062 | | | FundsManag-mentCentreName 51064 | | 0..1 51066 |
| | | | | | | ValidityPeriod 51068 | 1 51070 |
| | | | | | | Name 51072 | 1 51074 |

FIG. 51-4

| Package | | | level1 | level2 | level3 | level4 | Cardinality |
|---|---|---|---|---|---|---|---|
| | | | | | | Description 51076 | 0..1 51078 |
| | Log 51080 | | | Log 51082 | | | 1 51084 |

FIG. 52-1

| Package | | level1 | level2 | level3 | level4 | Cardinality |
|---|---|---|---|---|---|---|
| FundsManagementCentreERPSimpleByElementsQueryMessage_sync 52000 | | <MessageDataType>FundsManagementCentreERPSimpleByElementsQueryMessage_sync 52002 | | | | |
| | Selection 52004 | | FundsManagementCentreSimpleSelectionByElements 52006 | | | 1 52008 |
| | | | | FundsManagementAreaID 52010 | | 1 52012 |
| | | | | FundsManagementCentreID 52014 | | 0..1 52016 |

FIG. 52-2

| Package | | level1 | level2 | level3 | level4 | Cardinality |
|---|---|---|---|---|---|---|
| | | | | ContactUserAccountID 52018 | | 0..1 52020 |
| | | | | AuthorisationGroupCode 52022 | | 0..1 52024 |
| | | | | KeyDate 52026 | | 1 52028 |
| | | | | ContactPersonFormattedName 52030 | | 0..1 52032 |
| | | | | FundsManagementCentreName 52034 | | 0..1 52036 |
| | | | | FundsManagementCentreDescription 52038 | | 0..1 52040 |

FIG. 52-3

| Package | | level1 | level2 | level3 | level4 | Cardinality |
|---|---|---|---|---|---|---|
| | | | | SelectionByFunds-ManagementCentreID 52042 | | 0..n 52044 |
| | | | | | InclusionExclusion-Code 52046 | 1 52048 |
| | | | | | IntervalBound-aryTypeCode 52050 | 1 52052 |
| | | | | | LowerBoundary-FundsManagement-CentreID 52054 | 1 52056 |
| | | | | | UpperBoundary-FundsManagement-CentreID 52058 | 0..1 52060 |

FIG. 52-4

| Package | | level1 | level2 | level3 | level4 | Cardinality |
|---|---|---|---|---|---|---|
| | | | | SelectionByContactUserAccountID 52062 | | 0..n 52064 |
| | | | | | InclusionExclusionCode 52066 | 1 52068 |
| | | | | | IntervalBoundaryTypeCode 52070 | 1 52072 |
| | | | | | LowerBoundaryContactUserAccountID 52074 | 1 52076 |
| | | | | | UpperBoundaryContactUserAccountID 52078 | 0..1 52080 |

FIG. 52-5

| Package | | level1 | level2 | level3 | level4 | Cardinality |
|---|---|---|---|---|---|---|
| | | | | SelectionByAuthorisationGroupCode 52082 | | 0..n 52084 |
| | | | | | InclusionExclusionCode 52086 | 1 52088 |
| | | | | | IntervalBoundaryTypeCode 52090 | 1 52092 |
| | | | | | LowerBoundaryAuthorisationGroupCode 52094 | 1 52096 |
| | | | | | UpperBoundaryAuthorisationGroupCode 52098 | 0..1 52100 |

FIG. 52-6

| Package | | level1 | level2 | level3 | level4 | Cardinality |
|---|---|---|---|---|---|---|
| | | | | SelectionByContact-PersonFormatted-Name 52102 | | 0..n 52104 |
| | | | | | InclusionExclusion-Code 52106 | 1 52108 |
| | | | | | IntervalBound-aryTypeCode 52110 | 1 52112 |
| | | | | | LowerBoundaryCon-tactPersonFormat-tedName 52114 | 1 52116 |
| | | | | | UpperBoundaryCon-tactPersonFormat-tedName 52118 | 0..1 52120 |

FIG. 52-7

| Package | | level1 | level2 | level3 | level4 | Cardinality |
|---|---|---|---|---|---|---|
| | | | | SelectionByFunds-ManagementCentre-Name 52122 | | 0..n 52124 |
| | | | | | InclusionExclusion-Code 52126 | 1 52128 |
| | | | | | IntervalBound-aryTypeCode 52130 | 1 52132 |
| | | | | | LowerBoundary-FundsManagement-CentreName 52134 | 1 52136 |
| | | | | | UpperBoundary-FundsManagement-CentreName 52138 | 0..1 52140 |

FIG. 52-8

| Package | | level1 | level2 | level3 | level4 | Cardinality |
|---|---|---|---|---|---|---|
| | | | | SelectionByFunds-ManagementCentre-Description 52142 | | 0..n 52144 |
| | | | | | InclusionExclusion-Code 52146 | 1 52148 |
| | | | | | IntervalBound-aryTypeCode 52150 | 1 52152 |
| | | | | | LowerBoundary-FundsManagement-CentreDescription 52154 | 1 52156 |
| | | | | | UpperBoundary-FundsManagement-CentreDescription 52158 | 0..1 52160 |

FIG. 53-1

| Package | | | level1 | level2 | level3 | level4 | Cardinality |
|---|---|---|---|---|---|---|---|
| FundsManagementCentreERPSimpleByElementsResponseMessage_sync 53000 | | | FundsManagementCentreERPSimpleByElementsResponseMessage_sync 53002 | | | | |
| | FundsManagementCentre 53004 | | | FundsManagementCentre 53006 | | | 0..n 53008 |
| | | | | | FundsManagementAreaID 53010 | | 1 53012 |
| | | | | | ID 53014 | | 1 53016 |
| | | FundsManagementCentreName 53018 | | | FundsManagementCentreName 53020 | | 0..1 53022 |

FIG. 53-2

| Package | | | level1 | level2 | level3 | level4 | Cardinality |
|---|---|---|---|---|---|---|---|
| | | | | | | Name 53024 | 1 53026 |
| | | | | | | Description 53028 | 0..1 53030 |
| | Log 53032 | | | Log 53034 | | | 1 53036 |

| Package | | level1 | level2 | level3 | level4 | Cardinality | Data Type Name |
|---|---|---|---|---|---|---|---|
| IndividualMaterialMessage_sync 99000 | | IndividualMaterialMessage_sync 99002 | | | | | IndividualMaterialMessage_sync 99004 |
| | MessageHeader 99006 | | MessageHeader 99008 | | | 0..1 99010 | BasicBusinessDocumentMessageHeader 99012 |
| | IndividualMaterial 99014 | | IndividualMaterial 99016 | | | 0..n 99018 | |
| | | | | ID 99020 | | 1 99022 | ProductInternalID 99024 |

FIG. 99-2

| Package | | level1 | level2 | level3 | level4 | Cardinality | Data Type Name |
|---|---|---|---|---|---|---|---|
| | | | | MaterialID 99026 | | 0..1 99028 | ProductInter-nalID 99030 |
| | | | | SerialID 99032 | | 0..1 99034 | SerialID 99036 |
| | | | | Maintenance-PlanningPlantID 99038 | | 0..1 99040 | PlantID 99042 |
| | | | | WorkCentreID 99044 | | 0..1 99046 | WorkCentreID 99048 |
| | | | | WorkCentre-PlantID 99050 | | 0..1 99052 | PlantID 99054 |

FIG. 99-3

| Package | | | level1 | level2 | level3 | level4 | Cardinality | Data Type Name |
|---|---|---|---|---|---|---|---|---|
| | | | | | Description 99056 | | 0..1 99058 | SHORT_Description 99060 |
| | | | | | WorkCentreDescription 99062 | | 0..1 99064 | SHORT_Description 99066 |
| | | HierarchyRelationship 99068 | | | HierarchyRelationship 99070 | | 0..1 99072 | |
| | | | | | | ParentProductID 99074 | 1 99076 | ProductInternalID 99078 |

FIG. 99-4

| Package | | | level1 | level2 | level3 | level4 | Cardinality | Data Type Name |
|---|---|---|---|---|---|---|---|---|
| | | | | | | Installation-DateTime 99080 | 0..1 99082 | TIMEZONE_INDEPENDENT_DateTime 99084 |
| | | | | | | Dismantling-DateTime 99086 | 0..1 99088 | TIMEZONE_INDEPENDENT_DateTime 99090 |
| | | | | | | InstallationPosi-tionID 99092 | 0..1 99094 | InstallationPosi-tionID 99096 |
| | | ManufacturerIn-formation 99098 | | | ManufacturerIn-formation 99100 | | 0..1 99102 | |

FIG. 99-5

| Package | | | level1 | level2 | level3 | level4 | Cardinality | Data Type Name |
|---|---|---|---|---|---|---|---|---|
| | | | | | | PartNumberID 99104 | 0..1 99106 | ProductInter-nalID 99108 |
| | | | | | | SerialID 99110 | 0..1 99112 | SerialID 99114 |
| | Log 99116 | | | Log 99118 | | | 0..1 99120 | Log 99122 |

FIG. 100

| Package | | level1 | level2 | level3 | Cardinality | Data Type Name |
|---|---|---|---|---|---|---|
| IndividualMaterialByIDQueryMessage_sync 100000 | | IndividualMaterialByIDQueryMessage_sync 100002 | | | | IndividualMaterialByIDQueryMessage 100004 |
| | MessageHeader 100006 | | MessageHeader 100008 | | 0..1 100010 | BasicBusinessDocumentMessageHeader 100012 |
| | Selection 100014 | | IndividualMaterialSelectionByID 100016 | | 1 100018 | |
| | | | | IndividualMaterialID 100020 | 1 100022 | ProductInternalID 100024 |

FIG. 101-1

| Package | | level1 | level2 | level3 | level4 | Cardinality | Data Type Name |
|---|---|---|---|---|---|---|---|
| IndividualMaterialByIDReponseMessage_sync 101000 | | IndividualMaterialByIDReponseMessage_sync 101002 | | | | | IndividualMaterialByIDReponseMessage_sync 101004 |
| | MessageHeader 101006 | | MessageHeader 101008 | | | 0..1 101010 | BasicBusinessDocumentMessageHeader 101012 |
| | IndividualMaterial 101014 | | IndividualMaterial 101016 | | | 1 101018 | |
| | | | | ID 101020 | | 1 101022 | ProductInternalID 101024 |

FIG. 101-2

| Package | | level1 | level2 | level3 | level4 | Cardinality | Data Type Name |
|---|---|---|---|---|---|---|---|
| | | | | MaterialID 101026 | | 0..1 101028 | ProductInter-nalID 101030 |
| | | | | SerialID 101032 | | 0..1 101034 | SerialID 101036 |
| | | | | Maintenance-PlanningPlantID 101038 | | 0..1 101040 | PlantID 101042 |
| | | | | WorkCentreID 101044 | | 0..1 101046 | WorkCenterID 101048 |
| | | | | WorkCentre-PlantID 101050 | | 0..1 101052 | PlantID 101054 |

FIG. 101-3

| Package | | | level1 | level2 | level3 | level4 | Cardinality | Data Type Name |
|---|---|---|---|---|---|---|---|---|
| | | | | | Description 101056 | | 0..1 101058 | SHORT_Description 101060 |
| | | | | | WorkCentreDescription 101062 | | 0..1 101064 | SHORT_Description 101066 |
| | | HierarchyRelationship 101068 | | | HierarchyRelationship 101070 | | 0..1 101072 | |
| | | | | | | ParentProductID 101074 | 1 101076 | ProductInternalID 101078 |
| | | | | | | InstallationPositionID 101080 | 0..1 101082 | InstallationPositionID 101084 |

FIG. 101-4

| Package | | | level1 | level2 | level3 | level4 | Cardinality | Data Type Name |
|---|---|---|---|---|---|---|---|---|
| | | ManufacturerIn-formation 101086 | | | ManufacturerIn-formation 101088 | | 0..1 101090 | |
| | | | | | | PartNumberID 101092 | 0..1 101094 | ProductInter-nalID 101096 |
| | | | | | | SerialID 101098 | 0..1 101100 | SerialID 101102 |
| | Log 101104 | | | Log 101106 | | | 1 101108 | Log 101110 |

FIG. 102-1

| Package | level1 | level2 | level3 | level4 | Cardinality | Data Type Name |
| --- | --- | --- | --- | --- | --- | --- |
| IndividualMaterialInstallRequestMessage_sync 102000 | IndividualMaterialInstallRequestMessage_sync 102002 | | | | | IndividualMaterialInstallRequestMessage_sync 102004 |
| MessageHeader 102006 | | MessageHeader 102008 | | | 0..1 102010 | BasicBusinessDocumentMessageHeader 102012 |
| IndividualMaterial 102014 | | IndividualMaterial 102016 | | | 1 102018 | |
| | | | ID 102020 | | 1 102022 | ProductInternalID 102024 |

FIG. 102-2

| Package | | | level1 | level2 | level3 | level4 | Cardinality | Data Type Name |
|---|---|---|---|---|---|---|---|---|
| | | HierarchyRela-tionship 102026 | | | HierarchyRela-tionship 102028 | | 1 102030 | |
| | | | | | | ParentProductID 102032 | 1 102034 | ProductInter-nalID 102036 |
| | | | | | | Installation-DateTime 102038 | 0..1 102040 | TIMEZONE_INDEPENDENT_DateTime 102042 |
| | | | | | | InstallationPosi-tionID 102044 | 0..1 102046 | InstallationPosi-tionID 102048 |

FIG. 103

| Package | | level1 | level2 | Cardinality | Data Type Name |
|---|---|---|---|---|---|
| IndividualMaterialInstallConfirmationMessage_sync 103000 | | IndividualMaterialInstall-ConfirmationMes-sage_sync 103002 | | | IndividualMaterialInstall-ConfirmationMes-sage_sync 103004 |
| | MessageHeader 103006 | | MessageHeader 103008 | 0..1 103010 | BasicBusinessDocu-mentMessageHeader 103012 |
| | Log 103014 | | Log 103016 | 1 103018 | Log 103020 |

FIG. 104-1

| Package | | level1 | level2 | level3 | | Cardinality | Data Type Name |
|---|---|---|---|---|---|---|---|
| IndividualMaterialDismantleRequestMessage_sync 104000 | | IndividualMaterialDismantleRequestMessage_sync 104002 | | | | | IndividualMaterialDismantleRequestMessage_sync 104004 |
| | MessageHeader 104006 | | MessageHeader 104008 | | | 0..1 104010 | BasicBusinessDocumentMessageHeader 104012 |
| | IndividualMaterial 104014 | | IndividualMaterial 104016 | | | 1 104018 | |
| | | | | ID 104020 | | 1 104022 | ProductInternalID 104024 |

FIG. 104-2

| Package | | | level1 | level2 | level3 | | Cardinality | Data Type Name |
|---|---|---|---|---|---|---|---|---|
| | | HierarchyRelationship 104026 | | | HierarchyRelationship 104028 | | 1 104030 | |
| | | | | | | ParentProductID 104032 | 1 104034 | ProductInternalID 104036 |
| | | | | | | DismantlingDateTime 104038 | 0..1 104040 | TIMEZONE_INDEPENDENT_DateTime 104042 |

FIG. 105

| Package | | level1 | level2 | Cardinality | Data Type Name |
|---|---|---|---|---|---|
| IndividualMaterialDismantleConfirmationMessage_sync 105000 | | IndividualMaterialDismantleConfirmationMessage_sync 105002 | | | IndividualMaterialDismantleConfirmationMessage_sync 105004 |
| | MessageHeader 105006 | | MessageHeader 105008 | 0..1 105010 | BasicBusinessDocumentMessageHeader 105012 |
| | Log 105014 | | Log 105016 | 1 105018 | Log 105020 |

FIG. 106-1

| Package | | level1 | level2 | level3 | Cardinality | Data Type Name |
|---|---|---|---|---|---|---|
| IndividualMaterialSimpleByElementsQueryMessage_sync 106000 | | IndividualMaterialSimpleByElementsQueryMessage_sync 106002 | | | | IndividualMaterialSimpleByElementsQueryMessage_sync 106004 |
| | Selection 106006 | | IndividualMaterialSimpleSelectionByElements 106008 | | 1 106010 | |
| | | | | MaterialID 106012 | 0..1 106014 | ProductInternalID 106016 |
| | | | | SerialID 106018 | 0..1 106020 | SerialID 106022 |
| | | | | WorkCentreID 106024 | 0..1 106026 | WorkCentreID 106028 |
| | | | | WorkCentrePlantID 106030 | 0..1 106032 | PlantID 106034 |

FIG. 106-2

| Package | | level1 | level2 | level3 | Cardinality | Data Type Name |
|---|---|---|---|---|---|---|
| | | | | ManufacturerInformationPartNumberID 106036 | 0..1 106038 | ProductInternalID 106040 |
| | | | | ManufacturerInformationSerialID 106042 | 0..1 106044 | SerialID 106046 |

FIG. 107

| Package | | level1 | level2 | level3 | Cardinality | Data Type Name |
|---|---|---|---|---|---|---|
| IndividualMaterialSimpleByElementsResponseMessage_sync 107000 | | IndividualMaterial-SimpleByElements-ResponseMessage_sync 107002 | | | | IndividualMaterial-SimpleByElements-ResponseMessage_sync 107004 |
| | IndividualMaterial 107006 | | IndividualMaterial 107008 | | 0..n 107010 | |
| | | | | ID 107012 | 1 107014 | ProductInternalID 107016 |
| | | | | Description 107018 | 0..1 107020 | Short_Description 107022 |
| | Log 107024 | | Log 107026 | | 1 107028 | Log 107030 |

FIG. 108

| Package | | level1 | level2 | level3 | Cardinality | Data Type Name |
|---|---|---|---|---|---|---|
| IndividualMaterialSimpleByWarrantyQueryMessage_sync 108000 | | IndividualMaterial-SimpleByWarranty-QueryMessage_sync 108002 | | | | IndividualMaterial-SimpleByWarranty-QueryMessage_sync 108004 |
| | MessageHeader 108006 | | MessageHeader 108008 | | 0..1 108010 | BasicBusiness-DocumentMessage-Header 108012 |
| | Selection 108014 | | IndividualMaterial-SimpleSelectionBy-Warranty 108016 | | 1 108018 | |
| | | | | WarrantyID 108020 | 1 108022 | ProductInternalID 108024 |
| | | | | WarrantyType 108026 | 0..1 108028 | WarrantyTypeCode 108030 |

FIG. 109-1

| Package | | level1 | level2 | level3 | Cardinality | Data Type Name |
|---|---|---|---|---|---|---|
| IndividualMaterialSimpleByWarrantyResponseMessage_sync 109000 | | IndividualMaterialSimpleByWarrantyResponseMessage_sync 109002 | | | | IndividualMaterialSimpleByWarrantyResponseMessage_sync 109004 |
| | MessageHeader 109006 | | MessageHeader 109008 | | 0..1 109010 | BasicBusinessDocumentMessageHeader 109012 |
| | IndividualMaterial 109014 | | IndividualMaterial 109016 | | 1..n 109018 | |
| | | | | ID 109020 | 1 109022 | ProductInternalID 109024 |
| | | | | Description 109026 | 0..1 109028 | SHORT_Description 109030 |

FIG. 109-2

| Package | | level1 | level2 | level3 | Cardinality | Data Type Name |
|---|---|---|---|---|---|---|
| | Log 109032 | | Log 109034 | | 1 109036 | Log 109038 |

FIG. 110-1

| Package | level1 | level2 | level3 | level4 | Level5 | Data Type Name |
|---|---|---|---|---|---|---|
| IndividualMaterialERPMessage_sync 110000 | IndividualMaterialERPMessage_sync 110002 | | | | | <MessageDataType> 110004 |
| MessageHeader 110006 | | MessageHeader 110008 | | | | BusinessDocumentMessageHeader 110010 |
| IndividualMaterial 110012 | | IndividualMaterial 110014 | | | | … |
| | | | ID 110016 | | | ProductInternalID 110018 |
| | | | MaterialID 110020 | | | ProductInternalID 110022 |

FIG. 110-2

| Package | | | level1 | level2 | level3 | level4 | Level5 | Data Type Name |
|---|---|---|---|---|---|---|---|---|
| | | | | | SerialID 110024 | | | SerialID 110026 |
| | | | | | Maintenance-PlanningPlantID 110028 | | | PlantID 110030 |
| | | | | | WorkCentreID 110032 | | | WorkCentreID 110034 |
| | | | | | WorkCentre-PlantID 110036 | | | PlantID 110038 |
| | | | | | OperatingWork-CentreID 110040 | | | WorkCentreID 110042 |
| | | | | | OperatingPlan-tID 110044 | | | PlantID 110046 |

FIG. 110-3

| Package | | | level1 | level2 | level3 | level4 | Level5 | Data Type Name |
|---|---|---|---|---|---|---|---|---|
| | | | | | CustomerID 110048 | | | CustomerID 110050 |
| | | | | | ChangeStateID 110052 | | | ChangeStateID 110054 |
| | | | | | ProfileIssue-CategoryFilter-Code 110056 | | | IssueCategory-FilterCode 110058 |
| | | | | | CategoryCode 110060 | | | IndividualMate-rialCategory-Code 110062 |
| | | | | | Description 110064 | | | SHORT_Description 110066 |

FIG. 110-4

| Package | | | level1 | level2 | level3 | level4 | Level5 | Data Type Name |
|---|---|---|---|---|---|---|---|---|
| | | | | | WorkCentreDe-scription 110068 | | | SHORT_Description 110070 |
| | | | | | StatusObject 110072 | | | StatusObject 110074 |
| | | HierarchyRela-tionship 110076 | | | HierarchyRela-tionship 110078 | | | … |
| | | | | | | ParentProductID 110080 | | ProductInter-nalID 110082 |
| | | | | | | InstalledChildIn-dividualMateri-alID 110084 | | ProductInter-nalID 110086 |

FIG. 110-5

| Package | | | level1 | level2 | level3 | level4 | Level5 | Data Type Name |
|---|---|---|---|---|---|---|---|---|
| | | | | | | Replace-mentChildIndi-vidualMaterialID 110088 | | ProductInter-nalID 110090 |
| | | | | | | InstallationPosi-tionID 110092 | | InstallationPosi-tionID 110094 |
| | | | | | | Installation-DateTime 110096 | | TIMEZONE_INDEPENDENT_DateTime 110098 |
| | | | | | | Dismantling-DateTime 110100 | | TIMEZONE_INDEPENDENT_DateTime 110102 |
| | | | | | | Replacement-DateTime 110104 | | TIMEZONE_INDEPENDENT_DateTime 110106 |

FIG. 110-6

| Package | | | level1 | level2 | level3 | level4 | Level5 | Data Type Name |
|---|---|---|---|---|---|---|---|---|
| | | ManufacturerIn-formation 110108 | | | ManufacturerIn-formation 110110 | | | ... |
| | | | | | | PartNumberID 110112 | | ProductInter-nalID 110114 |
| | | | | | | SerialID 110116 | | SerialID 110118 |
| | | | | | | PartyInternalID 110120 | | PartyInternalID 110122 |
| | | | | | | ProductModelID 110124 | | ProductModelID 110126 |
| | | Property 110128 | | | Property 110130 | | | ... |

FIG. 110-7

| Package | | | level1 | level2 | level3 | level4 | Level5 | Data Type Name |
|---|---|---|---|---|---|---|---|---|
| | | | | | | CollectionID 110132 | | PropertyCollectionID 110134 |
| | | | | | | CollectionTypeCode 110136 | | PropertyCollectionTypeCode 110138 |
| | | | | | | @actionCode 110140 | | ActionCode 110142 |
| | | | | | | Valuation 110144 | | PropertyValuation 110146 |
| | | Address 110148 | | | Address 110150 | | | |
| | | | | | | HouseID 110152 | | HouseID 110154 |

FIG. 110-8

| Package | | | level1 | level2 | level3 | level4 | Level5 | Data Type Name |
|---|---|---|---|---|---|---|---|---|
| | | | | | | StreetPostal-Code 110156 | | PostalCode 110158 |
| | | | | | | CountryCode 110160 | | CountryCode 110162 |
| | | | | | | CountryName 110164 | | MEDIUM_Name 110166 |
| | | | | | | CityName 110168 | | MEDIUM_Name 110170 |
| | | | | | | StreetName 110172 | | StreetName 110174 |
| | | | | | | Telephone 110176 | | Telephone 110178 |

FIG. 110-9

| Package | | | level1 | level2 | level3 | level4 | Level5 | Data Type Name |
|---|---|---|---|---|---|---|---|---|
| | | Attachment-Folder 110180 | | | Attachment-Folder 110182 | | | |
| | | | | | | Document 110184 | | |
| | | | | | | | Name 110186 | LANGUAGEINDEPENDENT_EXTENDED_NAME 110188 |
| | | | | | | | TypeCode 110190 | Document-TypeCode 110192 |
| | | | | | | | Alternative-DocumentID 110194 | Alternative-DocumentID 110196 |

| Package | | | level1 | level2 | level3 | level4 | Level5 | Data Type Name |
|---|---|---|---|---|---|---|---|---|
| | | | | | | | VersionID 110198 | VersionID 110200 |
| | | | | | | | @actioncode 110202 | ActionCode 110204 |
| | Log 110206 | | | | Log 110208 | | | Log 110210 |

| Package | | | level1 | level2 | level3 | level4 | Cardinality |
|---|---|---|---|---|---|---|---|
| IndividualMaterialERPCreateRequestMessage_sync 111000 | | | IndividualMaterialERPCreateRequestMessage_sync 111002 | | | | |
| | MessageHeader 111004 | | | MessageHeader 111006 | | | 0..1 111008 |
| | IndividualMaterial 111010 | | | IndividualMaterial 111012 | | | 1 111014 |
| | | | | | ID 111016 | | 0..1 111018 |
| | | | | | MaterialID 111020 | | 0..1 111022 |
| | | | | | SerialID 111024 | | 0..1 111026 |

FIG. 111-2

| Package | | | level1 | level2 | level3 | level4 | Cardinality |
|---|---|---|---|---|---|---|---|
| | | | | | MaintenancePlan-ningPlantID 111028 | | 0..1 111030 |
| | | | | | WorkCentreID 111032 | | 0..1 111034 |
| | | | | | OperatingPlantID 111036 | | 0..1 111038 |
| | | | | | OperatingWork-CentreID 111040 | | 0..1 111042 |
| | | | | | CategoryCode 111044 | | 1 111046 |
| | | | | | ProfileIssueCate-goryFilterCode 111048 | | 0..1 111050 |

FIG. 111-3

| Package | | | level1 | level2 | level3 | level4 | Cardinality |
|---|---|---|---|---|---|---|---|
| | | | | | StatusObject 111052 | | 0..1 111054 |
| | | | | | Description 111056 | | 0..1 111058 |
| | | HierarchyRelationship 111060 | | | HierarchyRelationship 111062 | | 0..1 111064 |
| | | | | | | ParentProductID 111066 | 1 111068 |
| | | | | | | InstallationPositionID 111070 | 0..1 111072 |
| | | ManufacturerInformation 111074 | | | ManufacturerInformation 111076 | | 0..1 111078 |

FIG. 111-4

| Package | | | level1 | level2 | level3 | level4 | Cardinality |
|---|---|---|---|---|---|---|---|
| | | | | | | PartNumberID 111080 | 0..1 111082 |
| | | | | | | SerialID 111084 | 0..1 111086 |
| | | | | | | PartyInternalID 111088 | 0..1 111090 |
| | | | | | | ProductModelID 111092 | 0..1 111094 |
| | | Address 111096 | | | Address 111098 | | 0..1 111100 |
| | | | | | | HouseID 111102 | 0..1 111104 |
| | | | | | | StreetPostalCode 111106 | 0..1 111108 |

FIG. 111-5

| Package | | | level1 | level2 | level3 | level4 | Cardinality |
|---|---|---|---|---|---|---|---|
| | | | | | | CityName 111110 | 0..1 111112 |
| | | | | | | StreetName 111114 | 0..1 111116 |
| | | | | | | CountryCode 111118 | 1 111120 |
| | | | | | | Telephone 111122 | 0..1 111124 |

FIG. 112

| Package | | level1 | level2 | level3 | Cardinality |
|---|---|---|---|---|---|
| IndividualMaterialERPCreateConfirmationMessage_sync 112000 | | IndividualMaterialERPCreateConfirmationMessage_sync 112002 | | | |
| | MessageHeader 112004 | | MessageHeader 112006 | | 0..1 112008 |
| | IndividualMaterial 112010 | | IndividualMaterial 112012 | | 0..1 112014 |
| | | | | ID 112016 | 1 112018 |
| | Log 112020 | | Log 112022 | | 1 112024 |

FIG. 113-1

| Package | | | level1 | level2 | level3 | level4 | Cardinality |
|---|---|---|---|---|---|---|---|
| IndividualMaterialERPCreateCheckQueryMessage_sync 113000 | | | IndividualMaterialERPCreateCheckQueryMessage_sync 113002 | | | | |
| | IndividualMaterial 113004 | | | IndividualMaterial 113006 | | | 1 113008 |
| | | | | | ID 113010 | | 0..1 113012 |
| | | | | | MaterialID 113014 | | 0..1 113016 |
| | | | | | SerialID 113018 | | 0..1 113020 |
| | | | | | MaintenancePlanningPlantID 113022 | | 0..1 113024 |

FIG. 113-2

| Package | | | level1 | level2 | level3 | level4 | Cardinality |
|---|---|---|---|---|---|---|---|
| | | | | | WorkCentreID 113026 | | 0..1 113028 |
| | | | | | WorkCentrePlan-tID 113030 | | 0..1 113032 |
| | | | | | OperatingWork-CentreID 113034 | | 0..1 113036 |
| | | | | | OperatingPlantID 113038 | | 0..1 113040 |
| | | | | | CategoryCode 113042 | | 1 113044 |
| | | | | | ProfileIssueCate-goryFilterCode 113046 | | 0..1 113048 |

FIG. 113-3

| Package | | | level1 | level2 | level3 | level4 | Cardinality |
|---|---|---|---|---|---|---|---|
| | | | | | StatusObject 113050 | | 0..1 113052 |
| | | | | | Description 113054 | | 0..1 113056 |
| | | HierarchyRelation-ship 113058 | | | HierarchyRelation-ship 113060 | | 0..1 113062 |
| | | | | | | ParentProductID 113064 | 1 113066 |
| | | | | | | InstallationPosi-tionID 113068 | 0..1 113070 |
| | | ManufacturerIn-formation 113072 | | | ManufacturerIn-formation 113074 | | 0..1 113076 |

FIG. 113-4

| Package | | | level1 | level2 | level3 | level4 | Cardinality |
|---|---|---|---|---|---|---|---|
| | | | | | | PartNumberID 113078 | 0..1 113080 |
| | | | | | | SerialID 113082 | 0..1 113084 |
| | | | | | | PartyInternalID 113086 | 0..1 113088 |
| | | | | | | ProductModelID 113090 | 0..1 113092 |
| | | Address 113094 | | | Address 113096 | | 0..1 113098 |
| | | | | | | HouseID 113100 | 0..1 113102 |
| | | | | | | StreetPostalCode 113104 | 0..1 113106 |

FIG. 113-5

| Package | | | level1 | level2 | level3 | level4 | Cardinality |
|---|---|---|---|---|---|---|---|
| | | | | | | CityName 113108 | 1 113110 |
| | | | | | | StreetName 113112 | 0..1 113114 |
| | | | | | | CountryCode 113116 | 0..1 113118 |
| | | | | | | Telephone 113120 | 0..1 113122 |

FIG. 114

| Package | | level1 | level3 | Cardinality |
|---|---|---|---|---|
| IndividualMaterialERPCreateCheckResponseMessage_sync 114000 | | IndividualMaterialERPCreate-CheckResponseMes-sage_sync 114002 | | |
| | Log 114004 | | Log 114006 | 1 114008 |

FIG. 115-1

| Package | | | level1 | level2 | level3 | level4 | Cardinality |
|---|---|---|---|---|---|---|---|
| IndividualMaterialERPChangeRequestMessage_sync 115000 | | | IndividualMaterialERPChangeRequestMessage_sync 115002 | | | | |
| | MessageHeader 115004 | | | MessageHeader 115006 | | | 0..1 115008 |
| | IndividualMaterial 115010 | | | IndividualMaterial 115012 | | | 1 115014 |
| | | | | | ID 115016 | | 1 115018 |
| | | | | | MaintenancePlanningPlantID 115020 | | 0..1 115022 |
| | | | | | WorkCentreID 115024 | | 0..1 115026 |

FIG. 115-2

| Package | | | level1 | level2 | level3 | level4 | Cardinality |
|---|---|---|---|---|---|---|---|
| | | | | | OperatingWork-CentreID 115028 | | 0..1 115030 |
| | | | | | OperatingPlantID 115032 | | 0..1 115034 |
| | | | | | ProfileIssueCate-goryFilterCode 115036 | | 0..1 115038 |
| | | | | | StatusObject 115040 | | 0..1 115042 |
| | | | | | Description 115044 | | 0..1 115046 |
| | | ManufacturerIn-formation 115048 | | | ManufacturerIn-formation 115050 | | 0..1 115052 |

FIG. 115-3

| Package | | | level1 | level2 | level3 | level4 | Cardinality |
|---|---|---|---|---|---|---|---|
| | | | | | | PartNumberID 115054 | 0..1 115056 |
| | | | | | | SerialID 115058 | 0..1 115060 |
| | | | | | | PartyInternalID 115062 | 0..1 115064 |
| | | | | | | ProductModelID 115066 | 0..1 115068 |
| | | Address 115070 | | | Address 115072 | | 0..1 115074 |
| | | | | | | HouseID 115076 | 0..1 115078 |
| | | | | | | StreetPostalCode 115080 | 0..1 115082 |

FIG. 115-4

| Package | | | level1 | level2 | level3 | level4 | Cardinality |
|---|---|---|---|---|---|---|---|
| | | | | | | CityName 115084 | 0..1 115086 |
| | | | | | | StreetName 115088 | 0..1 115090 |
| | | | | | | CountryCode 115092 | 1 115094 |
| | | | | | | Telephone 115096 | 0..1 115098 |

FIG. 116

| Package | | level1 | level2 | level3 | Cardinality |
|---|---|---|---|---|---|
| IndividualMaterialChangeConfirmationMessage_sync 116000 | | IndividualMaterialERPChangeConfirmationMessage_sync 116002 | | | |
| | MessageHeader 116004 | | MessageHeader 116006 | | 0..1 116008 |
| | IndividualMaterial 116010 | | IndividualMaterial 116012 | | 1 116014 |
| | | | | ID 116016 | 1 116018 |
| | Log 116020 | | Log 116022 | | 1 116024 |

FIG. 117

| Package | | level1 | level2 | level3 | Cardinality |
|---|---|---|---|---|---|
| IndividualMaterialERPPropertyByIDQueryMessage_sync 117000 | | IndividualMaterialERPPropertyByIDQueryMessage_sync 117002 | | | |
| | Selection 117004 | | IndividualMaterialERPPropertySelectionByID 117006 | | 1 117008 |
| | | | | IndividualMaterialID 117010 | 1 117012 |

FIG. 118-1

| Package | | | level1 | level2 | level3 | level4 | | Cardinality |
|---|---|---|---|---|---|---|---|---|
| IndividualMaterialERPPropertyByIDReponseMessage_sync 118000 | | | IndividualMaterialERPPropertyByIDReponseMessage_sync 118002 | | | | | |
| | IndividualMaterial 118004 | | | IndividualMaterial 118006 | | | | 0..1 118008 |
| | | | | | ID 118010 | | | 1 118012 |
| | | | | | ChangeStateID 118014 | | | 0..1 118016 |
| | | | | | Description 118018 | | | 0..1 118020 |
| | | Property 118022 | | | Property 118024 | | | 0..n 118026 |

FIG. 118-2

| Package | | | level1 | level2 | level3 | level4 | | Cardinality |
|---|---|---|---|---|---|---|---|---|
| | | | | | | CollectionType-Code 118028 | | 1 118030 |
| | | | | | | CollectionID 118032 | | 1 118034 |
| | | | | | | Valuation 118036 | | 0..n 118038 |
| | | | | | | | Valuation 118040 | 0..n 118042 |
| | Log 118044 | | | Log 118046 | | | | 1 118048 |

FIG. 119

| Package | | level1 | level2 | level3 | Cardinality |
|---|---|---|---|---|---|
| IndividualMaterialERPUserStatusChangeRequestMessage_sync 119000 | | IndividualMaterialERPUserStatusChangeRequestMessage_sync 119002 | | | |
| | MessageHeader 119004 | | MessageHeader 119006 | | 0..1 119008 |
| | IndividualMaterial 119010 | | IndividualMaterial 119012 | | 1 119014 |
| | | | | ID 119016 | 1 119018 |
| | | | | StatusObject 119020 | 1 119022 |
| | | | | | |

FIG. 120

| Package | | level1 | level2 | Cardinality |
|---|---|---|---|---|
| IndividualMaterialERPUserStatusChangeConfirmationMessage_sync 120000 | | IndividualMaterialERPUserStatusChangeConfirmationMessage_sync 120002 | | |
| | MessageHeader 120004 | | MessageHeader 120006 | 0..1 120008 |
| | Log 120010 | | Log 120012 | 1 120014 |

FIG. 121-1

| Package | | level1 | level2 | level3 | Cardinality |
|---|---|---|---|---|---|
| IndividualMaterialERPSimpleByElementsQuery-Message_sync 121000 | | IndividualMaterialERP-SimpleByElementsQue-ryMessage_sync 121002 | | | |
| | Selection 121004 | | IndividualMaterialSim-pleSelectionByElements 121006 | | 1 121008 |
| | | | | MaterialID 121010 | 0..1 121012 |
| | | | | SerialID 121014 | 0..1 121016 |
| | | | | WorkCentreID 121018 | 0..1 121020 |
| | | | | WorkCentrePlantID 121022 | 0..1 121024 |

FIG. 121-2

| Package | | level1 | level2 | level3 | Cardinality |
|---|---|---|---|---|---|
| | | | | ManufacturerInformationPartNumberID 121026 | 0..1 121028 |
| | | | | ManufacturerInformationSerialID 121030 | 0..1 121032 |
| | | | | CustomerID 121034 | 0..1 121036 |
| | | | | CollectionID 121038 | 0..1 121040 |
| | | | | CollectionTypeCode 121042 | 0..1 121044 |
| | | | | Valuation 121046 | 0..1 121048 |

FIG. 121-3

| Package | | level1 | level2 | level3 | Cardinality |
|---|---|---|---|---|---|
| | ProcessingConditions 121050 | | ProcessingConditions 121052 | | 0..1 121054 |
| | | | | QueryHitsMaximum-NumberValue 121056 | 0..1 121058 |
| | | | | UnlimitedQueryHitsIndi-cator 121060 | 0..1 121062 |
| | | | | LastProvidedIndividual-MaterialID 121064 | 0..1 121066 |

FIG. 122-1

| Package | | level1 | level2 | level3 | Cardinality |
|---|---|---|---|---|---|
| IndividualMaterialERPSimpleByElementsResponseMessage_sync 122000 | | IndividualMaterialERPSimpleByElementsResponseMessage_sync 122002 | | | |
| | IndividualMaterial 122004 | | IndividualMaterial 122006 | | 0..n 122008 |
| | | | | ID 122010 | 1 122012 |
| | | | | Description 122014 | 0..1 122016 |
| | ProcessingConditions 122018 | | ProcessingConditions 122020 | | 1 122022 |
| | | | | ReturnedQueryHitsNumberValue 122024 | 1 122026 |

FIG. 122-2

| Package | | level1 | level2 | level3 | Cardinality |
|---|---|---|---|---|---|
| | | | | MoreElementsAvail-ableIndicator 122028 | 1 122030 |
| | | | | LastProvidedIndividual-MaterialID 122032 | 1 122034 |
| | Log 122036 | | Log 122038 | | 1 122040 |

FIG. 123-1

| Package | | | level1 | level2 | level3 | level4 | Cardinality |
|---|---|---|---|---|---|---|---|
| IndividualMaterialERPReplaceRequestMessage_sync 123000 | | | IndividualMaterialERPReplaceRequestMessage_sync 123002 | | | | |
| | MessageHeader 123004 | | | MessageHeader 123006 | | | 0..1 123008 |
| | IndividualMaterial 123010 | | | IndividualMaterial 123012 | | | 1 123014 |
| | | | | | ID 123016 | | 1 123018 |
| | | HierarchyRelationship 123020 | | | HierarchyRelationship 123022 | | 1 123024 |
| | | | | | | InstalledChildIndividualMaterialID 123026 | 1 123028 |

FIG. 123-2

| Package | | | level1 | level2 | level3 | level4 | Cardinality |
|---|---|---|---|---|---|---|---|
| | | | | | | Replace-mentChildIndi-vidualMaterialID 123030 | 1 123032 |
| | | | | | | Replacement-DateTime 123034 | 0..1 123036 |

FIG. 124

| Package | | level1 | level2 | Cardinality |
|---|---|---|---|---|
| IndividualMaterialERPReplaceConfirmationMessage_sync 124000 | | IndividualMaterialERPReplaceConfirmationMessage_sync 124002 | | |
| | MessageHeader 124004 | | MessageHeader 124006 | 0..1 124008 |
| | Log 124010 | | Log 124012 | 1 124014 |

FIG. 125-1

| Package | | | level1 | level2 | level3 | level4 | Cardinality |
|---|---|---|---|---|---|---|---|
| IndividualMaterialERPUpdateRequestMessage_sync 125000 | | | IndividualMaterialERPUpdateRequestMessage_sync 125002 | | | | |
| | MessageHeader 125004 | | | MessageHeader 125006 | | | 0..1 125008 |
| | IndividualMaterial 125010 | | | IndividualMaterial 125012 | | | 1 125014 |
| | | | | | ID 125016 | | 1 125018 |
| | | | | | MaterialID 125020 | | 0..1 125022 |
| | | | | | SerialID 125024 | | 0..1 125026 |

FIG. 125-2

| Package | | | level1 | level2 | level3 | level4 | Cardinality |
|---|---|---|---|---|---|---|---|
| | | | | | MaintenancePlanningPlantID 125028 | | 0..1 125030 |
| | | | | | WorkCentreID 125032 | | 0..1 125034 |
| | | | | | OperatingWorkCentreID 125036 | | 0..1 125038 |
| | | | | | OperatingPlantID 125040 | | 0..1 125042 |
| | | | | | CustomerID 125044 | | 0..1 125046 |
| | | | | | ProfileIssueCategoryFilterCode 125048 | | 0..1 125050 |

FIG. 125-3

| Package | | | level1 | level2 | level3 | level4 | Cardinality |
|---|---|---|---|---|---|---|---|
| | | | | | StatusObject 125052 | | 0..1 125054 |
| | | | | | Description 125056 | | 0..1 125058 |
| | | ManufacturerIn-formation 125060 | | | ManufacturerIn-formation 125062 | | 0..1 125064 |
| | | | | | | PartNumberID 125066 | 0..1 125068 |
| | | | | | | SerialID 125070 | 0..1 125072 |
| | | | | | | PartyInternalID 125074 | 0..1 125076 |

FIG. 125-4

| Package | | | level1 | level2 | level3 | level4 | Cardinality |
|---|---|---|---|---|---|---|---|
| | | | | | | ProductModelID 125078 | 0..1 125080 |
| | | Address 125082 | | | Address 125084 | | 0..1 125086 |
| | | | | | | HouseID 125088 | 0..1 125090 |
| | | | | | | StreetPostalCode 125092 | 0..1 125094 |
| | | | | | | CityName 125096 | 0..1 125098 |
| | | | | | | StreetName 125100 | 0..1 125102 |
| | | | | | | CountryCode 125104 | 1 125106 |

FIG. 125-5

| Package | | | level1 | level2 | level3 | level4 | Cardinality |
| --- | --- | --- | --- | --- | --- | --- | --- |
| | | | | | | Telephone 125108 | 0..1 125110 |

FIG. 126

| Package | | level1 | level2 | level3 | Cardinality |
|---|---|---|---|---|---|
| IndividualMaterialChangeConfirmationMessage_sync 126000 | | IndividualMaterialERPUpdateConfirmationMessage_sync 126002 | | | |
| | MessageHeader 126004 | | MessageHeader 126006 | | 0..1 126008 |
| | IndividualMaterial 126010 | | IndividualMaterial 126012 | | 1 126014 |
| | | | | ID 126016 | 1 126018 |
| | Log 126020 | | Log 126022 | | 1 126024 |

FIG. 127-1

| Package | | | level1 | level2 | level3 | level4 | Cardinality |
|---|---|---|---|---|---|---|---|
| IndividualMaterialERPUpdateCheckQueryMessage_sync 127000 | | | IndividualMaterialERPUpdateCheckQueryMessage_sync 127002 | | | | |
| | IndividualMaterial 127004 | | | IndividualMaterial 127006 | | | 1 127008 |
| | | | | | ID 127010 | | 1 127012 |
| | | | | | MaintenancePlanningPlantID 127014 | | 0..1 127016 |
| | | | | | WorkCentreID 127018 | | 0..1 127020 |
| | | | | | OperatingWorkCentreID 127022 | | 0..1 127024 |

FIG. 127-2

| Package | | | level1 | level2 | level3 | level4 | Cardinality |
|---|---|---|---|---|---|---|---|
| | | | | | OperatingPlantID 127026 | | 0..1 127028 |
| | | | | | ProfileIssueCategoryFilterCode 127030 | | 0..1 127032 |
| | | | | | StatusObject 127034 | | 0..1 127036 |
| | | | | | Description 127038 | | 0..1 127040 |
| | | ManufacturerInformation 127042 | | | ManufacturerInformation 127044 | | 0..1 127046 |
| | | | | | | PartNumberID 127048 | 0..1 127050 |

FIG. 127-3

| Package | | | level1 | level2 | level3 | level4 | Cardinality |
|---|---|---|---|---|---|---|---|
| | | | | | | SerialID 127052 | 0..1 127054 |
| | | | | | | PartyInternalID 127056 | 0..1 127058 |
| | | | | | | ProductModelID 127060 | 0..1 127062 |
| | | Address 127064 | | | Address 127066 | | 0..1 127068 |
| | | | | | | HouseID 127070 | 0..1 127072 |
| | | | | | | StreetPostalCode 127074 | 0..1 127076 |
| | | | | | | CityName 127078 | 0..1 127080 |

FIG. 127-4

| Package | | | level1 | level2 | level3 | level4 | Cardinality |
|---|---|---|---|---|---|---|---|
| | | | | | | StreetName 127082 | 0..1 127084 |
| | | | | | | CountryCode 127086 | 1 127088 |
| | | | | | | Telephone 127090 | 0..1 127092 |

FIG. 128

| Package | | level1 | level2 | Cardinality |
|---|---|---|---|---|
| IndividualMaterialERPUpdateCheckResponseMessage_sync 128000 | | IndividualMaterialERPUpdateCheckResponseMessage_sync 128002 | | |
| | Log 128004 | | Log 128006 | 1 128008 |

FIG. 129

| Package | | level1 | level2 | level3 | Cardinality |
|---|---|---|---|---|---|
| IndividualMaterialERPSetDeleteIndicatorRequest-Message_sync 129000 | | IndividualMaterialERPSetDeleteIndicatorRequestMessage_sync 129002 | | | |
| | MessageHeader 129004 | | MessageHeader 129006 | | 0..1 129008 |
| | IndividualMaterial 129010 | | IndividualMaterial 129012 | | 1 129014 |
| | | | | ID 129016 | 1 129018 |

FIG. 130

| Package | | level1 | level2 | Cardinality |
|---|---|---|---|---|
| IndividualMaterialERPSetDeleteIndicatorConfirmationMessage_sync 130000 | | IndividualMaterialERPSetDeleteIndicatorConfirmationMessage_sync 130002 | | |
| | MessageHeader 130004 | | MessageHeader 130006 | 0..1 130008 |
| | Log 130010 | | Log 130012 | 1 130014 |

FIG. 131

| Package | | level1 | level2 | level3 | Cardinality |
|---|---|---|---|---|---|
| IndividualMaterialERPResetDeleteIndicatorRequestMessage_sync 131000 | | IndividualMaterialERPResetDeleteIndicatorRequestMessage_sync 131002 | | | |
| | MessageHeader 131004 | | MessageHeader 131006 | | 0..1 131008 |
| | IndividualMaterial 131010 | | IndividualMaterial 131012 | | 1 131014 |
| | | | | ID 131016 | 1 131018 |

FIG. 132

| Package | | level1 | level2 | Cardinality |
|---|---|---|---|---|
| IndividualMaterialERPResetDeleteIndicatorConfirmationMessage_sync 132000 | | IndividualMaterialERPResetDeleteIndicatorConfirmationMessage_sync 132002 | | |
| | MessageHeader 132004 | | MessageHeader 132006 | 0..1 132008 |
| | Log 132010 | | Log 132012 | 1 132014 |

FIG. 133-1

| Package | | | level1 | level2 | level3 | level4 | level5 | Cardinality |
|---|---|---|---|---|---|---|---|---|
| IndividualMaterialERPAttachementFolder-ChangeRequestMessage_sync 133000 | | | IndividualMaterialERPAttachement-FolderUpdateRequest-Message_sync 133002 | | | | | |
| | MessageHeader 133004 | | | MessageHeader 133006 | | | | 0..1 133008 |
| | IndividualMaterial 133010 | | | IndividualMaterial 133012 | | | | 1 133014 |
| | | | | | ID 133016 | | | 1 133018 |
| | | Attachment-Folder 133020 | | | Attachment-Folder 133022 | | | 1 133024 |

FIG. 133-2

| Package | | | level1 | level2 | level3 | level4 | level5 | Cardinality |
|---|---|---|---|---|---|---|---|---|
| | | | | | | Document 133026 | | 1 133028 |
| | | | | | | | Name 133030 | 1 133032 |
| | | | | | | | TypeCode 133034 | 1 133036 |
| | | | | | | | Alternative-DocumentID 133038 | 1 133040 |
| | | | | | | | VersionID 133042 | 1 133044 |
| | | | | | | | @actioncode 133046 | 1 133048 |

FIG. 134

| Package | | level1 | level2 | Cardinality |
|---|---|---|---|---|
| IndividualMaterialERPAttachementFolderChangeConfirmationMessage_sync 134000 | | IndividualMaterialERPAttachementFolderChangeConfirmationMessage_sync 134002 | | |
| | MessageHeader 134004 | | MessageHeader 134006 | 0..1 134008 |
| | Log 134010 | | Log 134012 | 1 134014 |

FIG. 135

| Package | | level1 | level2 | level3 | Cardinality |
|---|---|---|---|---|---|
| IndividualMaterialByIDQueryMessage_sync 135000 | | IndividualMaterialByID-QueryMessage_sync 135002 | | | |
| | Selection 135004 | | IndividualMaterialSelec-tionByID 135006 | | 1 135008 |
| | | | | IndividualMaterialID 135010 | 1 135012 |

FIG. 136-1

| Package | | | level1 | level2 | level3 | level4 | Cardinality |
|---|---|---|---|---|---|---|---|
| IndividualMaterialByIDReponseMessage_sync 136000 | | | IndividualMaterial-ByIDReponse-Message_sync 136002 | | | | |
| | MessageHeader 136004 | | | MessageHeader 136006 | | | 0..1 136008 |
| | IndividualMaterial 136010 | | | IndividualMaterial 136012 | | | 1 136014 |
| | | | | | ID 136016 | | 1 136018 |
| | | | | | MaterialID 136020 | | 0..1 136022 |
| | | | | | SerialID 136024 | | 0..1 136026 |

FIG. 136-2

| Package | | | level1 | level2 | level3 | level4 | Cardinality |
|---|---|---|---|---|---|---|---|
| | | | | | MaintenancePlanningPlantID 136028 | | 0..1 136030 |
| | | | | | WorkCentreID 136032 | | 0..1 136034 |
| | | | | | WorkCentrePlantID 136036 | | 0..1 136038 |
| | | | | | Description 136040 | | 0..1 136042 |
| | | | | | WorkCentreDescription 136044 | | 0..1 136046 |
| | | HierarchyRelationship 136048 | | | HierarchyRelationship 136050 | | 0..1 136052 |

FIG. 136-3

| Package | | | level1 | level2 | level3 | level4 | Cardinality |
|---|---|---|---|---|---|---|---|
| | | | | | | ParentProductID 136054 | 1 136056 |
| | | | | | | InstallationPositionID 136058 | 0..1 136060 |
| | | ManufacturerInformation 136062 | | | ManufacturerInformation 136064 | | 0..1 136066 |
| | | | | | | PartNumberID 136068 | 0..1 136070 |
| | | | | | | SerialID 136072 | 0..1 136074 |
| | Log 136076 | | | Log 136078 | | | 1 136080 |

FIG. 137

| Package | | level1 | level2 | level3 | Cardinality |
|---|---|---|---|---|---|
| IndividualMaterialERPAttachementFolderByIDQueryMessage_sync 137000 | | IndividualMaterialERPAttachementFolderByID-QueryMessage_sync 137002 | | | |
| | Selection 137004 | | IndividualMaterialAttachmentFolderSelectionByID 137006 | | 1 137008 |
| | | | | IndividualMaterialID 137010 | 1 137012 |

FIG. 138-1

| Package | | | level1 | level2 | level3 | level4 | level5 | Cardinality |
|---|---|---|---|---|---|---|---|---|
| IndividualMaterialERPAttachementFolderByIDResponseMessage_sync 138000 | | | IndividualMaterialERPAttachementFolderByIDResponseMessage_sync 138002 | | | | | |
| | IndividualMaterial 138004 | | | IndividualMaterial 138006 | | | | 0..1 138008 |
| | | | | | ID 138010 | | | 1 138012 |
| | | Attachment-Folder 138014 | | | Attachment-Folder 138016 | | | 0..1 138018 |
| | | | | | | Document 138020 | | 1 138022 |

FIG. 138-2

| Package | | | level1 | level2 | level3 | level4 | level5 | Cardinality |
|---|---|---|---|---|---|---|---|---|
| | | | | | | | Name 138024 | 1 138026 |
| | | | | | | | TypeCode 138028 | 1 138030 |
| | | | | | | | Alternative-DocumentID 138032 | 1 138034 |
| | | | | | | | VersionID 138036 | 1 138038 |
| | Log 138040 | | | Log 138042 | | | | 1 138044 |

FIG. 139-1

| Package | | | level1 | level2 | level3 | level4 | Cardinality |
|---|---|---|---|---|---|---|---|
| IndividualMaterialERPPropertyUpdateRequestMessage_sync 139000 | | | IndividualMaterialERPPropertyUpdateRequestMessage_sync 139002 | | | | |
| | MessageHeader 139004 | | | MessageHeader 139006 | | | 0..1 139008 |
| | IndividualMaterial 139010 | | | IndividualMaterial 139012 | | | 1 139014 |
| | | | | | ID 139016 | | 1 139018 |
| | | Property 139020 | | | Property 139022 | | 1..n 139024 |
| | | | | | | CollectionID 139026 | 1 139028 |

FIG. 139-2

| Package | | | level1 | level2 | level3 | level4 | Cardinality |
|---|---|---|---|---|---|---|---|
| | | | | | | CollectionType-Code 139030 | 0..1 139032 |
| | | | | | | @actioncode 139034 | 1 139036 |
| | | | | | | Valuation 139038 | 0..n 139040 |

FIG. 140-1

| Package | | | level1 | level2 | level3 | level4 | Cardinality |
|---|---|---|---|---|---|---|---|
| IndividualMaterialERPPropertyUpdateRequestMessage_sync 140000 | | | IndividualMaterialERPPropertyUpdateRequestMessage_sync 140002 | | | | |
| | MessageHeader 140004 | | | MessageHeader 140006 | | | 0..1 140008 |
| | IndividualMaterial 140010 | | | IndividualMaterial 140012 | | | 1 140014 |
| | | | | | ID 140016 | | 1 140018 |
| | | Property 140020 | | | Property 140022 | | 1..n 140024 |
| | | | | | | CollectionID 140026 | 1 140028 |

FIG. 140-2

| Package | | | level1 | level2 | level3 | level4 | Cardinality |
|---|---|---|---|---|---|---|---|
| | | | | | | CollectionType-Code 140030 | 0..1 140032 |
| | | | | | | @actioncode 140034 | 1 140036 |
| | | | | | | Valuation 140038 | 0..n 140040 |

FIG. 141

| Package | level1 | level2 | Cardinality |
|---|---|---|---|
| IndividualMaterialERPPropertyUpdateConfirmationMessage_sync 141000 | IndividualMaterialERPPropertyUpdateConfirmationMessage_sync 141002 | | |
| MessageHeader 141004 | | MessageHeader 141006 | 0..1 141008 |
| Log 141010 | | Log 141012 | 1 141014 |

FIG. 150-1

| Package | | level1 | level2 | level3 | Data Type Name |
|---|---|---|---|---|---|
| MeasuringDeviceRequestMessage 150000 | | MeasuringDeviceRe-questMessage 150002 | | | <MessageDataType> 150004 |
| | MessageHeader 150006 | | MessageHeader 150008 | | BasicBusinessDocu-mentMessageHeader 150010 |
| | MeasuringDevice 150012 | | MeasuringDevice 150014 | | |
| | | | | ID 150016 | MeasuringDeviceID 150018 |
| | | | | IndividualMaterialID 150020 | ProductInternalID 150022 |
| | | | | InstallationPointID 150024 | InstallationPointID 150026 |

FIG. 150-2

| Package | | level1 | level2 | level3 | Data Type Name |
|---|---|---|---|---|---|
| | | | | MaterialInternalID 150028 | ProductInternalID 150030 |
| | | | | PositionID 150032 | MeasuringDevicePosi-tionID 150034 |
| | | | | PropertyID 150036 | PropertyID 150038 |
| | | | | MeasurementReading-SourceMeasuringDe-viceID 150040 | MeasuringDeviceID 150042 |
| | | | | MeasurementMainte-nanceIssueCategory-CatalogueID 150044 | MaintenanceIssueCate-goryCatalogueID 150046 |

FIG. 150-3

| Package | | level1 | level2 | level3 | Data Type Name |
|---|---|---|---|---|---|
| | | | | MeasurementParent-MaintenanceIssueCate-goryID 150048 | MaintenanceIssueCate-goryID 150050 |
| | | | | CategoryCode 150052 | MeasuringDeviceCate-goryCode 150054 |
| | | | | TypeCode 150056 | MeasuringDeviceType-Code 150058 |
| | | | | TargetMeasure 150060 | Measure 150062 |
| | | | | MaximumMeasure 150064 | Measure 150066 |
| | | | | MinimumMeasure 150068 | Measure 150070 |

FIG. 150-4

| Package | | level1 | level2 | level3 | Data Type Name |
|---|---|---|---|---|---|
| | | | | AnnualEstimatedMeasure 150072 | Measure 150074 |
| | | | | ResetThresholdMeasure 150076 | Measure 150078 |
| | | | | MeasurementReadingCopyIndicator 150080 | Indicator 150082 |
| | | | | MeasurementReadingCopyValidityPeriod 150084 | UPPEROPEN_TIMEZONEINDEPENDENT_DateTimePeriod 150086 |
| | | | | QuantitativeMeasurementOptionalIndicator 150088 | Indicator 150090 |
| | | | | DescendingIndicator 150092 | Indicator 150094 |

FIG. 150-5

| Package | | level1 | level2 | level3 | Data Type Name |
|---|---|---|---|---|---|
| | | | | TemplateIndicator 150096 | Indicator 150098 |
| | | | | Description 150100 | SHORT_Description 150102 |
| | | | | CategoryName 150104 | MEDIUM_Name 150106 |
| | | | | TypeName 150108 | MEDIUM_Name 150110 |
| | | | | Comment 150112 | Comment 150114 |
| | | | | ActiveIndicator 150116 | Indicator 150118 |
| | ProcessingConditions 150120 | | ProcessingConditions 150122 | | |

FIG. 150-6

| Package | | level1 | level2 | level3 | Data Type Name |
|---|---|---|---|---|---|
| | | | | QueryHitsMaximum-NumberValue 150124 | NumberValue 150126 |
| | | | | UnlimitedQueryHitsIndicator 150128 | Indicator 150130 |
| | | | | ReturnedQueryHitsNumberValue 150132 | NumberValue 150134 |
| | | | | MoreElementsAvailableIndicator 150136 | MoreElementsAvailableIndicator 150138 |
| | | | | LastProvidedMeasuring-DeviceID 150140 | MeasuringDeviceID 150142 |

FIG. 151-1

| Package | | | level1 | level2 | level3 | Cardinality |
|---|---|---|---|---|---|---|
| MeasuringDeviceERPCreateRequestMessage_sync 151000 | | | MeasuringDeviceERPCreateRequestMessage_sync 151002 | | | |
| | MessageHeader 151004 | | | MessageHeader 151006 | | 0..1 151008 |
| | MeasuringDevice 151010 | | | MeasuringDevice 151012 | | 1 151014 |
| | | | | | IndividualMaterialID 151016 | 0..1 151018 |
| | | | | | InstallationPointID 151020 | 0..1 151022 |
| | | | | | MaterialInternalID 151024 | 0..1 151026 |

FIG. 151-2

| Package | | | level1 | level2 | level3 | Cardinality |
|---|---|---|---|---|---|---|
| | | | | | PositionID 151028 | 0..1 151030 |
| | | | | | PropertyID 151032 | 1 151034 |
| | | | | | MeasurementReadingSourceMeasuringDeviceID 151036 | 0..1 151038 |
| | | | | | MeasurementMaintenanceIssueCategoryCatalogueID 151040 | 0..1 151042 |
| | | | | | MeasurementParentMaintenanceIssueCategoryID 151044 | 0..1 151046 |

FIG. 151-3

| Package | | | level1 | level2 | level3 | Cardinality |
|---|---|---|---|---|---|---|
| | | | | | CategoryCode 151048 | 1 151050 |
| | | | | | TypeCode 151052 | 1 151054 |
| | | | | | TargetMeasure 151056 | 0..1 151058 |
| | | | | | MaximumMeasure 151060 | 0..1 151062 |
| | | | | | MinimumMeasure 151064 | 0..1 151066 |
| | | | | | AnnualEstimated-Measure 151068 | 0..1 151070 |

FIG. 151-4

| Package | | | level1 | level2 | level3 | Cardinality |
|---|---|---|---|---|---|---|
| | | | | | ResetThreshold-Measure 151072 | 0..1 151074 |
| | | | | | MeasurementReading-CopyIndicator 151076 | 0..1 151078 |
| | | | | | MeasurementReading-CopyValidityPeriod 151080 | 0..1 151082 |
| | | | | | QuantitativeMeasurementOptionalIndicator 151084 | 0..1 151086 |
| | | | | | DescendingIndicator 151088 | 0..1 151090 |

FIG. 151-5

| Package | | | level1 | level2 | level3 | Cardinality |
|---|---|---|---|---|---|---|
| | | | | | TemplateIndicator 151092 | 0..1 151094 |
| | | | | | Description 151096 | 0..1 151098 |
| | | | | | Comment 151100 | 0..1 151102 |

FIG. 152

| Package | | | level1 | level2 | level3 | Cardinality |
|---|---|---|---|---|---|---|
| In-MeasuringDeviceERPCreateConfirmationMessage_sync 152000 | | | In-MeasuringDeviceERPCreateConfirmationMessage_sync 152002 | | | |
| | MessageHeader 152004 | | | MessageHeader 152006 | | 0..1 152008 |
| | MeasuringDevice 152010 | | | MeasuringDevice 152012 | | 0..1 152014 |
| | | | | | ID 152016 | 1 152018 |
| | Log 152020 | | | Log 152022 | | 1 152024 |

FIG. 153

| Package | level1 | level2 | level3 | Cardinality |
|---|---|---|---|---|
| MeasuringDeviceERPByIDQueryMessage_sync 153000 | MeasuringDeviceERPByIDQueryMessage_sync 153002 | | | |
| Selection 153004 | | MeasuringDeviceSelectionByID 153006 | | 1 153008 |
| | | | MeasuringDeviceID 153010 | 1 153012 |

FIG. 154-1

| Package | | | level1 | level2 | level3 | Cardinality |
|---|---|---|---|---|---|---|
| MeasuringDeviceERPByIDResponse_sync 154000 | | | MeasuringDeviceERPByIDResponse_sync 154002 | | | |
| | MeasuringDevice 154004 | | | MeasuringDevice 154006 | | 0..1 154008 |
| | | | | | ID 154010 | 1 154012 |
| | | | | | IndividualMaterialID 154014 | 0..1 154016 |
| | | | | | InstallationPointID 154018 | 0..1 154020 |
| | | | | | MaterialInternalID 154022 | 0..1 154024 |

FIG. 154-2

| Package | | | level1 | level2 | level3 | Cardinality |
|---|---|---|---|---|---|---|
| | | | | | PositionID 154026 | 0..1 154028 |
| | | | | | PropertyID 154030 | 1 154032 |
| | | | | | MeasurementReadingSourceMeasuringDeviceID 154034 | 0..1 154036 |
| | | | | | MeasurementMaintenanceIssueCategoryCatalogueID 154038 | 0..1 154040 |
| | | | | | MeasurementParentMaintenanceIssueCategoryID 154042 | 0..1 154044 |

FIG. 154-3

| Package | | | level1 | level2 | level3 | Cardinality |
|---|---|---|---|---|---|---|
| | | | | | CategoryCode 154046 | 1 154048 |
| | | | | | TypeCode 154050 | 1 154052 |
| | | | | | TargetMeasure 154054 | 0..1 154056 |
| | | | | | MaximumMeasure 154058 | 0..1 154060 |
| | | | | | MinimumMeasure 154062 | 0..1 154064 |
| | | | | | AnnualEstimated-Measure 154066 | 0..1 154068 |

FIG. 154-4

| Package | | | level1 | level2 | level3 | Cardinality |
|---|---|---|---|---|---|---|
| | | | | | ResetThreshold-Measure 154070 | 0..1 154072 |
| | | | | | MeasurementRead-ingCopyIndicator 154074 | 0..1 154076 |
| | | | | | MeasurementRead-ingCopyValidityPe-riod 154078 | 0..1 154080 |
| | | | | | QuantitativeMeas-urementOptionalIndi-cator 154082 | 0..1 154084 |
| | | | | | DescendingIndicator 154086 | 0..1 154088 |

FIG. 154-5

| Package | | | level1 | level2 | level3 | Cardinality |
|---|---|---|---|---|---|---|
| | | | | | TemplateIndicator 154090 | 0..1 154092 |
| | | | | | Description 154094 | 0..1 154096 |
| | | | | | CategoryName 154098 | 0..1 154100 |
| | | | | | TypeName 154102 | 0..1 154104 |
| | | | | | Comment 154106 | 0..1 154108 |
| | | | | | ActiveIndicator 154110 | 1 154112 |
| | Log 154114 | | | Log 154116 | | 1 154118 |

FIG. 155-1

| Package | | | level1 | level2 | level3 | level4 | Cardinality |
|---|---|---|---|---|---|---|---|
| MeasuringDeviceERPSimpleByElementsQueryMessage_sync 155000 | | | MeasuringDeviceERPSimpleByElementsQueryMessage_sync 155002 | | | | |
| | Selection 155004 | | | MeasuringDeviceSimpleSelectionByElements 155006 | | | 1 155008 |
| | | | | | SelectionByMeasuringDeviceID 155010 | | 0..1 155012 |
| | | | | | | InclusionExclusionCode 155014 | 1 155016 |
| | | | | | | IntervalBoundaryTypeCode 155018 | 1 155020 |

FIG. 155-2

| Package | | | level1 | level2 | level3 | level4 | Cardinality |
|---|---|---|---|---|---|---|---|
| | | | | | | LowerBoundary-MeasuringDe-viceID 155022 | 1 155024 |
| | | | | | | UpperBoundary-MeasuringDe-viceID 155026 | 0..1 155028 |
| | | | | | IndividualMateri-alID 155030 | | 0..1 155032 |
| | | | | | InstallationPointID 155034 | | 0..1 155036 |
| | | | | | MaterialInternalID 155038 | | 0..1 155040 |
| | | | | | PositionId 155042 | | 0..1 155044 |

FIG. 155-3

| Package | | | level1 | level2 | level3 | level4 | Cardinality |
|---|---|---|---|---|---|---|---|
| | | | | | PropertyID 155046 | | 0..1 155048 |
| | | | | | Measurement-MaintenanceIssueCategoryCatalogueID 155050 | | 0..1 155052 |
| | | | | | MeasurementParentMaintenanceIssueCategoryID 155054 | | |
| | | | | | Description 155056 | | 0..1 155058 |
| | ProcessingConditions 155060 | | | ProcessingConditions 155062 | | | 0..1 155064 |

FIG. 155-4

| Package | | | level1 | level2 | level3 | level4 | Cardinality |
|---|---|---|---|---|---|---|---|
| | | | | | QueryHitsMaxi-mumNumberValue 155066 | | 0..1 155068 |
| | | | | | UnlimitedQuery-HitsIndicator 155070 | | 0..1 155072 |
| | | | | | LastProvided-MeasuringDe-viceID 155074 | | 0..1 155076 |

FIG. 156-1

| Package | | | level1 | level2 | level3 | Cardinality |
|---|---|---|---|---|---|---|
| MeasuringDeviceERPSimpleByElementsResponseMessage_sync 156000 | | | MeasuringDeviceERPSimpleByElementsResponseMessage_sync 156002 | | | |
| | MeasuringDevice 156004 | | | MeasuringDevice 156006 | | 0..n 156008 |
| | | | | | ID 156010 | 1 156012 |
| | | | | | Description 156014 | 0..1 156016 |
| | ProcessingConditions 156018 | | | ProcessingConditions 156020 | | 1 156022 |
| | | | | | ReturnedQueryHitsNumberValue 156024 | 1 156026 |

FIG. 156-2

| Package | | | level1 | level2 | level3 | Cardinality |
|---|---|---|---|---|---|---|
| | | | | | MoreElementsAvail-ableIndicator 156028 | 1 156030 |
| | | | | | LastProvidedMeasur-ingDeviceID 156032 | 1 156034 |
| | | Log 156036 | | Log 156038 | | 1 156040 |

MANAGING CONSISTENT INTERFACES FOR BUSINESS OBJECTS ACROSS HETEROGENEOUS SYSTEMS

TECHNICAL FIELD

The subject matter described herein relates generally to the generation and use of consistent interfaces (or services) derived from a business object model. More particularly, the present disclosure relates to the generation and use of consistent interfaces or services that are suitable for use across industries, across businesses, and across different departments within a business.

BACKGROUND

Transactions are common among businesses and between business departments within a particular business. During any given transaction, these business entities exchange information. For example, during a sales transaction, numerous business entities may be involved, such as a sales entity that sells merchandise to a customer, a financial institution that handles the financial transaction, and a warehouse that sends the merchandise to the customer. The end-to-end business transaction may require a significant amount of information to be exchanged between the various business entities involved. For example, the customer may send a request for the merchandise as well as some form of payment authorization for the merchandise to the sales entity, and the sales entity may send the financial institution a request for a transfer of funds from the customer's account to the sales entity's account.

Exchanging information between different business entities is not a simple task. This is particularly true because the information used by different business entities is usually tightly tied to the business entity itself. Each business entity may have its own program for handling its part of the transaction. These programs differ from each other because they typically are created for different purposes and because each business entity may use semantics that differ from the other business entities. For example, one program may relate to accounting, another program may relate to manufacturing, and a third program may relate to inventory control. Similarly, one program may identify merchandise using the name of the product while another program may identify the same merchandise using its model number. Further, one business entity may use U.S. dollars to represent its currency while another business entity may use Japanese Yen. A simple difference in formatting, e.g., the use of upper-case lettering rather than lower-case or title-case, makes the exchange of information between businesses a difficult task. Unless the individual businesses agree upon particular semantics, human interaction typically is required to facilitate transactions between these businesses. Because these "heterogeneous" programs are used by different companies or by different business areas within a given company, a need exists for a consistent way to exchange information and perform a business transaction between the different business entities.

Currently, many standards exist that offer a variety of interfaces used to exchange business information. Most of these interfaces, however, apply to only one specific industry and are not consistent between the different standards. Moreover, a number of these interfaces are not consistent within an individual standard.

SUMMARY

In a first aspect, software creates, updates and retrieves information related to funds management centers. The software comprises computer readable instructions embodied on tangible media. The software executes in a landscape of computer systems providing message-based services. The software invokes a funds management center business object. The business object is a logically centralized, semantically disjointed object that represents the organizational structure of an organization within a financial management area, including subordinate financial management centers and attributes for different validity periods. The business object comprises data logically organized as a funds management center root node, an authorization group subordinate node, a contact subordinate node and a funds management center name subordinate node. The software initiates transmission of a message to a heterogeneous second application, executing in the environment of computer systems providing message-based services, based on the data in the funds management center business object. The message comprises a funds management center enterprise resource planning create request message entity, a message header package and a funds management center package.

In a second aspect, software creates, updates and retrieves information related to funds management centers. The software comprises computer readable instructions embodied on tangible media. The software executes in a landscape of computer systems providing message-based services. The software initiates transmission of a message to a heterogeneous second application, executing in the environment of computer systems providing message-based services, based on data in a funds management center business object invoked by the second application. The business object is a logically centralized, semantically disjointed object that represents the organizational structure of an organization within a financial management area, including subordinate financial management centers and attributes for different validity periods. The business object comprises data logically organized as a funds management center root node, an authorization group subordinate node, a contact subordinate node and a funds management center name subordinate node. The message comprises a funds management center enterprise resource planning create request message entity, a message header package and a funds management center package. The software receives a second message from the second application. The second message is associated with the invoked funds management center business object and is in response to the first message.

In a third aspect, a distributed system operates in a landscape of computer systems providing message-based services. The system processes business objects involving creating, updating and retrieving information related to funds management centers. The system comprises memory and a graphical user interface remote from the memory. The memory stores a business object repository storing a plurality of business objects. Each business object is a logically centralized, semantically disjointed object of a particular business object type. At least one of the business objects represents the organizational structure of an organization within a financial management area, including subordinate financial management centers and attributes for different validity periods. The business object comprises data logically organized as a funds management center root node, an authorization group subordinate node, a contact subordinate node and a funds management center name subordinate node. The graphical user interface presents data associated with an invoked instance of the funds management center business object, the interface comprising computer readable instructions embodied on tangible media.

In a fourth aspect, software creates, updates and retrieves information used for planning and executing maintenance activities on individual materials. The software comprises computer readable instructions embodied on tangible media. The software executes in a landscape of computer systems providing message-based services. The software invokes an individual material business object. The business object is a logically centralized, semantically disjointed object for a material that occurs only once in the real world and is therefore uniquely identifiable. The business object comprises data logically organized as an individual material root node, an individual material hierarchy relationship subordinate node, an individual material manufacturer information subordinate node, an individual material address information subordinate node, an individual material property subordinate node and an individual material attachment folder subordinate node. The individual material property node contains a valuation subordinate node. The individual material attachment folder node contains a document subordinate node. The software initiates transmission of a message to a heterogeneous second application, executing in the environment of computer systems providing message-based services, based on the data in the individual material business object. The message comprises an individual material message entity, a message header package, an individual material package and a log package.

In a fifth aspect, software creates, updates and retrieves information used for planning and executing maintenance activities on individual materials. The software comprises computer readable instructions embodied on tangible media. The software executes in a landscape of computer systems providing message-based services. The software initiates transmission of a message to a heterogeneous second application, executing in the environment of computer systems providing message-based services, based on data in an individual material business object invoked by the second application. The business object is a logically centralized, semantically disjointed object for a material that occurs only once in the real world and is therefore uniquely identifiable. The business object comprises data logically organized as an individual material root node, an individual material hierarchy relationship subordinate node, an individual material manufacturer information subordinate node, an individual material address information subordinate node, an individual material property subordinate node and an individual material attachment folder subordinate node. The individual material property node contains a valuation subordinate node. The individual material attachment folder node contains a document subordinate node. The message comprises an individual material message entity, a message header package, an individual material package and a log package. The software receives a second message from the second application. The second message is associated with the invoked individual material business object and is in response to the first message.

In a sixth aspect, a distributed system operates in a landscape of computer systems providing message-based services. The system processes business objects involving creating, updating and retrieving information used for planning and executing maintenance activities on individual materials. The system comprises memory and a graphical user interface remote from the memory. The memory stores a business object repository storing a plurality of business objects. Each business object is a logically centralized, semantically disjointed object of a particular business object type. At least one of the business objects is for a material that occurs only once in the real world and is therefore uniquely identifiable. The business object comprises data logically organized as an individual material root node, an individual material hierarchy relationship subordinate node, an individual material manufacturer information subordinate node, an individual material address information subordinate node, an individual material property subordinate node and an individual material attachment folder subordinate node. The individual material property node contains a valuation subordinate node. The individual material attachment folder node contains a document subordinate node. The graphical user interface presents data associated with an invoked instance of the individual material business object, the interface comprising computer readable instructions embodied on tangible media.

In a seventh aspect, software creates, updates and retrieves information for a device that is used to take measurement readings of technical objects. The software comprises computer readable instructions embodied on tangible media. The software executes in a landscape of computer systems providing message-based services. The software invokes a measuring device business object. The business object is a logically centralized, semantically disjointed object for represents a device that is used to take measurement readings of technical objects, including installation points and individual materials. The business object comprises data logically organized as a measuring device root node. The software initiates transmission of a message to a heterogeneous second application, executing in the environment of computer systems providing message-based services, based on the data in the measuring device business object. The message comprises a measuring device enterprise resource planning create request message entity, a message header package and a measuring device package.

In an eighth aspect, software creates, updates and retrieves information for a device that is used to take measurement readings of technical objects. The software comprises computer readable instructions embodied on tangible media. The software executes in a landscape of computer systems providing message-based services. The software initiates transmission of a message to a heterogeneous second application, executing in the environment of computer systems providing message-based services, based on data in a measuring device business object invoked by the second application. The business object is a logically centralized, semantically disjointed object for represents a device that is used to take measurement readings of technical objects, including installation points and individual materials. The business object comprises data logically organized as a measuring device root node. The message comprises a measuring device enterprise resource planning create request message entity, a message header package and a measuring device package. The software receives a second message from the second application. The second message is associated with the invoked measuring device business object and is in response to the first message.

In a ninth aspect, a distributed system operates in a landscape of computer systems providing message-based services. The system processes business objects involving creating, updating and retrieving information for a device that is used to take measurement readings of technical objects. The system comprises memory and a graphical user interface remote from the memory. The memory stores a business object repository storing a plurality of business objects. Each business object is a logically centralized, semantically disjointed object of a particular business object type. At least one of the business objects represents a device that is used to take measurement readings of technical objects, including installation points and individual materials. The business object comprises data logically organized as a measuring device root node. The graphical user interface presents data associated with an invoked instance of the measuring device business object, the interface comprising computer readable instructions embodied on tangible media.

BRIEF DESCRIPTION OF THE DRAWINGS

FIGS. 27A-E depict a hierarchization process in accordance with methods and systems consistent with the subject matter described herein.

FIGS. 43-1 through 43-4 show an exemplary FundsManagementCentreERPMessage_sync Element Structure.

FIGS. 44-1 through 44-3 show an exemplary FundsManagementCentreERPCreateRequestMessage_sync Element Structure.

FIGS. 45-1 through 45-2 show an exemplary FundsManagementCentreERPCreateConfirmationMessage_sync Element Structure.

FIGS. 46-1 through 46-3 show an exemplary FundsManagementCentreERPUpdateRequestMessage_sync Element Structure.

FIGS. 47-1 through 47-2 show an exemplary FundsManagementCentreERPUpdateConfirmationMessage_sync Element Structure.

FIGS. 48-1 through 48-3 show an exemplary FundsManagementCentreERPChangeRequestMessage_sync Element Structure.

FIGS. 49-1 through 49-2 show an exemplary FundsManagementCentreERPChangeConfirmationMessage_sync Element Structure.

FIG. 50 shows an exemplary FundsManagementCentreERPByIDQueryMessage_sync Element Structure.

FIGS. 51-1 through 51-4 show an exemplary FundsManagementCentreERPByIDResponseMessage_sync Element Structure.

FIGS. 52-1 through 52-8 show an exemplary FundsManagementCentreERPSimpleByElementsQueryMessage_sync Element Structure.

FIGS. 53-1 through 53-2 show an exemplary FundsManagementCentreERPSimpleByElementsResponseMessage_sync Element Structure.

FIGS. 54-1 through 54-4 show an exemplary IndividualMaterial Object Model.

FIGS. 99-1 through 99-5 show an exemplary IndividualMaterialsByIDResponse_sync, IndividualMaterialinstallRequest_sync, IndividualMaterialInstallConfirmation_sync, IndividualMateriaDismantleRequest_sync, IndividualMaterialDismantleConfirmation_sync, IndividualMaterialSimpleByWarrantyResponse_sync Element Structure.

FIG. 100 shows an exemplary IndividualMaterialByIDQueryMessage_sync Element Structure.

FIGS. 101-1 through 101-4 show an exemplary IndividualMaterialByIDResponseMessage_sync Element Structure.

FIGS. 102-1 through 102-2 show an exemplary IndividualMaterialInstallRequestMessage_sync Element Structure.

FIG. 103 shows an exemplary IndividualMaterialEquipmentInstallConfirmationMessage_sync Element Structure.

FIGS. 104-1 through 104-2 show an exemplary IndividualMaterialDismantleRequestMessage_sync Element Structure.

FIG. 105 shows an exemplary IndividualMaterialDismantleConfirmationMessage_sync Element Structure.

FIGS. 106-1 through 106-2 show an exemplary IndividualMaterialSimpleByElementsQueryMessage_sync Element Structure.

FIG. 107 shows an exemplary IndividualMaterialSimpleByElementsResponseMessage_sync Element Structure.

FIG. 108 shows an exemplary IndividualMaterialSimpleByWarrantyQueryMessage_sync Element Structure.

FIGS. 109-1 through 109-2 show an exemplary IndividualMaterialSimpleByWarrantyResponseMessage_sync Element Structure.

FIGS. 110-1 through 110-10 show an exemplary IndividualMaterialERPMessage_sync Element Structure.

FIGS. 111-1 through 111-5 show an exemplary IndividualMaterialERPCreateRequestMessage_sync Element Structure.

FIG. 112 shows an exemplary IndividualMaterialERPCreateConfirmationMessage_sync Element Structure.

FIGS. 113-1 through 113-5 show an exemplary IndividualMaterialERPCreateCheckQueryMessage_sync Element Structure.

FIG. 114 shows an exemplary IndividualMaterialERPCreateCheckResponseMessage_sync Element Structure.

FIGS. 115-1 through 115-4 show an exemplary IndividualMaterialERPChangeRequestMessage_sync Element Structure.

FIG. 116 shows an exemplary IndividualMaterialERPChangeConfirmationMessage_sync Element Structure.

FIG. 117 shows an exemplary IndividualMaterialERPPropertyByIDQueryMessage_sync Element Structure.

FIGS. 118-1 through 118-2 show an exemplary IndividualMaterialERPPropertyByIDResponseMessage_sync Element Structure.

FIG. 119 shows an exemplary IndividualMaterialERPUserStatusChangeRequestMessage_sync Element Structure.

FIG. 120 shows an exemplary IndividualMaterialERPUserStatusChangeConfirmationMessage_sync Element Structure.

FIGS. 121-1 through 121-3 show an exemplary IndividualMaterialERPSimpleByElementsQueryMessage_sync Element Structure.

FIGS. 122-1 through 122-2 show an exemplary IndividualMaterialERPSimpleByElementsResponseMessage_sync Element Structure.

FIGS. 123-1 through 123-2 show an exemplary IndividualMaterialERPReplaceRequestMessage_sync Element Structure.

FIG. 124 shows an exemplary IndividualMaterialERPReplaceConfirmationMessage_sync Element Structure.

FIGS. 125-1 through 125-5 show an exemplary IndividualMaterialERPUpdateRequestMessage_sync Element Structure.

FIG. 126 shows an exemplary IndividualMaterialERPUpdateConfirmationMessage_sync Element Structure.

FIGS. 127-1 through 127-4 show an exemplary IndividualMaterialERPUpdateCheckQueryMessage_sync Element Structure.

FIG. 128 shows an exemplary IndividualMaterialERPUpdateCheckResponseMessage_sync Element Structure.

FIG. 129 shows an exemplary IndividualMaterialERPSetDeleteIndicatorRequestMessage_sync Element Structure.

FIG. 130 shows an exemplary IndividualMaterialERPSetDeleteindicatorConfirmationMessage_sync Element Structure.

FIG. 131 shows an exemplary IndividualMaterialERPResetDeleteIndicatorRequestMessage_sync Element Structure.

FIG. 132 shows an exemplary IndividualMaterialERPResetDeleteIndicatorConfirmationMessage_sync Element Structure.

Figure 1:
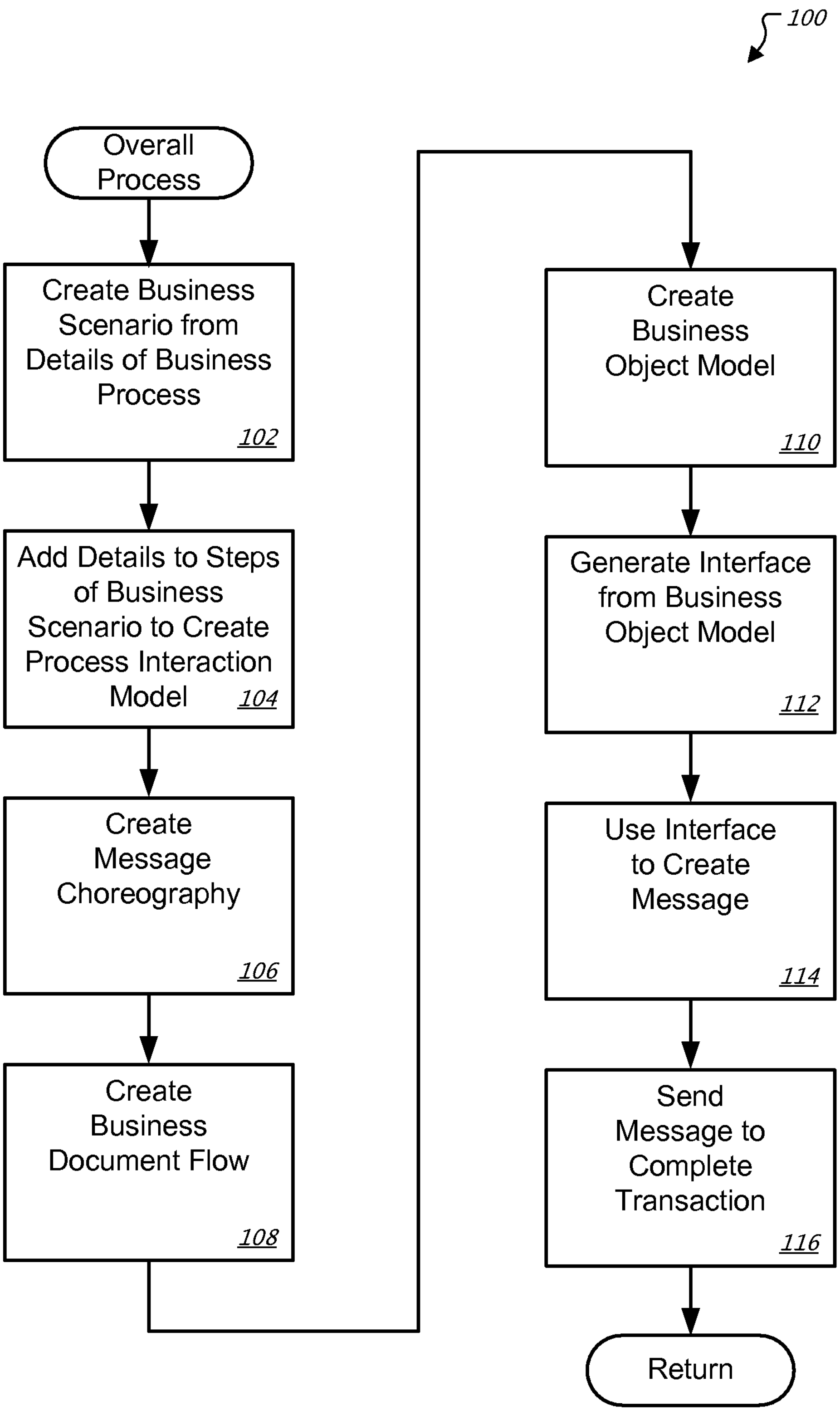
FIG. 1 depicts a flow diagram of the overall steps performed by methods and systems consistent with the subject matter described herein.
Figure 2:
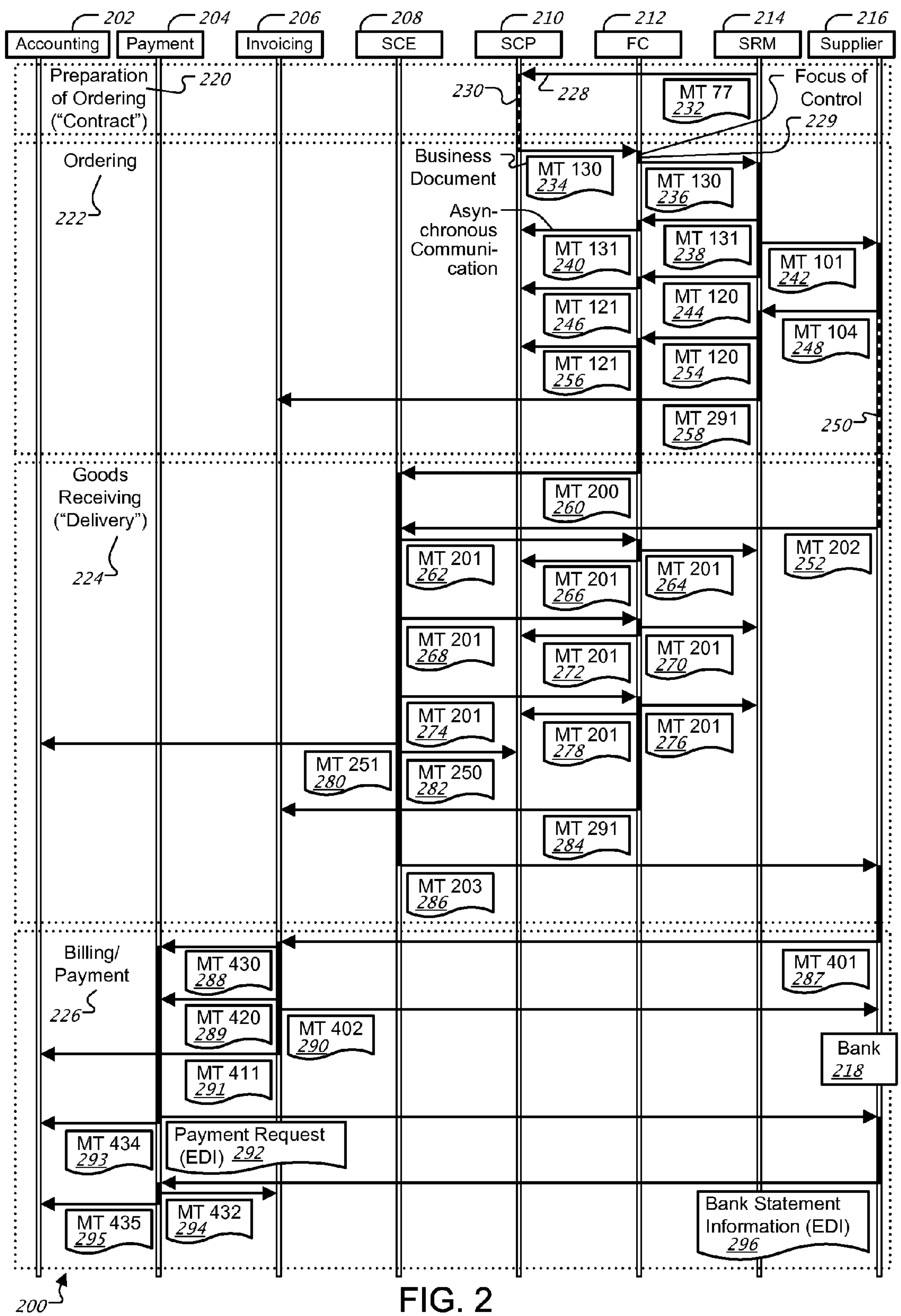
FIG. 2 depicts a business document flow for an invoice request in accordance with methods and systems consistent with the subject matter described herein.

FIGS. 133-1 through 133-2 show an exemplary IndividualMaterialERPAttachmentFolderChangeRequestMessage_sync Element Structure.

FIG. 134 shows an exemplary IndividualMaterialERPAttachmentFolderChangeConfirmationMessage_sync Element Structure.

FIG. 135 shows an exemplary IndividualMaterialByIDQueryMessage_sync Element Structure.

Figures 1, 54:
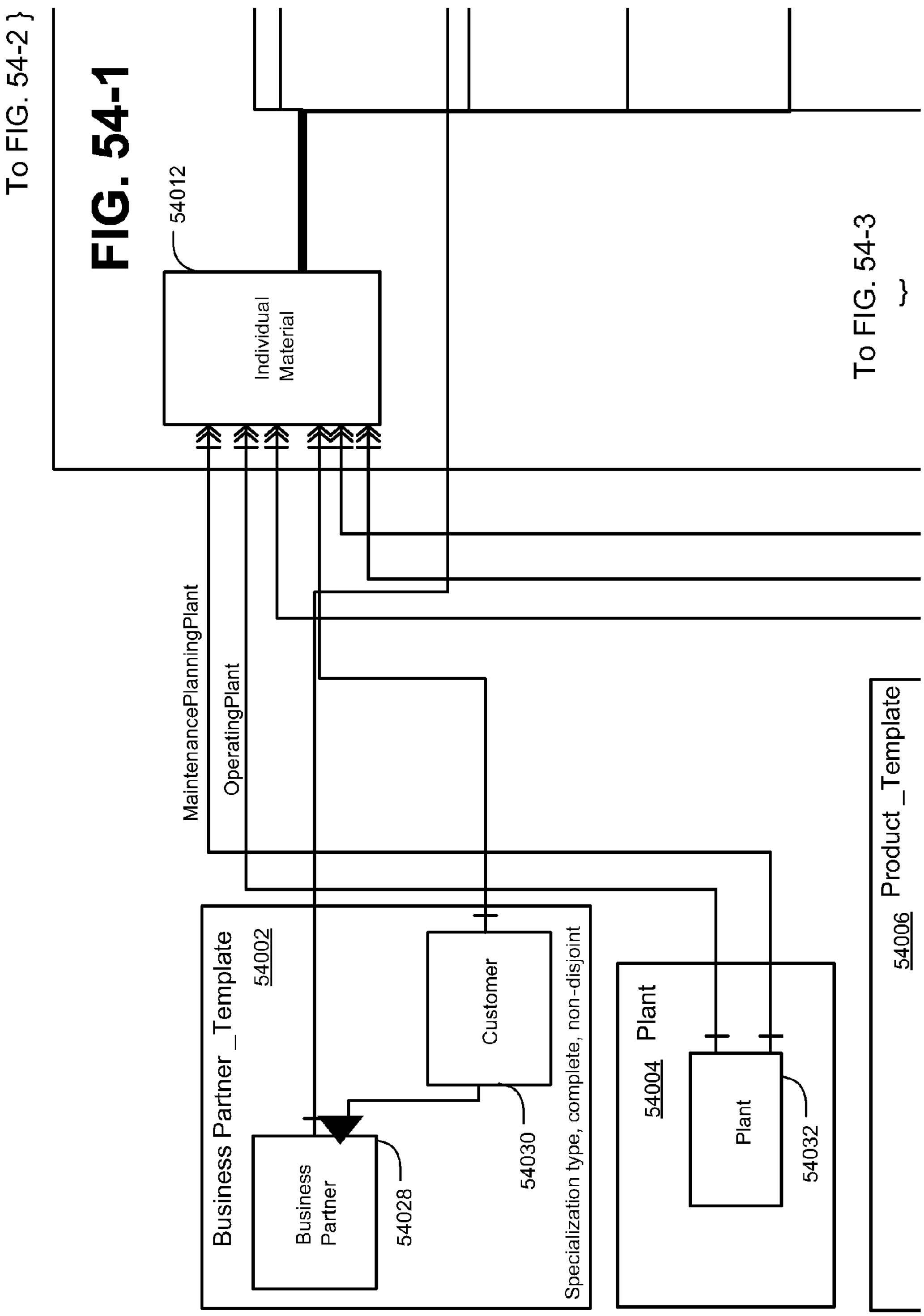
Figures 2, 54:
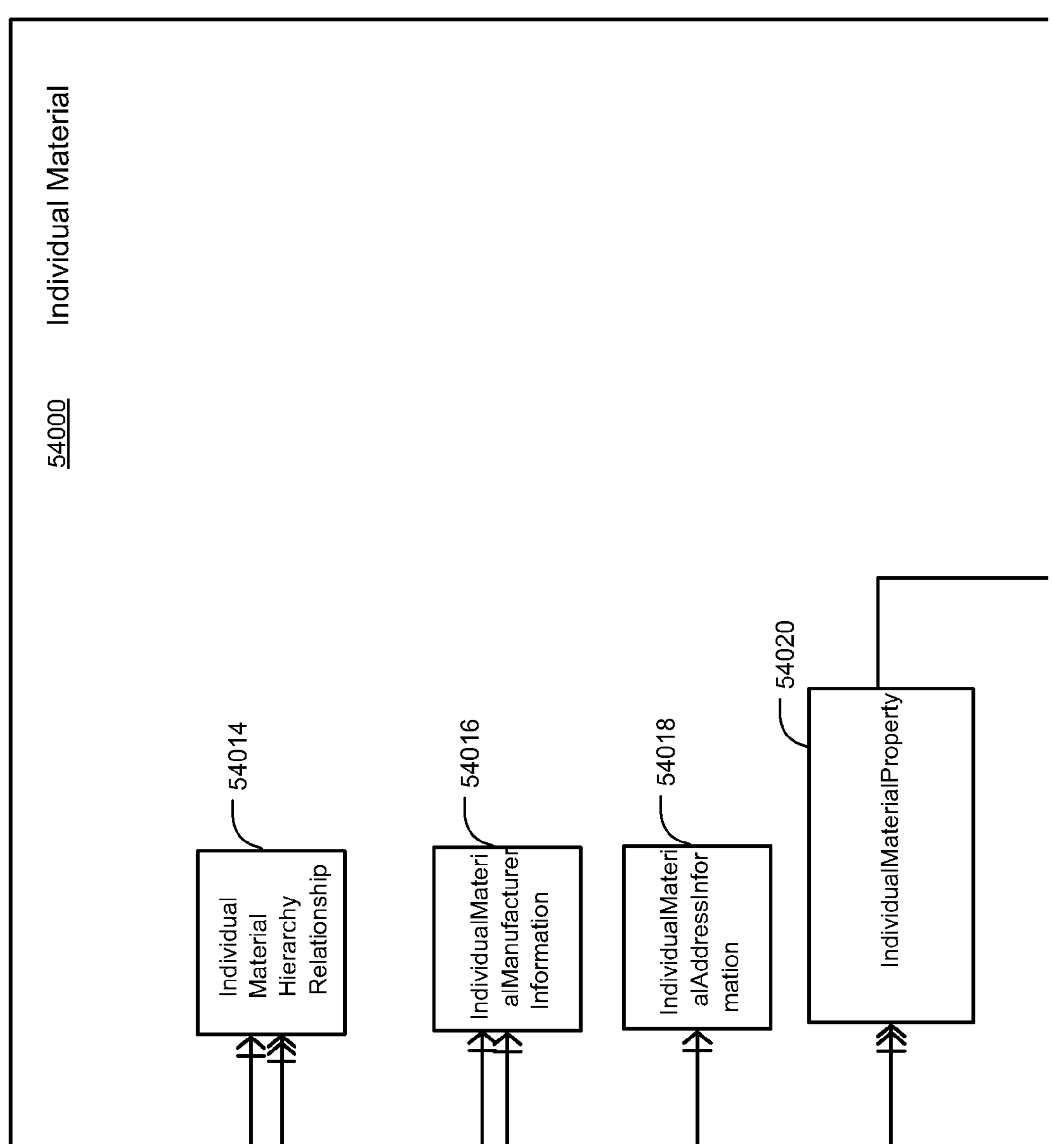
Figures 3, 54:
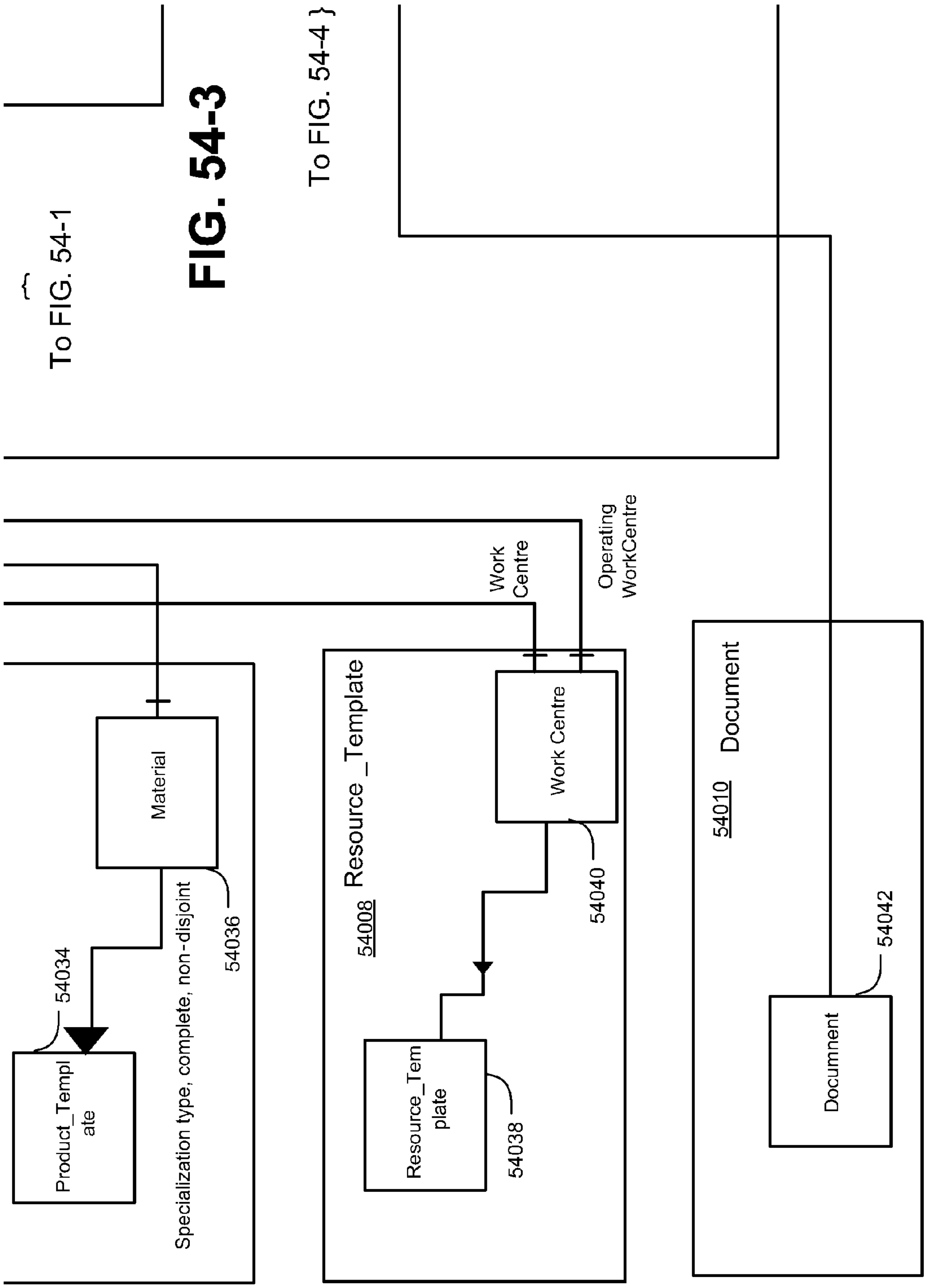
Figures 4, 54:
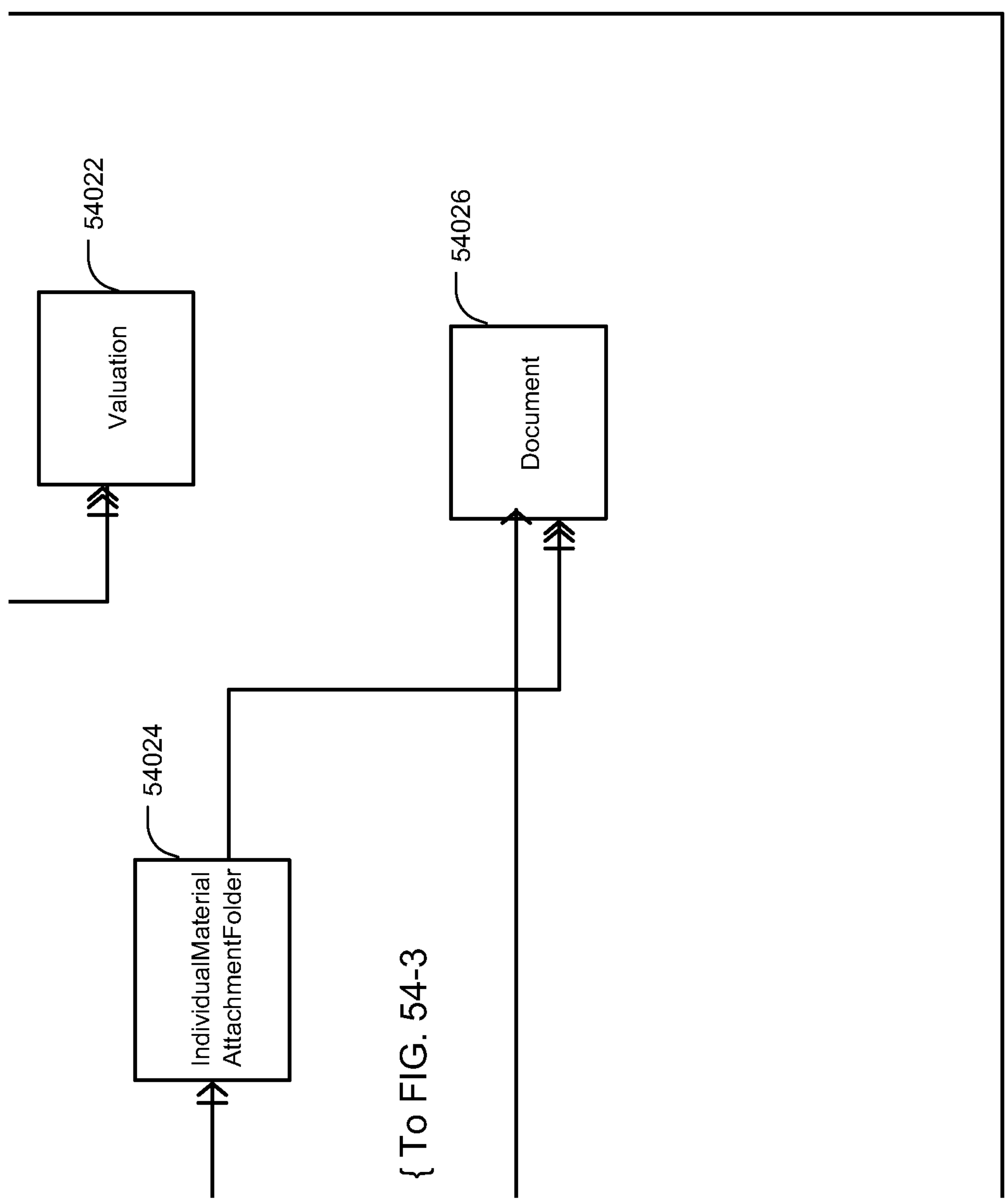

FIGS. 136-1 through 136-3 show an exemplary IndividualMaterialByIDResponseMessage_sync Element Structure.

FIG. 137 shows an exemplary IndividualMaterialERPAttachmentFolderByIDQueryMessage_sync Element Structure.

FIGS. 138-1 through 138-2 show an exemplary IndividualMaterialERPAttachmentFolderByIDResponseMessage_sync Element Structure.

FIGS. 139-1 through 139-2 show an exemplary IndividualMaterialERPPropertyUpdateRequestMessage_sync Element Structure.

FIGS. 140-1 through 140-2 show an exemplary IndividualMaterialERPPropertyUpdateRequestMessage_sync Element Structure.

FIG. 141 shows an exemplary IndividualMaterialERPPropertyUpdateConfirmationMessage_sync Element Structure.

Figure 142:
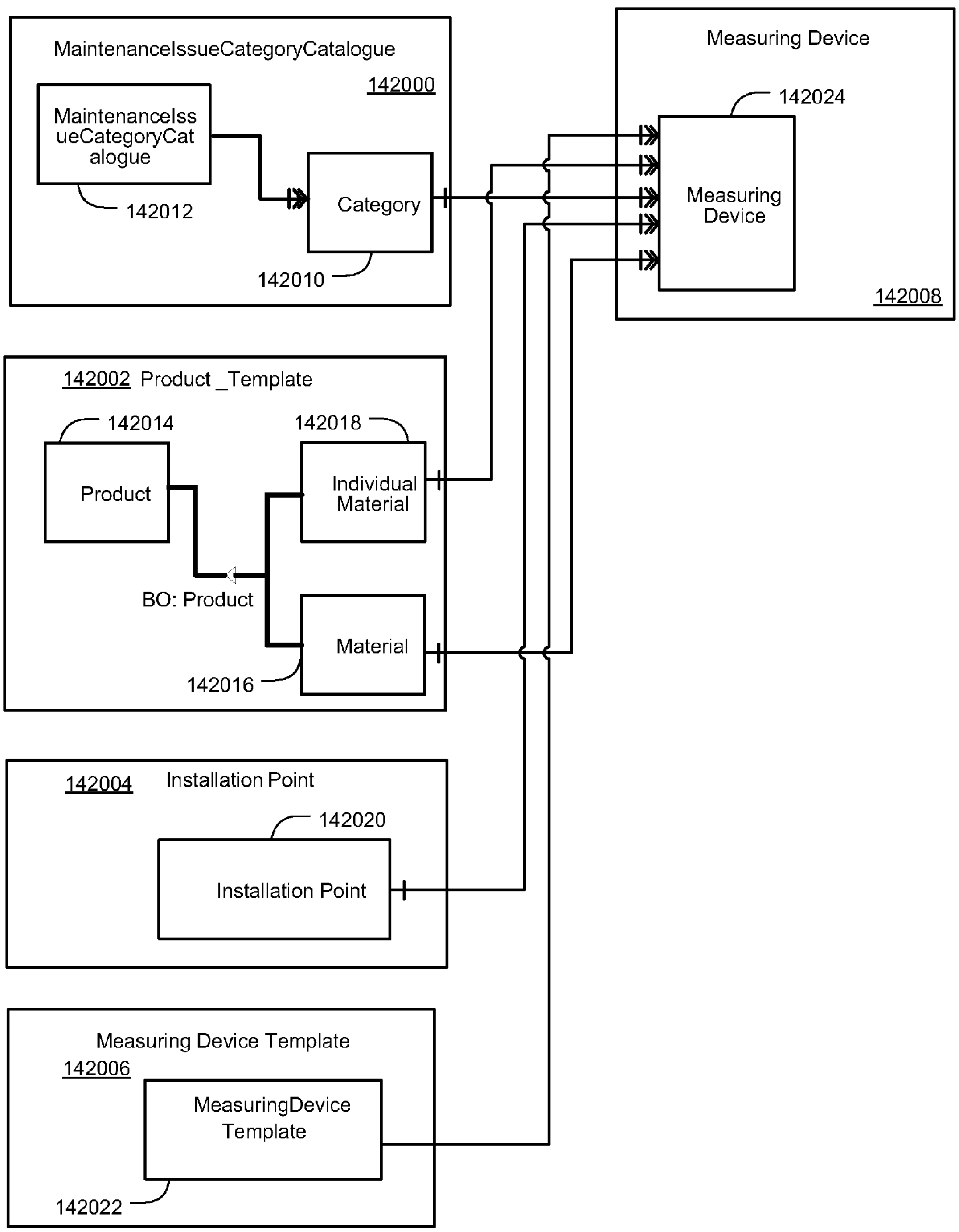

FIG. 142 shows an exemplary MeasuringDevice Object Model.

Figure 143:
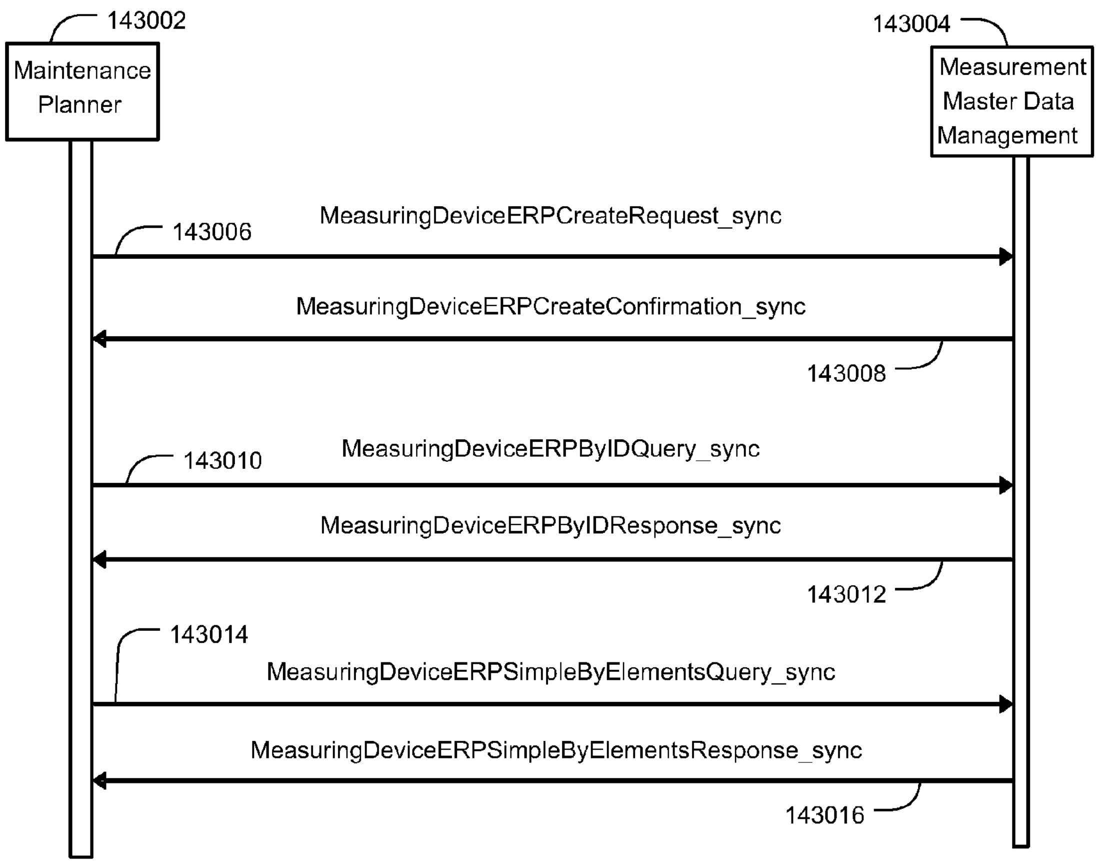

FIG. 143 shows an exemplary MeasuringDevice Message Choreography.

Figure 144:
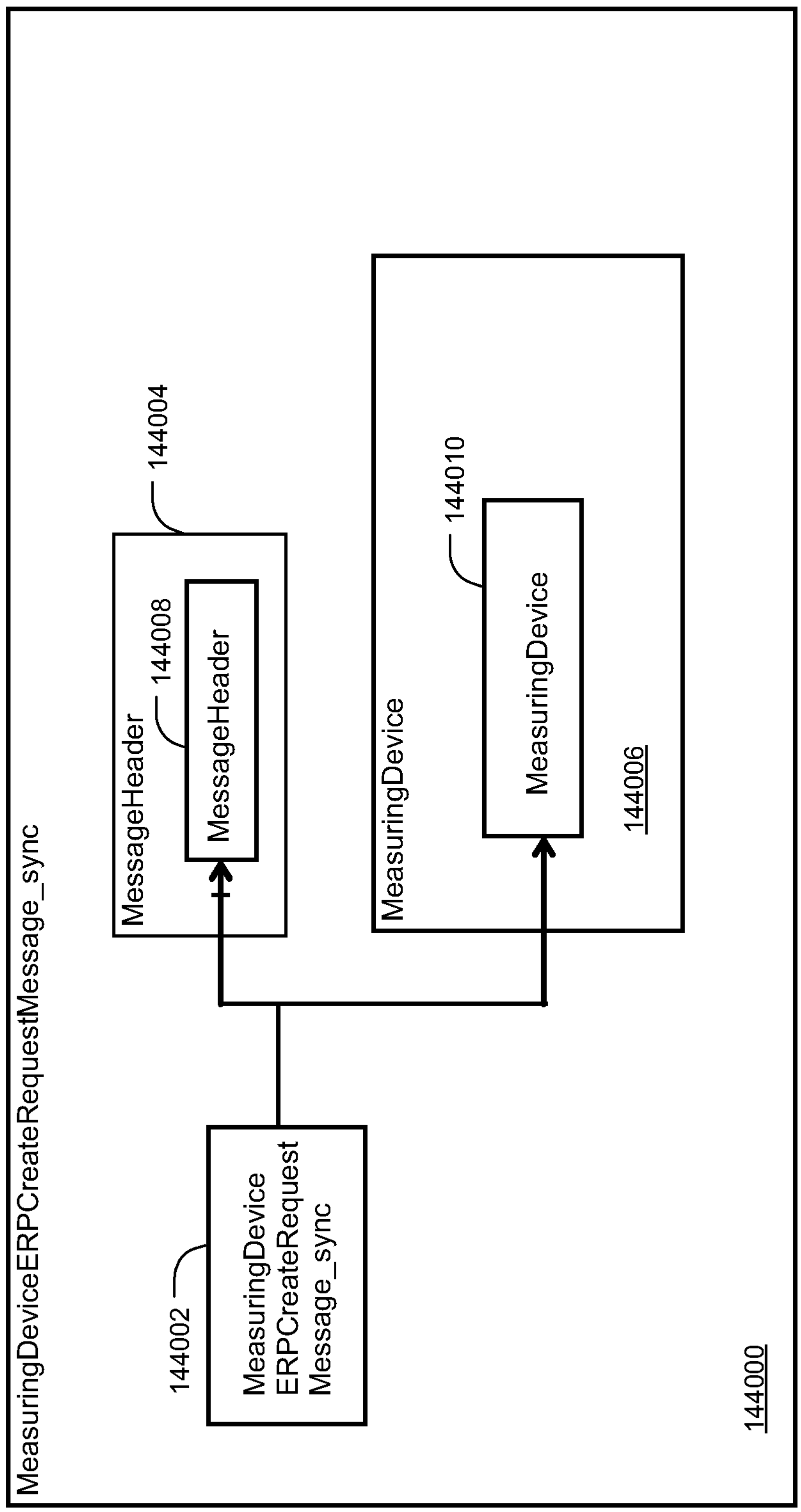

FIG. 144 shows an exemplary MeasuringDeviceERPCreateRequestMessage_sync Message Data Type.

Figure 145:
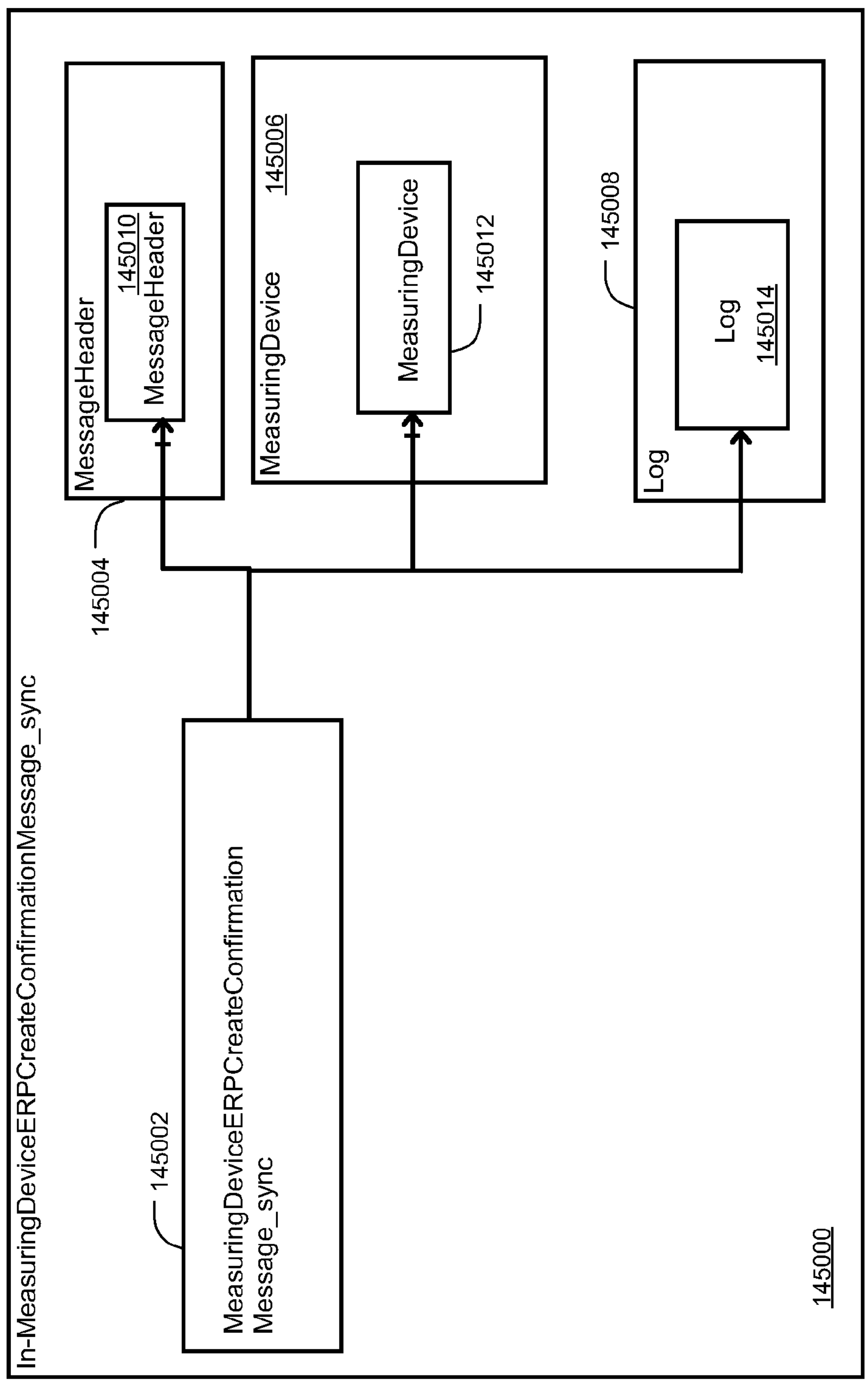

FIG. 145 shows an exemplary In-MeasuringDeviceERPCreateConfirmationMessage_sync Message Data Type.

Figure 146:
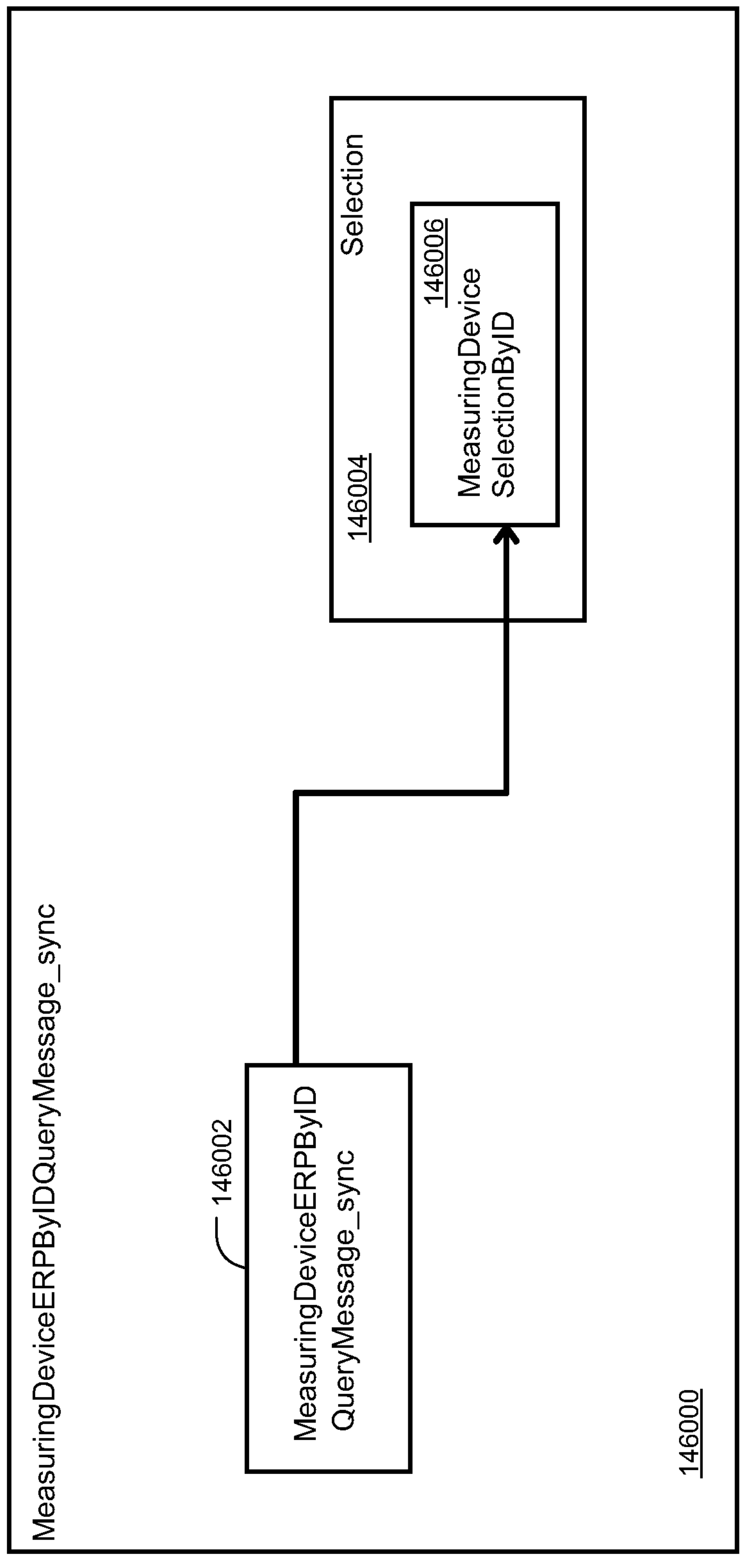

FIG. 146 shows an exemplary MeasuringDeviceERPByIDQueryMessage_sync Message Data Type.

Figure 147:
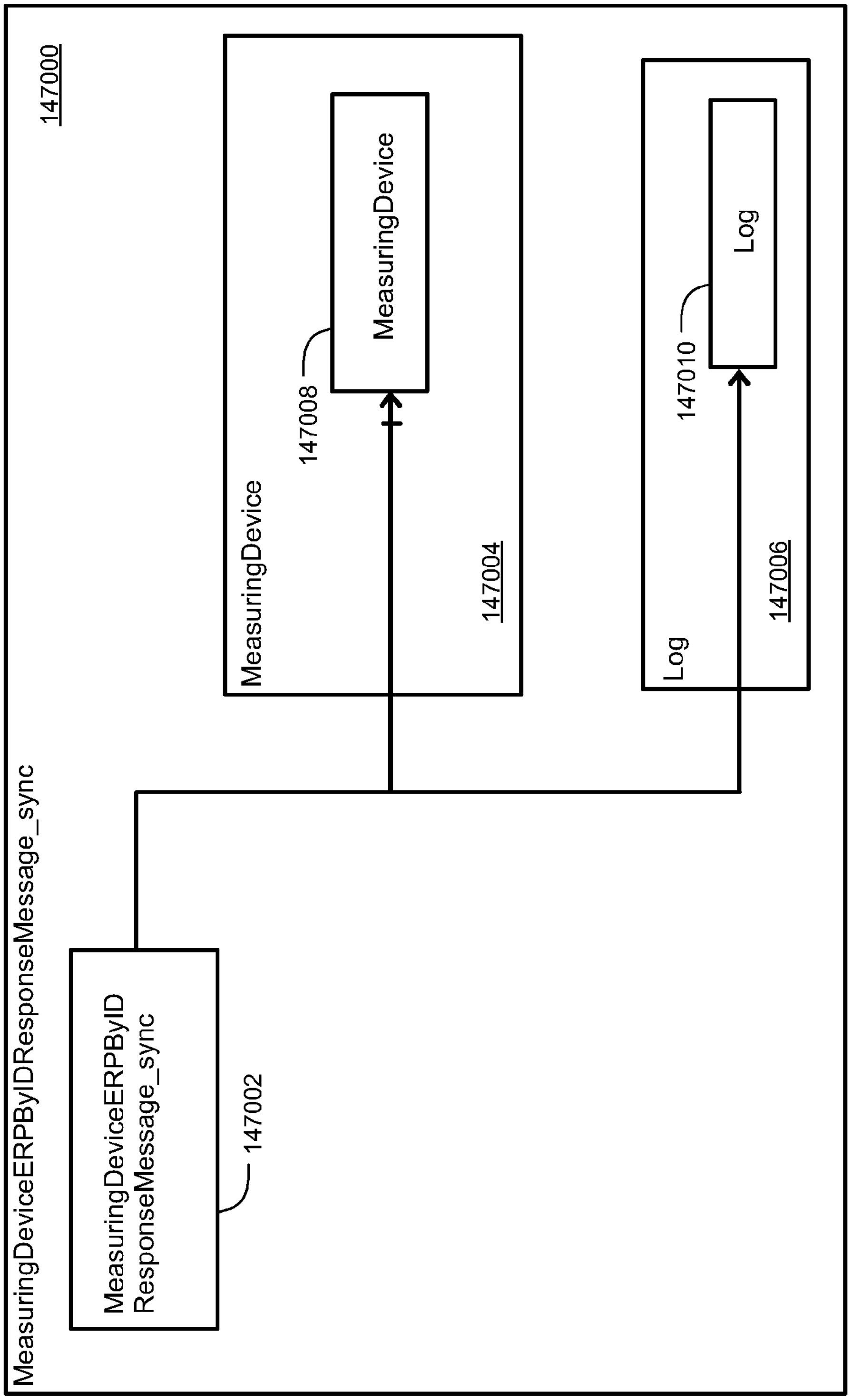

FIG. 147 shows an exemplary MeasuringDeviceERPByIDResponse_sync Message Data Type.

Figure 148:
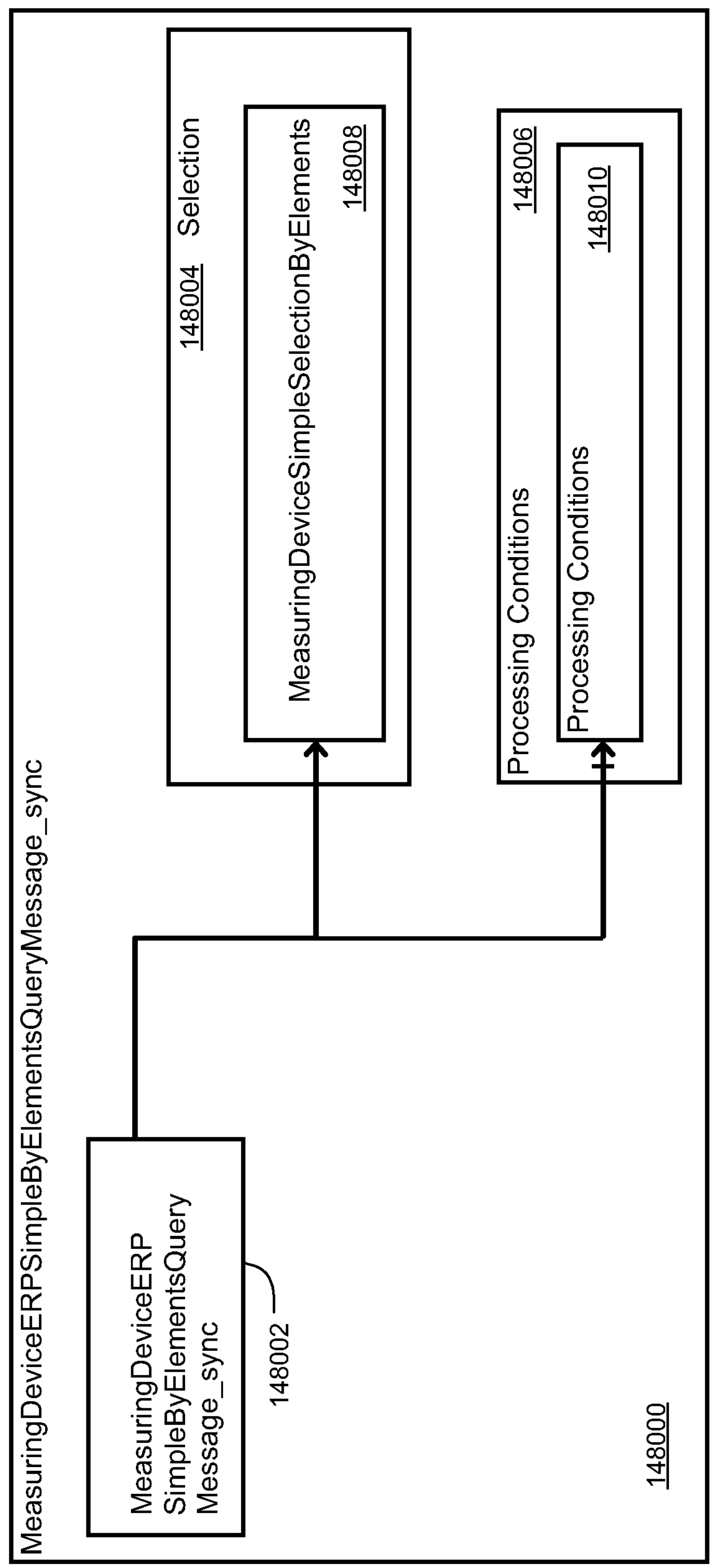

FIG. 148 shows an exemplary MeasuringDeviceERPSimpleByElementsQueryMessage_sync Message Data Type.

Figure 149:
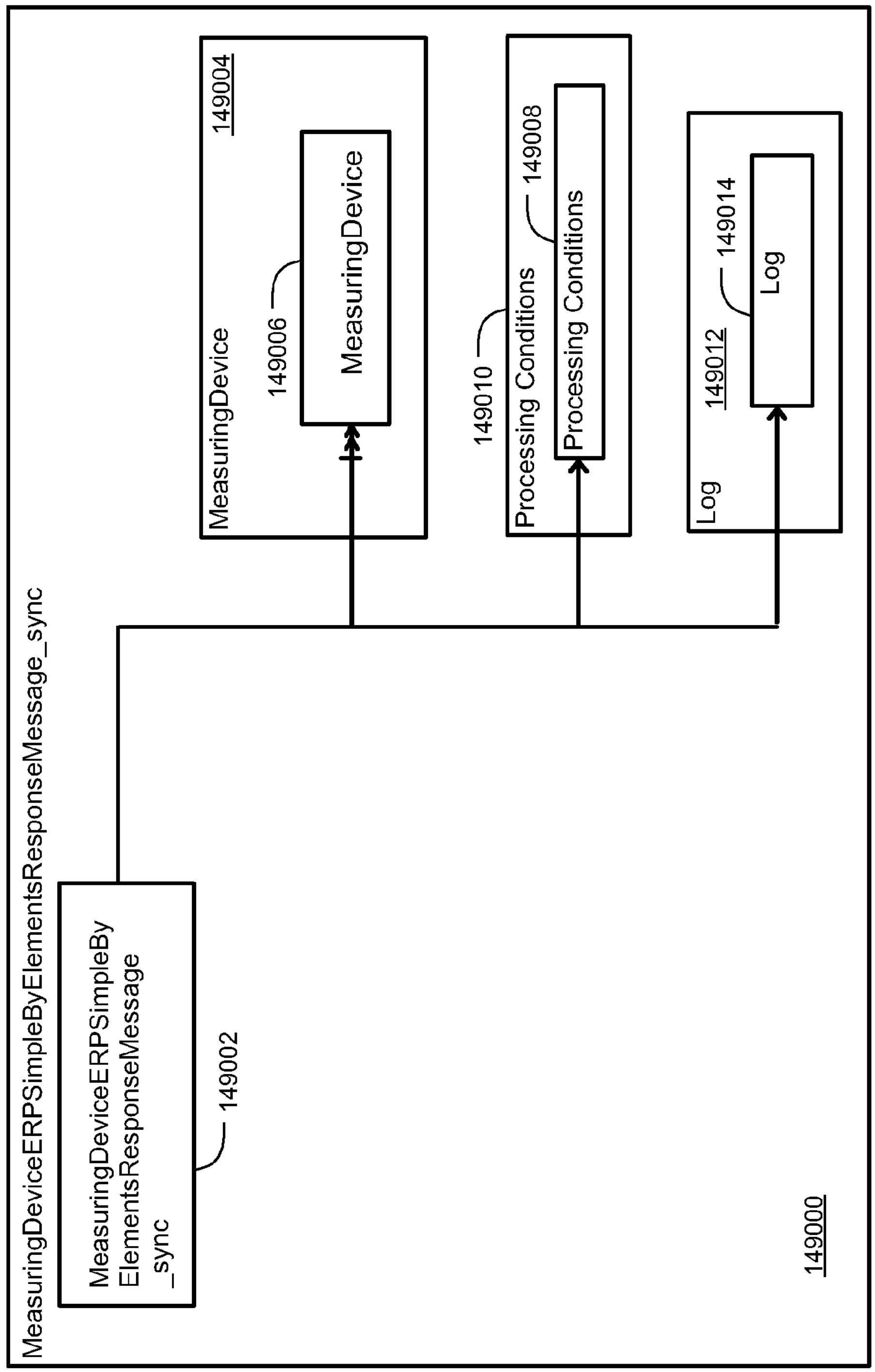

FIG. 149 shows an exemplary MeasuringDeviceERPSimpleByElementsResponseMessage_sync Message Data Type.

Figure 6:
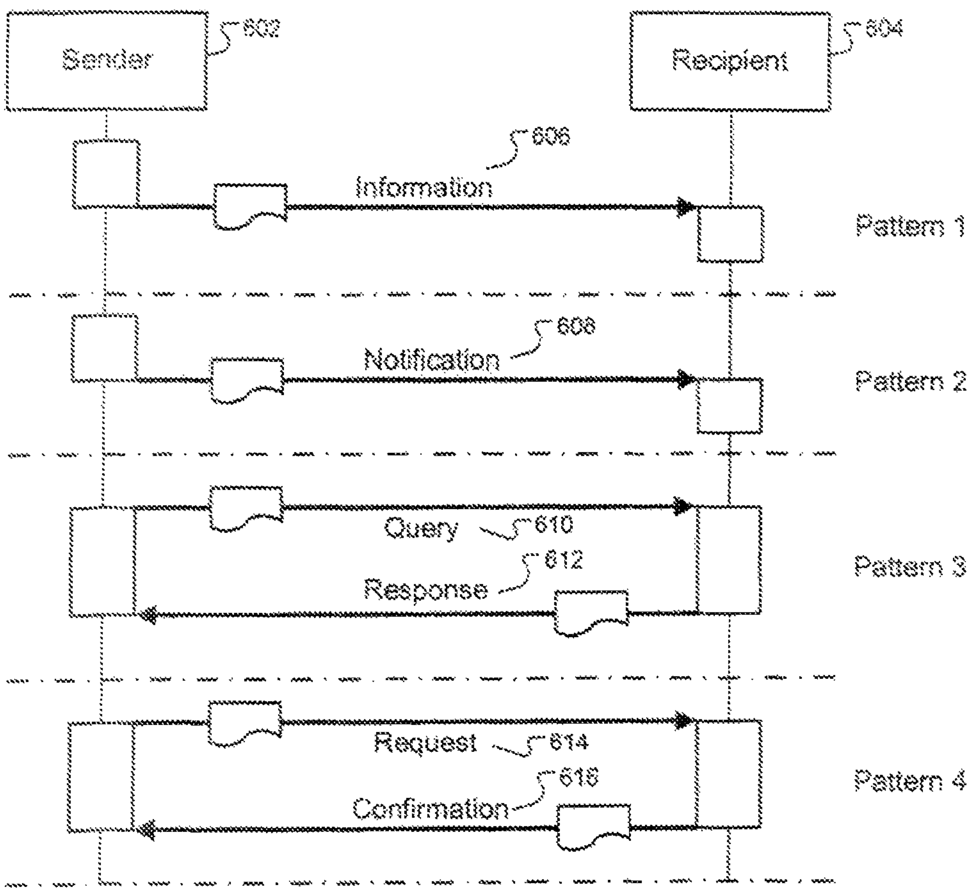
FIG. 6 depicts message categories in accordance with methods and systems consistent with the subject matter described herein.

FIGS. 150-1 through 150-6 show an exemplary MeasuringDeviceRequestMessage Element Structure.

FIGS. 151-1 through 151-5 show an exemplary MeasuringDeviceERPCreateRequestMessage_sync Element Structure.

FIG. 152 shows an exemplary In-MeasuringDeviceERPCreateConfirmationMessage_sync Element Structure.

FIG. 153 shows an exemplary MeasuringDeviceERPByIDQueryMessage_sync Element Structure.

FIGS. 154-1 through 154-5 show an exemplary MeasuringDeviceERPByIDResponse_sync Element Structure.

Figure 4:
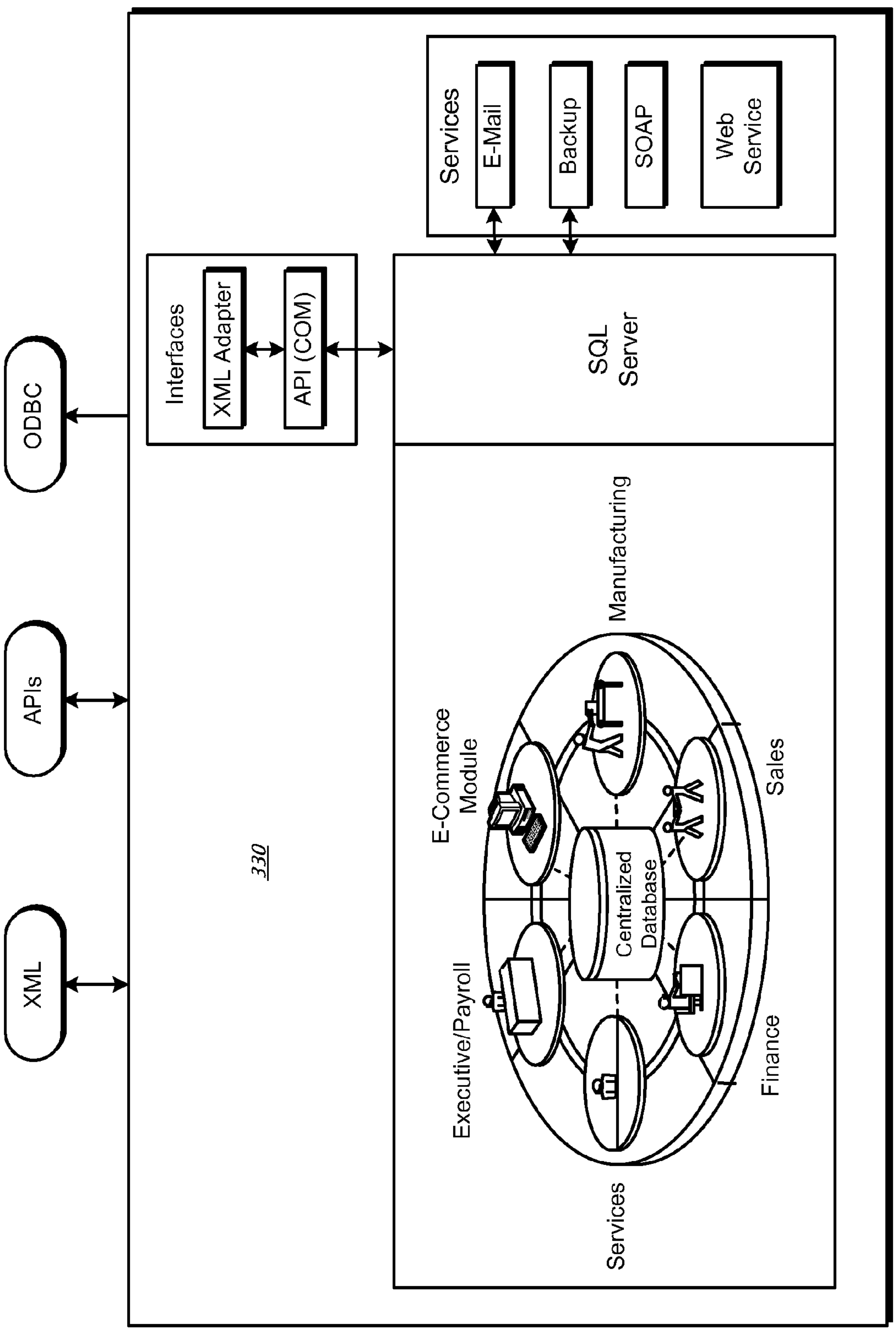
FIG. 4 illustrates an example application implementing certain techniques and components in accordance with one embodiment of the system of FIG. 1.

FIGS. 155-1 through 155-4 show an exemplary MeasuringDeviceERPSimpleByElementsQueryMessage_sync Element Structure.

FIGS. 156-1 through 156-2 show an exemplary MeasuringDeviceERPSimpleByElementsResponseMessage_sync Element Structure.

DETAILED DESCRIPTION

Overview

Methods and systems consistent with the subject matter described herein facilitate e-commerce by providing consistent interfaces that are suitable for use across industries, across businesses, and across different departments within a business during a business transaction. To generate consistent interfaces, methods and systems consistent with the subject matter described herein utilize a business object model, which reflects the data that will be used during a given business transaction. An example of a business transaction is the exchange of purchase orders and order confirmations between a buyer and a seller. The business object model is generated in a hierarchical manner to ensure that the same type of data is represented the same way throughout the business object model. This ensures the consistency of the information in the business object model. Consistency is also reflected in the semantic meaning of the various structural elements. That is, each structural element has a consistent business meaning. For example, the location entity, regardless of in which package it is located, refers to a location.

From this business object model, various interfaces are derived to accomplish the functionality of the business transaction. Interfaces provide an entry point for components to access the functionality of an application. For example, the interface for a Purchase Order Request provides an entry point for components to access the functionality of a Purchase Order, in particular, to transmit and/or receive a Purchase Order Request. One skilled in the art will recognize that each of these interfaces may be provided, sold, distributed, utilized, or marketed as a separate product or as a major component of a separate product. Alternatively, a group of related interfaces may be provided, sold, distributed, utilized, or marketed as a product or as a major component of a separate product. Because the interfaces are generated from the business object model, the information in the interfaces is consistent, and the interfaces are consistent among the business entities. Such consistency facilitates heterogeneous business entities in cooperating to accomplish the business transaction.

Generally, the business object is a representation of a type of a uniquely identifiable business entity (an object instance) described by a structural model. In the architecture, processes may typically operate on business objects. Business objects represent a specific view on some well-defined business content. In other words, business objects represent content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

The architectural elements also include the process component. The process component is a software package that realizes a business process and generally exposes its functionality as services. The functionality contains business transactions. In general, the process component contains one or more semantically related business objects. Often, a particular business object belongs to no more than one process component. Interactions between process component pairs involving their respective business objects, process agents, operations, interfaces, and messages are described as process component interactions, which generally determine the interactions of a pair of process components across a deployment unit boundary. Interactions between process components within a deployment unit are typically not constrained by the architectural design and can be implemented in any convenient fashion. Process components may be modular and context-independent. In other words, process components may not be specific to any particular application and as such, may be reusable. In some implementations, the process component is the smallest (most granular) element of reuse in the architecture. An external process component is generally used to represent the external system in describing interactions with the external system; however, this should be understood to require no more of the external system than that able to produce and receive messages as required by the process component that interacts with the external system. For example, process components may include multiple operations that may provide interaction with the external system. Each operation generally belongs to one type of process component in the architecture. Operations can be synchronous or asynchronous, corresponding to synchronous or asynchronous process agents, which will be described below. The operation is often the smallest, separately-callable function, described by a set of data types used as input, output, and fault parameters serving as a signature.

The architectural elements may also include the service interface, referred to simply as the interface. The interface is a named group of operations. The interface often belongs to one process component and process component might contain multiple interfaces. In one implementation, the service interface contains only inbound or outbound operations, but not a mixture of both. One interface can contain both synchronous and asynchronous operations. Normally, operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. Operation can use multiple message types for inbound, outbound, or error messages. When two process components are in different deployment units, invocation of an operation of one process component by the other process component is accomplished by the operation on the other process component sending a message to the first process component.

The architectural elements may also include the process agent. Process agents do business processing that involves the sending or receiving of messages. Each operation normally has at least one associated process agent. Each process agent can be associated with one or more operations. Process agents can be either inbound or outbound and either synchronous or asynchronous. Asynchronous outbound process agents are called after a business object changes such as after a "create", "update", or "delete" of a business object instance. Synchronous outbound process agents are generally triggered directly by business object. An outbound process agent will generally perform some processing of the data of the business object instance whose change triggered the event. The outbound agent triggers subsequent business process steps by sending messages using well-defined outbound services to another process component, which generally will be in another deployment unit, or to an external system. The outbound process agent is linked to the one business object that triggers the agent, but it is sent not to another business object but rather to another process component. Thus, the outbound process agent can be implemented without knowledge of the exact business object design of the recipient process component. Alternatively, the process agent may be inbound. For example, inbound process agents may be used for the inbound part of a message-based communication. Inbound process agents are called after a message has been received. The inbound process agent starts the execution of the business process step requested in a message by creating or updating one or multiple business object instances. Inbound process agent is not generally the agent of business object but of its process component. Inbound process agent can act on multiple business objects in a process component. Regardless of whether the process agent is inbound or outbound, an agent may be synchronous if used when a process component requires a more or less immediate response from another process component, and is waiting for that response to continue its work.

The architectural elements also include the deployment unit. Each deployment unit may include one or more process components that are generally deployed together on a single computer system platform. Conversely, separate deployment units can be deployed on separate physical computing systems. The process components of one deployment unit can interact with those of another deployment unit using messages passed through one or more data communication networks or other suitable communication channels. Thus, a deployment unit deployed on a platform belonging to one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by the deployment unit to be scaled to meet demand by creating as many instances as needed.

Since interaction between deployment units is through process component operations, one deployment unit can be replaced by other another deployment unit as long as the new deployment unit supports the operations depended upon by other deployment units as appropriate. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement generally supports the operations of the original.

Services (or interfaces) may be provided in a flexible architecture to support varying criteria between services and systems. The flexible architecture may generally be provided by a service delivery business object. The system may be able to schedule a service asynchronously as necessary, or on a regular basis. Services may be planned according to a schedule manually or automatically. For example, a follow-up service may be scheduled automatically upon completing an initial service. In addition, flexible execution periods may be possible (e.g. hourly, daily, every three months, etc.). Each customer may plan the services on demand or reschedule service execution upon request.

FIG. 1 depicts a flow diagram 100 showing an example technique, perhaps implemented by systems similar to those disclosed herein. Initially, to generate the business object model, design engineers study the details of a business process, and model the business process using a "business scenario" (step 102). The business scenario identifies the steps performed by the different business entities during a business process. Thus, the business scenario is a complete representation of a clearly defined business process.

After creating the business scenario, the developers add details to each step of the business scenario (step 104). In particular, for each step of the business scenario, the developers identify the complete process steps performed by each business entity. A discrete portion of the business scenario reflects a "business transaction," and each business entity is referred to as a "component" of the business transaction. The developers also identify the messages that are transmitted between the components. A "process interaction model" represents the complete process steps between two components.

After creating the process interaction model, the developers create a "message choreography" (step 106), which depicts the messages transmitted between the two components in the process interaction model. The developers then represent the transmission of the messages between the components during a business process in a "business document flow" (step 108). Thus, the business document flow illustrates the flow of information between the business entities during a business process.

FIG. 2 depicts an example business document flow 200 for the process of purchasing a product or service. The business entities involved with the illustrative purchase process include Accounting 202, Payment 204, Invoicing 206, Supply Chain Execution ("SCE") 208, Supply Chain Planning ("SCP") 210, Fulfillment Coordination ("FC") 212, Supply Relationship Management ("SRM") 214, Supplier 216, and Bank 218. The business document flow 200 is divided into four different transactions: Preparation of Ordering ("Contract") 220, Ordering 222, Goods Receiving ("Delivery") 224, and Billing/Payment 226. In the business document flow, arrows 228 represent the transmittal of documents. Each document reflects a message transmitted between entities. One of ordinary skill in the art will appreciate that the messages transferred may be considered to be a communications protocol. The process flow follows the focus of control, which is depicted as a solid vertical line (e.g., 229) when the step is required, and a dotted vertical line (e.g., 230) when the step is optional.

During the Contract transaction 220, the SRM 214 sends a Source of Supply Notification 232 to the SCP 210. This step is optional, as illustrated by the optional control line 230 coupling this step to the remainder of the business document flow 200. During the Ordering transaction 222, the SCP 210 sends a Purchase Requirement Request 234 to the FC 212, which forwards a Purchase Requirement Request 236 to the SRM 214. The SRM 214 then sends a Purchase Requirement Confirmation 238 to the FC 212, and the FC 212 sends a Purchase Requirement Confirmation 240 to the SCP 210. The SRM 214 also sends a Purchase Order Request 242 to the Supplier 216, and sends Purchase Order Information 244 to the FC 212. The FC 212 then sends a Purchase Order Planning Notification 246 to the SCP 210. The Supplier 216, after receiving the Purchase Order Request 242, sends a Purchase Order Confirmation 248 to the SRM 214, which sends a Purchase Order Information confirmation message 254 to the FC 212, which sends a message 256 confirming the Purchase Order Planning Notification to the SCP 210. The SRM 214 then sends an Invoice Due Notification 258 to Invoicing 206.

During the Delivery transaction 224, the FC 212 sends a Delivery Execution Request 260 to the SCE 208. The Supplier 216 could optionally (illustrated at control line 250) send a Dispatched Delivery Notification 252 to the SCE 208. The SCE 208 then sends a message 262 to the FC 212 notifying the FC 212 that the request for the Delivery Information was created. The FC 212 then sends a message 264 notifying the SRM 214 that the request for the Delivery Information was created. The FC 212 also sends a message 266 notifying the SCP 210 that the request for the Delivery Information was created. The SCE 208 sends a message 268 to the FC 212 when the goods have been set aside for delivery. The FC 212 sends a message 270 to the SRM 214 when the goods have been set aside for delivery. The FC 212 also sends a message 272 to the SCP 210 when the goods have been set aside for delivery.

The SCE 208 sends a message 274 to the FC 212 when the goods have been delivered. The FC 212 then sends a message 276 to the SRM 214 indicating that the goods have been delivered, and sends a message 278 to the SCP 210 indicating that the goods have been delivered. The SCE 208 then sends an Inventory Change Accounting Notification 280 to Accounting 202, and an Inventory Change Notification 282 to the SCP 210. The FC 212 sends an Invoice Due Notification 284 to Invoicing 206, and SCE 208 sends a Received Delivery Notification 286 to the Supplier 216.

During the Billing/Payment transaction 226, the Supplier 216 sends an Invoice Request 287 to Invoicing 206. Invoicing 206 then sends a Payment Due Notification 288 to Payment 204, a Tax Due Notification 289 to Payment 204, an Invoice Confirmation 290 to the Supplier 216, and an Invoice Accounting Notification 291 to Accounting 202. Payment 204 sends a Payment Request 292 to the Bank 218, and a Payment Requested Accounting Notification 293 to Accounting 202. Bank 218 sends a Bank Statement Information 296 to Payment 204. Payment 204 then sends a Payment Done Information 294 to Invoicing 206 and a Payment Done Accounting Notification 295 to Accounting 202.

Within a business document flow, business documents having the same or similar structures are marked. For example, in the business document flow 200 depicted in FIG. 2, Purchase Requirement Requests 234, 236 and Purchase Requirement Confirmations 238, 240 have the same structures. Thus, each of these business documents is marked with an "O6." Similarly, Purchase Order Request 242 and Purchase Order Confirmation 248 have the same structures. Thus, both documents are marked with an "O1." Each business document or message is based on a message type.

From the business document flow, the developers identify the business documents having identical or similar structures, and use these business documents to create the business object model (step 110). The business object model includes the objects contained within the business documents. These objects are reflected as packages containing related information, and are arranged in a hierarchical structure within the business object model, as discussed below.

Methods and systems consistent with the subject matter described herein then generate interfaces from the business object model (step 112). The heterogeneous programs use instantiations of these interfaces (called "business document objects" below) to create messages (step 114), which are sent to complete the business transaction (step 116). Business entities use these messages to exchange information with other business entities during an end-to-end business transaction. Since the business object model is shared by heterogeneous programs, the interfaces are consistent among these programs. The heterogeneous programs use these consistent interfaces to communicate in a consistent manner, thus facilitating the business transactions.

Standardized Business-to-Business ("B2B") messages are compliant with at least one of the e-business standards (i.e., they include the business-relevant fields of the standard). The e-business standards include, for example, RosettaNet for the high-tech industry, Chemical Industry Data Exchange ("CIDX"), Petroleum Industry Data Exchange ("PIDX") for the oil industry, UCCnet for trade, PapiNet for the paper industry, Odette for the automotive industry, HR-XML for human resources, and XML Common Business Library ("xCBL"). Thus, B2B messages enable simple integration of components in heterogeneous system landscapes. Application-to-Application ("A2A") messages often exceed the standards and thus may provide the benefit of the full functionality of application components. Although various steps of FIG. 1 were described as being performed manually, one skilled in the art will appreciate that such steps could be computer-assisted or performed entirely by a computer, including being performed by either hardware, software, or any other combination thereof.

Implementation Details

As discussed above, methods and systems consistent with the subject matter described herein create consistent interfaces by generating the interfaces from a business object model. Details regarding the creation of the business object model, the generation of an interface from the business object model, and the use of an interface generated from the business object model are provided below.

Figure 3A:
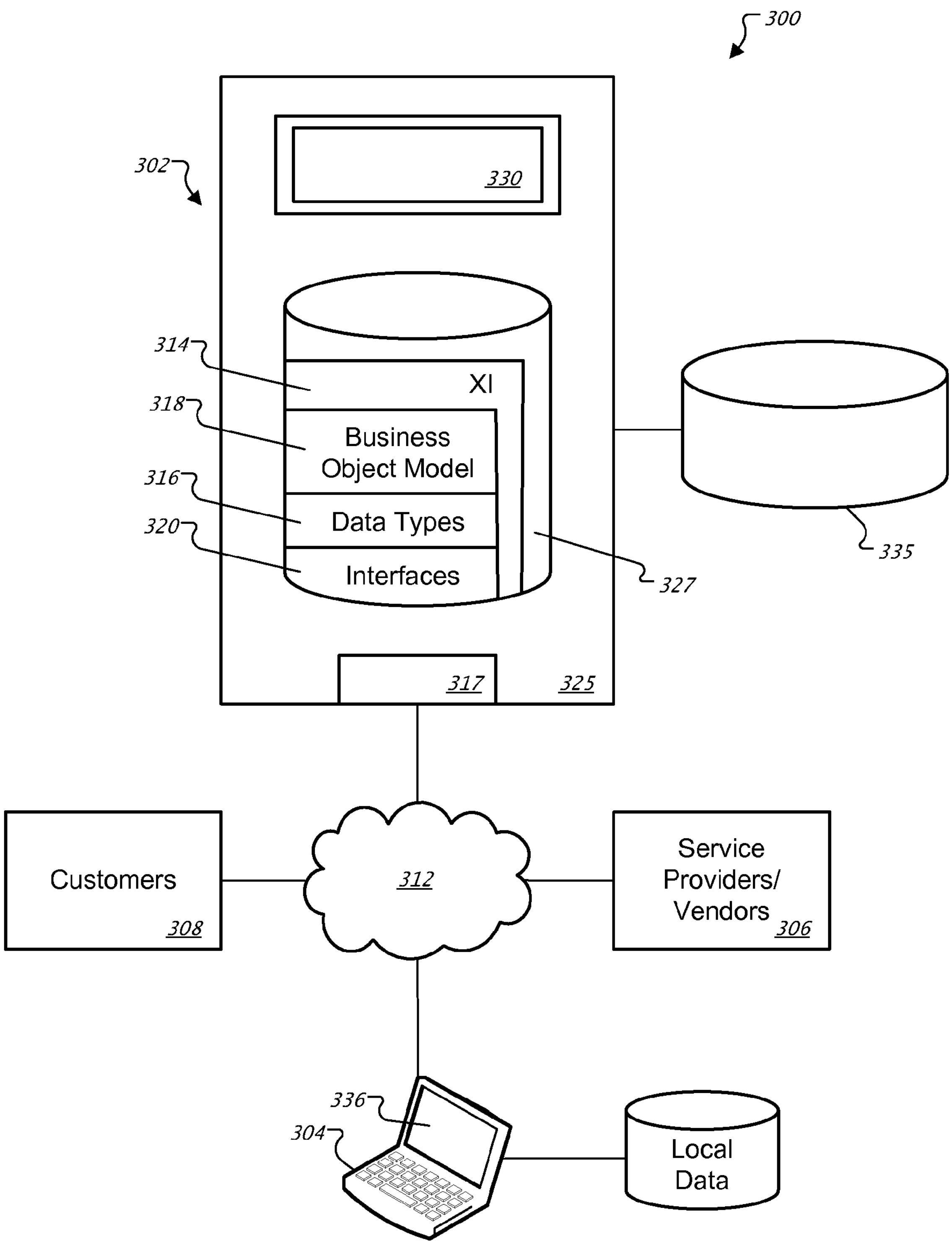
FIGS. 3A-B illustrate example environments implementing the transmission, receipt, and processing of data between heterogeneous applications in accordance with certain embodiments included in the present disclosure.

Turning to the illustrated embodiment in FIG. 3A, environment 300 includes or is communicably coupled (such as via a one-, bi- or multi-directional link or network) with server 302, one or more clients 304, one or more or vendors 306, one or more customers 308, at least some of which communicate across network 312. But, of course, this illustration is for example purposes only, and any distributed system or environment implementing one or more of the techniques described herein may be within the scope of this disclosure. Server 302 comprises an electronic computing device operable to receive, transmit, process and store data associated with environment 300. Generally, FIG. 3A provides merely one example of computers that may be used with the disclosure. Each computer is generally intended to encompass any suitable processing device. For example, although FIG. 3A illustrates one server 302 that may be used with the disclosure, environment 300 can be implemented using computers other than servers, as well as a server pool. Indeed, server 302 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 302 may be adapted to execute any operating system including Linux, UNIX, Windows Server, or any other suitable operating system. According to one embodiment, server 302 may also include or be communicably coupled with a web server and/or a mail server.

As illustrated (but not required), the server 302 is communicably coupled with a relatively remote repository 335 over a portion of the network 312. The repository 335 is any electronic storage facility, data processing center, or archive that may supplement or replace local memory (such as 327). The repository 335 may be a central database communicably coupled with the one or more servers 302 and the clients 304 via a virtual private network (VPN), SSH (Secure Shell) tunnel, or other secure network connection. The repository 335 may be physically or logically located at any appropriate location including in one of the example enterprises or offshore, so long as it remains operable to store information associated with the environment 300 and communicate such data to the server 302 or at least a subset of plurality of the clients 304.

Illustrated server 302 includes local memory 327. Memory 327 may include any memory or database module and may take the form of volatile or non-volatile memory including, without limitation, magnetic media, optical media, random access memory (RAM), read-only memory (ROM), removable media, or any other suitable local or remote memory component. Illustrated memory 327 includes an exchange infrastructure ("XI") 314, which is an infrastructure that supports the technical interaction of business processes across heterogeneous system environments. XI 314 centralizes the communication between components within a business entity and between different business entities. When appropriate, XI 314 carries out the mapping between the messages. XI 314 integrates different versions of systems implemented on different platforms (e.g., Java and ABAP). XI 314 is based on an open architecture, and makes use of open standards, such as eXtensible Markup Language (XML)™ and Java environments. XI 314 offers services that are useful in a heterogeneous and complex system landscape. In particular, XI 314 offers a runtime infrastructure for message exchange, configuration options for managing business processes and message flow, and options for transforming message contents between sender and receiver systems.

XI 314 stores data types 316, a business object model 318, and interfaces 320. The details regarding the business object model are described below. Data types 316 are the building blocks for the business object model 318. The business object model 318 is used to derive consistent interfaces 320. XI 314 allows for the exchange of information from a first company having one computer system to a second company having a second computer system over network 312 by using the standardized interfaces 320.

While not illustrated, memory 327 may also include business objects and any other appropriate data such as services, interfaces, VPN applications or services, firewall policies, a security or access log, print or other reporting files, HTML files or templates, data classes or object interfaces, child software applications or sub-systems, and others. This stored data may be stored in one or more logical or physical repositories. In some embodiments, the stored data (or pointers thereto) may be stored in one or more tables in a relational database described in terms of SQL statements or scripts. In the same or other embodiments, the stored data may also be formatted, stored, or defined as various data structures in text files, XML documents, Virtual Storage Access Method (VSAM) files, flat files, Btrieve files, comma-separated-value (CSV) files, internal variables, or one or more libraries. For example, a particular data service record may merely be a pointer to a particular piece of third party software stored remotely. In another example, a particular data service may be an internally stored software object usable by authenticated customers or internal development. In short, the stored data may comprise one table or file or a plurality of tables or files stored on one computer or across a plurality of computers in any appropriate format. Indeed, some or all of the stored data may be local or remote without departing from the scope of this disclosure and store any type of appropriate data.

Server 302 also includes processor 325. Processor 325 executes instructions and manipulates data to perform the operations of server 302 such as, for example, a central processing unit (CPU), a blade, an application specific integrated circuit (ASIC), or a field-programmable gate array (FPGA). Although FIG. 3A illustrates a single processor 325 in server 302, multiple processors 325 may be used according to particular needs and reference to processor 325 is meant to include multiple processors 325 where applicable. In the illustrated embodiment, processor 325 executes at least business application 330.

At a high level, business application 330 is any application, program, module, process, or other software that utilizes or facilitates the exchange of information via messages (or services) or the use of business objects. For example, application 330 may implement, utilize or otherwise leverage an enterprise service-oriented architecture (enterprise SOA), which may be considered a blueprint for an adaptable, flexible, and open IT architecture for developing services-based, enterprise-scale business solutions. This example enterprise service may be a series of web services combined with business logic that can be accessed and used repeatedly to support a particular business process. Aggregating web services into business-level enterprise services helps provide a more meaningful foundation for the task of automating enterprise-scale business scenarios Put simply, enterprise services help provide a holistic combination of actions that are semantically linked to complete the specific task, no matter how many cross-applications are involved. In certain cases, environment 300 may implement a composite application 330, as described below in FIG. 4. Regardless of the particular implementation, "software" may include software, firmware, wired or programmed hardware, or any combination thereof as appropriate. Indeed, application 330 may be written or described in any appropriate computer language including C, C++, Java, Visual Basic, assembler, Perl, any suitable version of 4GL, as well as others. For example, returning to the above mentioned composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while application 330 is illustrated in FIG. 4 as including various sub-modules, application 330 may include numerous other sub-modules or may instead be a single multi-tasked module that implements the various features and functionality through various objects, methods, or other processes. Further, while illustrated as internal to server 302, one or more processes associated with application 330 may be stored, referenced, or executed remotely. For example, a portion of application 330 may be a web service that is remotely called, while another portion of application 330 may be an interface object bundled for processing at remote client 304. Moreover, application 330 may be a child or sub-module of another software module or enterprise application (not illustrated) without departing from the scope of this disclosure. Indeed, application 330 may be a hosted solution that allows multiple related or third parties in different portions of the process to perform the respective processing.

More specifically, as illustrated in FIG. 4, application 330 may be a composite application, or an application built on other applications, that includes an object access layer (OAL) and a service layer. In this example, application 330 may execute or provide a number of application services, such as customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help the composite application to orchestrate a business process in synchronization with other existing processes (e.g., native processes of enterprise base systems) and leverage existing investments in the IT platform. Further, composite application 330 may run on a heterogeneous IT platform. In doing so, composite application may be cross-functional in that it may drive business processes across different applications, technologies, and organizations. Accordingly, composite application 330 may drive end-to-end business processes across heterogeneous systems or sub-systems. Application 330 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes a composite application 330, it may instead be a standalone or (relatively) simple software program. Regardless, application 330 may also perform processing automatically, which may indicate that the appropriate processing is substantially performed by at least one component of environment 300. It should be understood that automatically further contemplates any suitable administrator or other user interaction with application 330 or other components of environment 300 without departing from the scope of this disclosure.

Returning to FIG. 3A, illustrated server 302 may also include interface 317 for communicating with other computer systems, such as clients 304, over network 312 in a client-server or other distributed environment. In certain embodiments, server 302 receives data from internal or external senders through interface 317 for storage in memory 327, for storage in DB 335, and/or processing by processor 325. Generally, interface 317 comprises logic encoded in software and/or hardware in a suitable combination and operable to communicate with network 312. More specifically, interface 317 may comprise software supporting one or more communications protocols associated with communications network 312 or hardware operable to communicate physical signals.

Network 312 facilitates wireless or wireline communication between computer server 302 and any other local or remote computer, such as clients 304. Network 312 may be all or a portion of an enterprise or secured network. In another example, network 312 may be a VPN merely between server 302 and client 304 across wireline or wireless link. Such an example wireless link may be via 802.11a, 802.11b, 802.11g, 802.20, WiMax, and many others. While illustrated as a single or continuous network, network 312 may be logically divided into various sub-nets or virtual networks without departing from the scope of this disclosure, so long as at least portion of network 312 may facilitate communications between server 302 and at least one client 304. For example, server 302 may be communicably coupled to one or more "local" repositories through one sub-net while communicably coupled to a particular client 304 or "remote" repositories through another. In other words, network 312 encompasses any internal or external network, networks, sub-network, or combination thereof operable to facilitate communications between various computing components in environment 300. Network 312 may communicate, for example, Internet Protocol (IP) packets, Frame Relay frames, Asynchronous Transfer Mode (ATM) cells, voice, video, data, and other suitable information between network addresses. Network 312 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 312 may be a secure network associated with the enterprise and certain local or remote vendors 306 and customers 308. As used in this disclosure, customer 308 is any person, department, organization, small business, enterprise, or any other entity that may use or request others to use environment 300. As described above, vendors 306 also may be local or remote to customer 308. Indeed, a particular vendor 306 may provide some content to business application 330, while receiving or purchasing other content (at the same or different times) as customer 308. As illustrated, customer 308 and vendor 06 each typically perform some processing (such as uploading or purchasing content) using a computer, such as client 304.

Client 304 is any computing device operable to connect or communicate with server 302 or network 312 using any communication link. For example, client 304 is intended to encompass a personal computer, touch screen terminal, workstation, network computer, kiosk, wireless data port, smart phone, personal data assistant (PDA), one or more processors within these or other devices, or any other suitable processing device used by or for the benefit of business 308, vendor 306, or some other user or entity. At a high level, each client 304 includes or executes at least GUI 336 and comprises an electronic computing device operable to receive, transmit, process and store any appropriate data associated with environment 300. It will be understood that there may be any number of clients 304 communicably coupled to server 302. Further, "client 304," "business," "business analyst," "end user," and "user" may be used interchangeably as appropriate without departing from the scope of this disclosure. Moreover, for ease of illustration, each client 304 is described in terms of being used by one user. But this disclosure contemplates that many users may use one computer or that one user may use multiple computers. For example, client 304 may be a PDA operable to wirelessly connect with external or unsecured network. In another example, client 304 may comprise a laptop that includes an input device, such as a keypad, touch screen, mouse, or other device that can accept information, and an output device that conveys information associated with the operation of server 302 or clients 304, including digital data, visual information, or GUI 336. Both the input device and output device may include fixed or removable storage media such as a magnetic computer disk, CD-ROM, or other suitable media to both receive input from and provide output to users of clients 304 through the display, namely the client portion of GUI or application interface 336.

GUI 336 comprises a graphical user interface operable to allow the user of client 304 to interface with at least a portion of environment 300 for any suitable purpose, such as viewing application or other transaction data. Generally, GUI 336 provides the particular user with an efficient and user-friendly presentation of data provided by or communicated within environment 300. For example, GUI 336 may present the user with the components and information that is relevant to their task, increase reuse of such components, and facilitate a sizable developer community around those components. GUI 336 may comprise a plurality of customizable frames or views having interactive fields, pull-down lists, and buttons operated by the user. For example, GUI 336 is operable to display data involving business objects and interfaces in a user-friendly form based on the user context and the displayed data. In another example, GUI 336 is operable to display different levels and types of information involving business objects and interfaces based on the identified or supplied user role. GUI 336 may also present a plurality of portals or dashboards. For example, GUI 336 may display a portal that allows users to view, create, and manage historical and real-time reports including role-based reporting and such. Of course, such reports may be in any appropriate output format including PDF, HTML, and printable text. Real-time dashboards often provide table and graph information on the current state of the data, which may be supplemented by business objects and interfaces. It should be understood that the term graphical user interface may be used in the singular or in the plural to describe one or more graphical user interfaces and each of the displays of a particular graphical user interface. Indeed, reference to GUI 336 may indicate a reference to the front-end or a component of business application 330, as well as the particular interface accessible via client 304, as appropriate, without departing from the scope of this disclosure. Therefore, GUI 336 contemplates any graphical user interface, such as a generic web browser or touchscreen, that processes information in environment 300 and efficiently presents the results to the user. Server 302 can accept data from client 304 via the web browser (e.g., Microsoft Internet Explorer or Netscape Navigator) and return the appropriate HTML or XML responses to the browser using network 312.

Figure 3B:
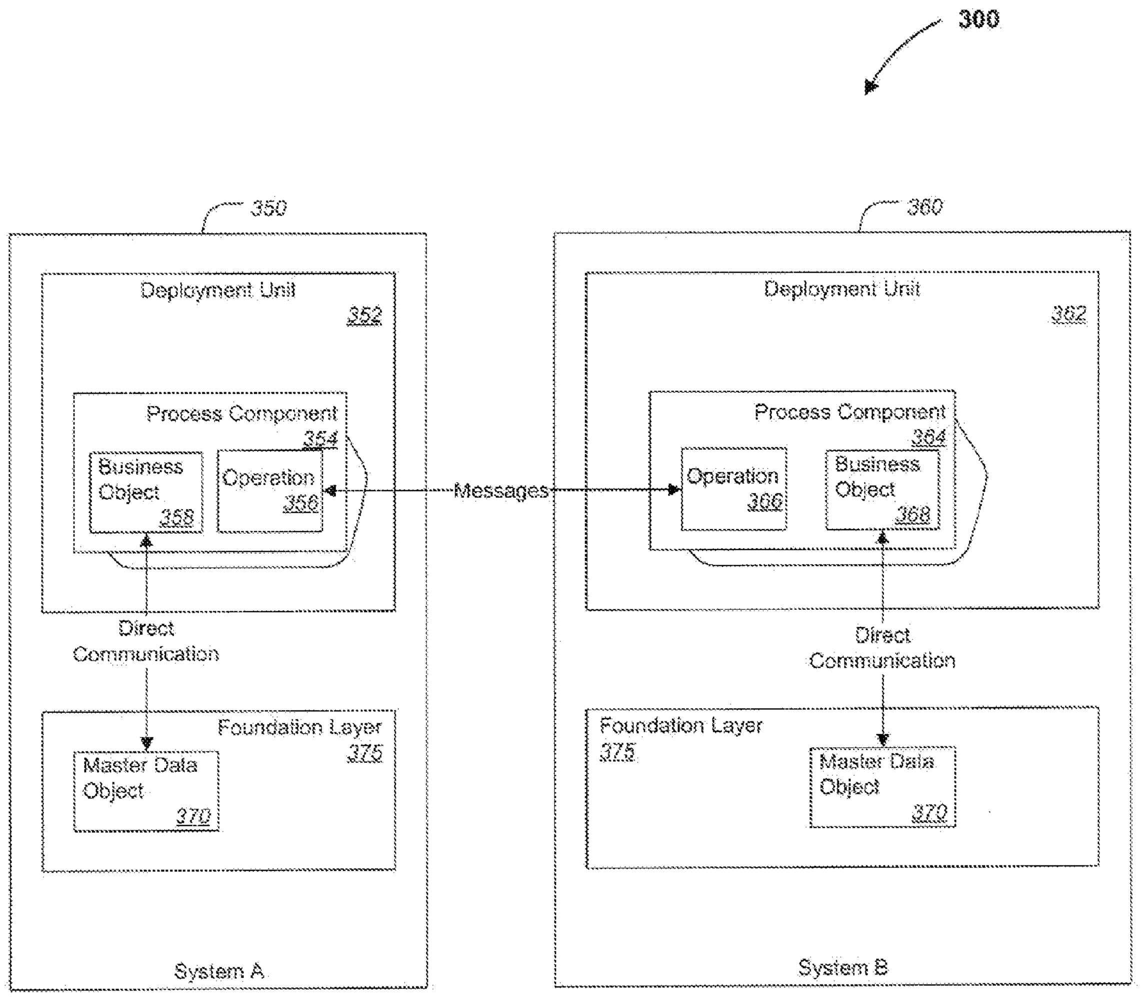

More generally in environment 300 as depicted in FIG. 3B, a Foundation Layer 375 can be deployed on multiple separate and distinct hardware platforms, e.g., System A 350 and System B 360, to support application software deployed as two or more deployment units distributed on the platforms, including deployment unit 352 deployed on System A and deployment unit 362 deployed on System B. In this example, the foundation layer can be used to support application software deployed in an application layer. In particular, the foundation layer can be used in connection with application software implemented in accordance with a software architecture that provides a suite of enterprise service operations having various application functionality. In some implementations, the application software is implemented to be deployed on an application platform that includes a foundation layer that contains all fundamental entities that can used from multiple deployment units. These entities can be process components, business objects, and reuse service components. A reuse service component is a piece of software that is reused in different transactions. A reuse service component is used by its defined interfaces, which can be, e.g., local APIs or service interfaces. As explained above, process components in separate deployment units interact through service operations, as illustrated by messages passing between service operations 356 and 366, which are implemented in process components 354 and 364, respectively, which are included in deployment units 352 and 362, respectively. As also explained above, some form of direct communication is generally the form of interaction used between a business object, e.g., business object 358 and 368, of an application deployment unit and a business object, such as master data object 370, of the Foundation Layer 375.

Various components of the present disclosure may be modeled using a model-driven environment. For example, the model-driven framework or environment may allow the developer to use simple drag-and-drop techniques to develop pattern-based or freestyle user interfaces and define the flow of data between them. The result could be an efficient, customized, visually rich online experience. In some cases, this model-driven development may accelerate the application development process and foster business-user self-service. It further enables business analysts or IT developers to compose visually rich applications that use analytic services, enterprise services, remote function calls (RFCs), APIs, and stored procedures. In addition, it may allow them to reuse existing applications and create content using a modeling process and a visual user interface instead of manual coding.

Figure 5A:
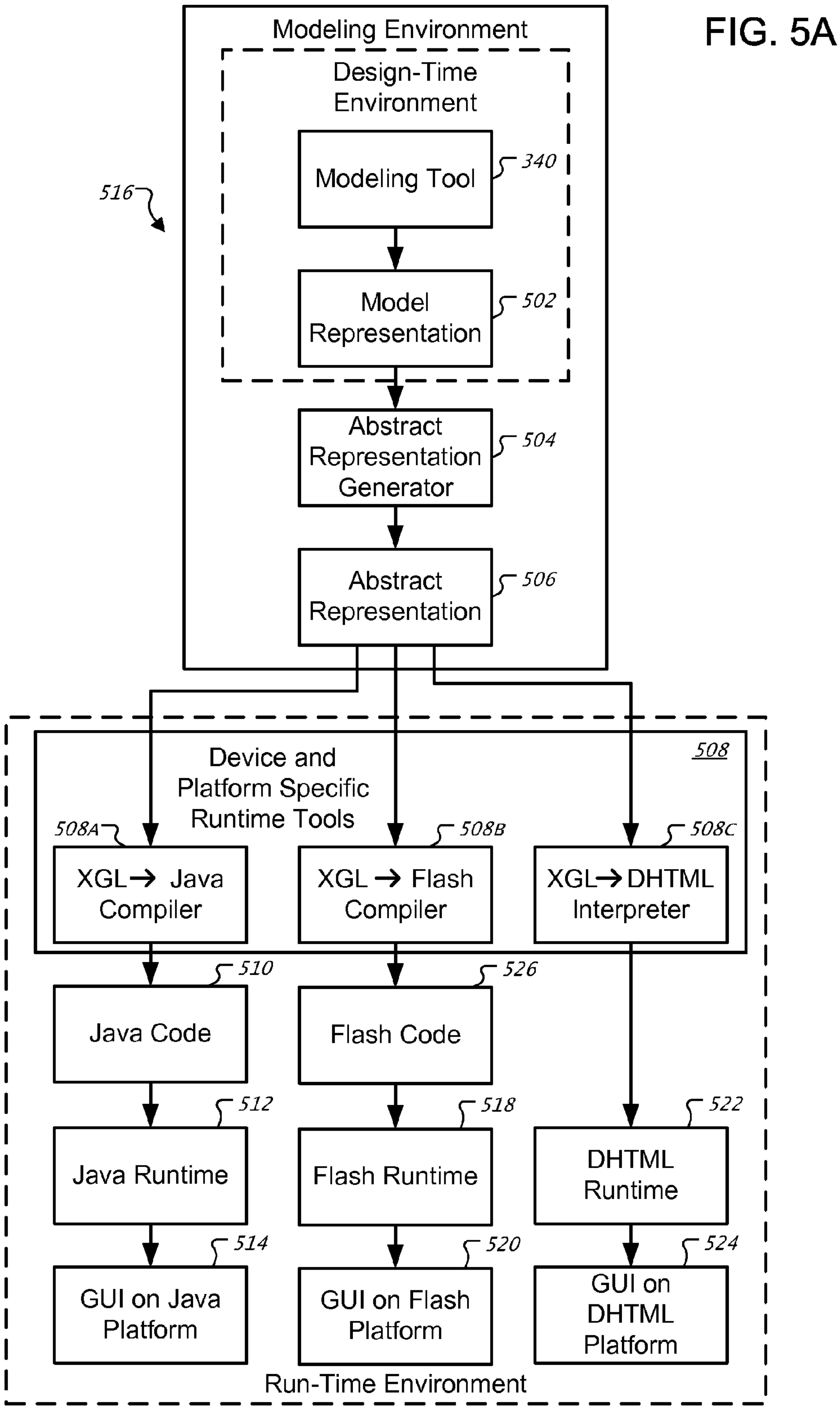
FIG. 5A depicts an example development environment in accordance with one embodiment of FIG. 1.

FIG. 5A depicts an example modeling environment 516, namely a modeling environment, in accordance with one embodiment of the present disclosure. Thus, as illustrated in FIG. 5A, such a modeling environment 516 may implement techniques for decoupling models created during design-time from the runtime environment. In other words, model representations for GUIs created in a design time environment are decoupled from the runtime environment in which the GUIs are executed. Often in these environments, a declarative and executable representation for GUIs for applications is provided that is independent of any particular runtime platform, GUI framework, device, or programming language.

According to some embodiments, a modeler (or other analyst) may use the model-driven modeling environment 516 to create pattern-based or freestyle user interfaces using simple drag-and-drop services. Because this development may be model-driven, the modeler can typically compose an application using models of business objects without having to write much, if any, code. In some cases, this example modeling environment 516 may provide a personalized, secure interface that helps unify enterprise applications, information, and processes into a coherent, role-based portal experience. Further, the modeling environment 516 may allow the developer to access and share information and applications in a collaborative environment. In this way, virtual collaboration rooms allow developers to work together efficiently, regardless of where they are located, and may enable powerful and immediate communication that crosses organizational boundaries while enforcing security requirements. Indeed, the modeling environment 516 may provide a shared set of services for finding, organizing, and accessing unstructured content stored in third-party repositories and content management systems across various networks 312. Classification tools may automate the organization of information, while subject-matter experts and content managers can publish information to distinct user audiences. Regardless of the particular implementation or architecture, this modeling environment 516 may allow the developer to easily model hosted business objects 140 using this model-driven approach.

In certain embodiments, the modeling environment 516 may implement or utilize a generic, declarative, and executable GUI language (generally described as XGL). This example XGL is generally independent of any particular GUI framework or runtime platform. Further, XGL is normally not dependent on characteristics of a target device on which the graphic user interface is to be displayed and may also be independent of any programming language. XGL is used to generate a generic representation (occasionally referred to as the XGL representation or XGL-compliant representation) for a design-time model representation. The XGL representation is thus typically a device-independent representation of a GUI. The XGL representation is declarative in that the representation does not depend on any particular GUI framework, runtime platform, device, or programming language. The XGL representation can be executable and therefore can unambiguously encapsulate execution semantics for the GUI described by a model representation. In short, models of different types can be transformed to XGL representations.

The XGL representation may be used for generating representations of various different GUIs and supports various GUI features including full windowing and componentization support, rich data visualizations and animations, rich modes of data entry and user interactions, and flexible connectivity to any complex application data services. While a specific embodiment of XGL is discussed, various other types of XGLs may also be used in alternative embodiments. In other words, it will be understood that XGL is used for example description only and may be read to include any abstract or modeling language that can be generic, declarative, and executable.

Turning to the illustrated embodiment in FIG. 5A, modeling tool 340 may be used by a GUI designer or business analyst during the application design phase to create a model representation 502 for a GUI application. It will be understood that modeling environment 516 may include or be compatible with various different modeling tools 340 used to generate model representation 502. This model representation 502 may be a machine-readable representation of an application or a domain specific model. Model representation 502 generally encapsulates various design parameters related to the GUI such as GUI components, dependencies between the GUI components, inputs and outputs, and the like. Put another way, model representation 502 provides a form in which the one or more models can be persisted and transported, and possibly handled by various tools such as code generators, runtime interpreters, analysis and validation tools, merge tools, and the like. In one embodiment, model representation 502 maybe a collection of XML documents with a well-formed syntax.

Illustrated modeling environment 516 also includes an abstract representation generator (or XGL generator) 504 operable to generate an abstract representation (for example, XGL representation or XGL-compliant representation) 506 based upon model representation 502. Abstract representation generator 504 takes model representation 502 as input and outputs abstract representation 506 for the model representation. Model representation 502 may include multiple instances of various forms or types depending on the tool/language used for the modeling. In certain cases, these various different model representations may each be mapped to one or more abstract representations 506. Different types of model representations may be transformed or mapped to XGL representations. For each type of model representation, mapping rules may be provided for mapping the model representation to the XGL representation 506. Different mapping rules may be provided for mapping a model representation to an XGL representation.

This XGL representation 506 that is created from a model representation may then be used for processing in the runtime environment. For example, the XGL representation 506 may be used to generate a machine-executable runtime GUI (or some other runtime representation) that may be executed by a target device. As part of the runtime processing, the XGL representation 506 may be transformed into one or more runtime representations, which may indicate source code in a particular programming language, machine-executable code for a specific runtime environment, executable GUI, and so forth, which may be generated for specific runtime environments and devices. Since the XGL representation 506, rather than the design-time model representation, is used by the runtime environment, the design-time model representation is decoupled from the runtime environment. The XGL representation 506 can thus serve as the common ground or interface between design-time user interface modeling tools and a plurality of user interface runtime frameworks. It provides a self-contained, closed, and deterministic definition of all aspects of a graphical user interface in a device-independent and programming-language independent manner. Accordingly, abstract representation 506 generated for a model representation 502 is generally declarative and executable in that it provides a representation of the GUI of model representation 502 that is not dependent on any device or runtime platform, is not dependent on any programming language, and unambiguously encapsulates execution semantics for the GUI. The execution semantics may include, for example, identification of various components of the GUI, interpretation of connections between the various GUI components, information identifying the order of sequencing of events, rules governing dynamic behavior of the GUI, rules governing handling of values by the GUI, and the like. The abstract representation 506 is also not GUI runtime-platform specific. The abstract representation 506 provides a self-contained, closed, and deterministic definition of all aspects of a graphical user interface that is device independent and language independent.

Abstract representation 506 is such that the appearance and execution semantics of a GUI generated from the XGL representation work consistently on different target devices irrespective of the GUI capabilities of the target device and the target device platform. For example, the same XGL representation may be mapped to appropriate GUIs on devices of differing levels of GUI complexity (i.e., the same abstract representation may be used to generate a GUI for devices that support simple GUIs and for devices that can support complex GUIs), the GUI generated by the devices are consistent with each other in their appearance and behavior.

Abstract representation generator 504 may be configured to generate abstract representation 506 for models of different types, which may be created using different modeling tools 340. It will be understood that modeling environment 516 may include some, none, or other sub-modules or components as those shown in this example illustration. In other words, modeling environment 516 encompasses the design-time environment (with or without the abstract generator or the various representations), a modeling toolkit (such as 340) linked with a developer's space, or any other appropriate software operable to decouple models created during design-time from the runtime environment. Abstract representation 506 provides an interface between the design time environment and the runtime environment. As shown, this abstract representation 506 may then be used by runtime processing.

As part of runtime processing, modeling environment 516 may include various runtime tools 508 and may generate different types of runtime representations based upon the abstract representation 506. Examples of runtime representations include device or language-dependent (or specific) source code, runtime platform-specific machine-readable code, GUIs for a particular target device, and the like. The runtime tools 508 may include compilers, interpreters, source code generators, and other such tools that are configured to generate runtime platform-specific or target device-specific runtime representations of abstract representation 506. The runtime tool 508 may generate the runtime representation from abstract representation 506 using specific rules that map abstract representation 506 to a particular type of runtime representation. These mapping rules may be dependent on the type of runtime tool, characteristics of the target device to be used for displaying the GUI, runtime platform, and/or other factors. Accordingly, mapping rules may be provided for transforming the abstract representation 506 to any number of target runtime representations directed to one or more target GUI runtime platforms. For example, XGL-compliant code generators may conform to semantics of XGL, as described below. XGL-compliant code generators may ensure that the appearance and behavior of the generated user interfaces is preserved across a plurality of target GUI frameworks, while accommodating the differences in the intrinsic characteristics of each and also accommodating the different levels of capability of target devices.

For example, as depicted in example FIG. 5A, an XGL-to-Java compiler 508A may take abstract representation 506 as input and generate Java code 510 for execution by a target device comprising a Java runtime 512. Java runtime 512 may execute Java code 510 to generate or display a GUI 514 on a Java-platform target device. As another example, an XGL-to-Flash compiler 508B may take abstract representation 506 as input and generate Flash code 526 for execution by a target device comprising a Flash runtime 518. Flash runtime 518 may execute Flash code 516 to generate or display a GUI 520 on a target device comprising a Flash platform. As another example, an XGL-to-DHTML (dynamic HTML) interpreter 508C may take abstract representation 506 as input and generate DHTML statements (instructions) on the fly which are then interpreted by a DHTML runtime 522 to generate or display a GUI 524 on a target device comprising a DHTML platform.

It should be apparent that abstract representation 506 may be used to generate GUIs for Extensible Application Markup Language (XAML) or various other runtime platforms and devices. The same abstract representation 506 may be mapped to various runtime representations and device-specific and runtime platform-specific GUIs. In general, in the runtime environment, machine executable instructions specific to a runtime environment may be generated based upon the abstract representation 506 and executed to generate a GUI in the runtime environment. The same XGL representation may be used to generate machine executable instructions specific to different runtime environments and target devices.

According to certain embodiments, the process of mapping a model representation 502 to an abstract representation 506 and mapping an abstract representation 506 to some runtime representation may be automated. For example, design tools may automatically generate an abstract representation for the model representation using XGL and then use the XGL abstract representation to generate GUIs that are customized for specific runtime environments and devices. As previously indicated, mapping rules may be provided for mapping model representations to an XGL representation. Mapping rules may also be provided for mapping an XGL representation to a runtime platform-specific representation.

Since the runtime environment uses abstract representation 506 rather than model representation 502 for runtime processing, the model representation 502 that is created during design-time is decoupled from the runtime environment. Abstract representation 506 thus provides an interface between the modeling environment and the runtime environment. As a result, changes may be made to the design time environment, including changes to model representation 502 or changes that affect model representation 502, generally to not substantially affect or impact the runtime environment or tools used by the runtime environment. Likewise, changes may be made to the runtime environment generally to not substantially affect or impact the design time environment. A designer or other developer can thus concentrate on the design aspects and make changes to the design without having to worry about the runtime dependencies such as the target device platform or programming language dependencies.

Figure 5B:
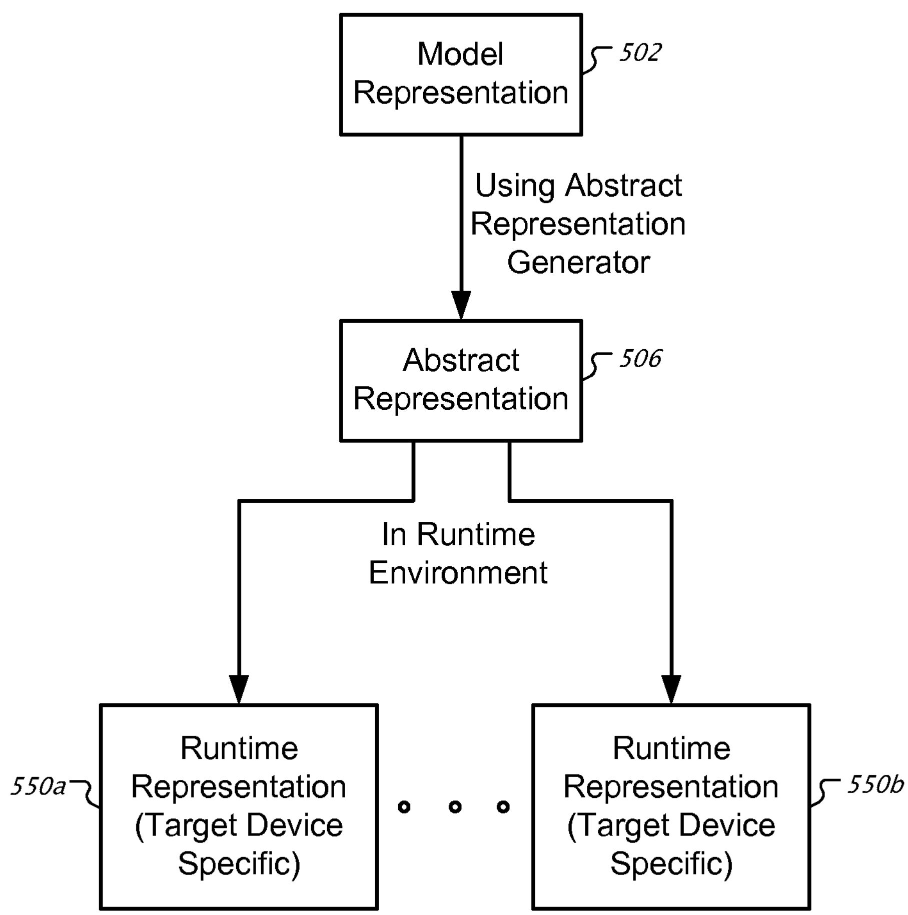
FIG. 5B depicts a simplified process for mapping a model representation to a runtime representation using the example development environment of FIG. 5A or some other development environment.

FIG. 5B depicts an example process for mapping a model representation 502 to a runtime representation using the example modeling environment 516 of FIG. 5A or some other modeling environment. Model representation 502 may comprise one or more model components and associated properties that describe a data object, such as hosted business objects and interfaces. As described above, at least one of these model components is based on or otherwise associated with these hosted business objects and interfaces. The abstract representation 506 is generated based upon model representation 502. Abstract representation 506 may be generated by the abstract representation generator 504. Abstract representation 506 comprises one or more abstract GUI components and properties associated with the abstract GUI components. As part of generation of abstract representation 506, the model GUI components and their associated properties from the model representation are mapped to abstract GUI components and properties associated with the abstract GUI components. Various mapping rules may be provided to facilitate the mapping. The abstract representation encapsulates both appearance and behavior of a GUI. Therefore, by mapping model components to abstract components, the abstract representation not only specifies the visual appearance of the GUI but also the behavior of the GUI, such as in response to events whether clicking/dragging or scrolling, interactions between GUI components and such.

One or more runtime representations 550*a*, including GUIs for specific runtime environment platforms, may be generated from abstract representation 506. A device-dependent runtime representation may be generated for a particular type of target device platform to be used for executing and displaying the GUI encapsulated by the abstract representation. The GUIs generated from abstract representation 506 may comprise various types of GUI elements such as buttons, windows, scrollbars, input boxes, etc. Rules may be provided for mapping an abstract representation to a particular runtime representation. Various mapping rules may be provided for different runtime environment platforms.

Methods and systems consistent with the subject matter described herein provide and use interfaces 320 derived from the business object model 318 suitable for use with more than one business area, for example different departments within a company such as finance, or marketing. Also, they are suitable across industries and across businesses. Interfaces 320 are used during an end-to-end business transaction to transfer business process information in an application-independent manner. For example the interfaces can be used for fulfilling a sales order.

Message Overview

To perform an end-to-end business transaction, consistent interfaces are used to create business documents that are sent within messages between heterogeneous programs or modules.

Message Categories

As depicted in FIG. 6, the communication between a sender 602 and a recipient 604 can be broken down into basic categories that describe the type of the information exchanged and simultaneously suggest the anticipated reaction of the recipient 604. A message category is a general business classification for the messages. Communication is sender-driven. In other words, the meaning of the message categories is established or formulated from the perspective of the sender 602. The message categories include information 606, notification 608, query 610, response 612, request 614, and confirmation 616.

Information

Information 606 is a message sent from a sender 602 to a recipient 604 concerning a condition or a statement of affairs. No reply to information is expected. Information 606 is sent to make business partners or business applications aware of a situation. Information 606 is not compiled to be application-specific. Examples of "information" are an announcement, advertising, a report, planning information, and a message to the business warehouse.

Notification

A notification 608 is a notice or message that is geared to a service. A sender 602 sends the notification 608 to a recipient 604. No reply is expected for a notification. For example, a billing notification relates to the preparation of an invoice while a dispatched delivery notification relates to preparation for receipt of goods.

Query

A query 610 is a question from a sender 602 to a recipient 604 to which a response 612 is expected. A query 610 implies no assurance or obligation on the part of the sender 602. Examples of a query 610 are whether space is available on a specific flight or whether a specific product is available. These queries do not express the desire for reserving the flight or purchasing the product.

Response

A response 612 is a reply to a query 610. The recipient 604 sends the response 612 to the sender 602. A response 612 generally implies no assurance or obligation on the part of the recipient 604. The sender 602 is not expected to reply. Instead, the process is concluded with the response 612. Depending on the business scenario, a response 612 also may include a commitment, i.e., an assurance or obligation on the part of the recipient 604. Examples of responses 612 are a response stating that space is available on a specific flight or that a specific product is available. With these responses, no reservation was made.

Request

A request 614 is a binding requisition or requirement from a sender 602 to a recipient 604. Depending on the business scenario, the recipient 604 can respond to a request 614 with a confirmation 616. The request 614 is binding on the sender 602. In making the request 614, the sender 602 assumes, for example, an obligation to accept the services rendered in the request 614 under the reported conditions. Examples of a request 614 are a parking ticket, a purchase order, an order for delivery and a job application.

Confirmation

A confirmation 616 is a binding reply that is generally made to a request 614. The recipient 604 sends the confirmation 616 to the sender 602. The information indicated in a confirmation 616, such as deadlines, products, quantities and prices, can deviate from the information of the preceding request 614. A request 614 and confirmation 616 may be used in negotiating processes. A negotiating process can consist of a series of several request 614 and confirmation 616 messages. The confirmation 616 is binding on the recipient 604. For example, 100 units of X may be ordered in a purchase order request; however, only the delivery of 80 units is confirmed in the associated purchase order confirmation.

Message Choreography

A message choreography is a template that specifies the sequence of messages between business entities during a given transaction. The sequence with the messages contained in it describes in general the message "lifecycle" as it proceeds between the business entities. If messages from a choreography are used in a business transaction, they appear in the transaction in the sequence determined by the choreography. This illustrates the template character of a choreography, i.e., during an actual transaction, it is not necessary for all messages of the choreography to appear. Those messages that are contained in the transaction, however, follow the sequence within the choreography. A business transaction is thus a derivation of a message choreography. The choreography makes it possible to determine the structure of the individual message types more precisely and distinguish them from one another.

Components of the Business Object Model

The overall structure of the business object model ensures the consistency of the interfaces that are derived from the business object model. The derivation ensures that the same business-related subject matter or concept is represented and structured in the same way in all interfaces.

The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Each business object is generally a capsule with an internal hierarchical structure, behavior offered by its operations, and integrity constraints. Business objects are semantically disjoint, i.e., the same business information is represented once. In the business object model, the business objects are arranged in an ordering framework. From left to right, they are arranged according to their existence dependency to each other. For example, the customizing elements may be arranged on the left side of the business object model, the strategic elements may be arranged in the center of the business object model, and the operative elements may be arranged on the right side of the business object model. Similarly, the business objects are arranged from the top to the bottom based on defined order of the business areas, e.g., finance could be arranged at the top of the business object model with CRM below finance and SRM below CRM.

To ensure the consistency of interfaces, the business object model may be built using standardized data types as well as packages to group related elements together, and package templates and entity templates to specify the arrangement of packages and entities within the structure.

Data Types

Data types are used to type object entities and interfaces with a structure. This typing can include business semantic. Such data types may include those generally described at pages 96 through 1642 (which are incorporated by reference herein) of U.S. patent application Ser. No. 11/803,178, filed on May 11, 2007 and entitled "Consistent Set Of Interfaces Derived From A Business Object Model". For example, the data type BusinessTransactionDocumentID is a unique identifier for a document in a business transaction. Also, as an example, Data type BusinessTransactionDocumentParty contains the information that is exchanged in business documents about a party involved in a business transaction, and includes the party's identity, the party's address, the party's contact person and the contact person's address. BusinessTransactionDocumentParty also includes the role of the party, e.g., a buyer, seller, product recipient, or vendor.

The data types are based on Core Component Types ("CCTs"), which themselves are based on the World Wide Web Consortium ("W3C") data types. "Global" data types represent a business situation that is described by a fixed structure. Global data types include both context-neutral generic data types ("GDTs") and context-based context data types ("CDTs"). GDTs contain business semantics, but are application-neutral, i.e., without context. CDTs, on the other hand, are based on GDTs and form either a use-specific view of the GDTs, or a context-specific assembly of GDTs or CDTs. A message is typically constructed with reference to a use and is thus a use-specific assembly of GDTs and CDTs. The data types can be aggregated to complex data types.

To achieve a harmonization across business objects and interfaces, the same subject matter is typed with the same data type. For example, the data type "GeoCoordinates" is built using the data type "Measure" so that the measures in a GeoCoordinate (i.e., the latitude measure and the longitude measure) are represented the same as other "Measures" that appear in the business object model.

Entities

Entities are discrete business elements that are used during a business transaction. Entities are not to be confused with business entities or the components that interact to perform a transaction. Rather, "entities" are one of the layers of the business object model and the interfaces. For example, a Catalogue entity is used in a Catalogue Publication Request and a Purchase Order is used in a Purchase Order Request. These entities are created using the data types defined above to ensure the consistent representation of data throughout the entities.

Packages

Packages group the entities in the business object model and the resulting interfaces into groups of semantically associated information. Packages also may include "sub"-packages, i.e., the packages may be nested.

Figure 7:
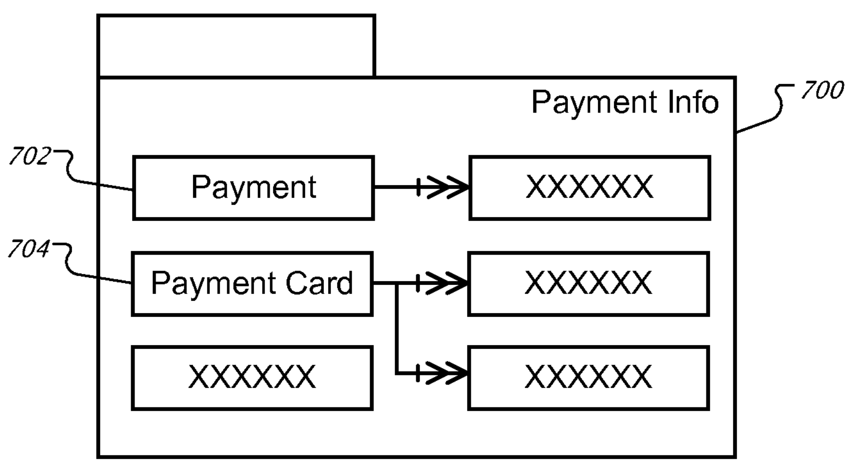
FIG. 7 depicts an example of a package in accordance with methods and systems consistent with the subject matter described herein.

Packages may group elements together based on different factors, such as elements that occur together as a rule with regard to a business-related aspect. For example, as depicted in FIG. 7, in a Purchase Order, different information regarding the purchase order, such as the type of payment 702, and payment card 704, are grouped together via the PaymentInformation package 700.

Figure 8:
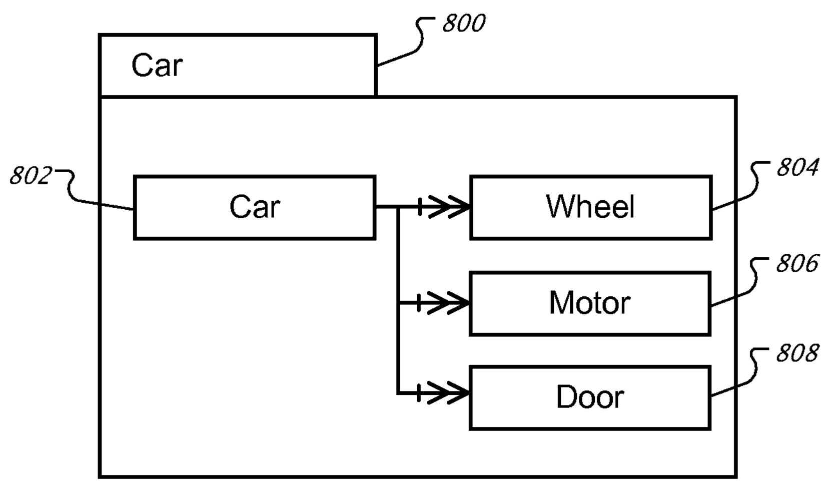
FIG. 8 depicts another example of a package in accordance with methods and systems consistent with the subject matter described herein.

Packages also may combine different components that result in a new object. For example, as depicted in FIG. 8, the components wheels 804, motor 806, and doors 808 are combined to form a composition "Car" 802. The "Car" package 800 includes the wheels, motor and doors as well as the composition "Car."

Figure 9:
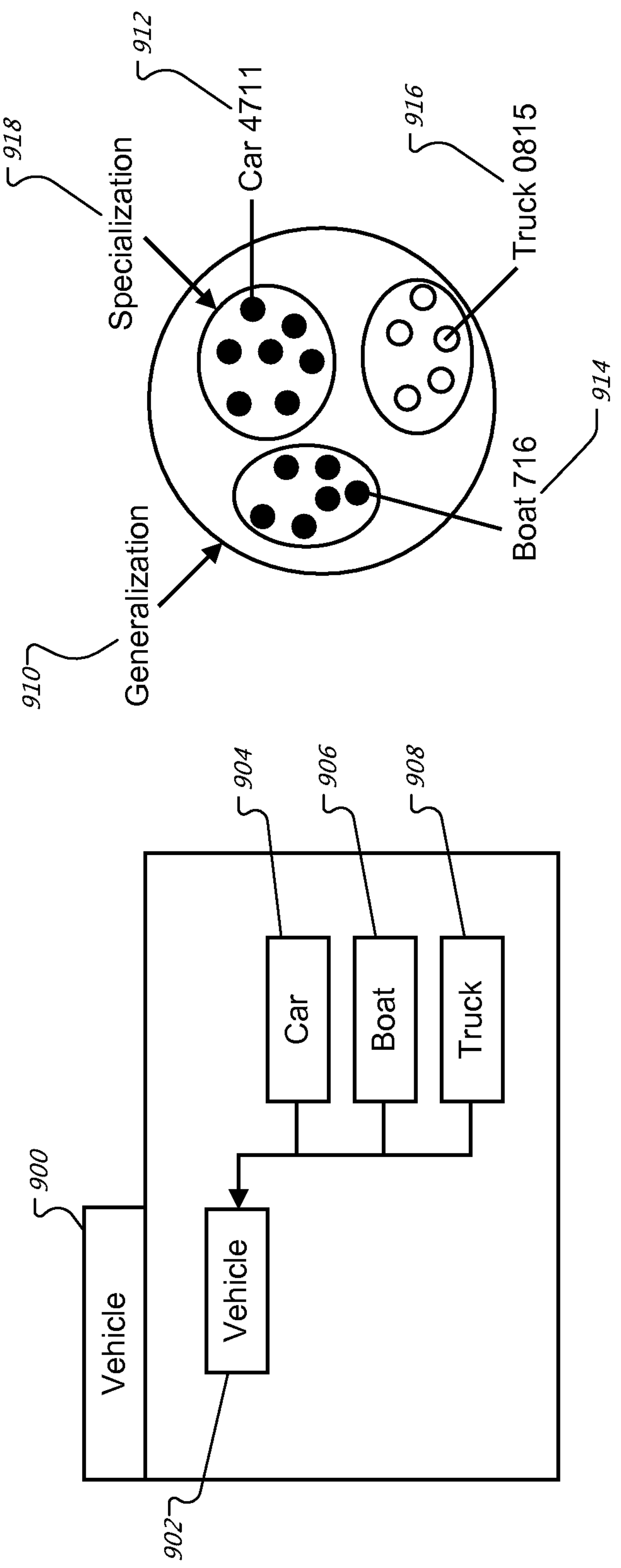
FIG. 9 depicts a third example of a package in accordance with methods and systems consistent with the subject matter described herein.

Another grouping within a package may be subtypes within a type. In these packages, the components are specialized forms of a generic package. For example, as depicted in FIG. 9, the components Car 904, Boat 906, and Truck 908 can be generalized by the generic term Vehicle 902 in Vehicle package 900. Vehicle in this case is the generic package 910, while Car 912, Boat 914, and Truck 916 are the specializations 918 of the generalized vehicle 910.

Figure 10:
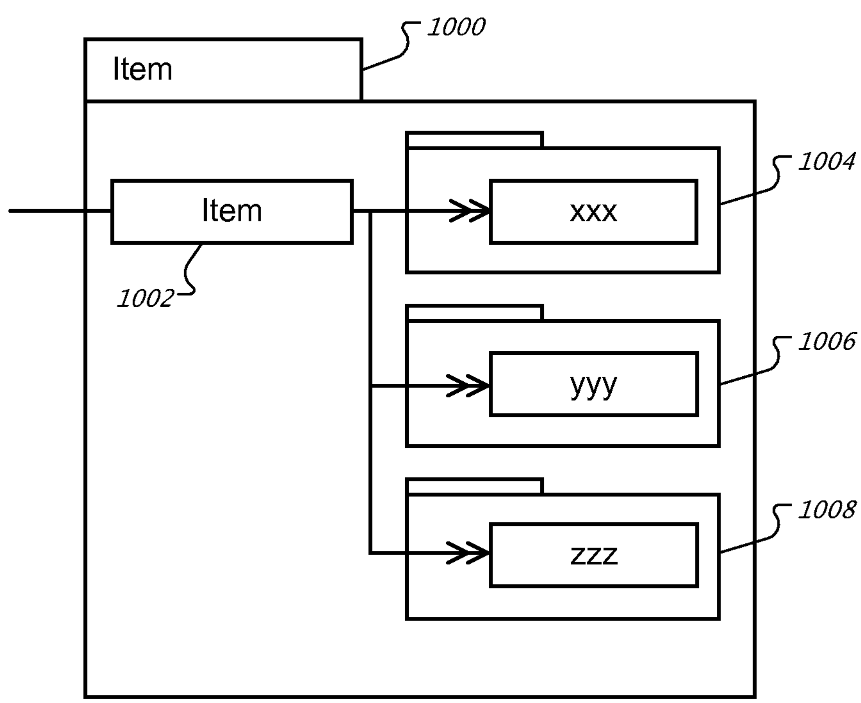
FIG. 10 depicts a fourth example of a package in accordance with methods and systems consistent with the subject matter described herein.

Packages also may be used to represent hierarchy levels. For example, as depicted in FIG. 10, the Item Package 1000 includes Item 1002 with subitem xxx 1004, subitem yyy 1006, and subitem zzz 1008.

Figure 11:
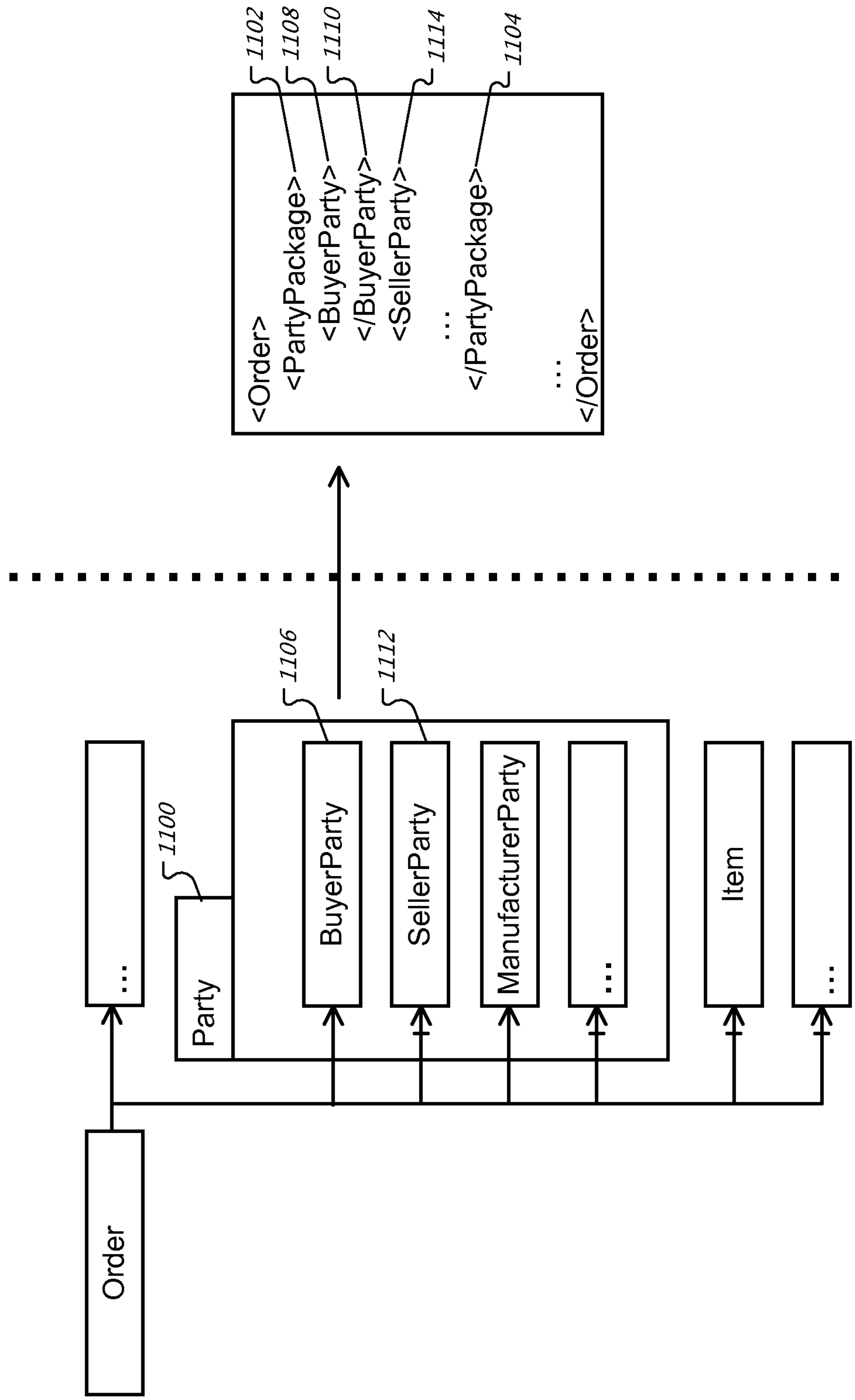
FIG. 11 depicts the representation of a package in the XML schema in accordance with methods and systems consistent with the subject matter described herein.

Packages can be represented in the XML schema as a comment. One advantage of this grouping is that the document structure is easier to read and is more understandable. The names of these packages are assigned by including the object name in brackets with the suffix "Package." For example, as depicted in FIG. 11, Party package 1100 is enclosed by <PartyPackage> 1102 and </PartyPackage> 1104. Party package 1100 illustratively includes a Buyer Party 1106, identified by <BuyerParty> 1108 and </BuyerParty> 1110, and a Seller Party 1112, identified by <SellerParty> 1114 and </SellerParty>, etc.

Relationships

Relationships describe the interdependencies of the entities in the business object model, and are thus an integral part of the business object model.

Cardinality of Relationships

Figure 12:
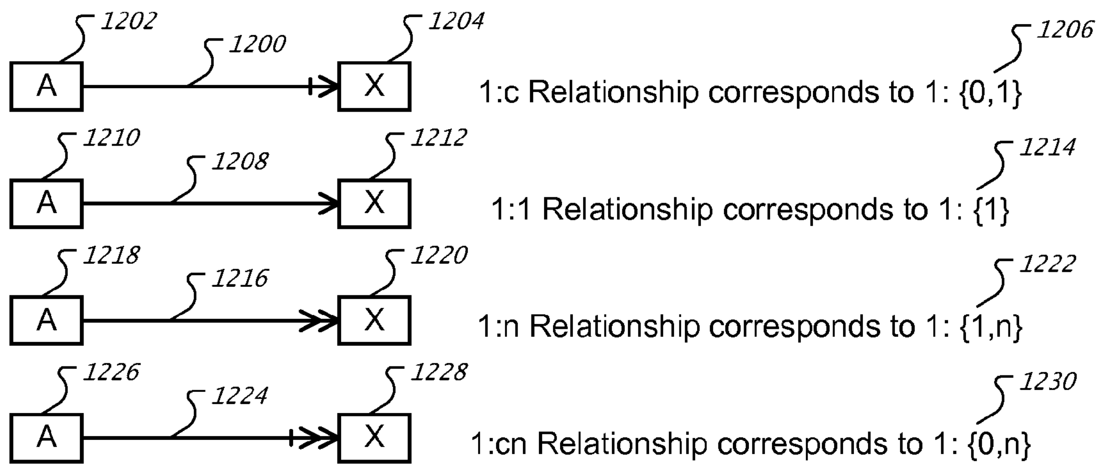
FIG. 12 depicts a graphical representation of cardinalities between two entities in accordance with methods and systems consistent with the subject matter described herein.

FIG. 12 depicts a graphical representation of the cardinalities between two entities. The cardinality between a first entity and a second entity identifies the number of second entities that could possibly exist for each first entity. Thus, a 1:c cardinality 1200 between entities A 1202 and X 1204 indicates that for each entity A 1202, there is either one or zero 1206 entity X 1204. A 1:1 cardinality 1208 between entities A 1210 and X 1212 indicates that for each entity A 1210, there is exactly one 1214 entity X 1212. A 1:n cardinality 1216 between entities A 1218 and X 1220 indicates that for each entity A 1218, there are one or more 1222 entity Xs 1220. A 1:cn cardinality 1224 between entities A 1226 and X 1228 indicates that for each entity A 1226, there are any number 1230 of entity Xs 1228 (i.e., 0 through n Xs for each A).

Types of Relationships

Composition

Figure 13:
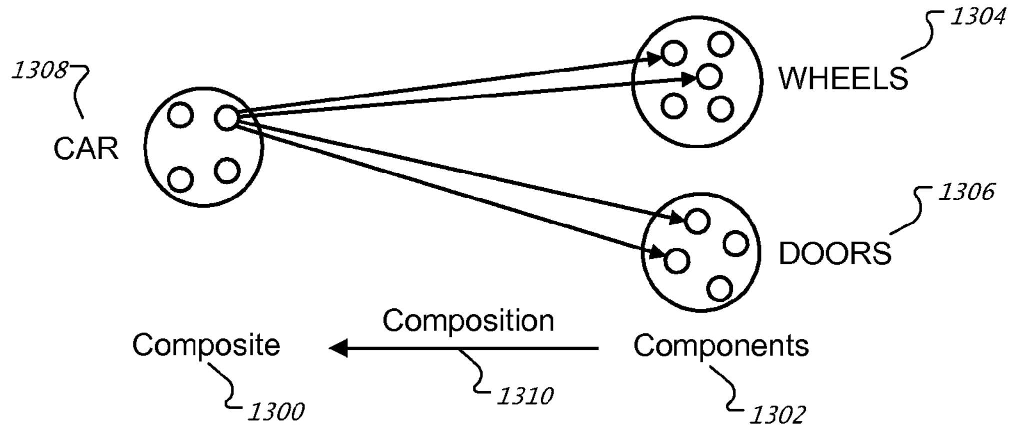
FIG. 13 depicts an example of a composition in accordance with methods and systems consistent with the subject matter described herein.
Figure 14:
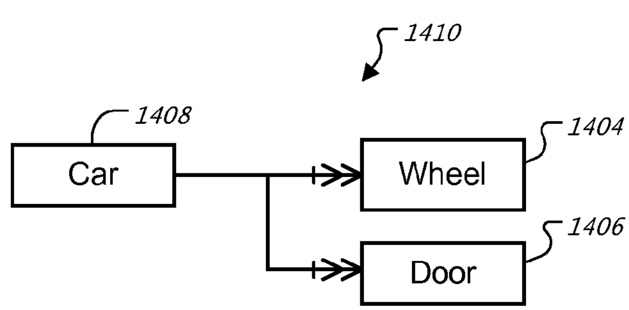
FIG. 14 depicts an example of a hierarchical relationship in accordance with methods and systems consistent with the subject matter described herein.

A composition or hierarchical relationship type is a strong whole-part relationship which is used to describe the structure within an object. The parts, or dependent entities, represent a semantic refinement or partition of the whole, or less dependent entity. For example, as depicted in FIG. 13, the components 1302, wheels 1304, and doors 1306 may be combined to form the composite 1300 "Car" 1308 using the composition 1310. FIG. 14 depicts a graphical representation of the composition 1410 between composite Car 1408 and components wheel 1404 and door 1406.

Aggregation

Figure 15:
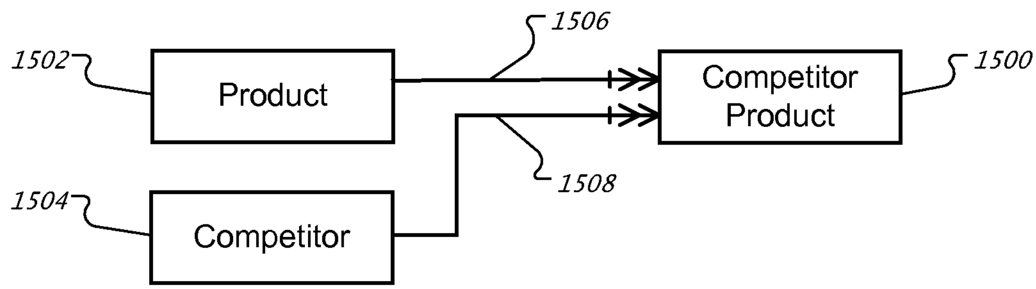
FIG. 15 depicts an example of an aggregating relationship in accordance with methods and systems consistent with the subject matter described herein.

An aggregation or an aggregating relationship type is a weak whole-part relationship between two objects. The dependent object is created by the combination of one or several less dependent objects. For example, as depicted in FIG. 15, the properties of a competitor product 1500 are determined by a product 1502 and a competitor 1504. A hierarchical relationship 1506 exists between the product 1502 and the competitor product 1500 because the competitor product 1500 is a component of the product 1502. Therefore, the values of the attributes of the competitor product 1500 are determined by the product 1502. An aggregating relationship 1508 exists between the competitor 1504 and the competitor product 1500 because the competitor product 1500 is differentiated by the competitor 1504. Therefore the values of the attributes of the competitor product 1500 are determined by the competitor 1504.

Association

Figure 16:
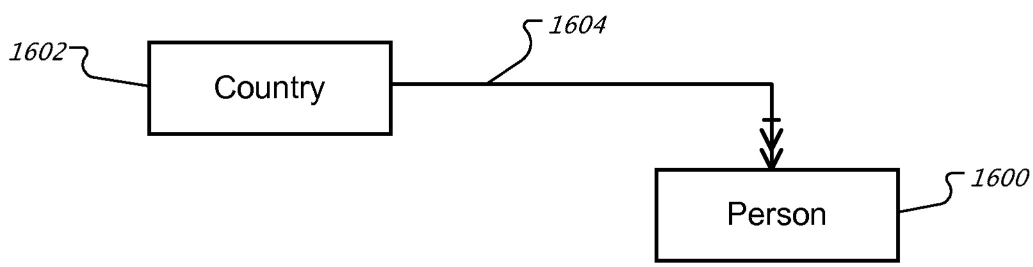
FIG. 16 depicts an example of an association in accordance with methods and systems consistent with the subject matter described herein.

An association or a referential relationship type describes a relationship between two objects in which the dependent object refers to the less dependent object. For example, as depicted in FIG. 16, a person 1600 has a nationality, and thus, has a reference to its country 1602 of origin. There is an association 1604 between the country 1602 and the person 1600. The values of the attributes of the person 1600 are not determined by the country 1602.

Specialization

Figure 17:
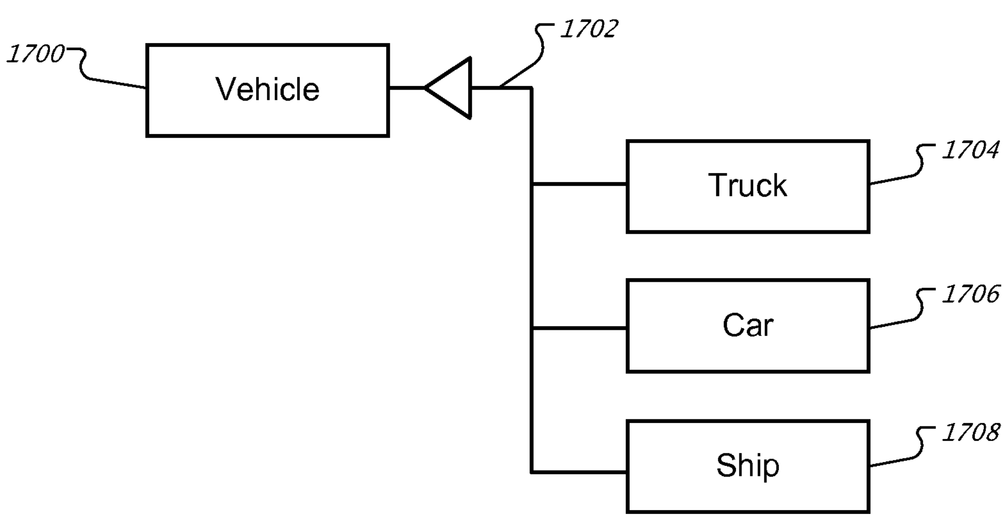
FIG. 17 depicts an example of a specialization in accordance with methods and systems consistent with the subject matter described herein.

Entity types may be divided into subtypes based on characteristics of the entity types. For example, FIG. 17 depicts an entity type "vehicle" 1700 specialized 1702 into subtypes "truck" 1704, "car" 1706, and "ship" 1708. These subtypes represent different aspects or the diversity of the entity type.

Subtypes may be defined based on related attributes. For example, although ships and cars are both vehicles, ships have an attribute, "draft," that is not found in cars. Subtypes also may be defined based on certain methods that can be applied to entities of this subtype and that modify such entities. For example, "drop anchor" can be applied to ships. If outgoing relationships to a specific object are restricted to a subset, then a subtype can be defined which reflects this subset.

Figure 18:
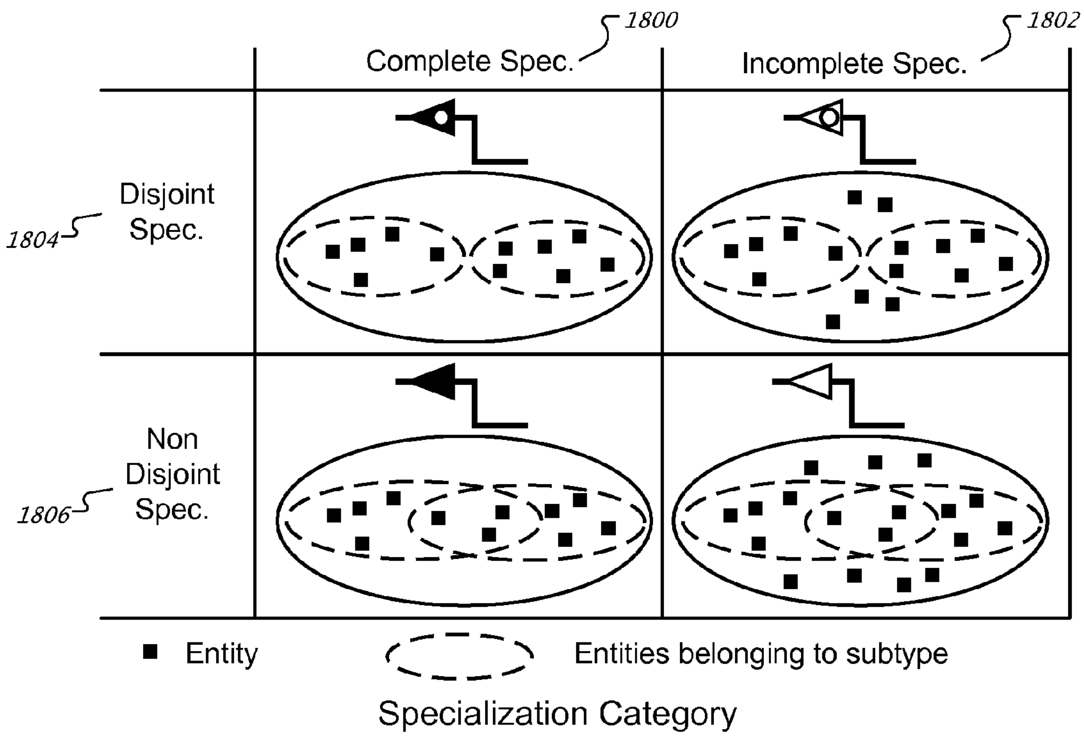
FIG. 18 depicts the categories of specializations in accordance with methods and systems consistent with the subject matter described herein.

As depicted in FIG. 18, specializations may further be characterized as complete specializations 1800 or incomplete specializations 1802. There is a complete specialization 1800 where each entity of the generalized type belongs to at least one subtype. With an incomplete specialization 1802, there is at least one entity that does not belong to a subtype. Specializations also may be disjoint 1804 or nondisjoint 1806. In a disjoint specialization 1804, each entity of the generalized type belongs to a maximum of one subtype. With a nondisjoint specialization 1806, one entity may belong to more than one subtype. As depicted in FIG. 18, four specialization categories result from the combination of the specialization characteristics.

Structural Patterns

Item

An item is an entity type which groups together features of another entity type. Thus, the features for the entity type chart of accounts are grouped together to form the entity type chart of accounts item. For example, a chart of accounts item is a category of values or value flows that can be recorded or represented in amounts of money in accounting, while a chart of accounts is a superordinate list of categories of values or value flows that is defined in accounting.

The cardinality between an entity type and its item is often either 1:n or 1:cn. For example, in the case of the entity type chart of accounts, there is a hierarchical relationship of the cardinality 1:n with the entity type chart of accounts item since a chart of accounts has at least one item in all cases.

Hierarchy

Figure 19:
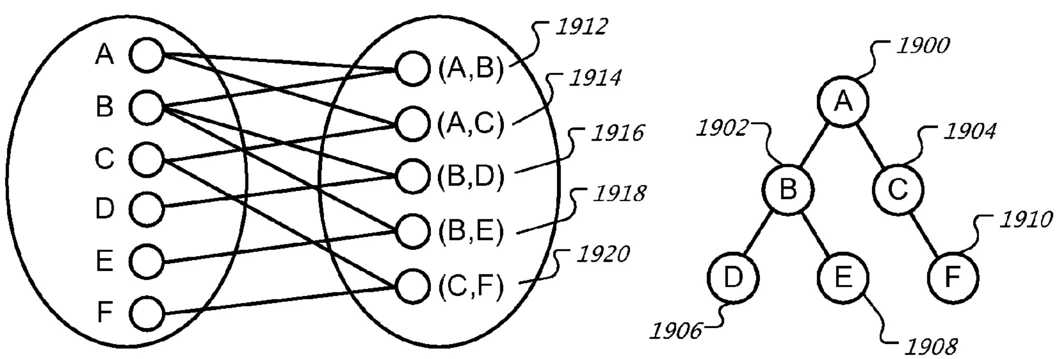
FIG. 19 depicts an example of a hierarchy in accordance with methods and systems consistent with the subject matter described herein.

A hierarchy describes the assignment of subordinate entities to superordinate entities and vice versa, where several entities of the same type are subordinate entities that have, at most, one directly superordinate entity. For example, in the hierarchy depicted in FIG. 19, entity B 1902 is subordinate to entity A 1900, resulting in the relationship (A,B) 1912. Similarly, entity C 1904 is subordinate to entity A 1900, resulting in the relationship (A,C) 1914. Entity D 1906 and entity E 1908 are subordinate to entity B 1902, resulting in the relationships (B,D) 1916 and (B,E) 1918, respectively. Entity F 1910 is subordinate to entity C 1904, resulting in the relationship (C,F) 1920.

Figure 20:
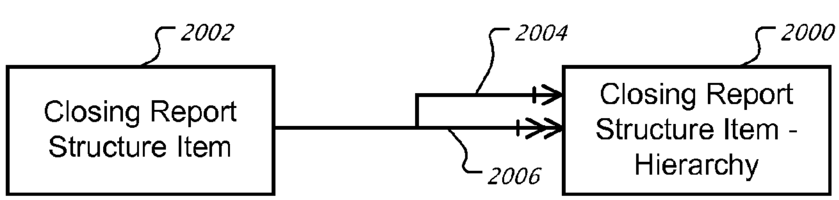
FIG. 20 depicts a graphical representation of a hierarchy in accordance with methods and systems consistent with the subject matter described herein.

Because each entity has at most one superordinate entity, the cardinality between a subordinate entity and its superordinate entity is 1:c. Similarly, each entity may have 0, 1 or many subordinate entities. Thus, the cardinality between a superordinate entity and its subordinate entity is 1:cn. FIG. 20 depicts a graphical representation of a Closing Report Structure Item hierarchy 2000 for a Closing Report Structure Item 2002. The hierarchy illustrates the 1:c cardinality 2004 between a subordinate entity and its superordinate entity, and the 1:cn cardinality 2006 between a superordinate entity and its subordinate entity.

Creation of the Business Object Model

Figure 21A:
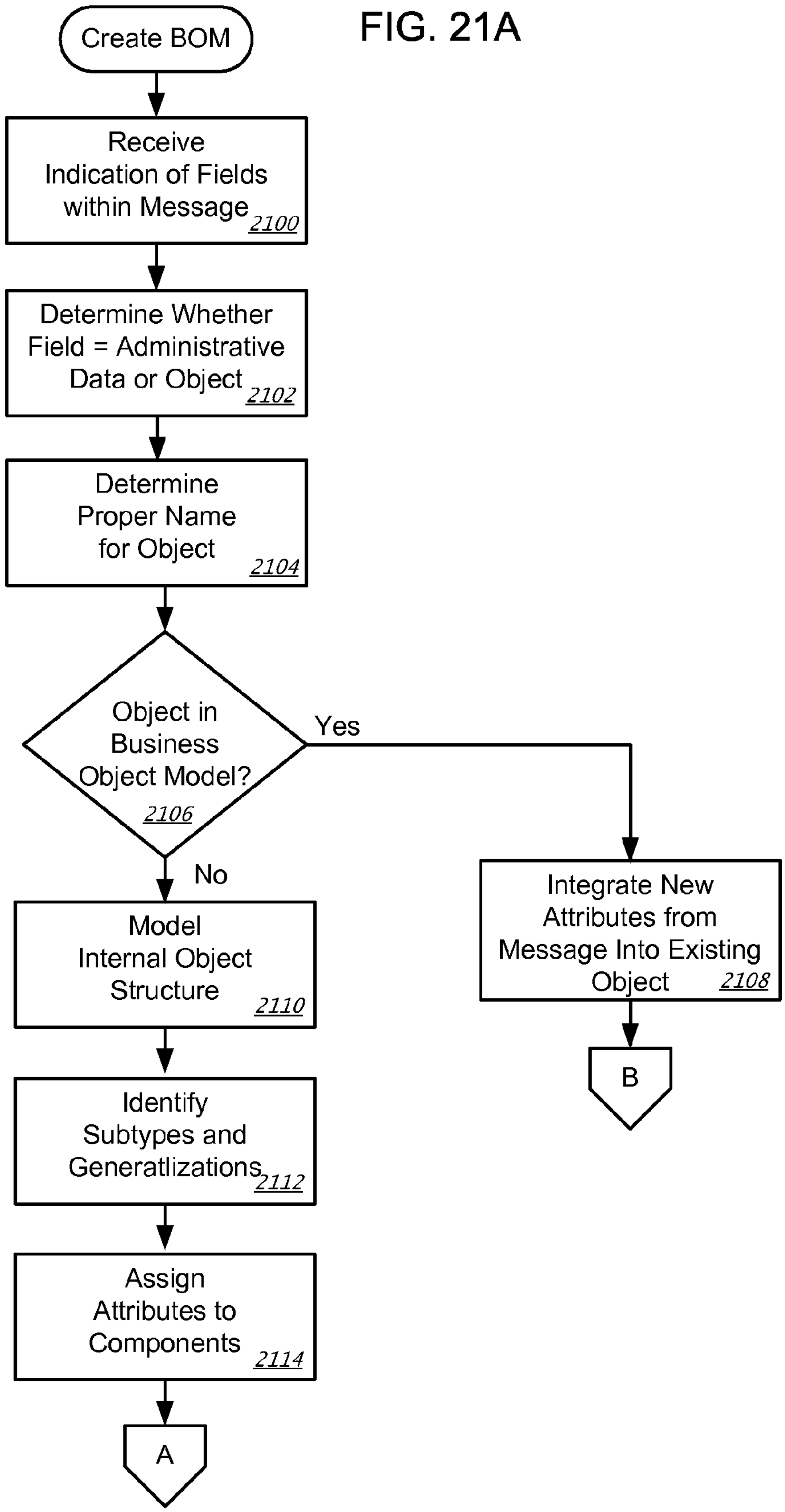
FIGS. 21A-B depict a flow diagram of the steps performed to create a business object model in accordance with methods and systems consistent with the subject matter described herein.
Figure 21B:
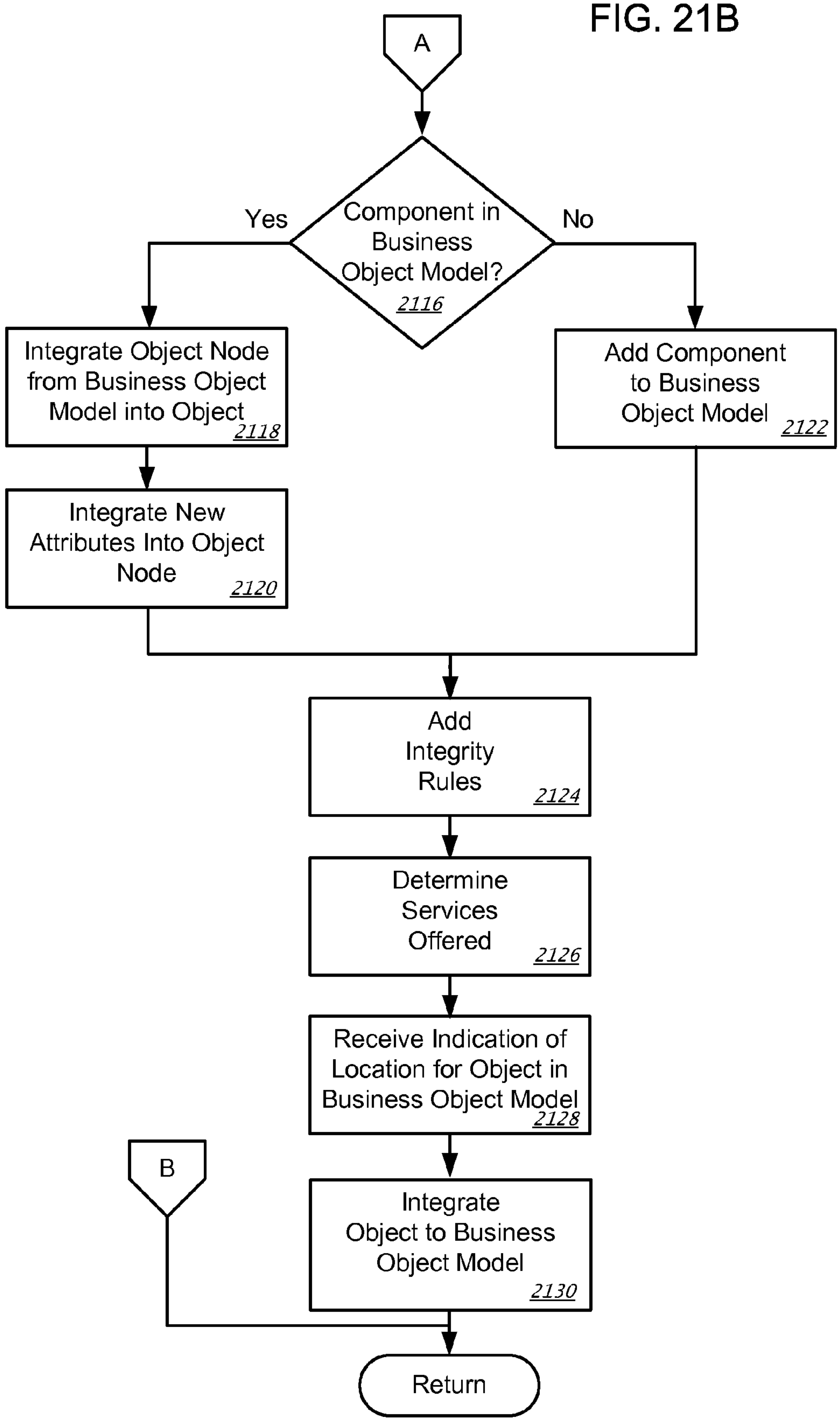

FIGS. 21A-B depict the steps performed using methods and systems consistent with the subject matter described herein to create a business object model. Although some steps are described as being performed by a computer, these steps may alternatively be performed manually, or computer-assisted, or any combination thereof. Likewise, although some steps are described as being performed by a computer, these steps may also be computer-assisted, or performed manually, or any combination thereof.

As discussed above, the designers create message choreographies that specify the sequence of messages between business entities during a transaction. After identifying the messages, the developers identify the fields contained in one of the messages (step 2100, FIG. 21A). The designers then determine whether each field relates to administrative data or is part of the object (step 2102). Thus, the first eleven fields identified below in the left column are related to administrative data, while the remaining fields are part of the object.

| | |
|---|---|
| MessageID | Admin |
| ReferenceID | |
| CreationDate | |
| SenderID | |
| AdditionalSenderID | |
| ContactPersonID | |
| SenderAddress | |
| RecipientID | |
| AdditionalRecipientID | |
| ContactPersonID | |
| RecipientAddress | |
| ID | Main Object |
| AdditionalID | |
| PostingDate | |
| LastChangeDate | |
| AcceptanceStatus | |
| Note | |
| CompleteTransmission Indicator | |
| Buyer | |
| BuyerOrganisationName | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobileNumber | |
| Facsimile | |
| Email | |
| Seller | |
| SellerAddress | |
| Location | |
| LocationType | |
| DeliveryItemGroupID | |
| DeliveryPriority | |

-continued

| |
|---|
| DeliveryCondition |
| TransferLocation |
| NumberofPartialDelivery |
| QuantityTolerance |
| MaximumLeadTime |
| TransportServiceLevel |
| TranportCondition |
| TransportDescription |
| CashDiscountTerms |
| PaymentForm |
| PaymentCardID |
| PaymentCardReferenceID |
| SequenceID |
| Holder |
| ExpirationDate |
| AttachmentID |
| AttachmentFilename |
| DescriptionofMessage |
| ConfirmationDescriptionof Message |
| FollowUpActivity |
| ItemID |
| ParentItemID |
| HierarchyType |
| ProductID |
| ProductType |
| ProductNote |
| ProductCategoryID |
| Amount |
| BaseQuantity |
| ConfirmedAmount |
| ConfirmedBaseQuantity |
| ItemBuyer |
| ItemBuyerOrganisationName |
| Person Name |
| FunctionalTitle |
| DepartmentName |
| CountryCode |
| StreetPostalCode |
| POBox Postal Code |
| Company Postal Code |
| City Name |
| DistrictName |
| PO Box ID |
| PO Box Indicator |
| PO Box Country Code |
| PO Box Region Code |
| PO Box City Name |
| Street Name |
| House ID |
| Building ID |
| Floor ID |
| Room ID |
| Care Of Name |
| AddressDescription |
| Telefonnumber |
| MobilNumber |
| Facsimile |
| Email |
| ItemSeller |
| ItemSellerAddress |
| ItemLocation |
| ItemLocationType |
| ItemDeliveryItemGroupID |
| ItemDeliveryPriority |
| ItemDeliveryCondition |
| ItemTransferLocation |
| ItemNumberofPartialDelivery |
| ItemQuantityTolerance |
| ItemMaximumLeadTime |
| ItemTransportServiceLevel |
| ItemTranportCondition |
| ItemTransportDescription |
| ContractReference |
| QuoteReference |
| CatalogueReference |
| ItemAttachmentID |
| ItemAttachmentFilename |
| ItemDescription |
| ScheduleLineID |
| DeliveryPeriod |
| Quantity |
| ConfirmedScheduleLineID |
| ConfirmedDeliveryPeriod |
| ConfirmedQuantity |

Next, the designers determine the proper name for the object according to the ISO 11179 naming standards (step 2104). In the example above, the proper name for the "Main Object" is "Purchase Order." After naming the object, the system that is creating the business object model determines whether the object already exists in the business object model (step 2106). If the object already exists, the system integrates new attributes from the message into the existing object (step 2108), and the process is complete.

If at step 2106 the system determines that the object does not exist in the business object model, the designers model the internal object structure (step 2110). To model the internal structure, the designers define the components. For the above example, the designers may define the components identified below.

| | | |
|---|---|---|
| ID | Purchase | |
| AdditionalID | Order | |
| PostingDate | | |
| LastChangeDate | | |
| AcceptanceStatus | | |
| Note | | |
| CompleteTransmission Indicator | | |
| Buyer | | Buyer |
| BuyerOrganisationName | | |
| Person Name | | |
| FunctionalTitle | | |
| DepartmentName | | |
| CountryCode | | |
| StreetPostalCode | | |
| POBox Postal Code | | |
| Company Postal Code | | |
| City Name | | |
| DistrictName | | |
| PO Box ID | | |
| PO Box Indicator | | |
| PO Box Country Code | | |
| PO Box Region Code | | |
| PO Box City Name | | |
| Street Name | | |
| House ID | | |
| Building ID | | |
| Floor ID | | |
| Room ID | | |
| Care Of Name | | |
| AddressDescription | | |
| Telefonnumber | | |
| MobileNumber | | |
| Facsimile | | |
| Email | | |
| Seller | | Seller |
| SellerAddress | | |
| Location | | Location |
| LocationType | | |
| DeliveryItemGroupID | | DeliveryTerms |
| DeliveryPriority | | |
| DeliveryCondition | | |
| TransferLocation | | |
| NumberofPartialDelivery | | |
| QuantityTolerance | | |
| MaximumLeadTime | | |
| TransportServiceLevel | | |
| TranportCondition | | |
| TransportDescription | | |
| CashDiscountTerms | | |
| PaymentForm | | Payment |
| PaymentCardID | | |

-continued

| | | |
|---|---|---|
| PaymentCardReferenceID | | |
| SequenceID | | |
| Holder | | |
| ExpirationDate | | |
| AttachmentID | | |
| AttachmentFilename | | |
| DescriptionofMessage | | |
| ConfirmationDescriptionof Message | | |
| FollowUpActivity | | |
| ItemID | Purchase Order | |
| ParentItemID | Item | |
| HierarchyType | | |
| ProductID | | Product |
| ProductType | | |
| ProductNote | | |
| ProductCategoryID | | Product-Category |
| Amount | | |
| BaseQuantity | | |
| ConfirmedAmount | | |
| ConfirmedBaseQuantity | | |
| ItemBuyer | | Buyer |
| ItemBuyerOrganisation | | |
| Name | | |
| Person Name | | |
| FunctionalTitle | | |
| DepartmentName | | |
| CountryCode | | |
| StreetPostalCode | | |
| POBox Postal Code | | |
| Company Postal Code | | |
| City Name | | |
| DistrictName | | |
| PO Box ID | | |
| PO Box Indicator | | |
| PO Box Country Code | | |
| PO Box Region Code | | |
| PO Box City Name | | |
| Street Name | | |
| House ID | | |

-continued

| | |
|---|---|
| Building ID | |
| Floor ID | |
| Room ID | |
| Care Of Name | |
| AddressDescription | |
| Telefonnumber | |
| MobilNumber | |
| Facsimile | |
| Email | |
| ItemSeller | Seller |
| ItemSellerAddress | |
| ItemLocation | Location |
| ItemLocationType | |
| ItemDeliveryItemGroupID | |
| ItemDeliveryPriority | |
| ItemDeliveryCondition | |
| ItemTransferLocation | |
| ItemNumberofPartial Delivery | |
| ItemQuantityTolerance | |
| ItemMaximumLeadTime | |
| ItemTransportServiceLevel | |
| ItemTranportCondition | |
| ItemTransportDescription | |
| ContractReference | Contract |
| QuoteReference | Quote |
| CatalogueReference | Catalogue |
| ItemAttachmentID | |
| ItemAttachmentFilename | |
| ItemDescription | |
| ScheduleLineID | |
| DeliveryPeriod | |
| Quantity | |
| ConfirmedScheduleLineID | |
| ConfirmedDeliveryPeriod | |
| ConfirmedQuantity | |

During the step of modeling the internal structure, the designers also model the complete internal structure by identifying the compositions of the components and the corresponding cardinalities, as shown below.

| | | | | |
|---|---|---|---|---|
| PurchaseOrder | | | | 1 |
| | Buyer | | | 0 . . . 1 |
| | | Address | | 0 . . . 1 |
| | | ContactPerson | | 0 . . . 1 |
| | | | Address | 0 . . . 1 |
| | Seller | | | 0 . . . 1 |
| | Location | | | 0 . . . 1 |
| | | Address | | 0 . . . 1 |
| | DeliveryTerms | | | 0 . . . 1 |
| | | Incoterms | | 0 . . . 1 |
| | | PartialDelivery | | 0 . . . 1 |
| | | QuantityTolerance | | 0 . . . 1 |
| | | Transport | | 0 . . . 1 |
| | CashDiscount Terms | | | 0 . . . 1 |
| | | MaximumCashDiscount | | 0 . . . 1 |
| | | NormalCashDiscount | | 0 . . . 1 |
| | PaymentForm | | | 0 . . . 1 |
| | | PaymentCard | | 0 . . . 1 |
| | Attachment | | | 0 . . . n |
| | Description | | | 0 . . . 1 |
| | Confirmation Description | | | 0 . . . 1 |
| | Item | | | 0 . . . n |
| | | HierarchyRelationship | | 0 . . . 1 |
| | | Product | | 0 . . . 1 |
| | | ProductCategory | | 0 . . . 1 |
| | | Price | | 0 . . . 1 |
| | | | NetunitPrice | 0 . . . 1 |
| | | ConfirmedPrice | | 0 . . . 1 |
| | | | NetunitPrice | 0 . . . 1 |
| | | Buyer | | 0 . . . 1 |
| | | Seller | | 0 . . . 1 |
| | | Location | | 0 . . . 1 |

-continued

| | | |
|---|---|---|
| DeliveryTerms | | 0 . . . 1 |
| Attachment | | 0 . . . n |
| Description | | 0 . . . 1 |
| ConfirmationDescription | | 0 . . . 1 |
| ScheduleLine | | 0 . . . n |
| | DeliveryPeriod | 1 |
| ConfirmedScheduleLine | | 0 . . . n |

After modeling the internal object structure, the developers identify the subtypes and generalizations for all objects and components (step 2112). For example, the Purchase Order may have subtypes Purchase Order Update, Purchase Order Cancellation and Purchase Order Information. Purchase Order Update may include Purchase Order Request, Purchase Order Change, and Purchase Order Confirmation. Moreover, Party may be identified as the generalization of Buyer and Seller. The subtypes and generalizations for the above example are shown below.

| | | | | | |
|---|---|---|---|---|---|
| Purchase Order | | | | | 1 |
| | PurchaseOrder Update | | | | |
| | | PurchaseOrder Request | | | |
| | | PurchaseOrder Change | | | |
| | | PurchaseOrder Confirmation | | | |
| | PurchaseOrder Cancellation | | | | |
| | PurchaseOrder Information | | | | |
| | Party | | | | |
| | | BuyerParty | | | 0 . . . 1 |
| | | | Address | | 0 . . . 1 |
| | | | ContactPerson | | 0 . . . 1 |
| | | | | Address | 0 . . . 1 |
| | | SellerParty | | | 0 . . . 1 |
| | Location | | | | |
| | | ShipToLocation | | | 0 . . . 1 |
| | | | Address | | 0 . . . 1 |
| | | ShipFromLocation | | | 0 . . . 1 |
| | | | Address | | 0 . . . 1 |
| | DeliveryTerms | | | | 0 . . . 1 |
| | | Incoterms | | | 0 . . . 1 |
| | | PartialDelivery | | | 0 . . . 1 |
| | | QuantityTolerance | | | 0 . . . 1 |
| | | Transport | | | 0 . . . 1 |
| | CashDiscount Terms | | | | 0 . . . 1 |
| | | MaximumCash Discount | | | 0 . . . 1 |
| | | NormalCashDiscount | | | 0 . . . 1 |
| | PaymentForm | | | | 0 . . . 1 |
| | | PaymentCard | | | 0 . . . 1 |
| | Attachment | | | | 0 . . . n |
| | Description | | | | 0 . . . 1 |
| | Confirmation Description | | | | 0 . . . 1 |
| | Item | | | | 0 . . . n |
| | | HierarchyRelationship | | | 0 . . . 1 |
| | | Product | | | 0 . . . 1 |
| | | ProductCategory | | | 0 . . . 1 |
| | | Price | | | 0 . . . 1 |
| | | | NetunitPrice | | 0 . . . 1 |
| | | ConfirmedPrice | | | 0 . . . 1 |
| | | | NetunitPrice | | 0 . . . 1 |
| | | Party | | | |
| | | | BuyerParty | | 0 . . . 1 |
| | | | SellerParty | | 0 . . . 1 |
| | | Location | | | |
| | | | ShipTo Location | | 0 . . . 1 |
| | | | ShipFrom Location | | 0 . . . 1 |
| | | DeliveryTerms | | | 0 . . . 1 |
| | | Attachment | | | 0 . . . n |

-continued

| | | | |
|---|---|---|---|
| Description | | | 0 . . . 1 |
| Confirmation Description | | | 0 . . . 1 |
| ScheduleLine | | | 0 . . . n |
| | Delivery Period | | 1 |
| ConfirmedScheduleLine | | | 0 . . . n |

After identifying the subtypes and generalizations, the developers assign the attributes to these components (step 2114). The attributes for a portion of the components are shown below.

| | | | | |
|---|---|---|---|---|
| Purchase Order | | | | 1 |
| | ID | | | 1 |
| | SellerID | | | 0 . . . 1 |
| | BuyerPosting DateTime | | | 0 . . . 1 |
| | BuyerLast ChangeDate Time | | | 0 . . . 1 |
| | SellerPosting DateTime | | | 0 . . . 1 |
| | SellerLast ChangeDate Time | | | 0 . . . 1 |
| | Acceptance StatusCode | | | 0 . . . 1 |
| | Note | | | 0 . . . 1 |
| | ItemList Complete Transmission Indicator | | | 0 . . . 1 |
| | BuyerParty | | | 0 . . . 1 |
| | | StandardID | | 0 . . . n |
| | | BuyerID | | 0 . . . 1 |
| | | SellerID | | 0 . . . 1 |
| | | Address | | 0 . . . 1 |
| | | ContactPerson | | 0 . . . 1 |
| | | | BuyerID | 0 . . . 1 |
| | | | SellerID | 0 . . . 1 |
| | | | Address | 0 . . . 1 |
| | SellerParty | | | 0 . . . 1 |
| | Product RecipientParty | | | 0 . . . 1 |
| | VendorParty | | | 0 . . . 1 |
| | Manufacturer Party | | | 0 . . . 1 |
| | BillToParty | | | 0 . . . 1 |
| | PayerParty | | | 0 . . . 1 |
| | CarrierParty | | | 0 . . . 1 |
| | ShipTo Location | | | 0 . . . 1 |
| | | StandardID | | 0 . . . n |
| | | BuyerID | | 0 . . . 1 |
| | | SellerID | | 0 . . . 1 |
| | | Address | | 0 . . . 1 |
| | ShipFrom Location | | | 0 . . . 1 |

The system then determines whether the component is one of the object nodes in the business object model (step 2116, FIG. 21B). If the system determines that the component is one of the object nodes in the business object model, the system integrates a reference to the corresponding object node from the business object model into the object (step 2118). In the above example, the system integrates the reference to the Buyer party represented by an ID and the reference to the ShipToLocation represented by an into the object, as shown below. The attributes that were formerly located in the PurchaseOrder object are now assigned to the new found object party. Thus, the attributes are removed from the PurchaseOrder object.

| | | |
|---|---|---|
| PurchaseOrder | | |
| | ID | |
| | SellerID | |
| | BuyerPostingDateTime | |
| | BuyerLastChangeDateTime | |
| | SellerPostingDateTime | |
| | SellerLastChangeDateTime | |
| | AcceptanceStatusCode | |
| | Note | |
| | ItemListComplete TransmissionIndicator | |
| | BuyerParty | |
| | | ID |
| | SellerParty | |
| | ProductRecipientParty | |
| | VendorParty | |
| | ManufacturerParty | |
| | BillToParty | |
| | PayerParty | |
| | CarrierParty | |
| | ShipToLocation | |
| | | ID |
| | ShipFromLocation | |

During the integration step, the designers classify the relationship (i.e., aggregation or association) between the object node and the object being integrated into the business object model. The system also integrates the new attributes into the object node (step 2120). If at step 2116, the system determines that the component is not in the business object model, the system adds the component to the business object model (step 2122).

Regardless of whether the component was in the business object model at step 2116, the next step in creating the business object model is to add the integrity rules (step 2124). There are several levels of integrity rules and constraints which should be described. These levels include consistency rules between attributes, consistency rules between components, and consistency rules to other objects. Next, the designers determine the services offered, which can be accessed via interfaces (step 2126). The services offered in the example above include PurchaseOrderCreateRequest, PurchaseOrderCancellationRequest, and PurchaseOrderReleaseRequest. The system then receives an indication of the location for the object in the business object model (step 2128). After receiving the indication of the location, the system integrates the object into the business object model (step 2130).

Structure of the Business Object Model

The business object model, which serves as the basis for the process of generating consistent interfaces, includes the elements contained within the interfaces. These elements are arranged in a hierarchical structure within the business object model.

Interfaces Derived from Business Object Model

Figure 27A:
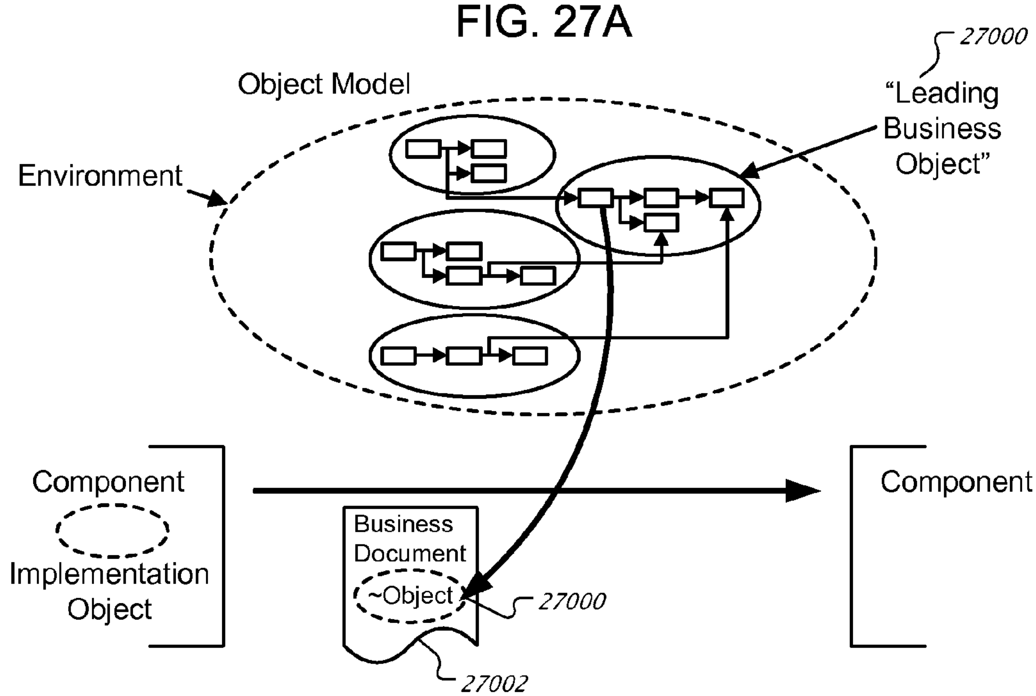

Interfaces are the starting point of the communication between two business entities. The structure of each interface determines how one business entity communicates with another business entity. The business entities may act as a unified whole when, based on the business scenario, the business entities know what an interface contains from a business perspective and how to fill the individual elements or fields of the interface. As illustrated in FIG. 27A, communication between components takes place via messages that contain business documents (e.g., business document 27002). The business document 27002 ensures a holistic business-related understanding for the recipient of the message. The business documents are created and accepted or consumed by interfaces, specifically by inbound and outbound interfaces. The interface structure and, hence, the structure of the business document are derived by a mapping rule. This mapping rule is known as "hierarchization." An interface structure thus has a hierarchical structure created based on the leading business object 27000. The interface represents a usage-specific, hierarchical view of the underlying usage-neutral object model.

Figure 27B:
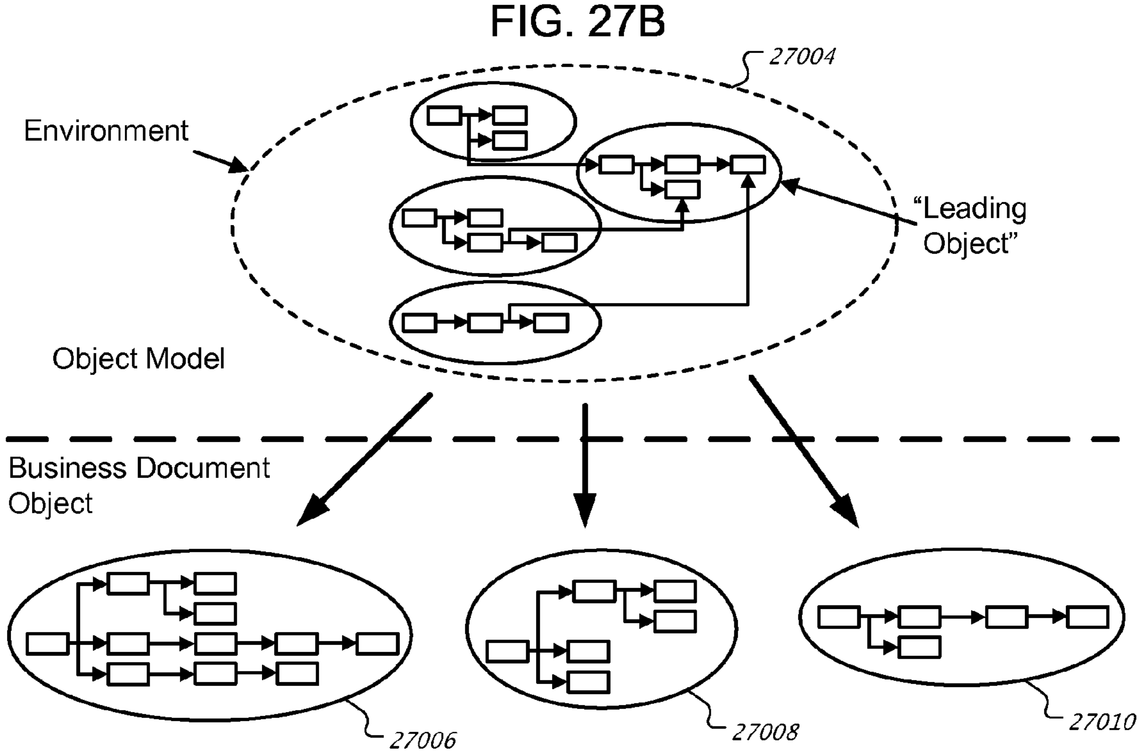

As illustrated in FIG. 27B, several business document objects 27006, 27008, and 27010 as overlapping views may be derived for a given leading object 27004. Each business document object results from the object model by hierarchization.

Figure 27C:
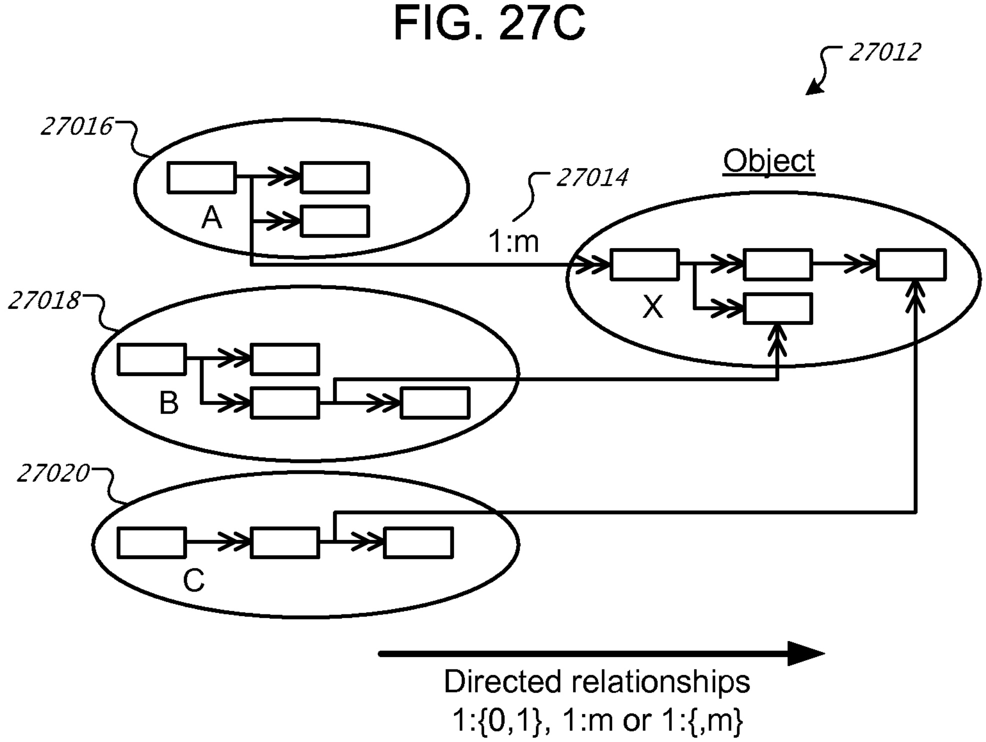

To illustrate the hierarchization process, FIG. 27C depicts an example of an object model 27012 (i.e., a portion of the business object model) that is used to derive a service operation signature (business document object structure). As depicted, leading object X 27014 in the object model 27012 is integrated in a net of object A 27016, object B 27018, and object C 27020. Initially, the parts of the leading object 27014 that are required for the business object document are adopted. In one variation, all parts required for a business document object are adopted from leading object 27014 (making such an operation a maximal service operation). Based on these parts, the relationships to the superordinate objects (i.e., objects A, B, and C from which object X depends) are inverted. In other words, these objects are adopted as dependent or subordinate objects in the new business document object.

For example, object A 27016, object B 27018, and object C 27020 have information that characterize object X. Because object A 27016, object B 27018, and object C 27020 are superordinate to leading object X 27014, the dependencies of these relationships change so that object A 27016, object B 27018, and object C 27020 become dependent and subordinate to leading object X 27014. This procedure is known as "derivation of the business document object by hierarchization."

Business-related objects generally have an internal structure (parts). This structure can be complex and reflect the individual parts of an object and their mutual dependency. When creating the operation signature, the internal structure of an object is strictly hierarchized. Thus, dependent parts keep their dependency structure, and relationships between the parts within the object that do not represent the hierarchical structure are resolved by prioritizing one of the relationships.

Relationships of object X to external objects that are referenced and whose information characterizes object X are added to the operation signature. Such a structure can be quite complex (see, for example, FIG. 27D). The cardinality to these referenced objects is adopted as 1:1 or 1:C, respectively. By this, the direction of the dependency changes. The required parts of this referenced object are adopted identically, both in their cardinality and in their dependency arrangement.

Figure 27D:
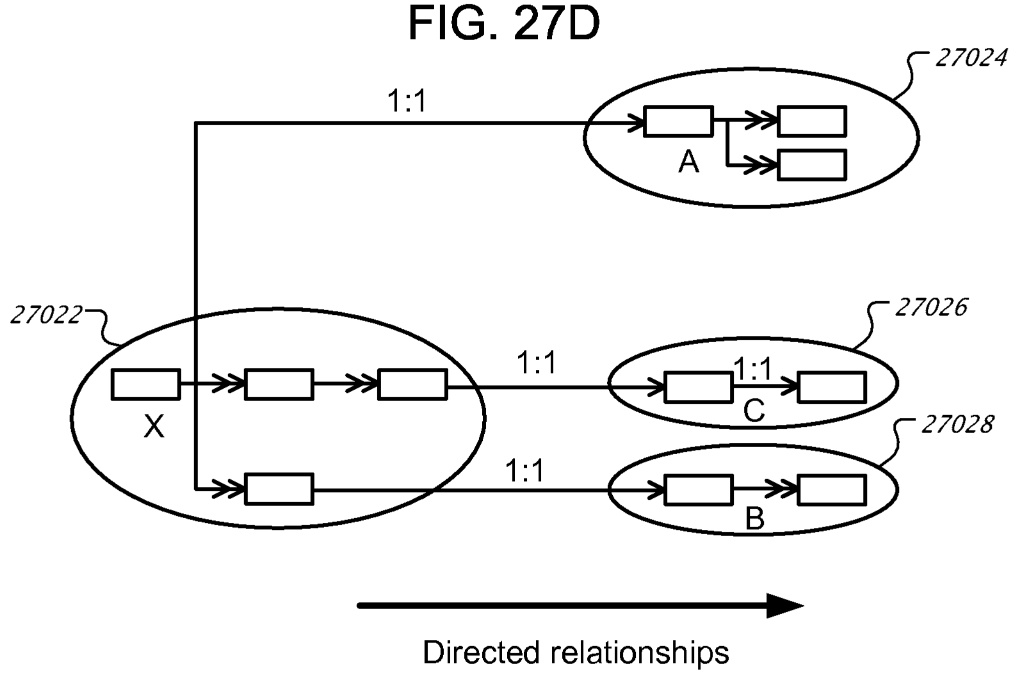

The newly created business document object contains all required information, including the incorporated master data information of the referenced objects. As depicted in FIG. 27D, components Xi in leading object X 27022 are adopted directly. The relationship of object X 27022 to object A 27024, object B 27028, and object C 27026 are inverted, and the parts required by these objects are added as objects that depend from object X 27022. As depicted, all of object A 27024 is adopted. B3 and B4 are adopted from object B 27028, but B1 is not adopted. From object C 27026, C2 and C1 are adopted, but C3 is not adopted.

FIG. 27E depicts the business document object X 27030 created by this hierarchization process. As shown, the arrangement of the elements corresponds to their dependency levels, which directly leads to a corresponding representation as an XML structure 27032.

The following provides certain rules that can be adopted singly or in combination with regard to the hierarchization process:

- A business document object always refers to a leading business document object and is derived from this object.
- The name of the root entity in the business document entity is the name of the business object or the name of a specialization of the business object or the name of a service specific view onto the business object.
- The nodes and elements of the business object that are relevant (according to the semantics of the associated message type) are contained as entities and elements in the business document object.
- The name of a business document entity is predefined by the name of the corresponding business object node. The name of the superordinate entity is not repeated in the name of the business document entity. The "full" semantic name results from the concatenation of the entity names along the hierarchical structure of the business document object.
- The structure of the business document object is, except for deviations due to hierarchization, the same as the structure of the business object.
- The cardinalities of the business document object nodes and elements are adopted identically or more restrictively to the business document object.
- An object from which the leading business object is dependent can be adopted to the business document object. For this arrangement, the relationship is inverted, and the object (or its parts, respectively) are hierarchically subordinated in the business document object.
- Nodes in the business object representing generalized business information can be adopted as explicit entities to the business document object (generally speaking, multiply TypeCodes out). When this adoption occurs, the entities are named according to their more specific semantic (name of TypeCode becomes prefix).
  - Party nodes of the business object are modeled as explicit entities for each party role in the business document object. These nodes are given the name <Prefix><Party Role> Party, for example, BuyerParty, ItemBuyerParty.
  - BTDReference nodes are modeled as separate entities for each reference type in the business document object. These nodes are given the name <Qualifier><BO><Node> Reference, for example SalesOrderReference, OriginSalesOrderReference, SalesOrderItemReference.
  - A product node in the business object comprises all of the information on the Product, ProductCategory, and Batch. This information is modeled in the business document object as explicit entities for Product, ProductCategory, and Batch.

Entities which are connected by a 1:1 relationship as a result of hierarchization can be combined to a single entity, if they are semantically equivalent. Such a combination can often occurs if a node in the business document object that results from an assignment node is removed because it does not have any elements.

The message type structure is typed with data types.

Elements are typed by GDTs according to their business objects.

Aggregated levels are typed with message type specific data types (Intermediate Data Types), with their names being built according to the corresponding paths in the message type structure.

The whole message type structured is typed by a message data type with its name being built according to the root entity with the suffix "Message".

For the message type, the message category (e.g., information, notification, query, response, request, confirmation, etc.) is specified according to the suited transaction communication pattern.

In one variation, the derivation by hierarchization can be initiated by specifying a leading business object and a desired view relevant for a selected service operation. This view determines the business document object. The leading business object can be the source object, the target object, or a third object. Thereafter, the parts of the business object required for the view are determined. The parts are connected to the root node via a valid path along the hierarchy. Thereafter, one or more independent objects (object parts, respectively) referenced by the leading object which are relevant for the service may be determined (provided that a relationship exists between the leading object and the one or more independent objects).

Once the selection is finalized, relevant nodes of the leading object node that are structurally identical to the message type structure can then be adopted. If nodes are adopted from independent objects or object parts, the relationships to such independent objects or object parts are inverted. Linearization can occur such that a business object node containing certain TypeCodes is represented in the message type structure by explicit entities (an entity for each value of the TypeCode). The structure can be reduced by checking all 1:1 cardinalities in the message type structure. Entities can be combined if they are semantically equivalent, one of the entities carries no elements, or an entity solely results from an n:m assignment in the business object.

After the hierarchization is completed, information regarding transmission of the business document object (e.g., CompleteTransmissionIndicator, ActionCodes, message category, etc.) can be added. A standardized message header can be added to the message type structure and the message structure can be typed. Additionally, the message category for the message type can be designated.

Invoice Request and Invoice Confirmation are examples of interfaces. These invoice interfaces are used to exchange invoices and invoice confirmations between an invoicing party and an invoice recipient (such as between a seller and a buyer) in a B2B process. Companies can create invoices in electronic as well as in paper form. Traditional methods of communication, such as mail or fax, for invoicing are cost intensive, prone to error, and relatively slow, since the data is recorded manually. Electronic communication eliminates such problems. The motivating business scenarios for the Invoice Request and Invoice Confirmation interfaces are the Procure to Stock (PTS) and Sell from Stock (SFS) scenarios. In the PTS scenario, the parties use invoice interfaces to purchase and settle goods. In the SFS scenario, the parties use invoice interfaces to sell and invoice goods. The invoice interfaces directly integrate the applications implementing them and also form the basis for mapping data to widely-used XML standard formats such as RosettaNet, PIDX, xCBL, and CIDX.

The invoicing party may use two different messages to map a B2B invoicing process: (1) the invoicing party sends the message type InvoiceRequest to the invoice recipient to start a new invoicing process; and (2) the invoice recipient sends the message type InvoiceConfirmation to the invoicing party to confirm or reject an entire invoice or to temporarily assign it the status "pending."

An InvoiceRequest is a legally binding notification of claims or liabilities for delivered goods and rendered services—usually, a payment request for the particular goods and services. The message type InvoiceRequest is based on the message data type InvoiceMessage. The InvoiceRequest message (as defined) transfers invoices in the broader sense. This includes the specific invoice (request to settle a liability), the debit memo, and the credit memo.

InvoiceConfirmation is a response sent by the recipient to the invoicing party confirming or rejecting the entire invoice received or stating that it has been assigned temporarily the status "pending." The message type InvoiceConfirmation is based on the message data type InvoiceMessage. An InvoiceConfirmation is not mandatory in a B2B invoicing process, however, it automates collaborative processes and dispute management.

Usually, the invoice is created after it has been confirmed that the goods were delivered or the service was provided. The invoicing party (such as the seller) starts the invoicing process by sending an InvoiceRequest message. Upon receiving the InvoiceRequest message, the invoice recipient (for instance, the buyer) can use the InvoiceConfirmation message to completely accept or reject the invoice received or to temporarily assign it the status "pending." The InvoiceConfirmation is not a negotiation tool (as is the case in order management), since the options available are either to accept or reject the entire invoice. The invoice data in the InvoiceConfirmation message merely confirms that the invoice has been forwarded correctly and does not communicate any desired changes to the invoice. Therefore, the InvoiceConfirmation includes the precise invoice data that the invoice recipient received and checked. If the invoice recipient rejects an invoice, the invoicing party can send a new invoice after checking the reason for rejection (AcceptanceStatus and ConfirmationDescription at Invoice and InvoiceItem level). If the invoice recipient does not respond, the invoice is generally regarded as being accepted and the invoicing party can expect payment.

FIGS. 22A-F depict a flow diagram of the steps performed by methods and systems consistent with the subject matter described herein to generate an interface from the business object model. Although described as being performed by a computer, these steps may alternatively be performed manually, or using any combination thereof. The process begins when the system receives an indication of a package template from the designer, i.e., the designer provides a package template to the system (step 2200).

Package templates specify the arrangement of packages within a business transaction document. Package templates are used to define the overall structure of the messages sent between business entities. Methods and systems consistent with the subject matter described herein use package templates in conjunction with the business object model to derive the interfaces.

The system also receives an indication of the message type from the designer (step 2202). The system selects a package from the package template (step 2204), and receives an indication from the designer whether the package is required for the interface (step 2206). If the package is not required for the interface, the system removes the package from the package template (step 2208). The system then continues this analysis for the remaining packages within the package template (step 2210).

Figure 22A:
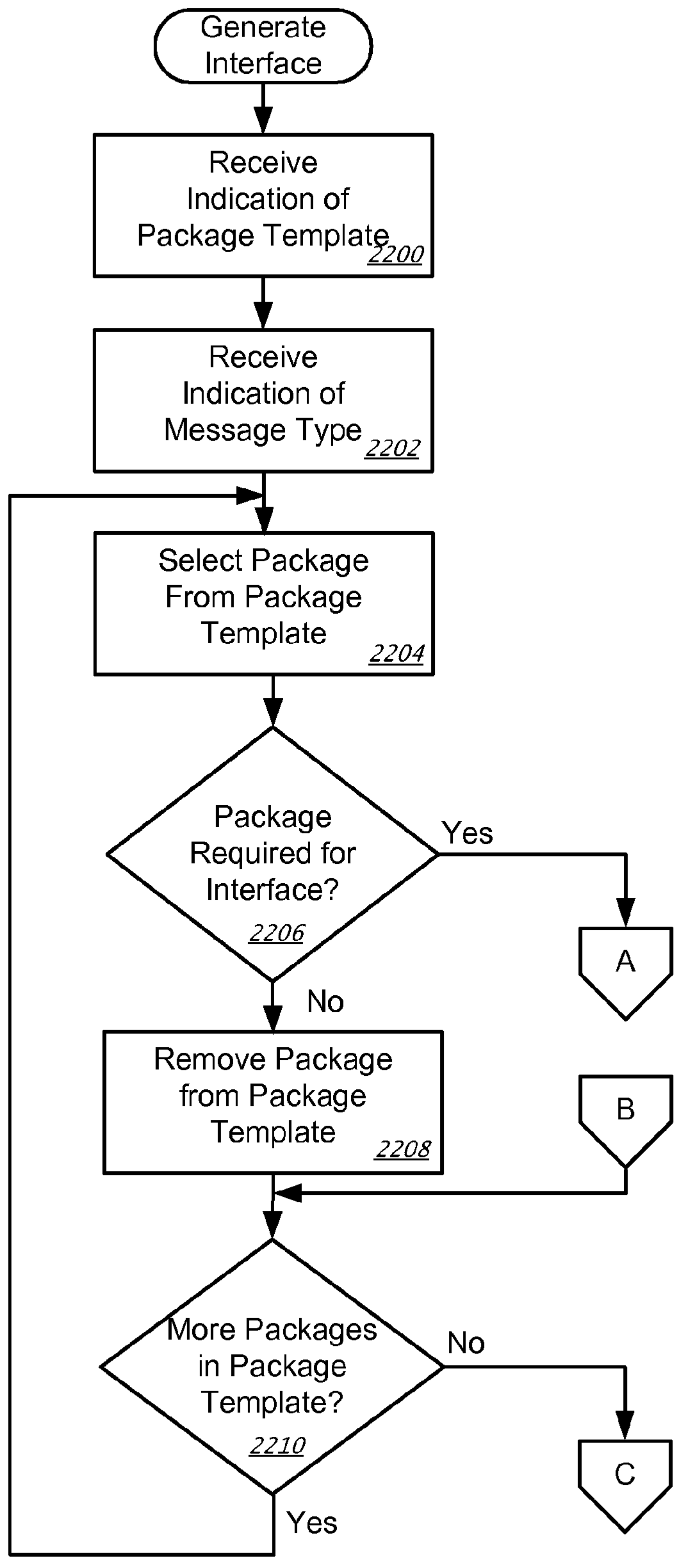
FIGS. 22A-F depict a flow diagram of the steps performed to generate an interface from the business object model in accordance with methods and systems consistent with the subject matter described herein.
Figure 22B:
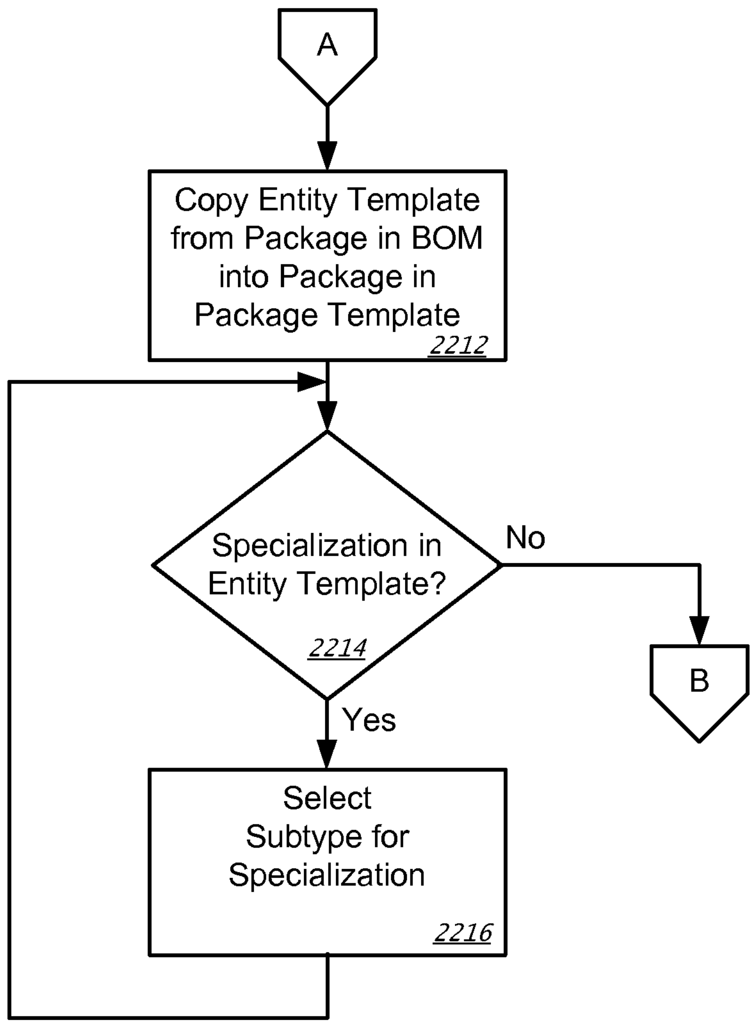
Figure 22C:
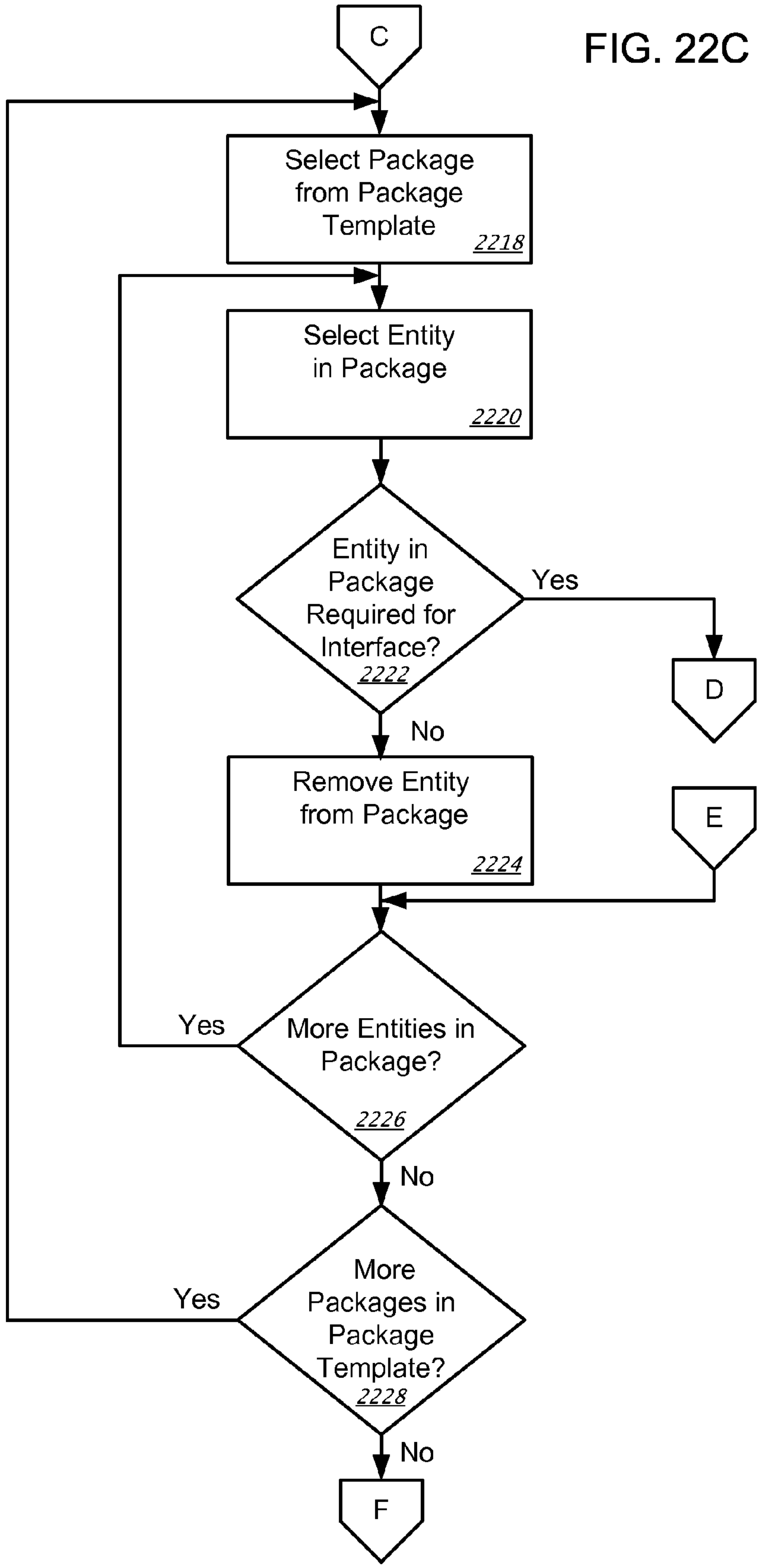

If, at step 2206, the package is required for the interface, the system copies the entity template from the package in the business object model into the package in the package template (step 2212, FIG. 22B). The system determines whether there is a specialization in the entity template (step 2214). If the system determines that there is a specialization in the entity template, the system selects a subtype for the specialization (step 2216). The system may either select the subtype for the specialization based on the message type, or it may receive this information from the designer. The system then determines whether there are any other specializations in the entity template (step 2214). When the system determines that there are no specializations in the entity template, the system continues this analysis for the remaining packages within the package template (step 2210, FIG. 22A).

At step 2210, after the system completes its analysis for the packages within the package template, the system selects one of the packages remaining in the package template (step 2218, FIG. 22C), and selects an entity from the package (step 2220). The system receives an indication from the designer whether the entity is required for the interface (step 2222). If the entity is not required for the interface, the system removes the entity from the package template (step 2224). The system then continues this analysis for the remaining entities within the package (step 2226), and for the remaining packages within the package template (step 2228).

Figure 22D:
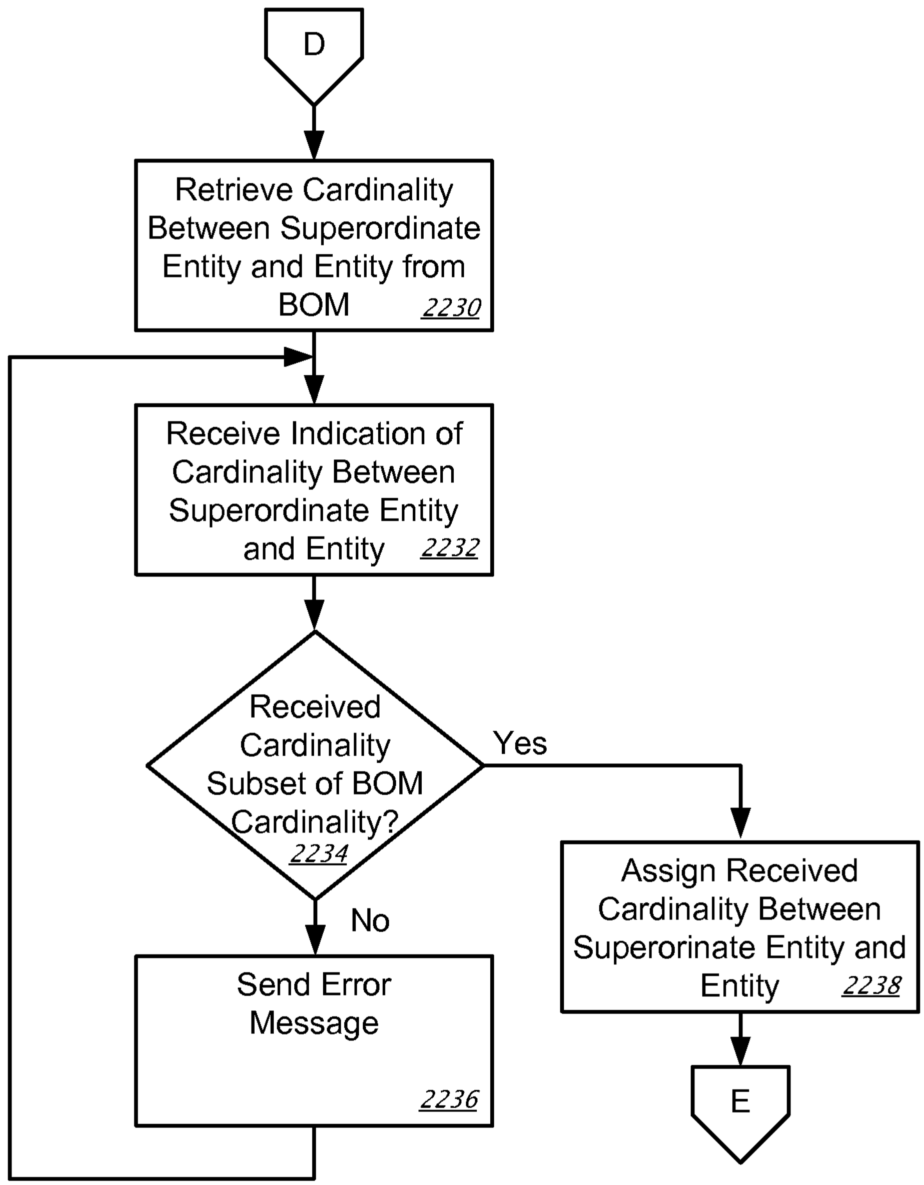

If, at step 2222, the entity is required for the interface, the system retrieves the cardinality between a superordinate entity and the entity from the business object model (step 2230, FIG. 22D). The system also receives an indication of the cardinality between the superordinate entity and the entity from the designer (step 2232). The system then determines whether the received cardinality is a subset of the business object model cardinality (step 2234). If the received cardinality is not a subset of the business object model cardinality, the system sends an error message to the designer (step 2236). If the received cardinality is a subset of the business object model cardinality, the system assigns the received cardinality as the cardinality between the superordinate entity and the entity (step 2238). The system then continues this analysis for the remaining entities within the package (step 2226, FIG. 22C), and for the remaining packages within the package template (step 2228).

Figure 22E:
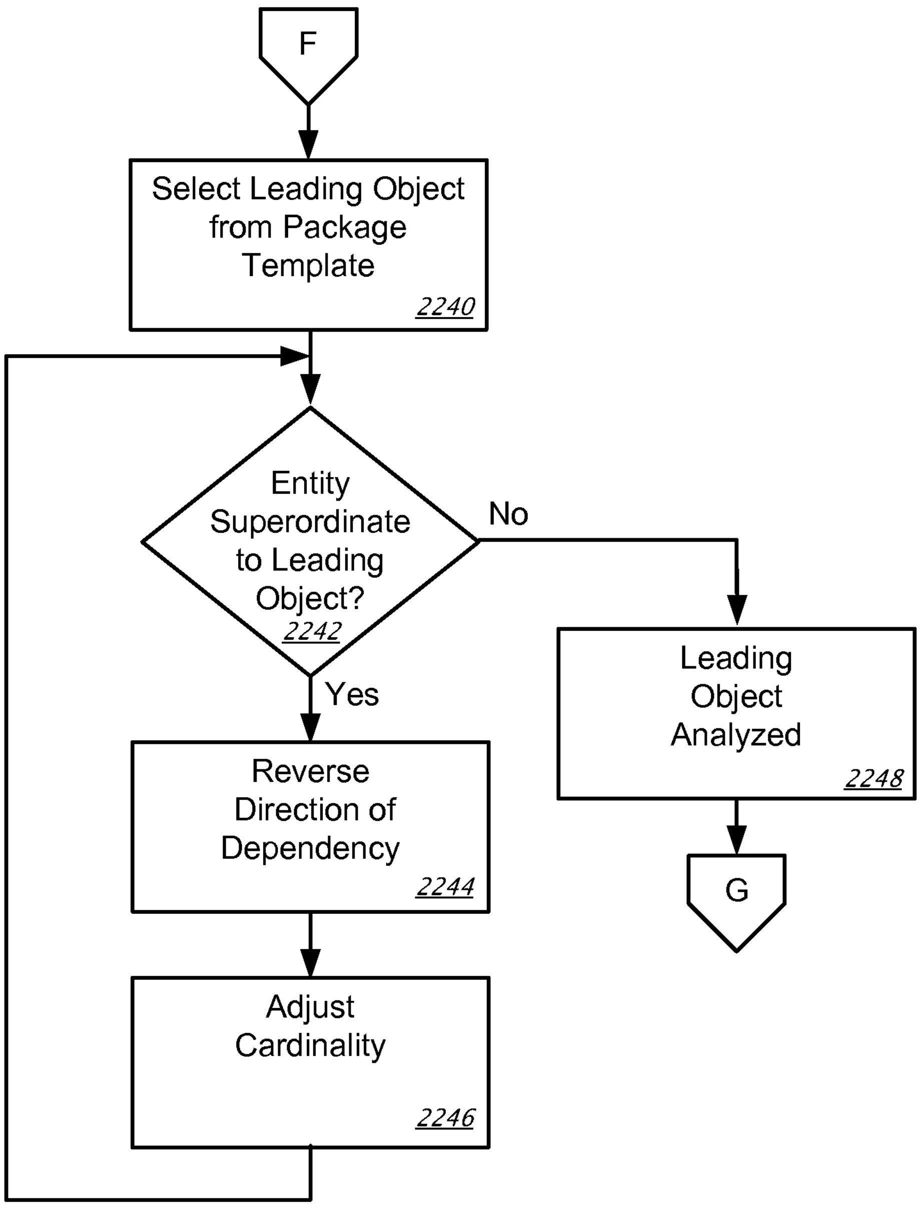

The system then selects a leading object from the package template (step 2240, FIG. 22E). The system determines whether there is an entity superordinate to the leading object (step 2242). If the system determines that there is an entity superordinate to the leading object, the system reverses the direction of the dependency (step 2244) and adjusts the cardinality between the leading object and the entity (step 2246). The system performs this analysis for entities that are superordinate to the leading object (step 2242). If the system determines that there are no entities superordinate to the leading object, the system identifies the leading object as analyzed (step 2248).

Figure 22F:
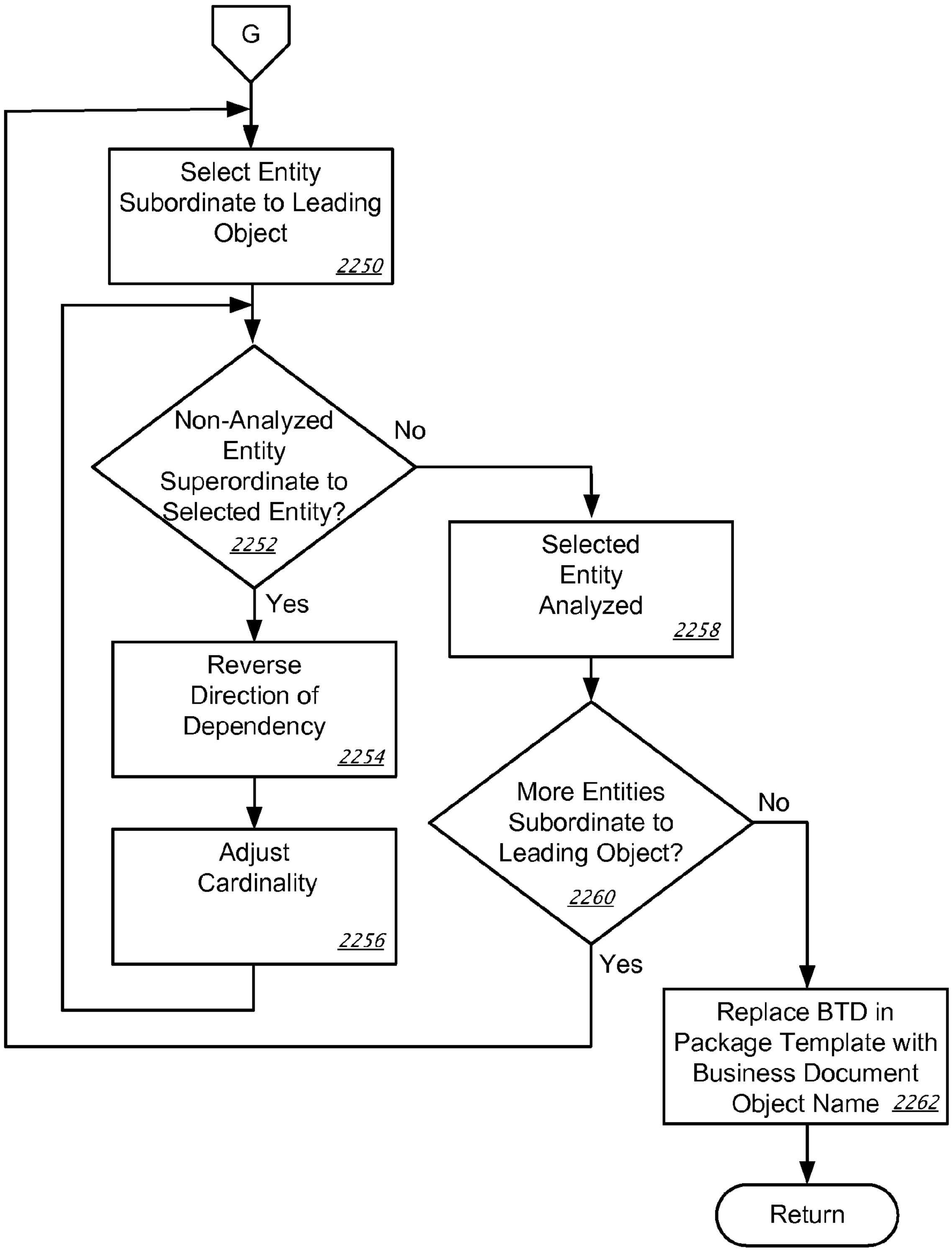

The system then selects an entity that is subordinate to the leading object (step 2250, FIG. 22F). The system determines whether any non-analyzed entities are superordinate to the selected entity (step 2252). If a non-analyzed entity is superordinate to the selected entity, the system reverses the direction of the dependency (step 2254) and adjusts the cardinality between the selected entity and the non-analyzed entity (step 2256). The system performs this analysis for non-analyzed entities that are superordinate to the selected entity (step 2252). If the system determines that there are no non-analyzed entities superordinate to the selected entity, the system identifies the selected entity as analyzed (step 2258), and continues this analysis for entities that are subordinate to the leading object (step 2260). After the packages have been analyzed, the system substitutes the BusinessTransactionDocument ("BTD") in the package template with the name of the interface (step 2262). This includes the "BTD" in the BTDItem package and the "BTD" in the BTDItemScheduleLine package.

Use of an Interface

Figure 23:
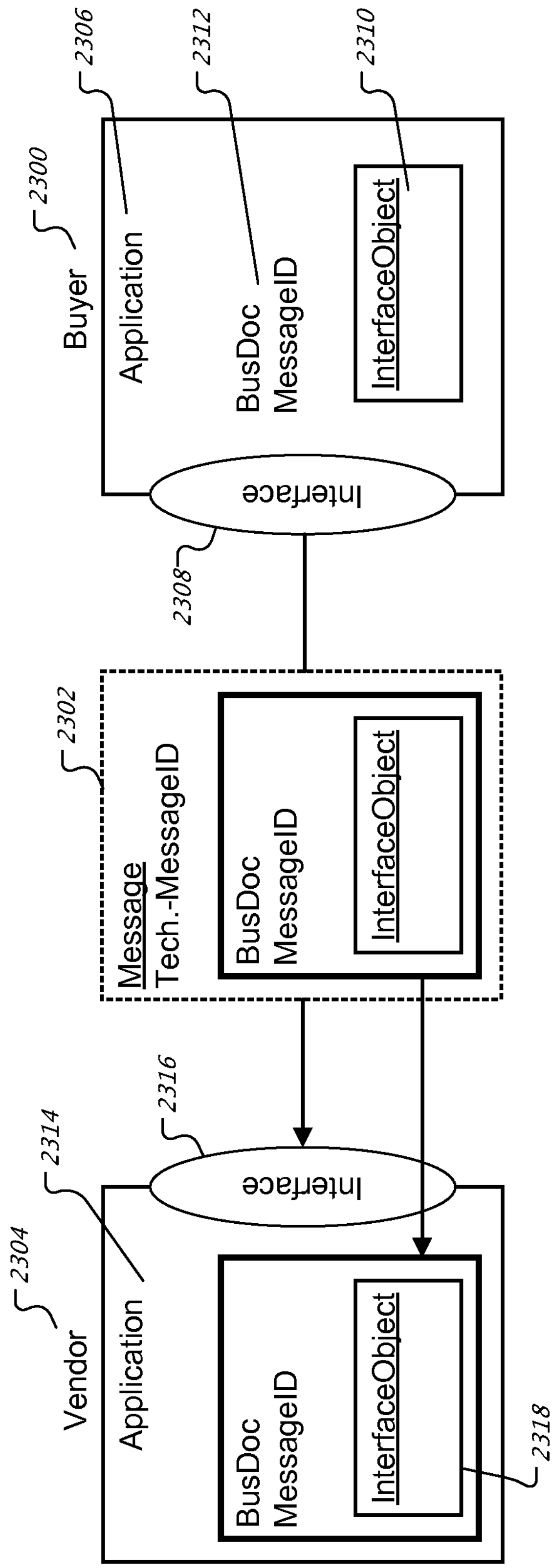
FIG. 23 depicts an example illustrating the transmittal of a business document in accordance with methods and systems consistent with the subject matter described herein.

The XI stores the interfaces (as an interface type). At runtime, the sending party's program instantiates the interface to create a business document, and sends the business document in a message to the recipient. The messages are preferably defined using XML. In the example depicted in FIG. 23, the Buyer 2300 uses an application 2306 in its system to instantiate an interface 2308 and create an interface object or business document object 2310. The Buyer's application 2306 uses data that is in the sender's component-specific structure and fills the business document object 2310 with the data. The Buyer's application 2306 then adds message identification 2312 to the business document and places the business document into a message 2302. The Buyer's application 2306 sends the message 2302 to the Vendor 2304. The Vendor 2304 uses an application 2314 in its system to receive the message 2302 and store the business document into its own memory. The Vendor's application 2314 unpacks the message 2302 using the corresponding interface 2316 stored in its XI to obtain the relevant data from the interface object or business document object 2318.

Figure 24:
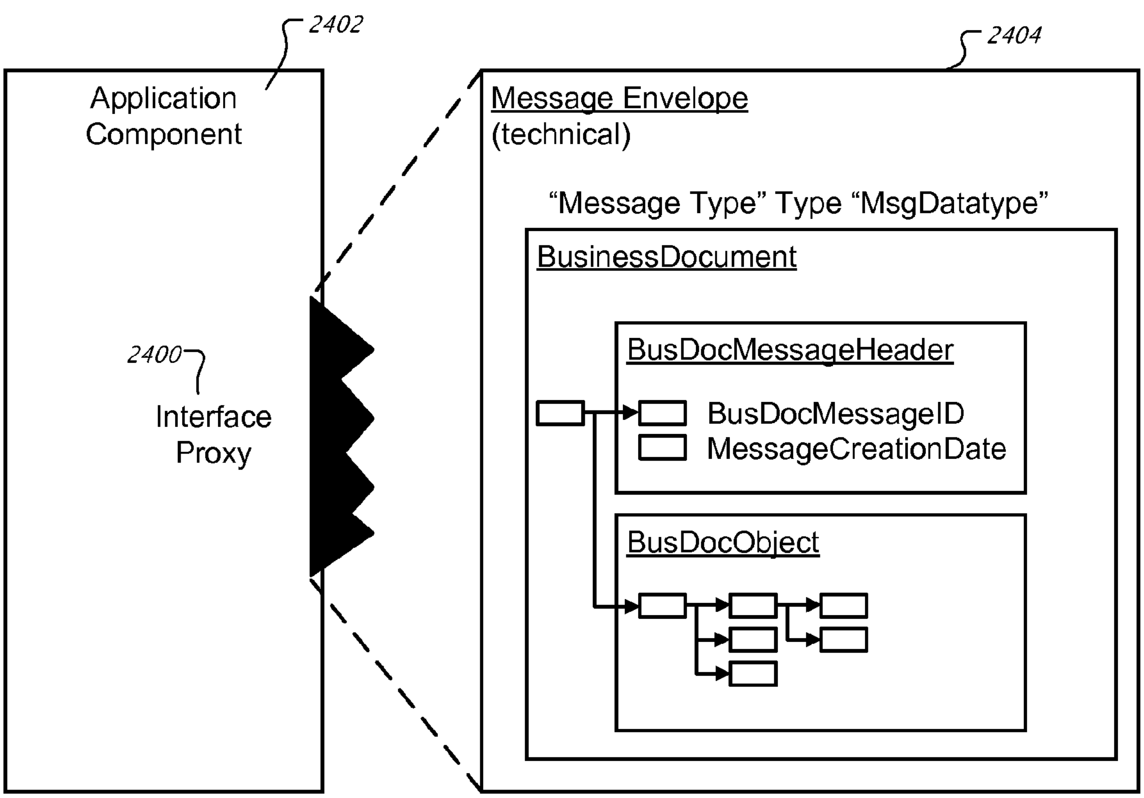
FIG. 24 depicts an interface proxy in accordance with methods and systems consistent with the subject matter described herein.
Figure 25:
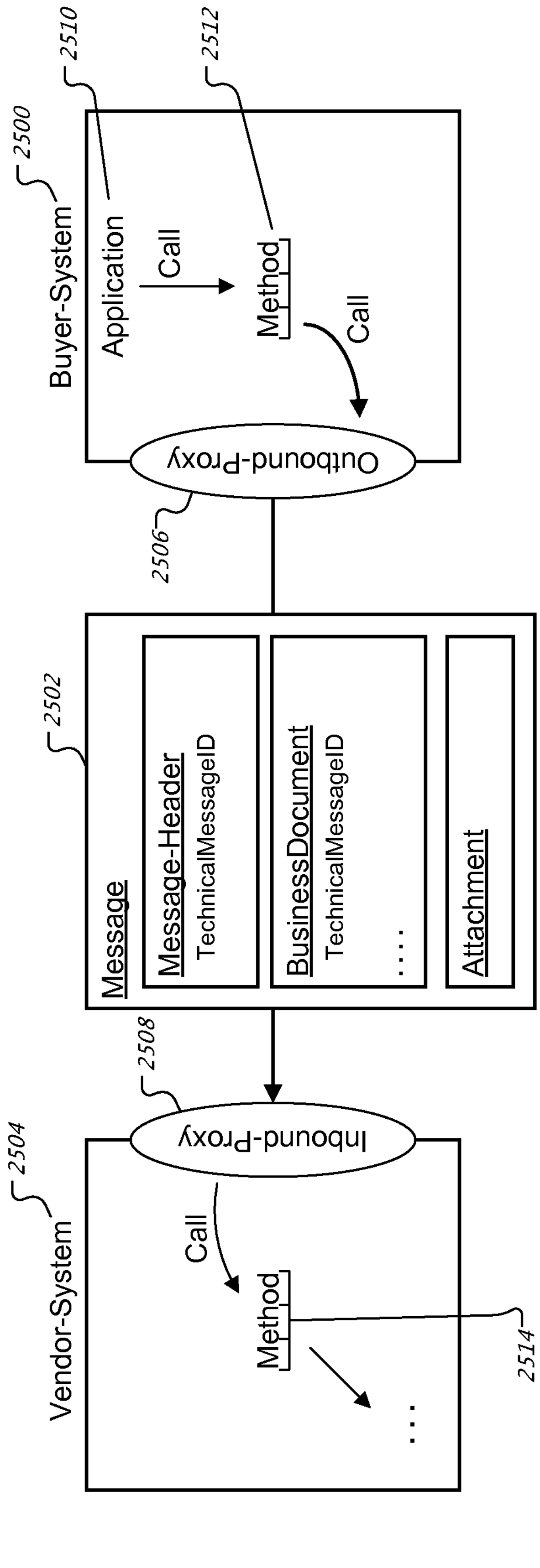
FIG. 25 depicts an example illustrating the transmittal of a message using proxies in accordance with methods and systems consistent with the subject matter described herein.

From the component's perspective, the interface is represented by an interface proxy 2400, as depicted in FIG. 24. The proxies 2400 shield the components 2402 of the sender and recipient from the technical details of sending messages 2404 via XI. In particular, as depicted in FIG. 25, at the sending end, the Buyer 2500 uses an application 2510 in its system to call an implemented method 2512, which generates the outbound proxy 2506. The outbound proxy 2506 parses the internal data structure of the components and converts them to the XML structure in accordance with the business document object. The outbound proxy 2506 packs the document into a message 2502. Transport, routing and mapping the XML message to the recipient 28304 is done by the routing system (XI, modeling environment 516, etc.).

When the message arrives, the recipient's inbound proxy 2508 calls its component-specific method 2514 for creating a document. The proxy 2508 at the receiving end downloads the data and converts the XML structure into the internal data structure of the recipient component 2504 for further processing.

Figure 26A:
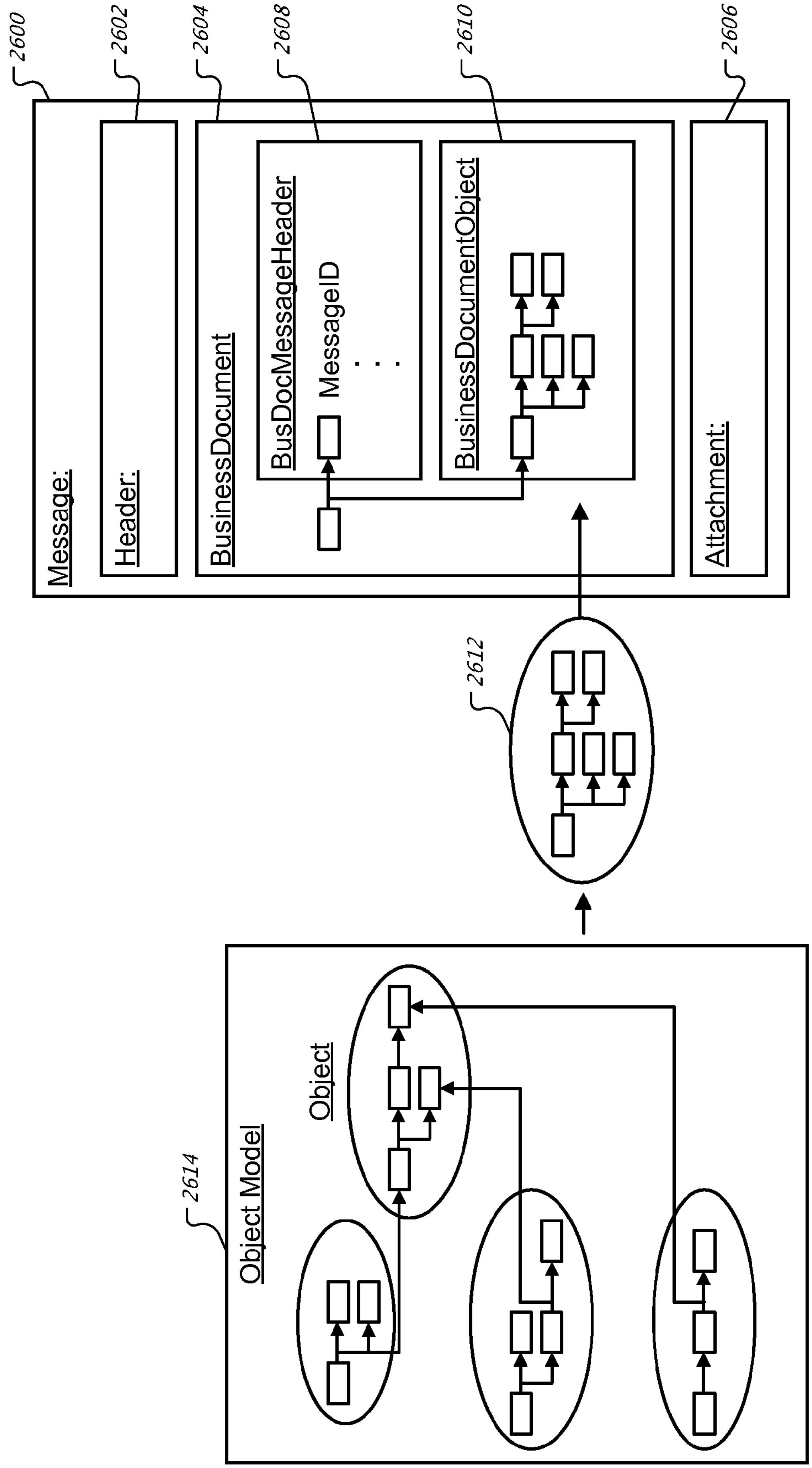
FIG. 26A depicts components of a message in accordance with methods and systems consistent with the subject matter described herein.

As depicted in FIG. 26A, a message 2600 includes a message header 2602 and a business document 2604. The message 2600 also may include an attachment 2606. For example, the sender may attach technical drawings, detailed specifications or pictures of a product to a purchase order for the product. The business document 2604 includes a business document message header 2608 and the business document object 2610. The business document message header 2608 includes administrative data, such as the message ID and a message description. As discussed above, the structure 2612 of the business document object 2610 is derived from the business object model 2614. Thus, there is a strong correlation between the structure of the business document object and the structure of the business object model. The business document object 2610 forms the core of the message 2600.

In collaborative processes as well as Q&A processes, messages should refer to documents from previous messages. A simple business document object ID or object ID is insufficient to identify individual messages uniquely because several versions of the same business document object can be sent during a transaction. A business document object ID with a version number also is insufficient because the same version of a business document object can be sent several times. Thus, messages require several identifiers during the course of a transaction.

Figure 26B:
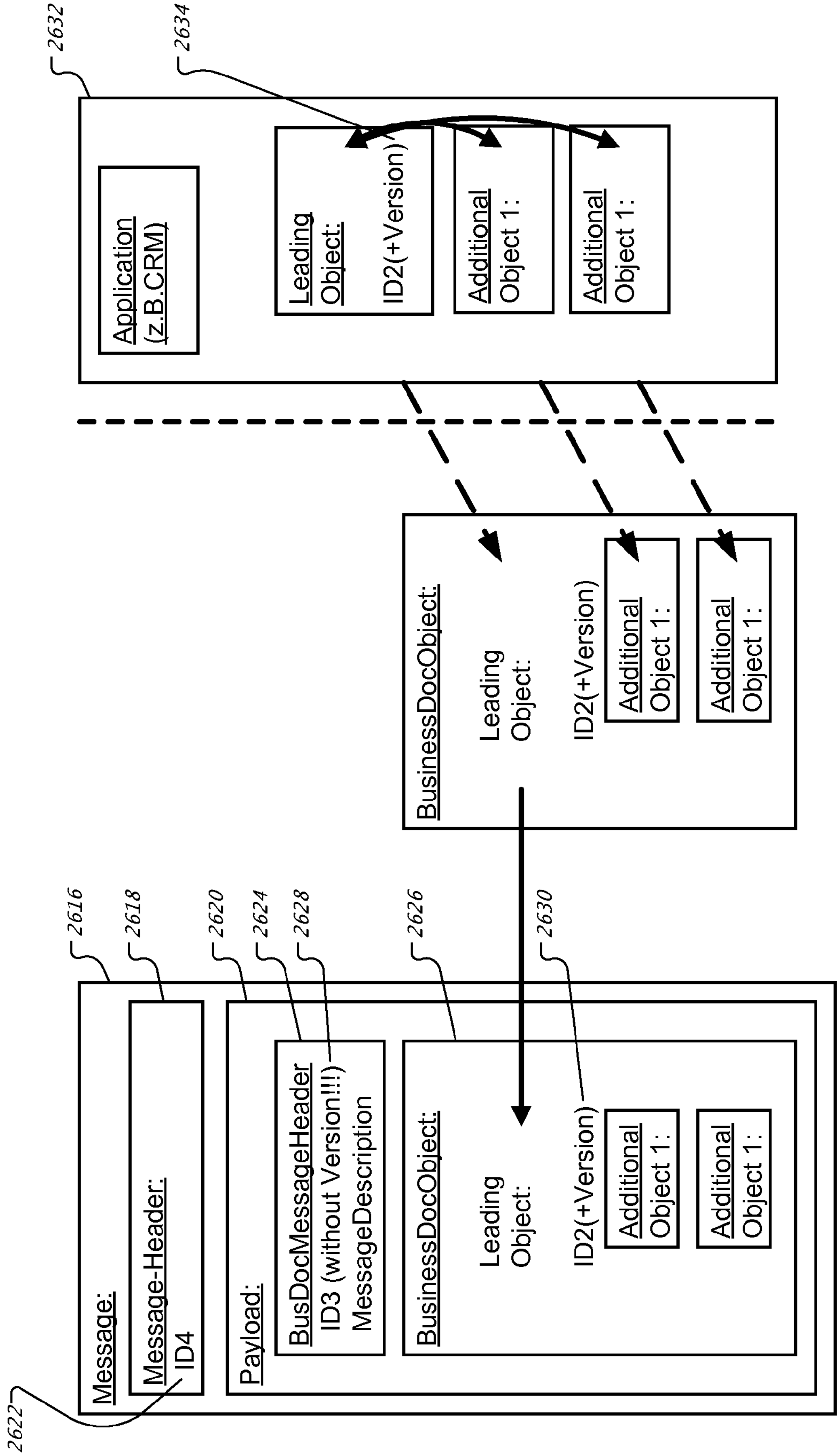
FIG. 26B depicts IDs used in a message in accordance with methods and systems consistent with the subject matter described herein.

As depicted in FIG. 26B, the message header 2618 in message 2616 includes a technical ID ("ID4") 2622 that identifies the address for a computer to route the message. The sender's system manages the technical ID 2622.

The administrative information in the business document message header 2624 of the payload or business document 2620 includes a BusinessDocumentMessageID ("ID3") 2628. The business entity or component 2632 of the business entity manages and sets the BusinessDocumentMessageID 2628. The business entity or component 2632 also can refer to other business documents using the BusinessDocumentMessageID 2628. The receiving component 2632 requires no knowledge regarding the structure of this ID. The BusinessDocumentMessageID 2628 is, as an ID, unique. Creation of a message refers to a point in time. No versioning is typically expressed by the ID. Besides the BusinessDocumentMessageID 2628, there also is a business document object ID 2630, which may include versions.

The component 2632 also adds its own component object ID 2634 when the business document object is stored in the component. The component object ID 2634 identifies the business document object when it is stored within the component. However, not all communication partners may be aware of the internal structure of the component object ID 2634. Some components also may include a versioning in their ID 2634.

Use of Interfaces Across Industries

Methods and systems consistent with the subject matter described herein provide interfaces that may be used across different business areas for different industries. Indeed, the interfaces derived using methods and systems consistent with the subject matter described herein may be mapped onto the interfaces of different industry standards. Unlike the interfaces provided by any given standard that do not include the interfaces required by other standards, methods and systems consistent with the subject matter described herein provide a set of consistent interfaces that correspond to the interfaces provided by different industry standards. Due to the different fields provided by each standard, the interface from one standard does not easily map onto another standard. By comparison, to map onto the different industry standards, the interfaces derived using methods and systems consistent with the subject matter described herein include most of the fields provided by the interfaces of different industry standards. Missing fields may easily be included into the business object model. Thus, by derivation, the interfaces can be extended consistently by these fields. Thus, methods and systems consistent with the subject matter described herein provide consistent interfaces or services that can be used across different industry standards.

Figure 28:
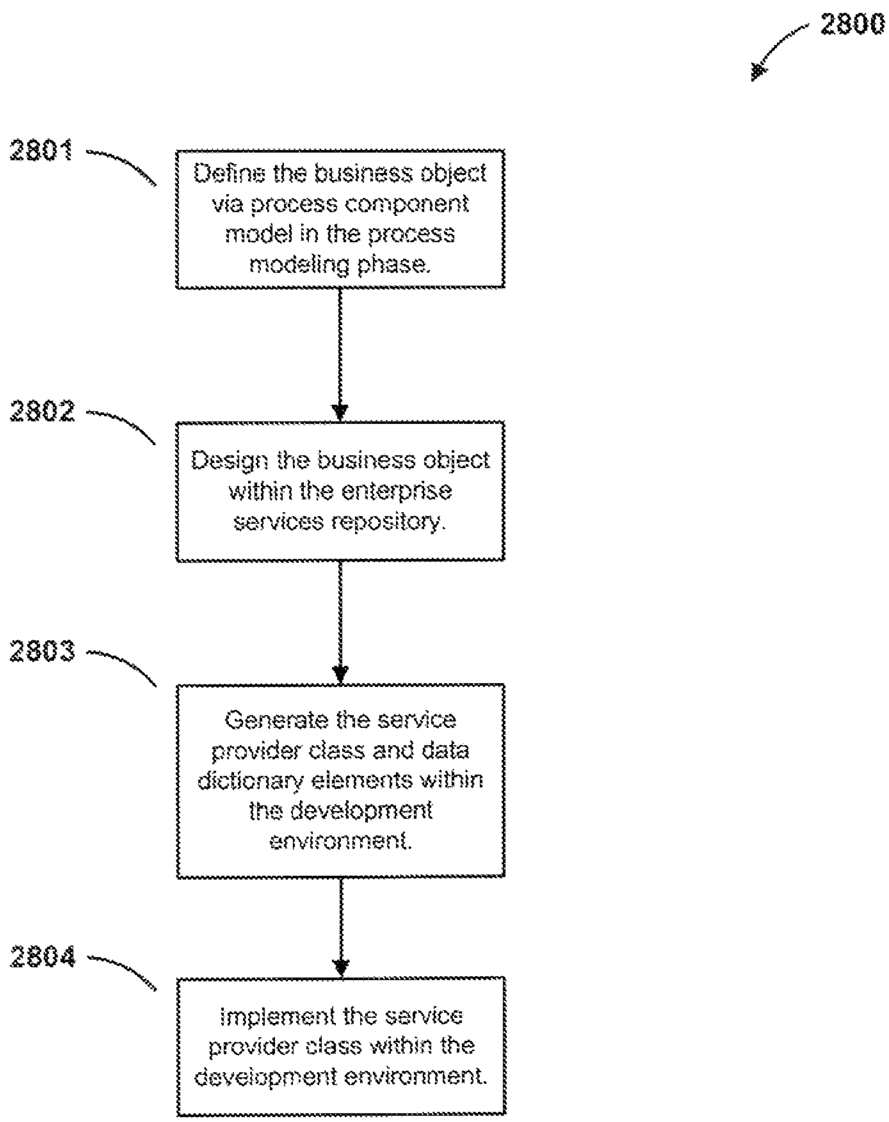
FIG. 28 illustrates an example method for service enabling in accordance with one embodiment of the present disclosure.
Figure 29:
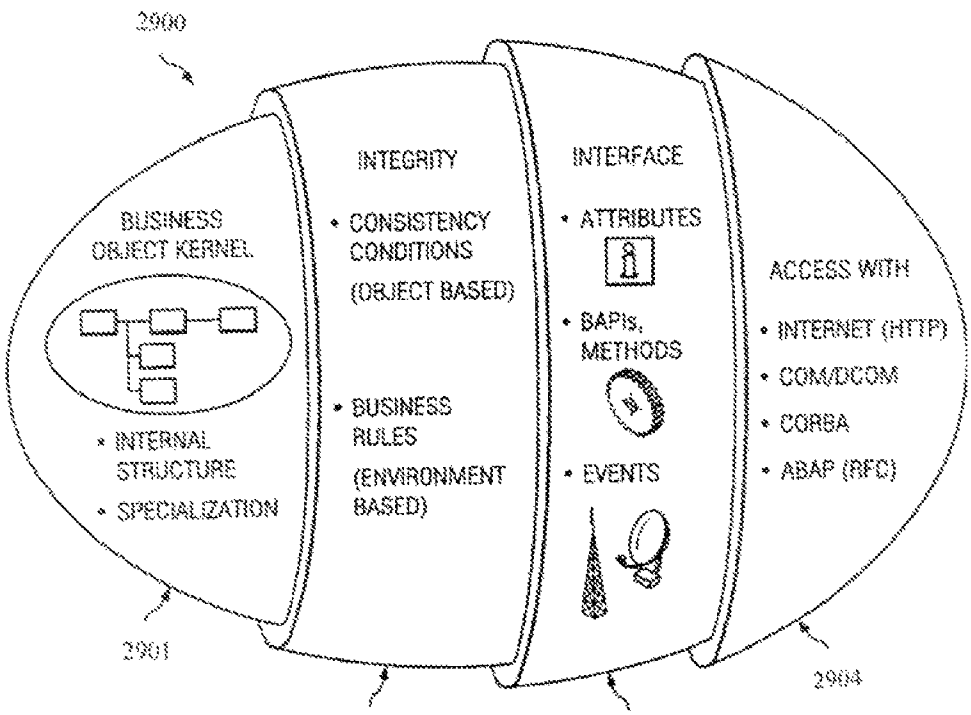
FIG. 29 is a graphical illustration of an example business object and associated components as may be used in the enterprise service infrastructure system of the present disclosure.

For example, FIG. 28 illustrates an example method 2800 for service enabling. In this example, the enterprise services infrastructure may offer one common and standard-based service infrastructure. Further, one central enterprise services repository may support uniform service definition, implementation and usage of services for user interface, and cross-application communication. In step 2801, a business object is defined via a process component model in a process modeling phase. Next, in step 2802, the business object is designed within an enterprise services repository. For example, FIG. 29 provides a graphical representation of one of the business objects 2900. As shown, an innermost layer or kernel 2901 of the business object may represent the business object's inherent data. Inherent data may include, for example, an employee's name, age, status, position, address, etc. A second layer 2902 may be considered the business object's logic. Thus, the layer 2902 includes the rules for consistently embedding the business object in a system environment as well as constraints defining values and domains applicable to the business object. For example, one such constraint may limit sale of an item only to a customer with whom a company has a business relationship. A third layer 2903 includes validation options for accessing the business object. For example, the third layer 2903 defines the business object's interface that may be interfaced by other business objects or applications. A fourth layer 2904 is the access layer that defines technologies that may externally access the business object.

Accordingly, the third layer 2903 separates the inherent data of the first layer 2901 and the technologies used to access the inherent data. As a result of the described structure, the business object reveals only an interface that includes a set of clearly defined methods. Thus, applications access the business object via those defined methods. An application wanting access to the business object and the data associated therewith usually includes the information or data to execute the clearly defined methods of the business object's interface. Such clearly defined methods of the business object's interface represent the business object's behavior. That is, when the methods are executed, the methods may change the business object's data. Therefore, an application may utilize any business object by providing the information or data without having any concern for the details related to the internal operation of the business object. Returning to method 2800, a service provider class and data dictionary elements are generated within a development environment at step 2803. In step 2804, the service provider class is implemented within the development environment.

Figure 30:
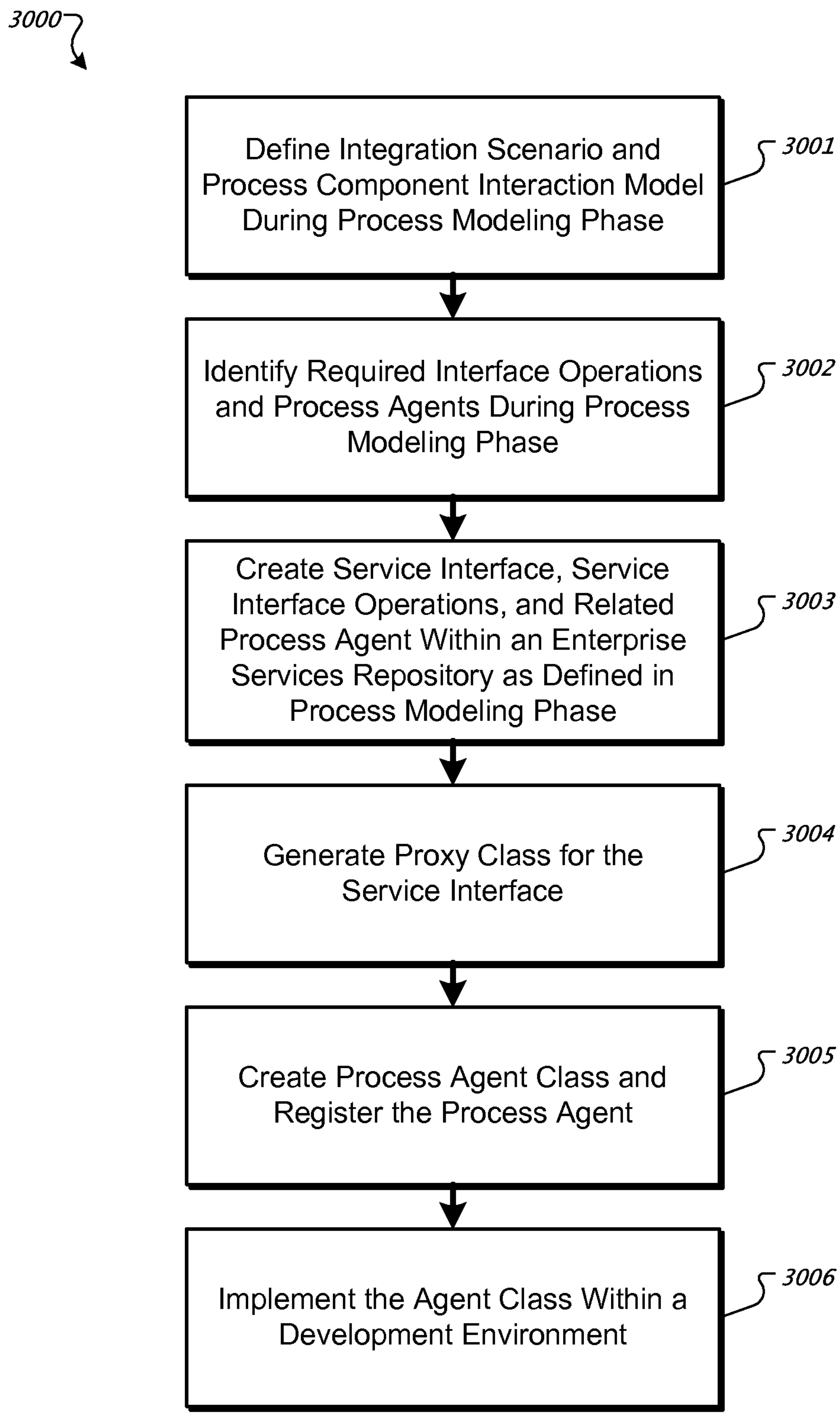
FIG. 30 illustrates an example method for managing a process agent framework in accordance with one embodiment of the present disclosure.

FIG. 30 illustrates an example method 3000 for a process agent framework. For example, the process agent framework may be the basic infrastructure to integrate business processes located in different deployment units. It may support a loose coupling of these processes by message based integration. A process agent may encapsulate the process integration logic and separate it from business logic of business objects. As shown in FIG. 30, an integration scenario and a process component interaction model are defined during a process modeling phase in step 3001. In step 3002, required interface operations and process agents are identified during the process modeling phase also. Next, in step 3003, a service interface, service interface operations, and the related process agent are created within an enterprise services repository as defined in the process modeling phase. In step 3004, a proxy class for the service interface is generated. Next, in step 3005, a process agent class is created and the process agent is registered. In step 3006, the agent class is implemented within a development environment.

Figure 31:
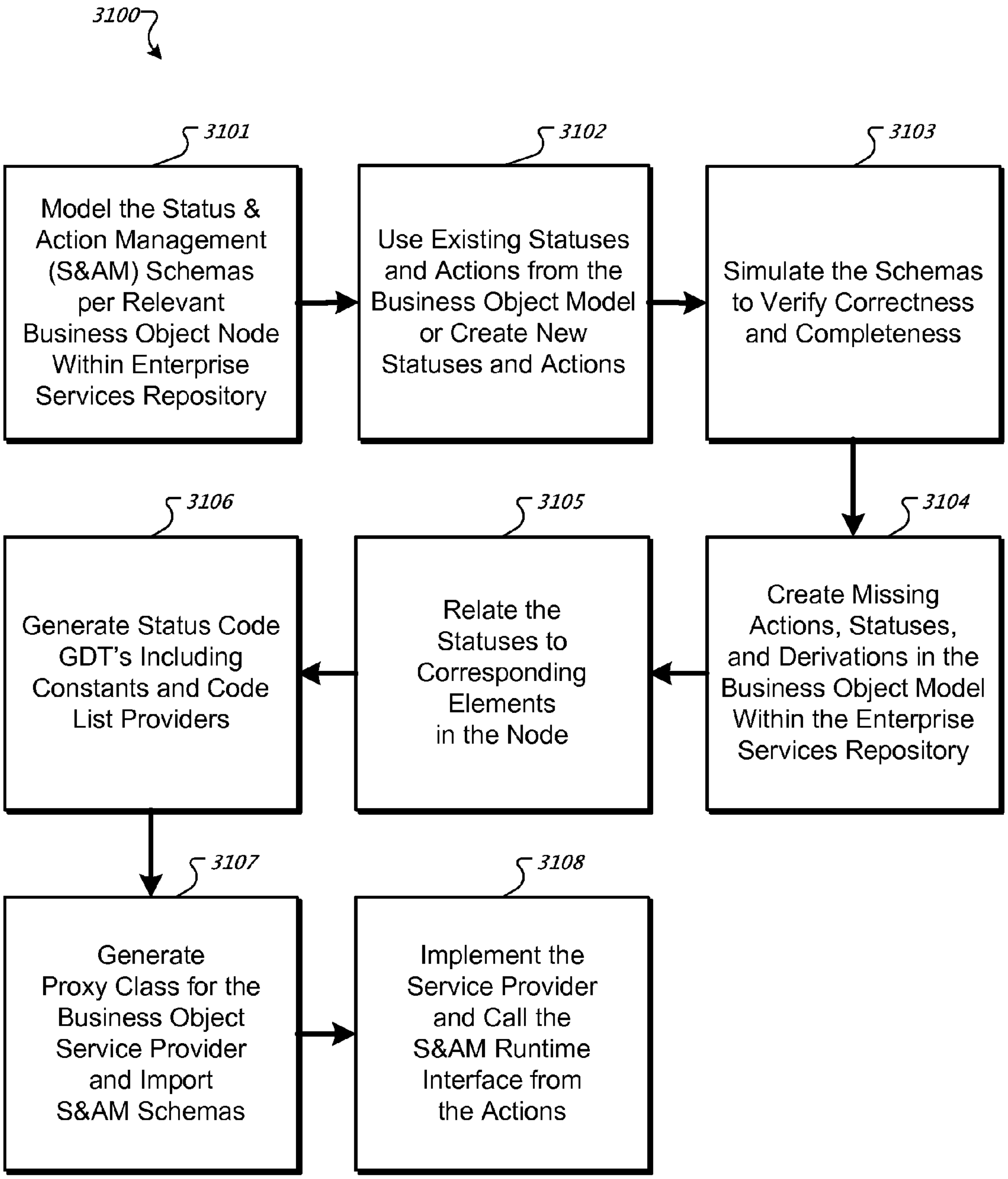
FIG. 31 illustrates an example method for status and action management in accordance with one embodiment of the present disclosure.

FIG. 31 illustrates an example method 3100 for status and action management (S&AM). For example, status and action management may describe the life cycle of a business object (node) by defining actions and statuses (as their result) of the business object (node), as well as, the constraints that the statuses put on the actions. In step 3101, the status and action management schemas are modeled per a relevant business object node within an enterprise services repository. In step 3102, existing statuses and actions from the business object model are used or new statuses and actions are created. Next, in step 3103, the schemas are simulated to verify correctness and completeness. In step 3104, missing actions, statuses, and derivations are created in the business object model with the enterprise services repository. Continuing with method 3100, the statuses are related to corresponding elements in the node in step 3105. In step 3106, status code GDT's are generated, including constants and code list providers. Next, in step 3107, a proxy class for a business object service provider is generated and the proxy class S&AM schemas are imported. In step 3108, the service provider is implemented and the status and action management runtime interface is called from the actions.

Regardless of the particular hardware or software architecture used, the disclosed systems or software are generally capable of implementing business objects and deriving (or otherwise utilizing) consistent interfaces that are suitable for use across industries, across businesses, and across different departments within a business in accordance with some or all of the following description. In short, system 100 contemplates using any appropriate combination and arrangement of logical elements to implement some or all of the described functionality.

Moreover, the preceding flowcharts and accompanying description illustrate example methods. The present services environment contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, the services environment may use methods with additional steps, fewer steps, and/or different steps, so long as the methods remain appropriate.

FundsManagementCentre Interfaces

The motivation business scenario is to enable an employee to request the creation of a FundsManagementCentre. An employee who is responsible for creation of FundsManagementCentre (usually located in a central service department) can check if the request contains all relevant information, complete missing information if needed and inform requesting employee about the status of his request. After the information is completed the central employee can create the FundsManagementCentre in Organisational Management.

Figure 32:
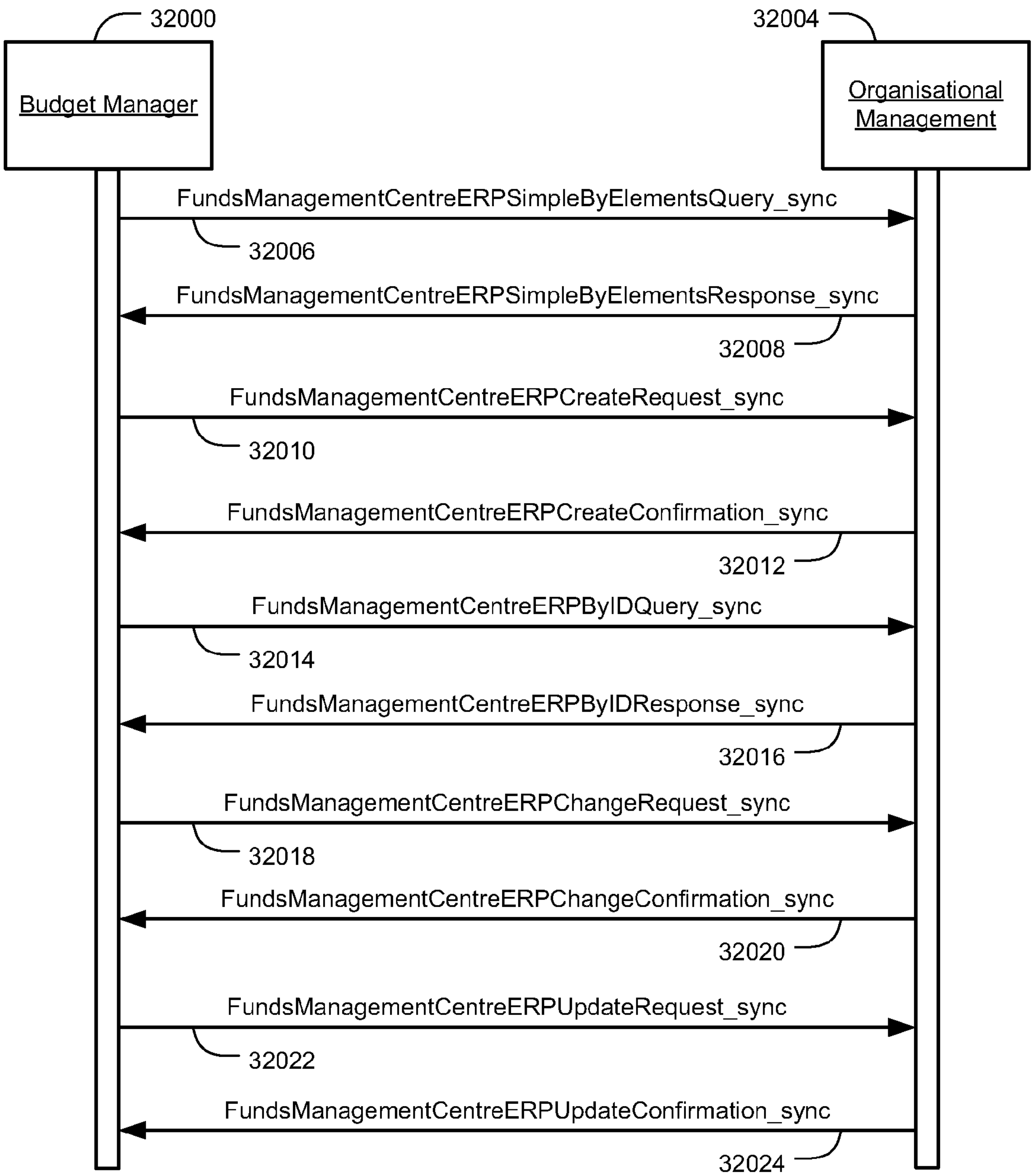
FIG. 32 shows an exemplary FundsManagementCentre Message Choreography.

The message choreography of FIG. 32 describes a possible logical sequence of messages that can be used to realize a FundsManagementCentre business scenario.

A "Budget Manager" system 32000 can query funds management centre elements using a FundsManagementCentreERPSimpleByElementsQuery_sync message 32006 as shown, for example, in FIG. 32. An "Organizational Management" system 32004 can respond to the query using a FundsManagementCentreERPSimpleByElementsResponse_sync message 32008 as shown, for example, in FIG. 32.

The "Budget Manager" system 32000 can request the creation of a funds management centre using a FundsManagementCentreERPCreateRequest_sync message 32010 as shown, for example, in FIG. 32. The "Organizational Management" system 32004 can confirm the request using a FundsManagementCentreERPCreateConfirmation_sync message 32012 as shown, for example, in FIG. 32.

The "Budget Manager" system 32000 can query funds management centre elements by ID using a FundsManagementCentreERPByIDQuery_sync message 32014 as shown, for example, in FIG. 32. The "Organizational Management" system 32004 can respond to the query using a FundsManagementCentreERPByIDResponse_sync message 32016 as shown, for example, in FIG. 32.

The "Budget Manager" system 32000 can request the change of a funds management centre using a FundsManagementCentreERPChangeRequest_sync message 32018 as shown, for example, in FIG. 32. The "Organizational Management" system 32004 can confirm the request using a FundsManagementCentreERPChangeConfirmation_sync message 32020 as shown, for example, in FIG. 32.

The "Budget Manager" system 32000 can request the update of a funds management centre using a FundsManagementCentreERPUpdateRequest_sync message 32022 as shown, for example, in FIG. 32. The "Organizational Management" system 32004 can confirm the request using a FundsManagementCentreERPUpdateConfirmation_sync message 32024 as shown, for example, in FIG. 32.

The FundsManagementCentre interface performs various operations, namely a FundsManagementCentreERPCreateRequestConfirmation, a FundsManagementCentreERPChangeRequestConfirmation, a FundsManagementCentreERPUpdateRequestConfirmation, a FundsManagementCentreERPSimpleByElementsQueryResponse, and a FundsManagementCentreERPByIDQueryResponse.

The FundsManagementCentreERPCreateRequestConfirmation is a Request to and Confirmation from Organisational Management to create a FundsManagementCentre. The FundsManagementCentreERPCreateRequestConfirmation can be used when an employee requests a creation of a FundsManagementCentre in Organisational Management. The FundsManagementCentreERPCreateRequestConfirmation operation includes various message types, namely a FundsManagementCentreERPCreateRequest_sync and a FundsManagementCentreERPCreateConfirmation_sync. The structure of the FundsManagementCentreERPCreateRequest_sync message type is specified by a FundsManagementCentreERPCreateRequestMessage_sync message data type. The structure of the FundsManagementCentreERPCreateConfirmation_sync message type is specified by a FundsManagementCentreERPCreateConfirmationMessage_sync message data type.

The FundsManagementCentreERPChangeRequestConfirmation is a Request to and Confirmation from Organisational Management to change a FundsManagementCentre. The FundsManagementCentreERPChangeRequestConfirmation can be used when an employee requests a change of a FundsManagementCentre in Organisational Management. The FundsManagementCentreERPChangeRequestConfirmation operation includes various message types, namely a FundsManagementCentreERPCreateConfirmation_sync, a FundsManagementCentreERPChangeRequest_sync and a FundsManagementCentreERPChangeConfirmation_sync. The structure of the FundsManagementCentreERPChangeRequest_sync message type is specified by a FundsManagementCentreERPChangeConfirmationMessage_sync message data type. The structure of the FundsManagementCentreERPChangeConfirmation_sync message type is specified by a FundsManagementCentreERPChangeConfirmationMessage_sync message data type.

The FundsManagementCentreERPUpdateRequestConfirmation is a Request to and Confirmation from Organisational Management to update a FundsManagementCentre. The FundsManagementCentreERPUpdateRequestConfirmation can be used when an employee requests an update of a FundsManagementCentre in Organisational Management. The FundsManagementCentreERPUpdateRequestConfirmation operation includes various message types, namely a FundsManagementCentreERPChangeConfirmation_sync, a FundsManagementCentreERPUpdateRequest_sync and a FundsManagementCentreERPUpdateConfirmation_sync. The structure of the FundsManagementCentreERPUpdateRequest_sync message type is specified by a FundsManagementCentreERPUpdateConfirmationMessage_sync message data type. The structure of the FundsManagementCentreERPUpdateConfirmation_sync message type is specified by a FundsManagementCentreERPUpdateConfirmationMessage_sync message data type.

The FundsManagementCentreERPSimpleByElementsQueryResponse is a query to and response from OrganisationalManagement to supply FundsManagementCentre identifying elements that satisfy the selection criteria specified in the query. The FundsManagementCentreERPSimpleByElementsQueryResponse can be used when an employee requests a list of FundsManagementCentre identifying information that satisfy a specified selection criteria. The FundsManagementCentreERPSimpleByElementsQueryResponse operation includes various message types, namely a FundsManagementCentreERPUpdateConfirmation_sync, a FundsManagementCentreERPSimpleByElementsQuery_sync and a FundsManagementCentreERPSimpleByElementsResponse_sync. The structure of the FundsManagementCentreERPSimpleByElementsQuery_sync message type is specified by a FundsManagementCentreERPSimpleByElementsQueryMessage_sync message data type. The structure of the FundsManagementCentreERPSimpleByElementsResponse_sync message type is specified by a FundsManagementCentreERPSimpleByElementsResponseMessage_sync message data type.

The FundsManagementCentreERPByIDQueryResponse is a query to and response from OrganisationalManagement to supply detailed FundsManagementCentre information. The FundsManagementCentreERPByIDQueryResponse can be used when an employee requests detailed information about a FundsManagementCentre. The FundsManagementCentreERPByIDQueryResponse operation includes various message types, namely a FundsManagementCentreERPSimpleByElementsResponse_sync and a FundsManagementCentreERPByIDQuery_sync. The structure of the FundsManagementCentreERPByIDQuery_sync message type is specified by a FundsManagementCentreERPByIDQueryMessage_sync message data type.

The operation includes various message types, namely a FundsManagementCentreERPByIDQuery_sync and a FundsManagementCentreERPByIDResponse_sync. The structure of the FundsManagementCentreERPByIDResponse_sync message type is specified by a FundsManagementCentreERPByIDResponseMessage_sync message data type.

Figure 33:
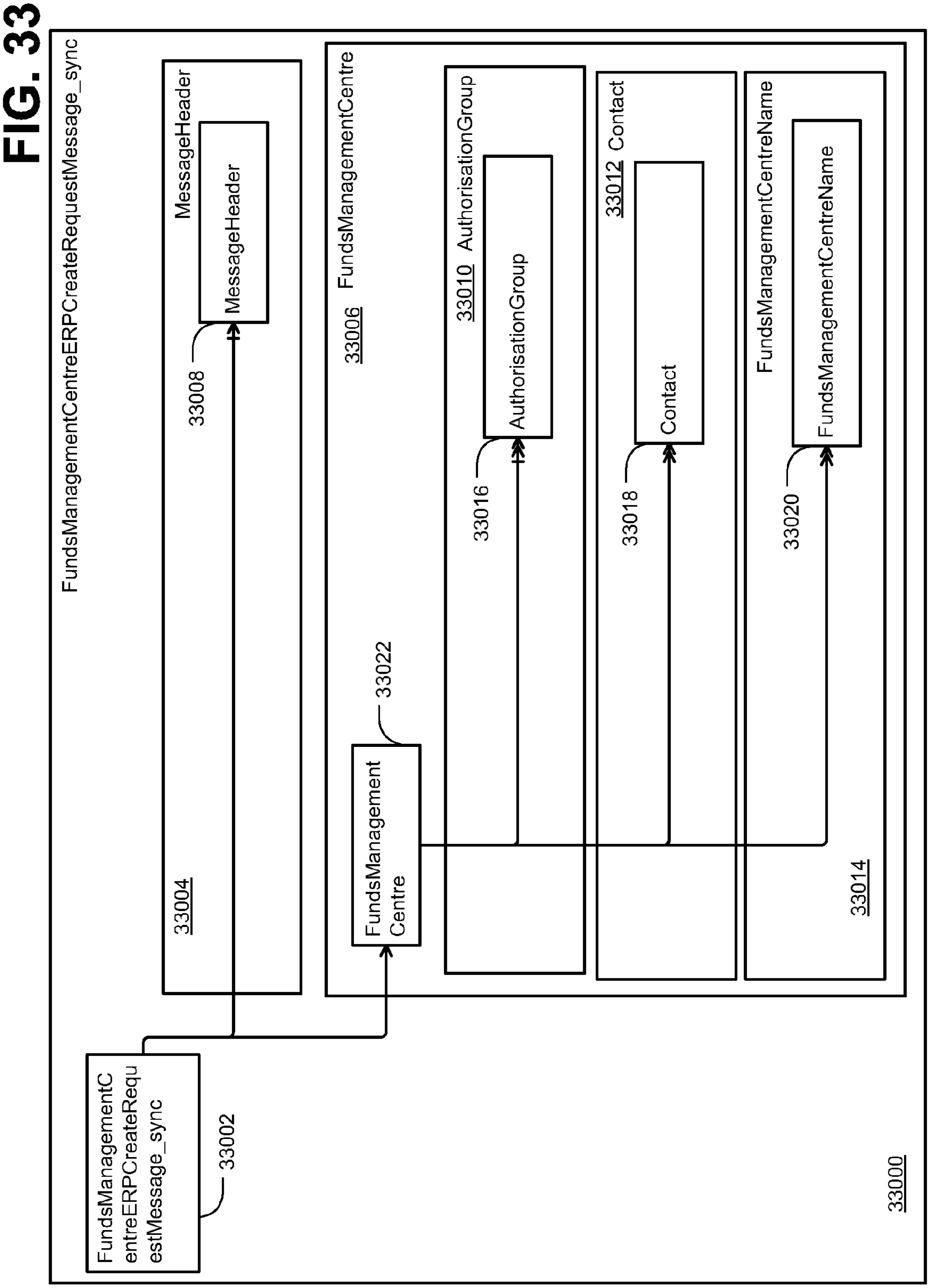
FIG. 33 shows an exemplary FundsManagementCentreERPCreateRequestMessage_sync Message Data Type.

FIG. 33 illustrates one example logical configuration of FundsManagementCentreERPCreateRequestMessage_sync message 33000. Specifically, this figure depicts the arrangement and hierarchy of various components such as one or more levels of packages, entities, and datatypes, shown here as 33000 through 33020. As described above, packages may be used to represent hierarchy levels. Entities are discrete business elements that are used during a business transaction. Data types are used to type object entities and interfaces with a structure. For example, FundsManagementCentreERPCreateRequestMessage_sync message 33000 includes, among other things, FundsManagementCentre 33006. Accordingly, heterogeneous applications may communicate using this consistent message configured as such.

Figure 34:
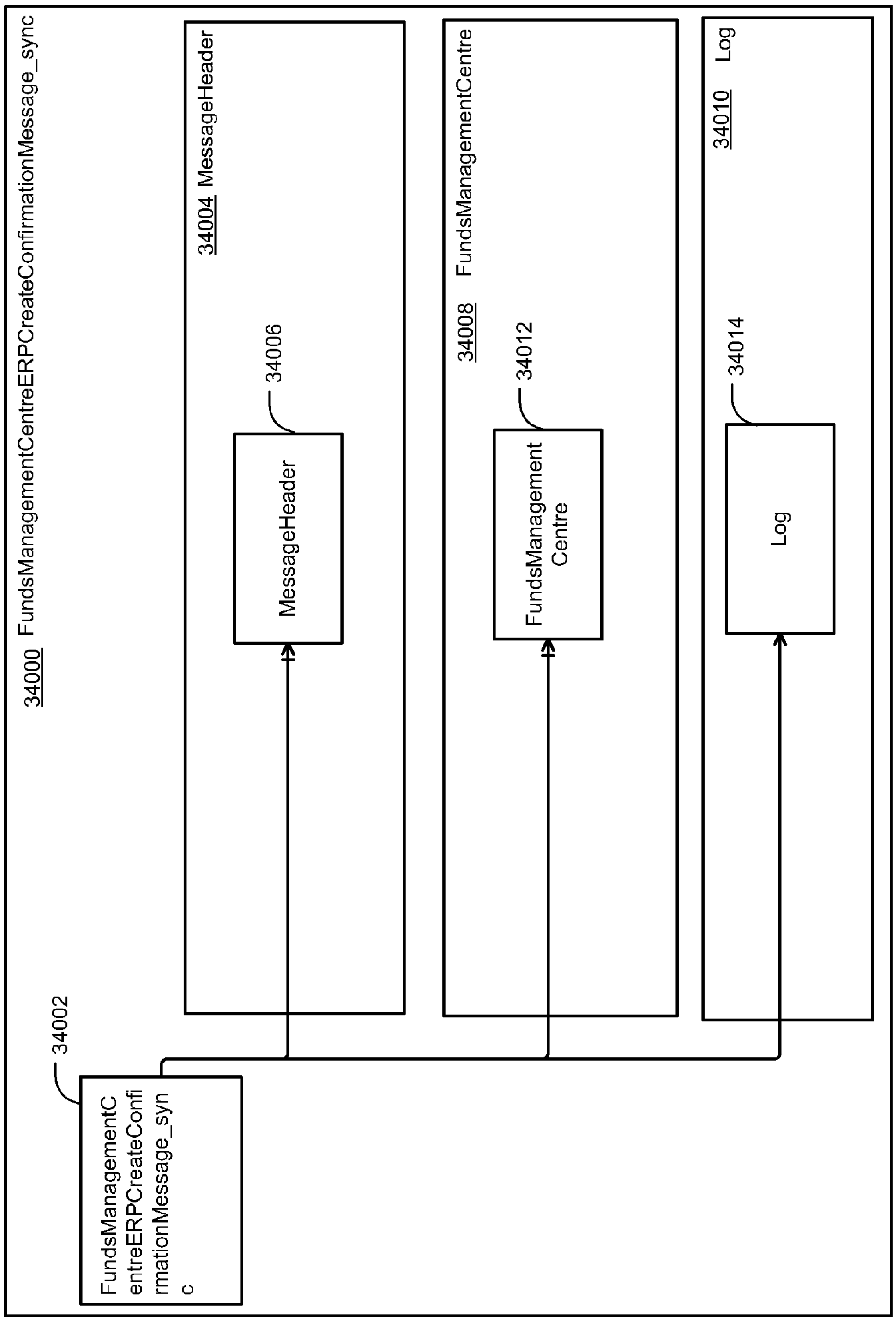
FIG. 34 shows an exemplary FundsManagementCentreERPCreateConfirmationMessage_sync Message Data Type.

Additionally, FIG. 34 illustrates one example logical configuration of FundsManagementCentreERPCreateConfirmationMessage_sync message 34000. Specifically, this figure depicts the arrangement and hierarchy of various components such as one or more levels of packages, entities, and datatypes, shown here as 34000 through 34014. As described above, packages may be used to represent hierarchy levels. Entities are discrete business elements that are used during a business transaction. Data types are used to type object entities and interfaces with a structure. For example, FundsManagementCentreERPCreateConfirmationMessage_sync message 34000 includes, among other things, FundsManagementCentre 34008. Accordingly, heterogeneous applications may communicate using this consistent message configured as such.

Figure 35:
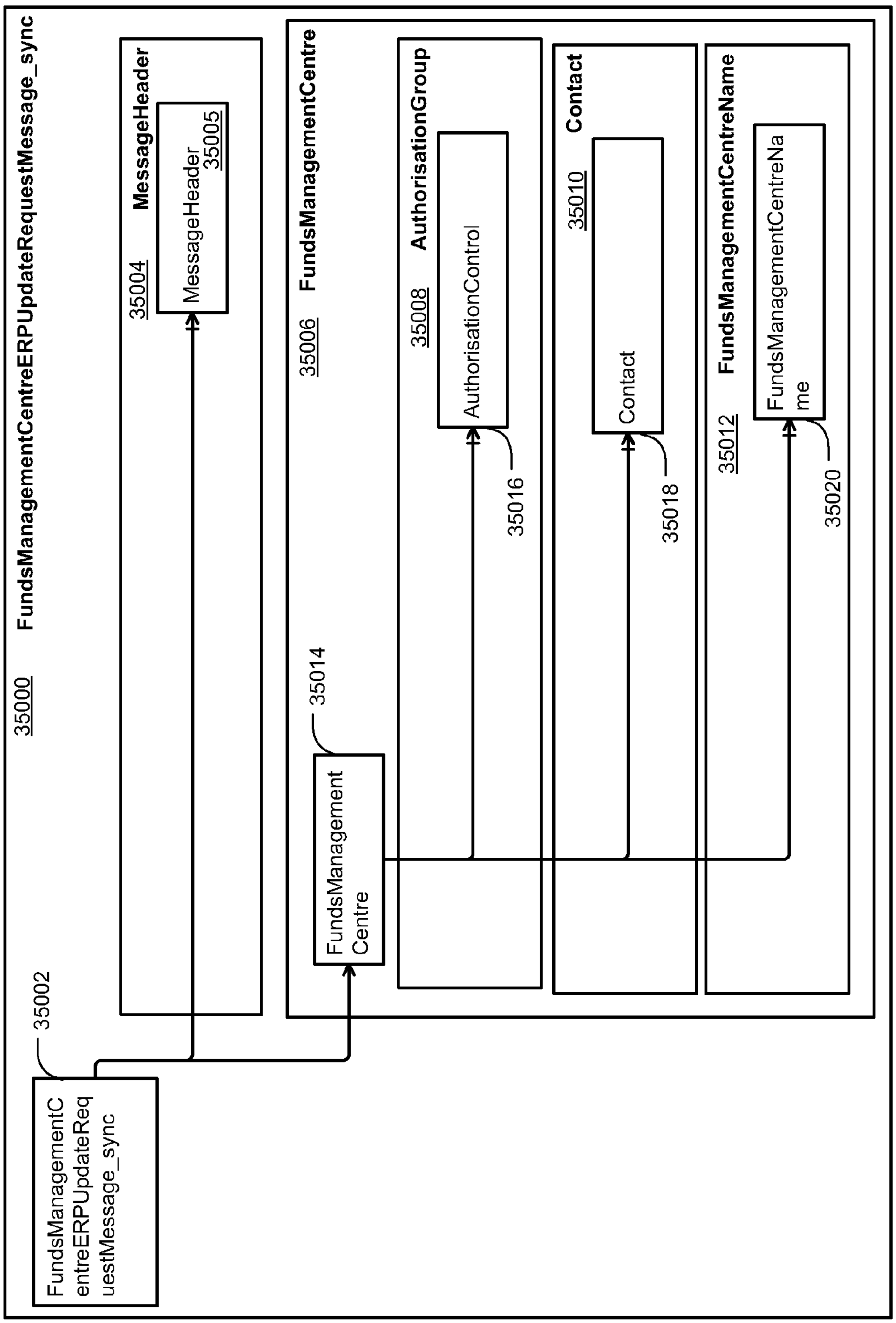
FIG. 35 shows an exemplary FundsManagementCentreERPUpdateRequestMessage_sync Message Data Type.

Additionally, FIG. 35 illustrates one example logical configuration of FundsManagementCentreERPUpdateRequestMessage_sync message 35000. Specifically, this figure depicts the arrangement and hierarchy of various components such as one or more levels of packages, entities, and datatypes, shown here as 35000 through 35020. As described above, packages may be used to represent hierarchy levels. Entities are discrete business elements that are used during a business transaction. Data types are used to type object entities and interfaces with a structure. For example, FundsManagementCentreERPUpdateRequestMessage_sync message 35000 includes, among other things, FundsManagementCentre 35006. Accordingly, heterogeneous applications may communicate using this consistent message configured as such.

Figure 36:
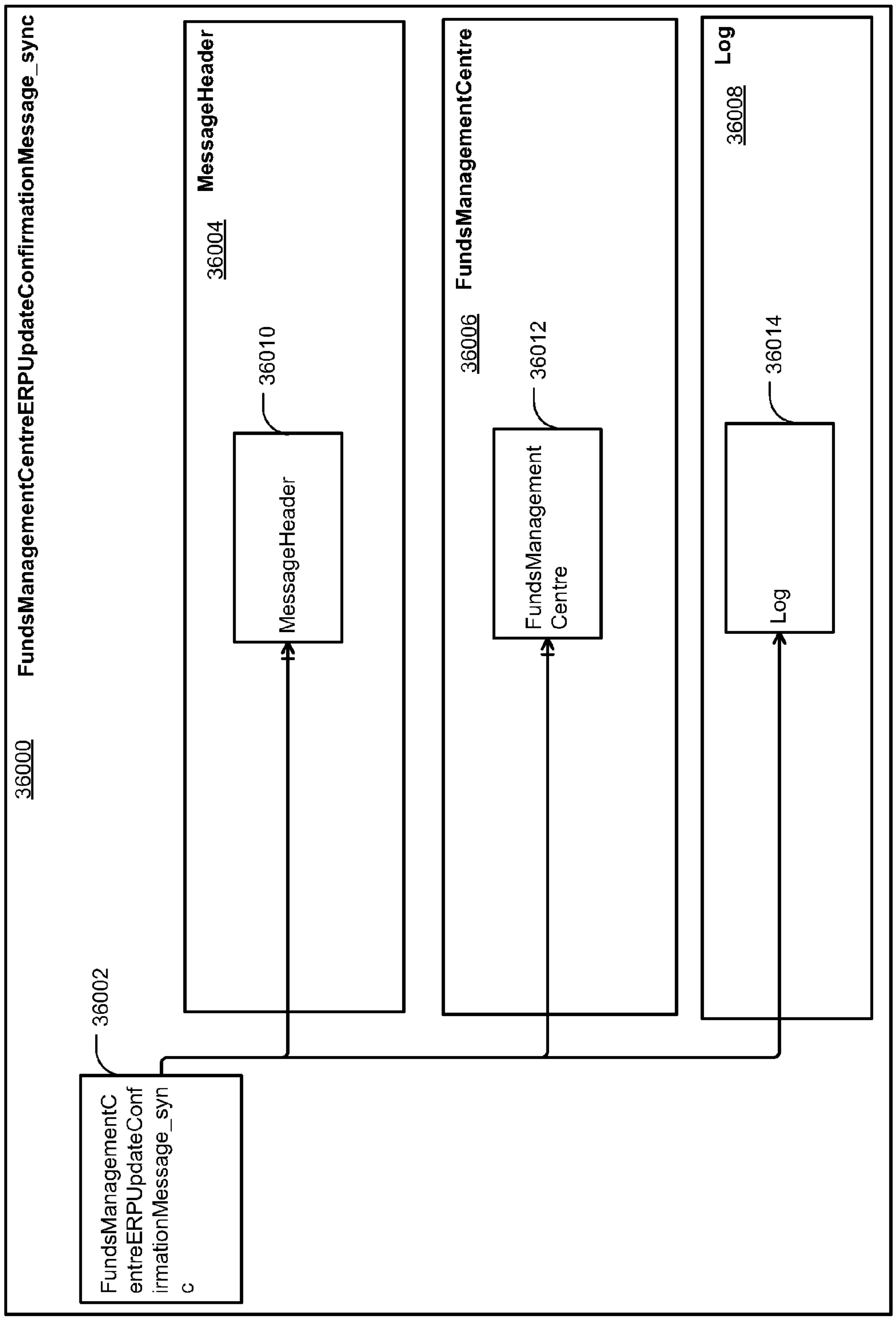
FIG. 36 shows an exemplary FundsManagementCentreERPUpdateConfirmationMessage_sync Message Data Type.

Additionally, FIG. 36 illustrates one example logical configuration of FundsManagementCentreERPUpdateConfirmationMessage_sync message 36000. Specifically, this figure depicts the arrangement and hierarchy of various components such as one or more levels of packages, entities, and datatypes, shown here as 36000 through 36014. As described above, packages may be used to represent hierarchy levels. Entities are discrete business elements that are used during a business transaction. Data types are used to type object entities and interfaces with a structure. For example, FundsManagementCentreERPUpdateConfirmationMessage_sync message 36000 includes, among other things, FundsManagementCentre 36006. Accordingly, heterogeneous applications may communicate using this consistent message configured as such.

Figure 37:
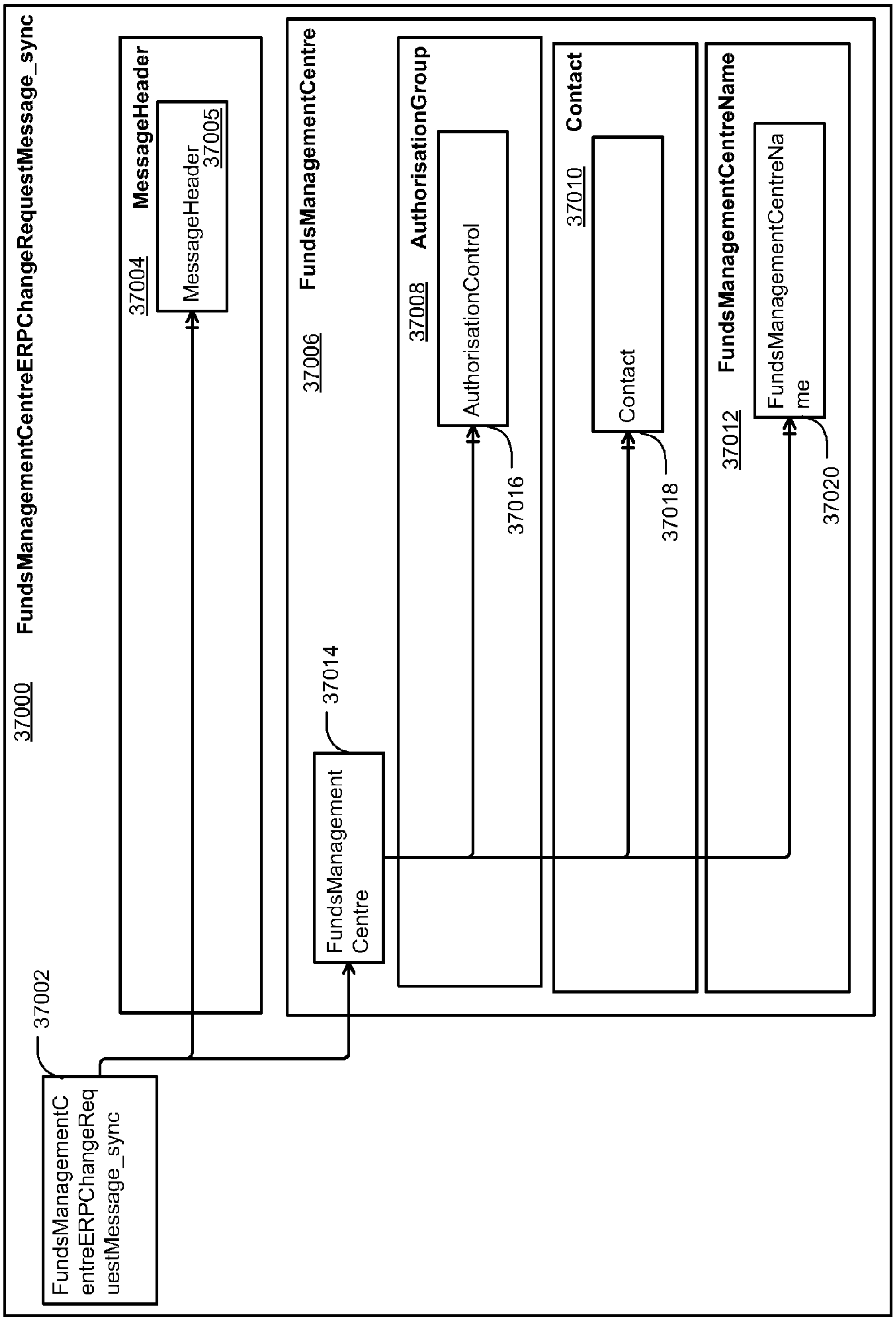
FIG. 37 shows an exemplary FundsManagementCentreERPChangeRequestMessage_sync Message Data Type.

Additionally, FIG. 37 illustrates one example logical configuration of FundsManagementCentreERPChangeRequestMessage_sync message 37000. Specifically, this figure depicts the arrangement and hierarchy of various components such as one or more levels of packages, entities, and datatypes, shown here as 37000 through 37020. As described above, packages may be used to represent hierarchy levels. Entities are discrete business elements that are used during a business transaction. Data types are used to type object entities and interfaces with a structure. For example, FundsManagementCentreERPChangeRequestMessage_sync message 37000 includes, among other things, FundsManagementCentre 37006.

Accordingly, heterogeneous applications may communicate using this consistent message configured as such.

Figure 38:
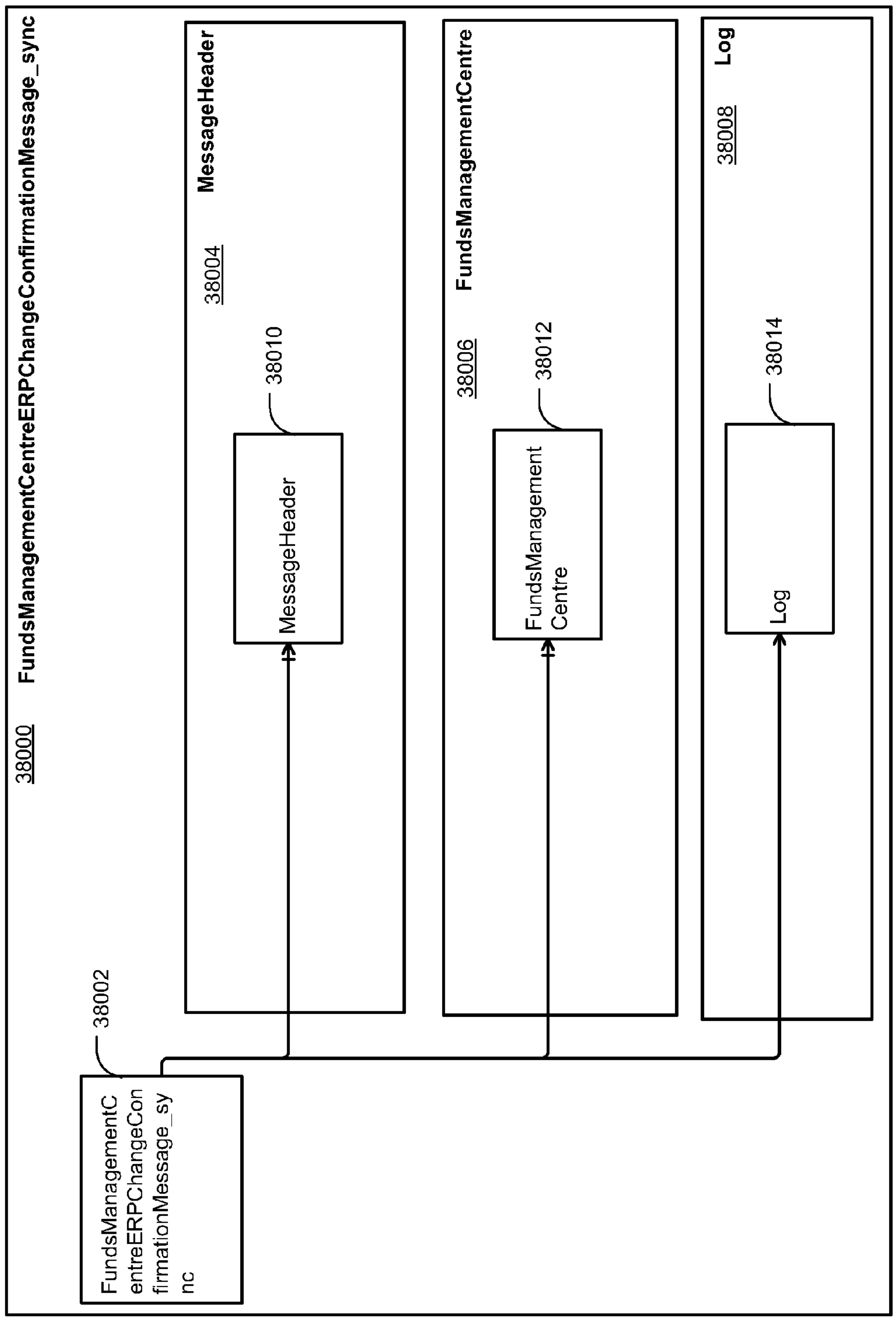
FIG. 38 shows an exemplary FundsManagementCentreERPChangeConfirmationMessage_sync Message Data Type.

Additionally, FIG. 38 illustrates one example logical configuration of FundsManagementCentreERPChangeConfirmationMessage_sync message 38000. Specifically, this figure depicts the arrangement and hierarchy of various components such as one or more levels of packages, entities, and datatypes, shown here as 38000 through 38014. As described above, packages may be used to represent hierarchy levels. Entities are discrete business elements that are used during a business transaction. Data types are used to type object entities and interfaces with a structure. For example, FundsManagementCentreERPChangeConfirmationMessage_sync message 38000 includes, among other things, FundsManagementCentre 38006. Accordingly, heterogeneous applications may communicate using this consistent message configured as such.

Figure 39:
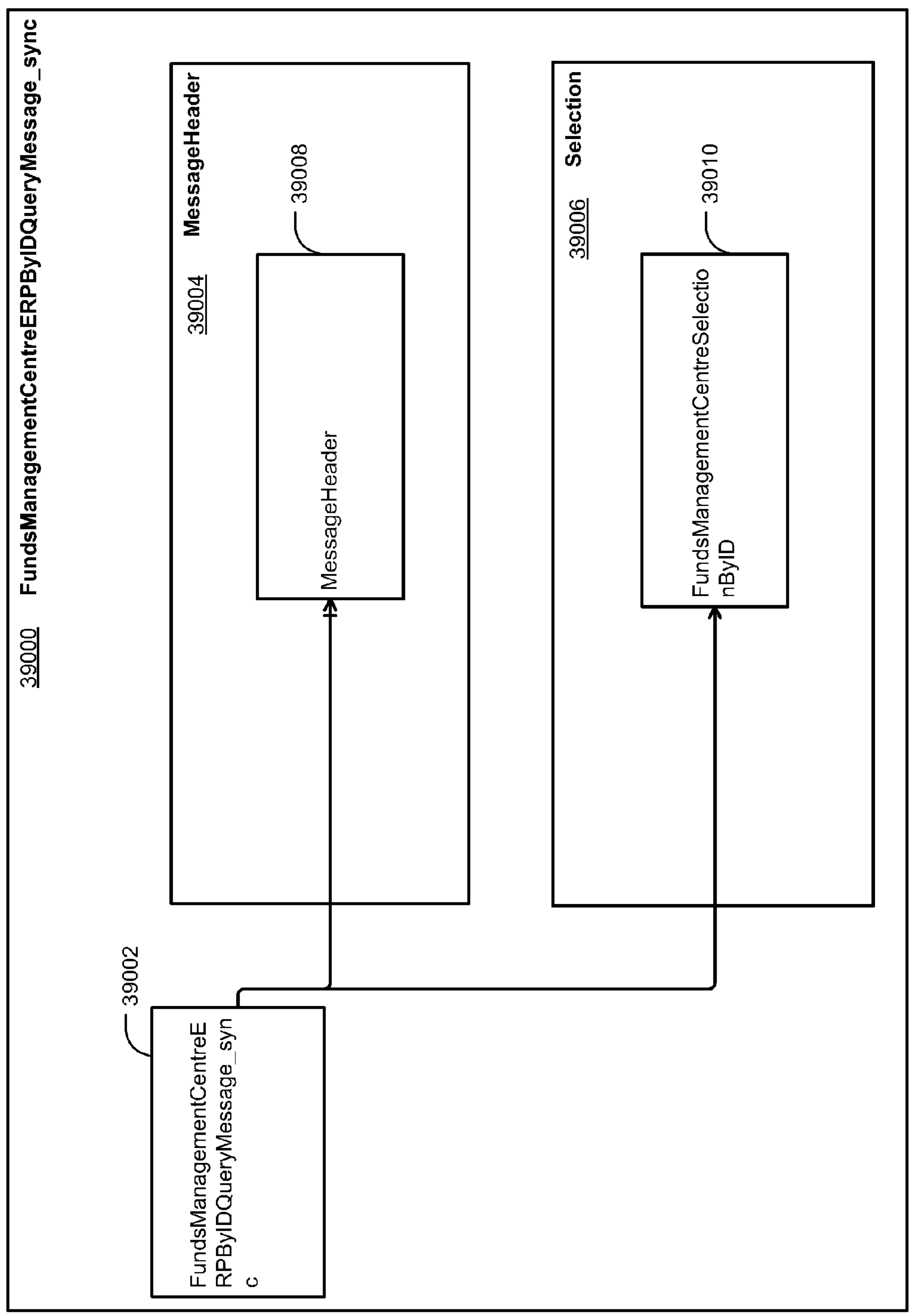
FIG. 39 shows an exemplary FundsManagementCentreERPByIDQueryMessage_sync Message Data Type.

Additionally, FIG. 39 illustrates one example logical configuration of FundsManagementCentreERPByIDQueryMessage_sync message 39000. Specifically, this figure depicts the arrangement and hierarchy of various components such as one or more levels of packages, entities, and datatypes, shown here as 39000 through 39010. As described above, packages may be used to represent hierarchy levels. Entities are discrete business elements that are used during a business transaction. Data types are used to type object entities and interfaces with a structure. For example, FundsManagementCentreERPByIDQueryMessage_sync message 39000 includes, among other things, Selection 39006. Accordingly, heterogeneous applications may communicate using this consistent message configured as such.

Figure 40:
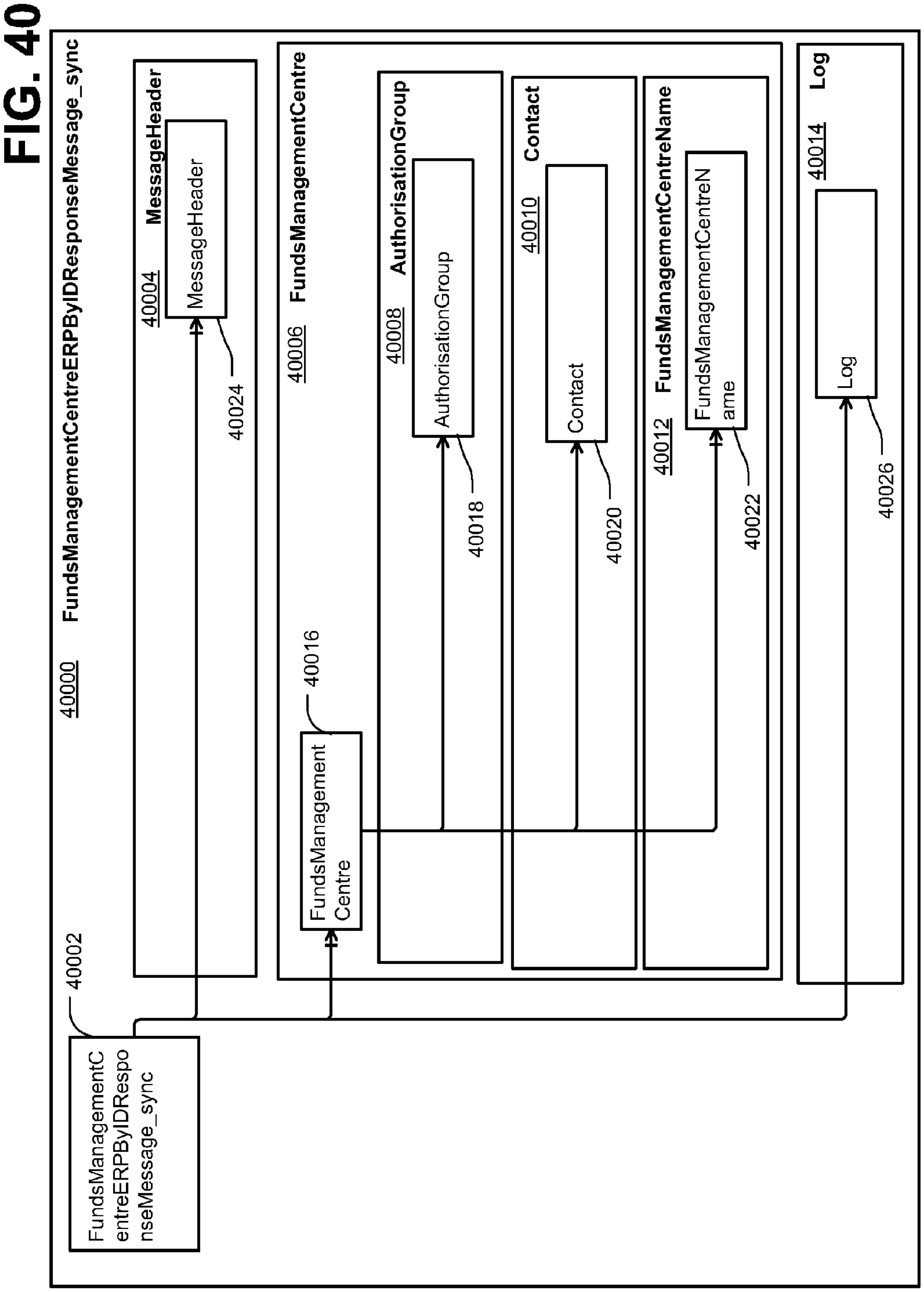
FIG. 40 shows an exemplary FundsManagementCentreERPByIDResponseMessage_sync Message Data Type.

Additionally, FIG. 40 illustrates one example logical configuration of FundsManagementCentreERPByIDResponseMessage_sync message 40000. Specifically, this figure depicts the arrangement and hierarchy of various components such as one or more levels of packages, entities, and datatypes, shown here as 40000 through 40026. As described above, packages may be used to represent hierarchy levels. Entities are discrete business elements that are used during a business transaction. Data types are used to type object entities and interfaces with a structure. For example, FundsManagementCentreERPByIDResponseMessage_sync message 40000 includes, among other things, FundsManagementCentre 40006. Accordingly, heterogeneous applications may communicate using this consistent message configured as such.

Figure 41:
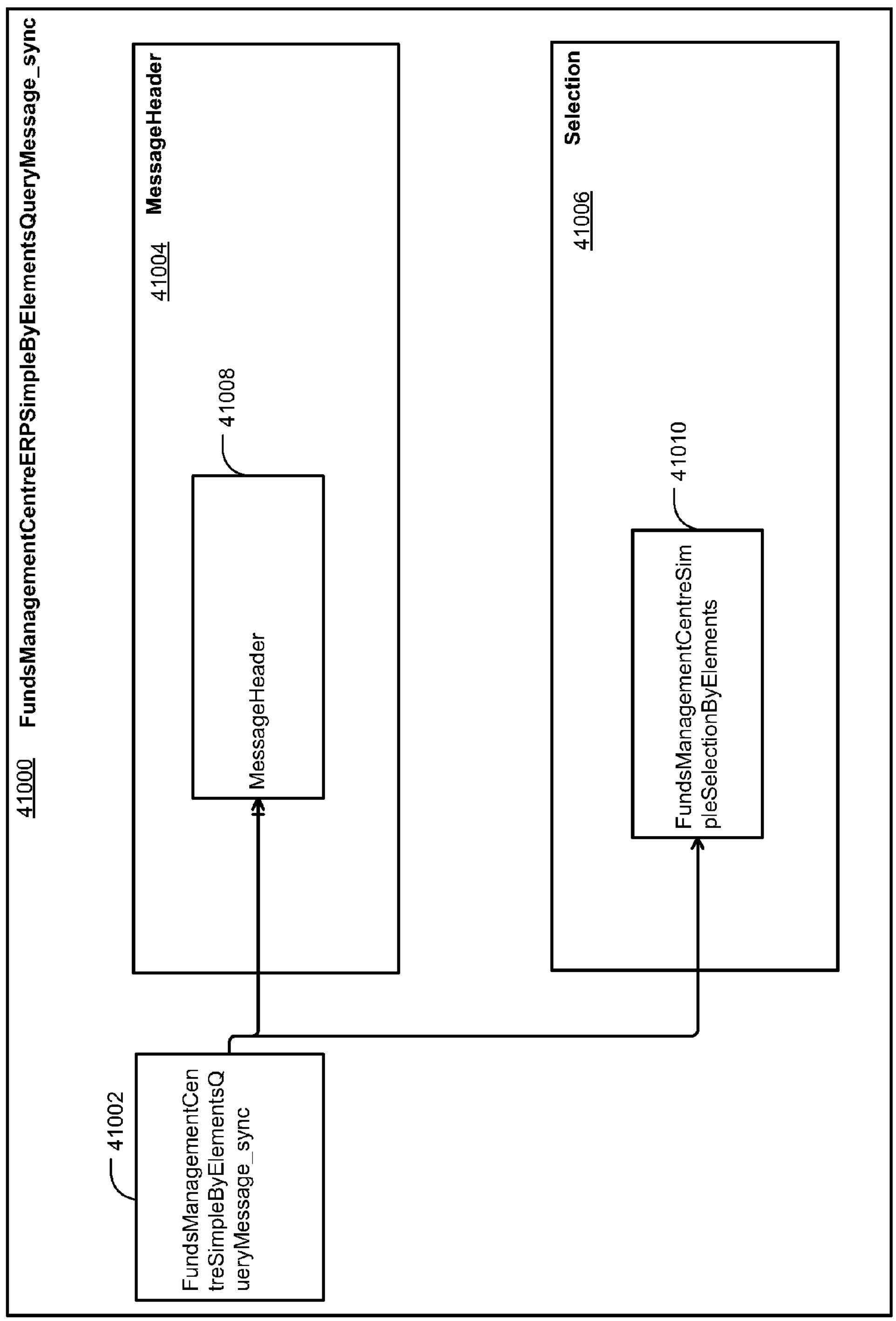
FIG. 41 shows an exemplary FundsManagementCentreERPSimpleByElementsQueryMessage_sync Message Data Type.

Additionally, FIG. 41 illustrates one example logical configuration of FundsManagementCentreERPSimpleByElementsQueryMessage_sync message 41000. Specifically, this figure depicts the arrangement and hierarchy of various components such as one or more levels of packages, entities, and datatypes, shown here as 41000 through 41010. As described above, packages may be used to represent hierarchy levels. Entities are discrete business elements that are used during a business transaction. Data types are used to type object entities and interfaces with a structure. For example, FundsManagementCentreERPSimpleByElementsQueryMessage_sync message 41000 includes, among other things, Selection 41006. Accordingly, heterogeneous applications may communicate using this consistent message configured as such.

Figure 42:
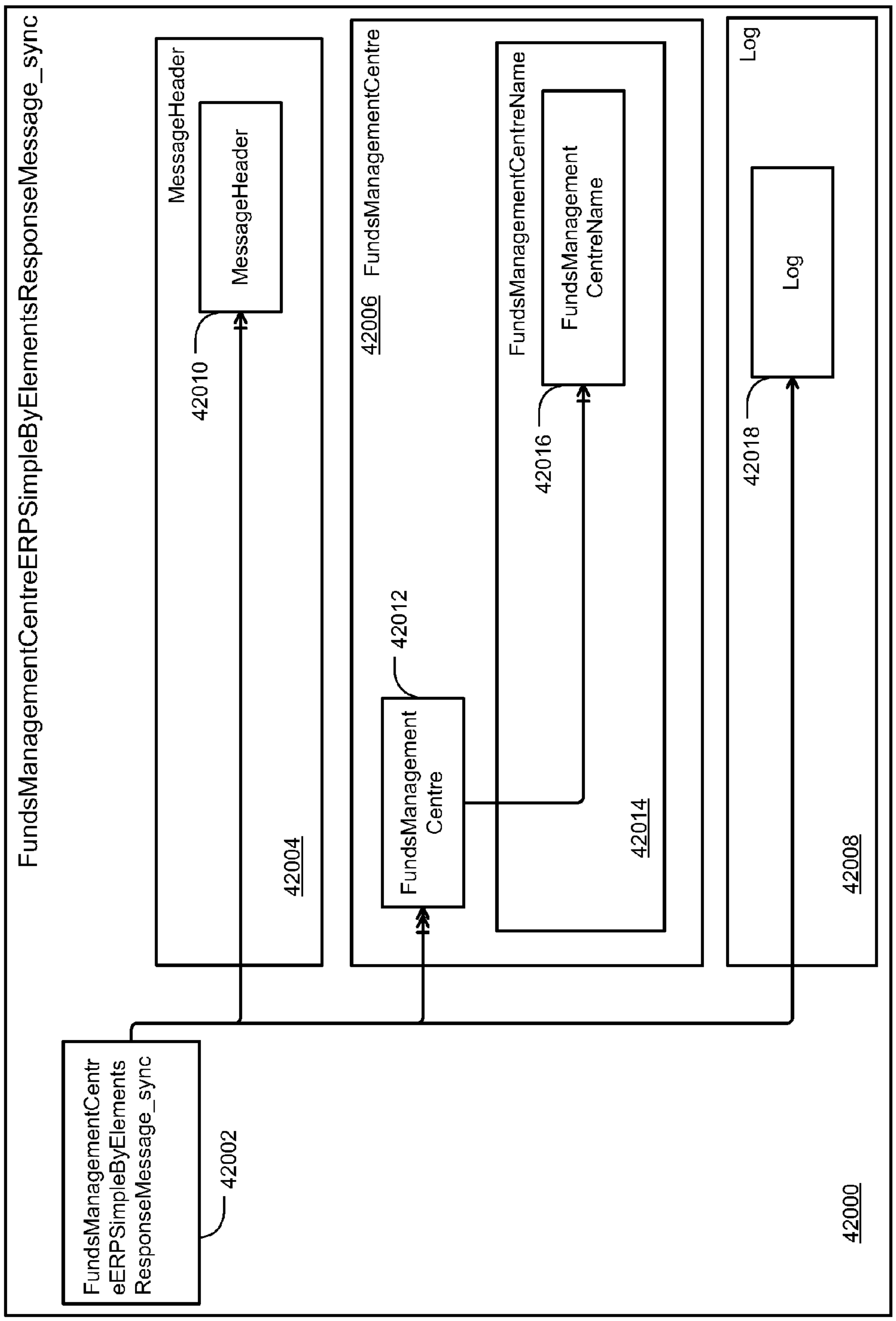
FIG. 42 shows an exemplary FundsManagementCentreERPSimpleByElementsResponseMessage_sync Message Data Type.

Additionally, FIG. 42 illustrates one example logical configuration of FundsManagementCentreERPSimpleByElementsResponseMessage_sync message 42000. Specifically, this figure depicts the arrangement and hierarchy of various components such as one or more levels of packages, entities, and datatypes, shown here as 42000 through 42018. As described above, packages may be used to represent hierarchy levels. Entities are discrete business elements that are used during a business transaction. Data types are used to type object entities and interfaces with a structure. For example, FundsManagementCentreERPSimpleByElementsResponseMessage_sync message 42000 includes, among other things, FundsManagementCentre 42006. Accordingly, heterogeneous applications may communicate using this consistent message configured as such.

FIGS. 43-1 through 43-4 show a FundsManagementCentreERPMessage_sync 43000 package. The FundsManagementCentreERPMessage_sync 43000 package is a FundsManagementCentreERPMessage_sync 43004 data type. The FundsManagementCentreERPMessage_sync 43000 package includes a FundsManagementCentreERPMessage_sync 43002 entity. The FundsManagementCentreERPMessage_sync 43000 package includes various packages, namely a MessageHeader 43006 package, a FundsManagementCentre 43012 package and a Log 43080 package.

The MessageHeader 43006 package is a BasicBusinessDocumentMessageHeader 43010 data type. The MessageHeader 43006 package includes a MessageHeader 43008 entity.

The FundsManagementCentre 43012 package includes a FundsManagementCentre 43014 entity. The FundsManagementCentre 43012 package includes various packages, namely an AuthorisationGroup 43036 package, a Contact 43048 package and a FundsManagementCentreName 43064 package.

The FundsManagementCentre 43014 entity includes various attributes, namely a FundsManagementAreaID 43016 attribute, an ID 43020 attribute, a SuperordinateFundsManagementCentreID 43024 attribute, a ChangeStateID 43028 attribute and a ValidityPeriod 43032 attribute. The FundsManagementAreaID 43016 attribute is a FundsManagementAreaID 43018 data type. The ID 43020 attribute is a FundsManagementCentreID 43022 data type. The SuperordinateFundsManagementCentreID 43024 attribute is a FundsManagementCentreID 43026 data type. The ChangeStateID 43028 attribute is a ChangeStateID 43030 data type. The ValidityPeriod 43032 attribute is a CLOSED_DatePeriod 43034 data type.

The AuthorisationGroup 43036 package includes an AuthorisationGroup 43038 entity. The AuthorisationGroup 43038 entity includes various attributes, namely an AuthorisationGroupCode 43040 attribute and a ValidityPeriod 43044 attribute. The AuthorisationGroupCode 43040 attribute is an AuthorisationGroupCode 43042 data type. The ValidityPeriod 43044 attribute is a CLOSED_DatePeriod 43046 data type.

The Contact 43048 package includes a Contact 43050 entity. The Contact 43050 entity includes various attributes, namely a UserAccountID 43052 attribute, a ValidityPeriod 43056 attribute and a PersonFormattedName 43060 attribute. The UserAccountID 43052 attribute is a UserAccountID 43054 data type. The ValidityPeriod 43056 attribute is a CLOSED_DatePeriod 43058 data type. The PersonFormattedName 43060 attribute is a PersonFormattedName 43062 data type.

The FundsManagementCentreName 43064 package includes a FundsManagementCentreName 43066 entity. The FundsManagementCentreName 43066 entity includes various attributes, namely a ValidityPeriod 43068 attribute, a Name 43072 attribute and a Description 43076 attribute. The ValidityPeriod 43068 attribute is a CLOSED_DatePeriod 43070 data type. The Name 43072 attribute is a FundsManagementCentreName 43074 data type. The Description 43076 attribute is a FundsManagementCentreDescription 43078 data type.

The Log 43080 package is a Log 43084 data type. The Log 43080 package includes a Log 43082 entity.

FIGS. 44-1 through 44-3 illustrate one example logical configuration of a FundsManagementCentreERPCreateRequestMessage_sync 44000 element structure. Specifically, these figures depict the arrangement and hierarchy of various components such as one or more levels of packages, entities, and datatypes, shown here as 44000 through 44080. As described above, packages may be used to represent hierarchy levels. Entities are discrete business elements that are used during a business transaction. Data types are used to type object entities and interfaces with a structure. For example, the FundsManagementCentreERPCreateRequestMessage_sync 44000 includes, among other things, a FundsManagementCentreERPCreateRequestMessage_sync 44002. Accordingly, heterogeneous applications may communicate using this consistent message configured as such. The data types of the various packages, entities, and attributes are described with respect to FIG. 43.

FIGS. 45-1 through 45-2 illustrate one example logical configuration of a FundsManagementCentreERPCreateConfirmationMessage_sync 45000 element structure. Specifically, these figures depict the arrangement and hierarchy of various components such as one or more levels of packages, entities, and datatypes, shown here as 45000 through 45032. As described above, packages may be used to represent hierarchy levels. Entities are discrete business elements that are used during a business transaction. Data types are used to type object entities and interfaces with a structure. For example, the FundsManagementCentreERPCreateConfirmationMessage_sync 45000 includes, among other things, a FundsManagementCentreERPCreateConfirmationMessage_sync 45002. Accordingly, heterogeneous applications may communicate using this consistent message configured as such. The data types of the various packages, entities, and attributes are described with respect to FIG. 43.

FIGS. 46-1 through 46-3 illustrate one example logical configuration of a FundsManagementCentreERPUpdateRequestMessage_sync 46000 element structure. Specifically, these figures depict the arrangement and hierarchy of various components such as one or more levels of packages, entities, and datatypes, shown here as 46000 through 46074. As described above, packages may be used to represent hierarchy levels. Entities are discrete business elements that are used during a business transaction. Data types are used to type object entities and interfaces with a structure. For example, the FundsManagementCentreERPUpdateRequestMessage_sync 46000 includes, among other things, a FundsManagementCentreERPUpdateRequestMessage_sync 46002. Accordingly, heterogeneous applications may communicate using this consistent message configured as such. The data types of the various packages, entities, and attributes are described with respect to FIG. 43.

FIGS. 47-1 through 47-2 illustrate one example logical configuration of a FundsManagementCentreERPUpdateConfirmationMessage_sync 47000 element structure. Specifically, these figures depict the arrangement and hierarchy of various components such as one or more levels of packages, entities, and datatypes, shown here as 47000 through 47032. As described above, packages may be used to represent hierarchy levels. Entities are discrete business elements that are used during a business transaction. Data types are used to type object entities and interfaces with a structure. For example, the FundsManagementCentreERPUpdateConfirmationMessage_sync 47000 includes, among other things, a FundsManagementCentreERPUpdateConfirmationMessage_sync 47002. Accordingly, heterogeneous applications may communicate using this consistent message configured as such. The data types of the various packages, entities, and attributes are described with respect to FIG. 43.

FIGS. 48-1 through 48-3 illustrate one example logical configuration of a FundsManagementCentreERPChangeRequestMessage_sync 48000 element structure. Specifically, these figures depict the arrangement and hierarchy of various components such as one or more levels of packages, entities, and datatypes, shown here as 48000 through 48070. As described above, packages may be used to represent hierarchy levels. Entities are discrete business elements that are used during a business transaction. Data types are used to type object entities and interfaces with a structure. For example, the FundsManagementCentreERPChangeRequestMessage_sync 48000 includes, among other things, a FundsManagementCentreERPChangeRequestMessage_sync 48002. Accordingly, heterogeneous applications may communicate using this consistent message configured as such. The data types of the various packages, entities, and attributes are described with respect to FIG. 43.

FIGS. 49-1 through 49-2 illustrate one example logical configuration of a FundsManagementCentreERPChnageConfirmationMessage_sync 49000 element structure. Specifically, these figures depict the arrangement and hierarchy of various components such as one or more levels of packages, entities, and datatypes, shown here as 49000 through 49032. As described above, packages may be used to represent hierarchy levels. Entities are discrete business elements that are used during a business transaction. Data types are used to type object entities and interfaces with a structure. For example, the FundsManagementCentreERPChnageConfirmationMessage_sync 49000 includes, among other things, a FundsManagementCentreERPChnageConfirmationMessage_sync 49002. Accordingly, heterogeneous applications may communicate using this consistent message configured as such. The data types of the various packages, entities, and attributes are described with respect to FIG. 43.

FIG. 50 illustrates one example logical configuration of a FundsManagementCentreERPByIDQueryMessage_sync 50000 element structure. Specifically, this figure depicts the arrangement and hierarchy of various components such as one or more levels of packages, entities, and datatypes, shown here as 50000 through 50020. As described above, packages may be used to represent hierarchy levels. Entities are discrete business elements that are used during a business transaction. Data types are used to type object entities and interfaces with a structure. For example, the FundsManagementCentreERPByIDQueryMessage_sync 50000 includes, among other things, a FundsManagementCentreERPByIDQueryMessage_sync 50002. Accordingly, heterogeneous applications may communicate using this consistent message configured as such. The data types of the various packages, entities, and attributes are described with respect to FIG. 43.

FIGS. 51-1 through 51-4 illustrate one example logical configuration of a FundsManagementCentreERPByIDResponseMessage_sync 51000 element structure. Specifically, these figures depict the arrangement and hierarchy of various components such as one or more levels of packages, entities, and datatypes, shown here as 51000 through 51084. As described above, packages may be used to represent hierarchy levels. Entities are discrete business elements that are used during a business transaction. Data types are used to type object entities and interfaces with a structure. For example, the FundsManagementCentreERPByIDResponseMessage_sync 51000 includes, among other things, a FundsManagementCentreERPByIDResponseMessage_sync 51002. Accordingly, heterogeneous applications may communicate using this consistent message configured as such. The data types of the various packages, entities, and attributes are described with respect to FIG. 43.

FIGS. 52-1 through 52-8 illustrate one example logical configuration of a FundsManagementCentreERPSimpleByElementsQueryMessage_sync 52000 element structure. Specifically, these figures depict the arrangement and hierarchy of various components such as one or more levels of packages, entities, and datatypes, shown here as 52000 through 52160. As described above, packages may be used to represent hierarchy levels. Entities are discrete business elements that are used during a business transaction. Data types are used to type object entities and interfaces with a structure. For example, the FundsManagementCentreERPSimpleByElementsQueryMessage_sync 52000 includes, among other things, a <MessageDataType>FundsManagementCentreERPSimpleByElementsQueryMessage_sync 52002. Accordingly, heterogeneous applications may communicate using this consistent message configured as such. The data types of the various packages, entities, and attributes are described with respect to FIG. 43.

FIGS. 53-1 through 53-2 illustrate one example logical configuration of a FundsManagementCentreERPSimpleByElementsResponseMessage_sync 53000 element structure. Specifically, these figures depict the arrangement and hierarchy of various components such as one or more levels of packages, entities, and datatypes, shown here as 53000 through 53036. As described above, packages may be used to represent hierarchy levels. Entities are discrete business elements that are used during a business transaction. Data types are used to type object entities and interfaces with a structure. For example, the FundsManagementCentreERPSimpleByElementsResponseMessage_sync 53000 includes, among other things, a FundsManagementCentreERPSimpleByElementsResponseMessage_sync 53002. Accordingly, heterogeneous applications may communicate using this consistent message configured as such. The data types of the various packages, entities, and attributes are described with respect to FIG. 43.

IndividualMaterial Interfaces

A maintenance technician uses details of individual material to plan and execute maintenance activities on them. The information can be obtained by querying for individual material based on ID, basic data or based on warranty information. Also, changes to individual material can be made.

FIGS. 54-1 through 54-4 illustrate an example IndividualMaterial business object model 54000. Specifically, this model depicts interactions among various components of the IndividualMaterial, as well as external components that interact with the IndividualMaterial (shown here as 54002 through 54010 and 54028 through 54042).

An IndividualMaterial is a material that occurs only once in the real world and is therefore uniquely identifiable. The business object Individual Material belongs to the process component Product Data Management. An IndividualMaterial describes an individual object that can be maintained independently. It has the information about the hierarchical relationship between the individual material and a parent individual material.

A number of composition relationships to subordinate nodes can exist, such as: IndividualMaterialHierarchyRelationship 54014, with a cardinality of 1:C; IndividualMaterialManufacturerInformation 54016, with a cardinality of 1:C; IndividualMaterialAddressInformation 54018, with a cardinality of 1:C; IndividualMaterialProperty 54020, with a cardinality of 1:CN; and IndividualMaterialAttachmentFolder 54024, with a cardinality of 1:C.

A number of inbound aggregation relationships can exist, such as 1) from the business object Business Partner_Template/node Customer, a <qualifier>Business Partner_TemplateCustomer relationship with a cardinality of C:CN; 2) from the business object Plant/node Plant, a <qualifier>PlantPlant relationship with a cardinality of C:CN; 3) from the business object Plant/node Plant, a <qualifier>PlantPlant relationship with a cardinality of C:CN; 4) from the business object Product_Template/node Material, a <qualifier>Product_TempateMaterial relationship with a cardinality of C:CN; 5) from the business object Resource_Template/node Work Centre, a <qualifier>Resource_TemplateWorkCentre relationship with a cardinality of C:CN; and 6) from the business object Resource_Template/node Work Centre, a <qualifier>Resource_TemplateWorkCentre relationship with a cardinality of C:CN.

A HierarchyRelationship is information about the hierarchical structure of an individual material. It describes the hierarchical relationship between the individual material and its parent individual material. A number of inbound aggregation relationships can exist, such as from the business object Individual Material/node Individual Material, an IndividualMaterialHierarchy relationship with a cardinality of 1:CN.

ManufacturerInformation gives information about the manufacturer of the individual material. Manufacturer information can include information such as manufacturer name, manufacturing country, manufacturer model number, manufacturer part number, manufacturer serial number, and construction year and month. A number of inbound aggregation relationships can exist, such as from the business object Business Partner_Template/node Business Partner, a <qualifier>BusinessPartner_TemplateBusinessPartner relationship with a cardinality of C:C.

AddressInformation specifies an address associated with an individual material. This address can be the delivery address of the physical location or the customer address of an individual material. A property describes the assignment of one or more values to a simple or complex property or to characteristics. A number of composition relationships to subordinate nodes can exist, such as to IndividualMaterialPropertyValuation 54022, with a cardinality of 1:CN.

Valuation includes one or more ValueGroups. A ValueGroup assigns one or more property values to a simple property. A ValueGroup assigns several ValueGroups, and thus their values, to a complex property. An IndividualMaterialAttachmentFolder (root) 54012 is the collection of all documents attached to a business object or a part of a business object. It includes administrative data and attached documents, which are in turn independent documents. A number of composition relationships to subordinate nodes can exist, such as to IndividualMaterialAttachmentFolderDocument 54026, with a cardinality of 1:CN. Document is a carrier of unstructured information and additional control and monitoring information. A number of inbound association relationships can exist, such as from the business object Document/node Document, a <qualifier>Document.document relationship.

Figure 55:
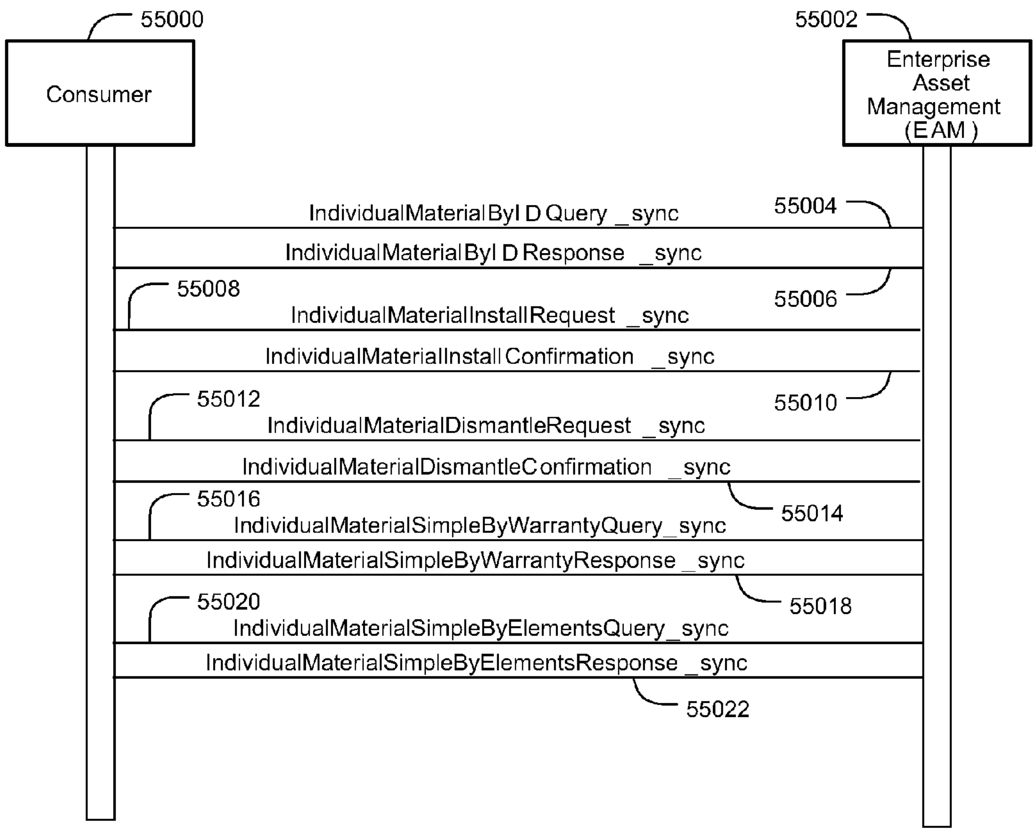
FIG. 55 shows an exemplary IndividualMaterial Message Choreography.

The message choreography of FIG. 55 describes a possible logical sequence of messages that can be used to realize an IndividualMaterial business scenario.

A "Consumer" system 55000 can query an individual material using an IndividualMaterialByIDQuery_sync message 55004 as shown, for example, in FIG. 55. An "Enterprise Asset Management (EAM)" system 55002 can respond to the query using an IndividualMaterialByIDResponse_sync message 55006 as shown, for example, in FIG. 55.

The "Consumer" system 55000 can request EAM to install an individual material at another individual material using an IndividualMaterialInstallRequest_sync message 55008 as shown, for example, in FIG. 55. The "Enterprise Asset Management (EAM)" system 55002 can confirm the request using an IndividualMaterialInstallConfirmation_sync message 55010 as shown, for example, in FIG. 55.

The "Consumer" system 55000 can request EAM to dismantle an individual material from a parent individual material using an IndividualMaterialDismantleRequest_sync message 55012 as shown, for example, in FIG. 55. The "Enterprise Asset Management (EAM)" system 55002 can confirm the request using an IndividualMaterialInstallConfirmation_sync message 55014 as shown, for example, in FIG. 55.

The "Consumer" system 55000 can request EAM to identify elements of individual materials based on warranty information using an IndividualMaterialSimpleByWarrantyQuery_sync message 55016 as shown, for example, in FIG. 55. The "Enterprise Asset Management (EAM)" system 55002 can respond to the query using an IndividualMaterialSimpleByWarrantyResponse_sync message 55018 as shown, for example, in FIG. 55.

The "Consumer" system 55000 can query elements of an individual material using an IndividualMaterialSimpleByElementsQuery_sync message 55020 as shown, for example, in FIG. 55. The "Enterprise Asset Management (EAM)" system 55002 can respond to the query using an IndividualMaterialSimpleByElementsResponse_sync message 55022 as shown, for example, in FIG. 55.

Figure 56:
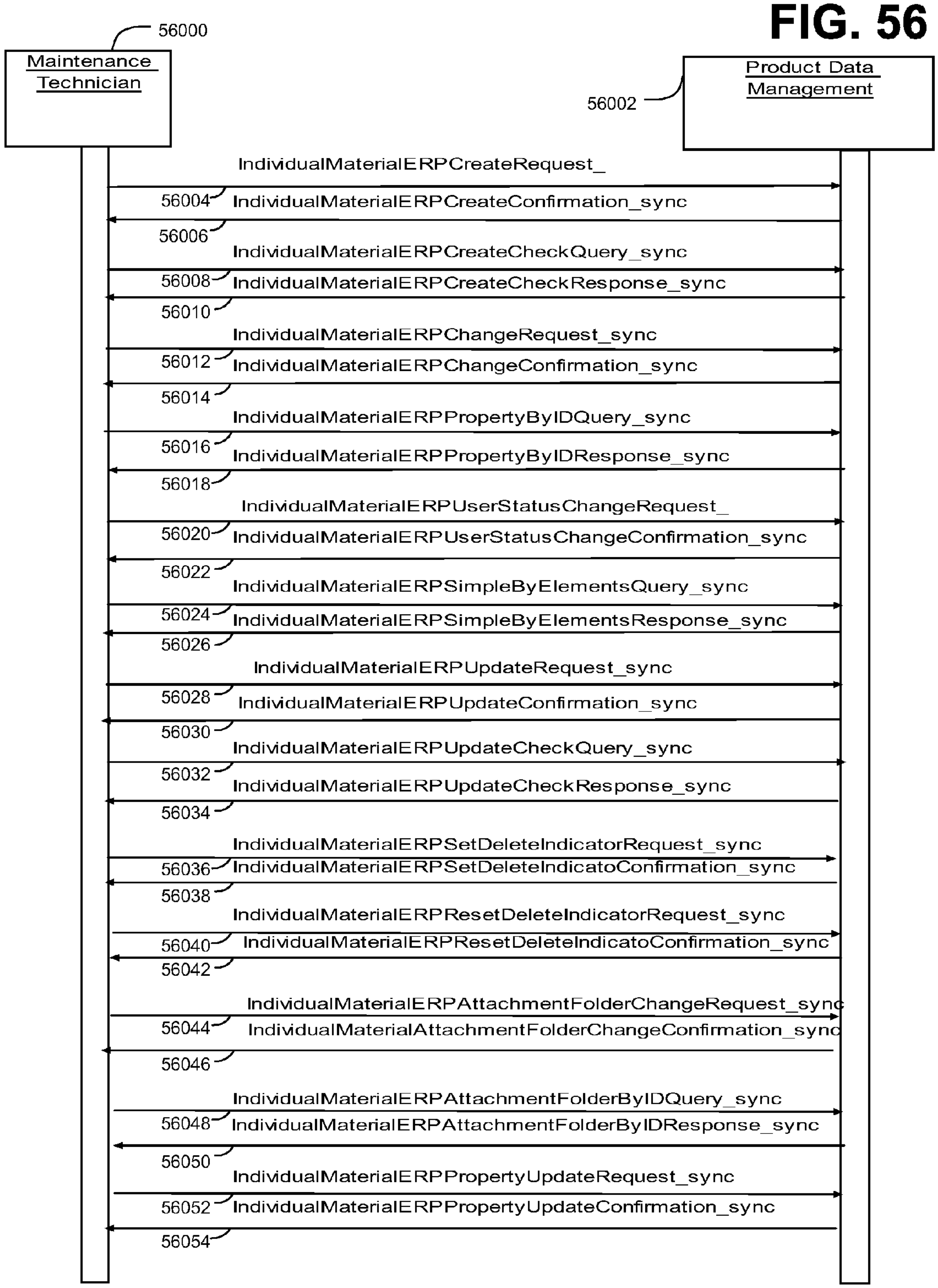
FIG. 56 shows an exemplary IndividualMaterialERP Message Choreography.

The message choreography of FIG. 56 describes another possible logical sequence of messages that can be used to realize an IndividualMaterial business scenario.

A "Maintenance Technician" system 56000 can request the creation of an individual material using an IndividualMaterialERPCreateRequest_sync message 56004 as shown, for example, in FIG. 56. A "Product Data Management" system 56002 can confirm the request using an IndividualMaterialERPCreateConfirmation_sync message 56006 as shown, for example, in FIG. 56.

The "Maintenance Technician" system 56000 can check the creation of an individual material using an IndividualMaterialERPCreateCheckQuery_sync message 56008 as shown, for example, in FIG. 56. The "Product Data Management" system 56002 can confirm the request using an IndividualMaterialERPCreateCheckResponse_sync message 56010 as shown, for example, in FIG. 56.

The "Maintenance Technician" system 56000 can request the change of an individual material using an IndividualMaterialERPChangeRequest_sync message 56012 as shown, for example, in FIG. 56. The "Product Data Management" system 56002 can confirm the request using an IndividualMaterialERPChangeConfirmation_sync message 56014 as shown, for example, in FIG. 56.

The "Maintenance Technician" system 56000 can query an individual material by ID using an IndividualMaterialERPPropertyByIDQuery_sync message 56016 as shown, for example, in FIG. 56. The "Product Data Management" system 56002 can confirm the request using an IndividualMaterialERPPropertyByIDResponse_sync message 56018 as shown, for example, in FIG. 56.

The "Maintenance Technician" system 56000 can request to change user status information on an individual material using an IndividualMaterialERPUserStatusChangeRequest_sync message 56020 as shown, for example, in FIG. 56. The "Product Data Management" system 56002 can confirm the request using an IndividualMaterialERPUserStatusChangeConfirmation_sync message 56022 as shown, for example, in FIG. 56.

The "Maintenance Technician" system 56000 can query an individual material by elements using an IndividualMaterialERPSimpleByElementsQuery_sync message 56024 as shown, for example, in FIG. 56. The "Product Data Management" system 56002 can confirm the request using an IndividualMaterialERPSimpleByElementsResponse_sync message 56026 as shown, for example, in FIG. 56.

The "Maintenance Technician" system 56000 can request the update of an individual material using an IndividualMaterialERPUpdateRequest_sync message 56028 as shown, for example, in FIG. 56. The "Product Data Management" system 56002 can confirm the request using an IndividualMaterialERPUpdateConfirmation_sync message 56030 as shown, for example, in FIG. 56.

The "Maintenance Technician" system 56000 can check the update of an individual material using an IndividualMaterialERPUpdateCheckQuery_sync message 56032 as shown, for example, in FIG. 56. The "Product Data Management" system 56002 can confirm the request using an IndividualMaterialERPUpdateCheckResponse_sync message 56034 as shown, for example, in FIG. 56.

The "Maintenance Technician" system 56000 can request to set the delete indicator on an individual material using an IndividualMaterialERPSetDeleteIndicatorRequest_sync message 56036 as shown, for example, in FIG. 56. The "Product Data Management" system 56002 can confirm the request using an IndividualMaterialERPSetDeleteIndicatorConfirmation_sync message 56038 as shown, for example, in FIG. 56.

The "Maintenance Technician" system 56000 can request to reset the delete indicator on an individual material using an IndividualMaterialERPResetDeleteIndicatorRequest_sync message 56040 as shown, for example, in FIG. 56. The "Product Data Management" system 56002 can confirm the request using an IndividualMaterialERPResetDeleteIndicatorConfirmation_sync message 56042 as shown, for example, in FIG. 56.

The "Maintenance Technician" system 56000 can request to change an individual material attachment folder using an IndividualMaterialERPAttachmentFolderChangeRequest_sync message 56044 as shown, for example, in FIG. 56. The "Product Data Management" system 56002 can confirm the request using an IndividualMaterialERPAttachmentFolderChangeConfirmation_sync message 56046 as shown, for example, in FIG. 56.

The "Maintenance Technician" system 56000 can query an individual material attachment folder by ID using an IndividualMaterialERPAttachmentFolderByIDQuery_sync message 56048 as shown, for example, in FIG. 56. The "Product Data Management" system 56002 can respond to the query using an IndividualMaterialERPAttachmentFolderByIDResponse_sync message 56050 as shown, for example, in FIG. 56.

The "Maintenance Technician" system 56000 can request to update the property of an individual material using an IndividualMaterialERPPropertyUpdateRequest_sync message 56052 as shown, for example, in FIG. 56. The "Product Data Management" system 56002 can confirm the request using an IndividualMaterialERPPropertyUpdateConfirmation_sync message 56054 as shown, for example, in FIG. 56.

An IndividualMaterialByIDQuery_sync is an inquiry to Enterprise Asset Management for an individual material. The structure of the message type IndividualMaterialByIDQuery_sync is specified by the message data type IndividualMaterialByIDQueryMessage_sync.

An IndividualMaterialByIDResponse_sync is a response from Enterprise Asset Management to an IndividualMaterialByIDQuery_sync. The structure of the message type IndividualMaterialByIDResponse_sync is specified by the message data type IndividualMaterialByIDResponseMessage_sync, which is derived from the message data type IndividualMaterialMessage_sync.

An IndividualMaterialInstallRequest_sync is a request to Enterprise Asset Management to install an individual material at another individual material. The structure of the message type IndividualMaterialInstallRequest_sync is specified by the message data type IndividualMaterialInstallRequestMessage_sync, which is derived from the message data type IndividualMaterialMessage_sync.

An IndividualMaterialInstallConfirmation_sync is a confirmation from Enterprise Asset Management to an IndividualMaterialInstallRequest_sync. The structure of the message type IndividualMaterialInstallConfirmation_sync is specified by the message data type IndividualMaterialInstallConfirmationMessage_sync, which is derived from the message data type IndividualMaterialMessage_sync.

An IndividualMaterialDismantleRequest_sync is a request to Enterprise Asset Management to dismantle an individual material from a parent individual material. The structure of the message type IndividualMaterialDismantleRequest_sync is specified by the message data type IndividualMaterialDismantleRequestMessage_sync, which is derived from the message data type IndividualMaterialMessage_sync.

An IndividualMaterialDismantleConfirmation_sync is a confirmation from Enterprise Asset Management to an IndividualMaterialDismantleRequest_sync. The structure of the message type IndividualMaterialDismantleConfirmation_sync is specified by the message data type IndividualMaterialDismantleConfirmationMessage_sync, which is derived from the message data type IndividualMaterialMessage_sync.

An IndividualMaterialSimpleByWarrantyQuery_sync is an inquiry to Enterprise Asset Management for identifying elements of individual materials based on warranty information. The structure of the message type IndividualMaterialSimpleByWarrantyQuery_sync is specified by the message data type IndividualMaterialSimpleByWarrantyQueryMessage_sync.

An IndividualMaterialSimpleByWarrantyResponse_sync is a response from Enterprise Asset Management to an IndividualMaterialSimpleByWarrantyQuery_sync. The structure of the message type IndividualMaterialSimpleByWarrantyResponse_sync is specified by the message data type IndividualMaterialSimpleByWarrantyResponseMessage_sync, which is derived from the message data type IndividualMaterialMessage_sync.

An IndividualMaterialSimpleByElementsQuery_sync is an inquiry to Enterprise Asset Management for identifying elements of individual material. The structure of the message type IndividualMaterialSimpleByElementsQuery_sync is specified by the message data type IndividualMaterialSimpleByElementsQueryMessage_sync.

An IndividualMaterialSimpleByElementsResponse_sync is a response from Enterprise Asset Management for an IndividualMaterialSimpleByElementsQuery_sync. The structure of the message type IndividualMaterialSimpleByElementsResponse_sync is specified by the message data type IndividualMaterialSimpleByElementsResponseMessage_sync, which is derived from the message data type IndividualMaterialMessage_sync. An example of a Consumer is a maintenance technician.

A number of interfaces can be included, such as: IndividualMaterialByIDQueryResponse_In, IndividualMaterialInstallRequestConfirmation_In, IndividualMaterialDismantleRequestConfirmation_In, IndividualMaterialSimpleByWarrantyQueryResponse_In, and IndividualMaterialSimpleByElementsQueryResponse_In.

Figure 57:
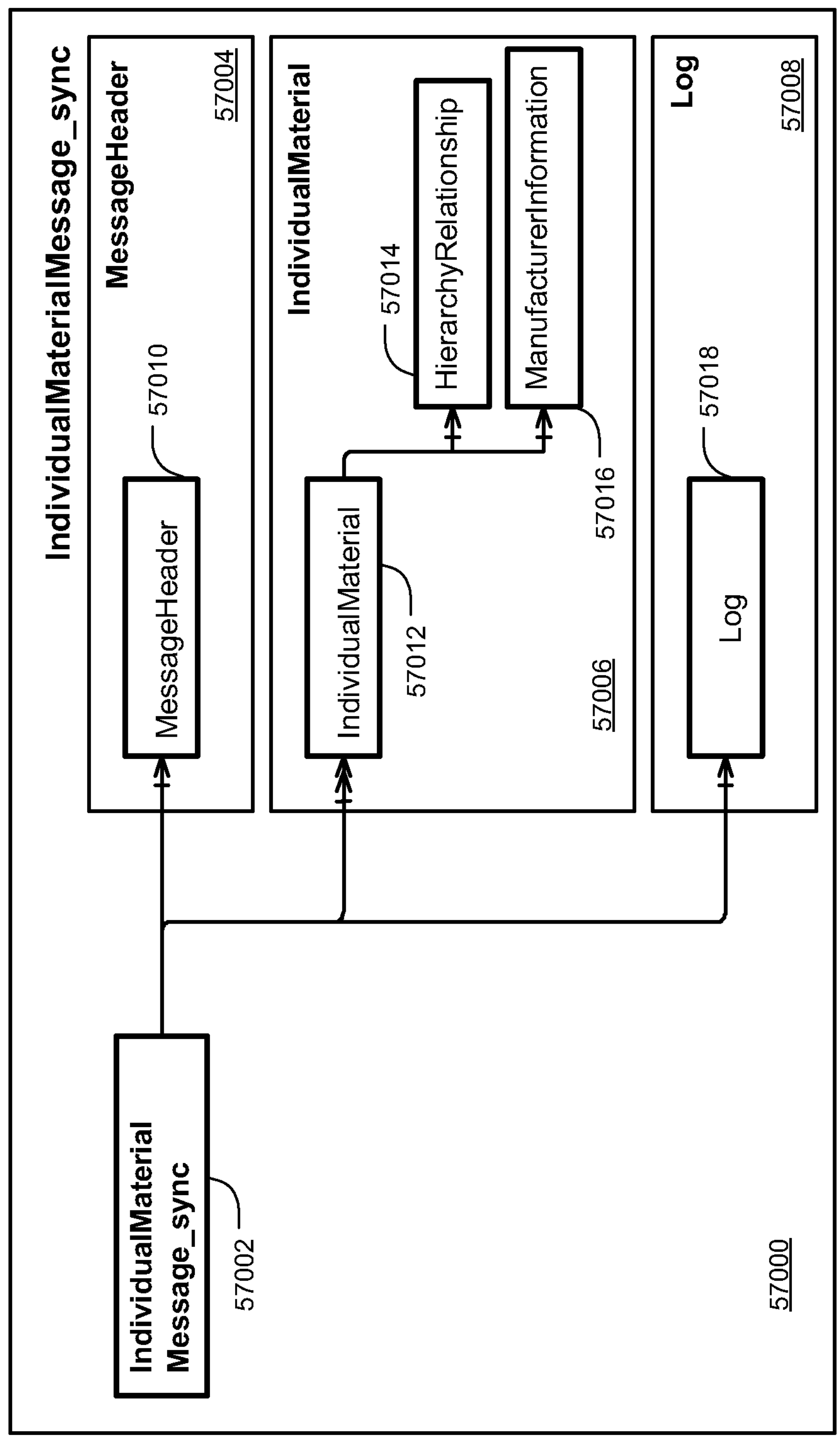
FIG. 57 shows an exemplary IndividualMaterialMessage_sync Message Data Type.

FIG. 57 illustrates one example logical configuration of IndividualMaterialMessage_sync message 57000. Specifically, this figure depicts the arrangement and hierarchy of various components such as one or more levels of packages, entities, and datatypes, shown here as 57000 through 57018. As described above, packages may be used to represent hierarchy levels. Entities are discrete business elements that are used during a business transaction. Data types are used to type object entities and interfaces with a structure. For example, IndividualMaterialMessage_sync message 57000 includes, among other things, IndividualMaterial 57006. Accordingly, heterogeneous applications may communicate using this consistent message configured as such.

Figure 58:
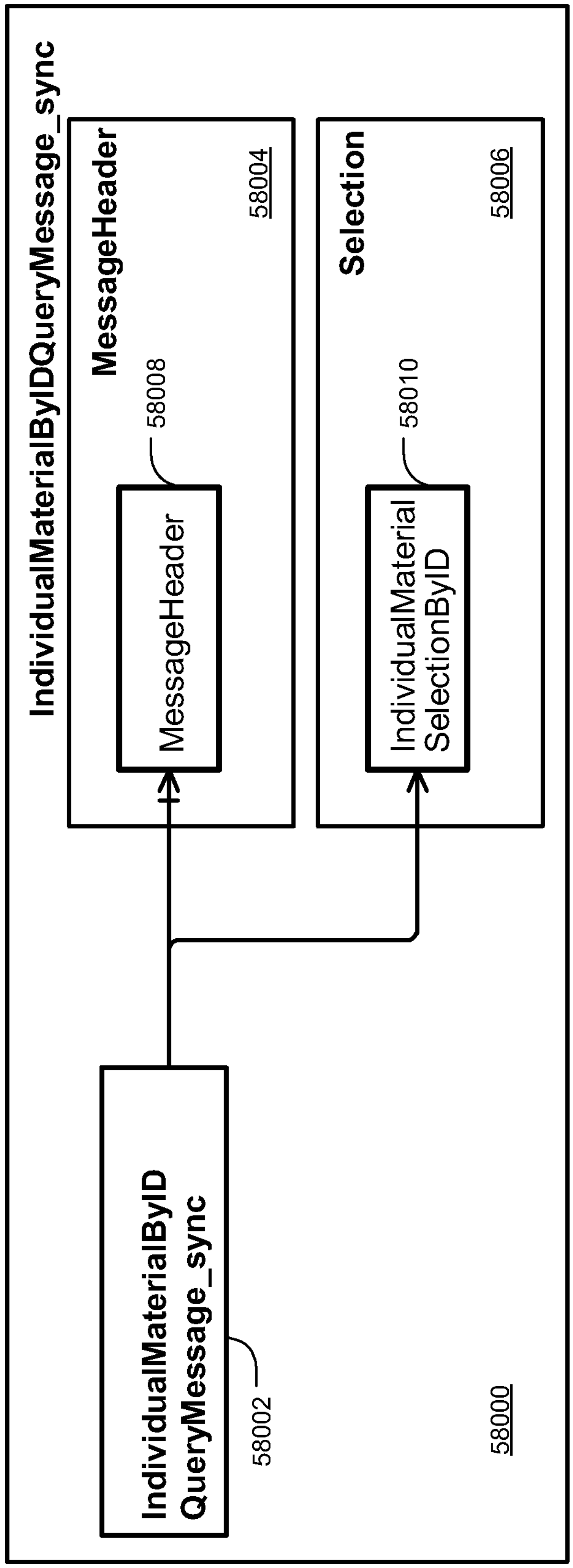
FIG. 58 shows an exemplary IndividualMaterialByIDQueryMessage_sync Message Data Type.

Additionally, FIG. 58 illustrates one example logical configuration of IndividualMaterialByIDQueryMessage_sync message 58000. Specifically, this figure depicts the arrangement and hierarchy of various components such as one or more levels of packages, entities, and datatypes, shown here as 58000 through 58010. As described above, packages may be used to represent hierarchy levels. Entities are discrete business elements that are used during a business transaction. Data types are used to type object entities and interfaces with a structure. For example, IndividualMaterialByIDQueryMessage_sync message 58000 includes, among other things, Selection 58006. Accordingly, heterogeneous applications may communicate using this consistent message configured as such.

Figure 59:
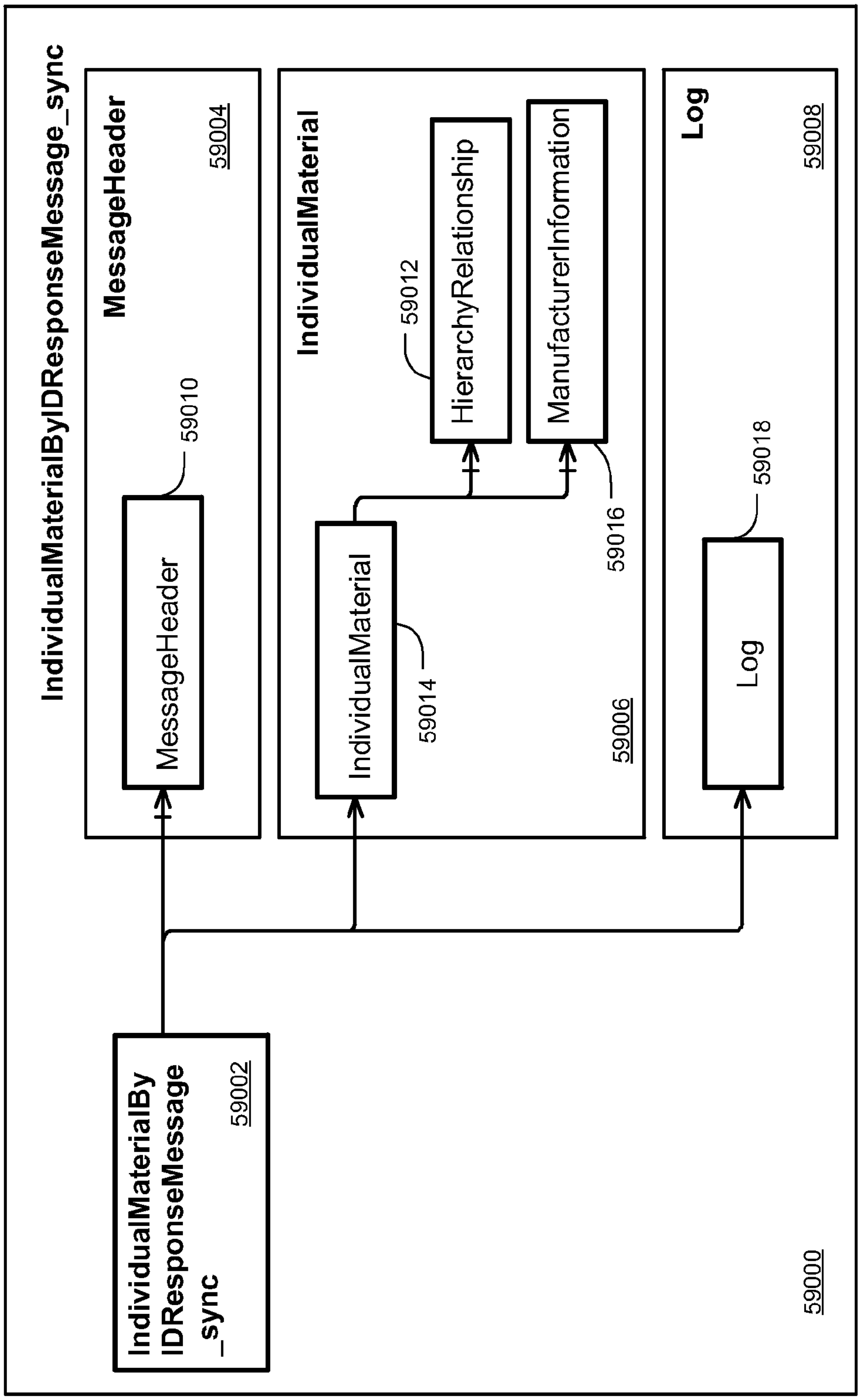
FIG. 59 shows an exemplary IndividualMaterialByIDResponseMessage_sync Message Data Type.

Additionally, FIG. 59 illustrates one example logical configuration of IndividualMaterialByIDResponseMessage_sync message 59000. Specifically, this figure depicts the arrangement and hierarchy of various components such as one or more levels of packages, entities, and datatypes, shown here as 59000 through 59018. As described above, packages may be used to represent hierarchy levels. Entities are discrete business elements that are used during a business transaction. Data types are used to type object entities and interfaces with a structure. For example, IndividualMaterialByIDResponseMessage_sync message 59000 includes, among other things, IndividualMaterial 59006. Accordingly, heterogeneous applications may communicate using this consistent message configured as such.

Figure 60:
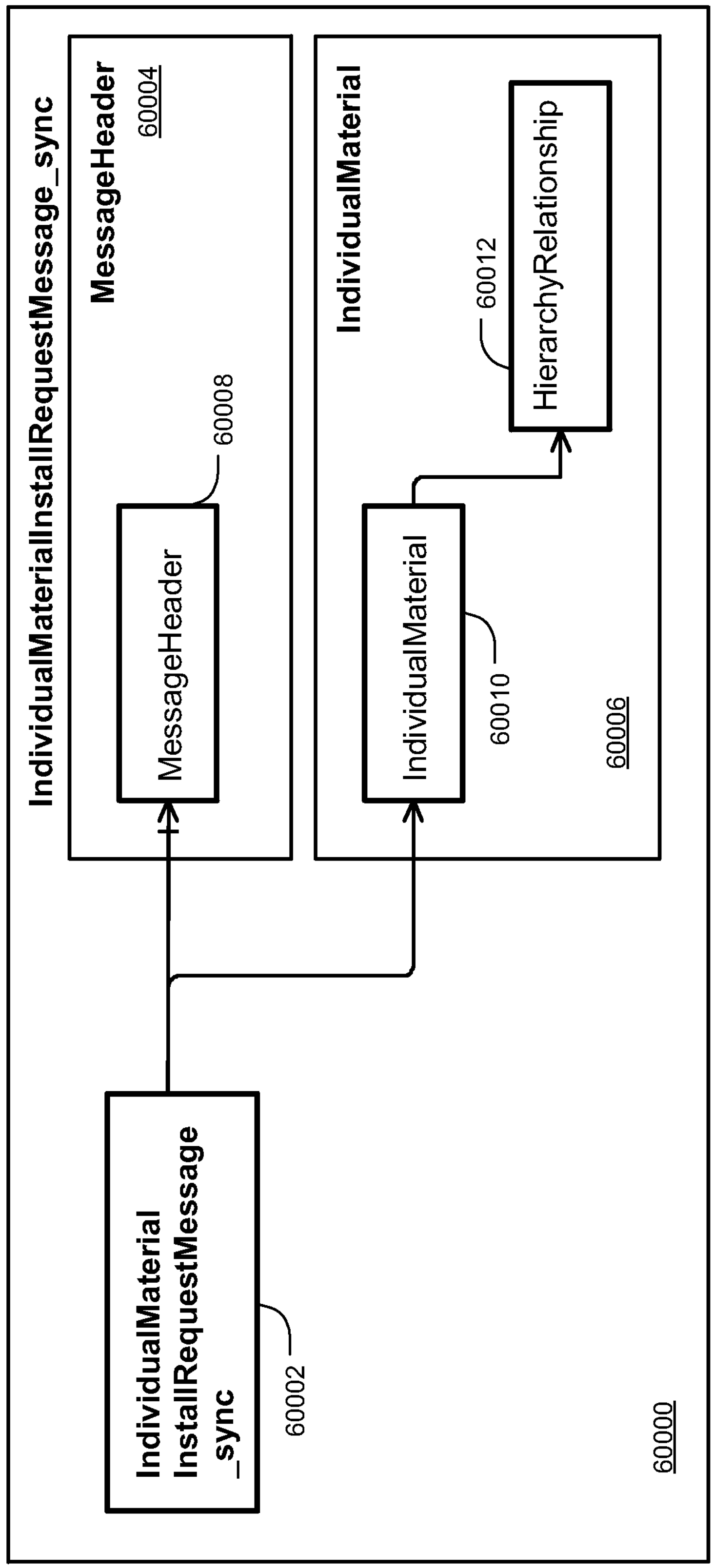
FIG. 60 shows an exemplary IndividualMaterialInstallRequestMessage_sync Message Data Type.

Additionally, FIG. 60 illustrates one example logical configuration of IndividualMaterialInstallRequestMessage_sync message 60000. Specifically, this figure depicts the arrangement and hierarchy of various components such as one or more levels of packages, entities, and datatypes, shown here as 60000 through 60012. As described above, packages may be used to represent hierarchy levels. Entities are discrete business elements that are used during a business transaction. Data types are used to type object entities and interfaces with a structure. For example, IndividualMaterialInstallRequestMessage_sync message 60000 includes, among other things, IndividualMaterial 60006. Accordingly, heterogeneous applications may communicate using this consistent message configured as such.

Figure 61:
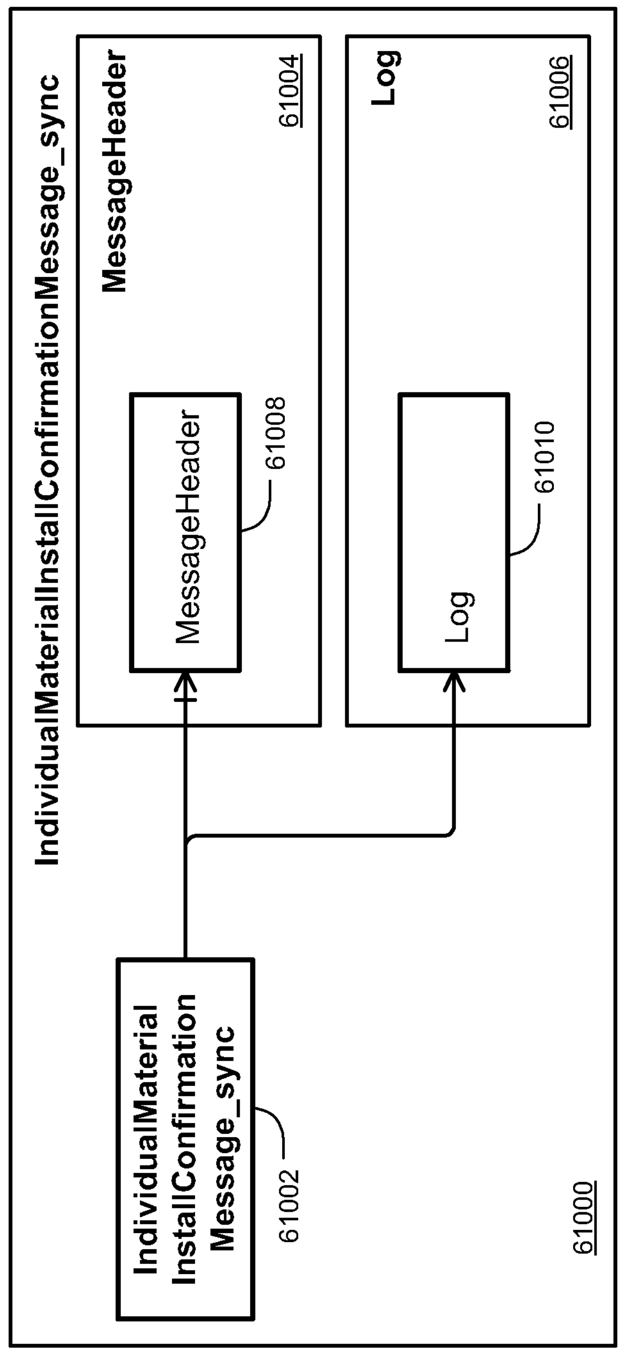
FIG. 61 shows an exemplary IndividualMaterialInstallConfirmationMessage_sync Message Data Type.

Additionally, FIG. 61 illustrates one example logical configuration of IndividualMaterialInstallConfirmationMessage_sync message 61000. Specifically, this figure depicts the arrangement and hierarchy of various components such as one or more levels of packages, entities, and datatypes, shown here as 61000 through 61010. As described above, packages may be used to represent hierarchy levels. Entities are discrete business elements that are used during a business transaction. Data types are used to type object entities and interfaces with a structure. For example, IndividualMaterialInstallConfirmationMessage_sync message 61000 includes, among other things, Log 61006. Accordingly, heterogeneous applications may communicate using this consistent message configured as such.

Figure 62:
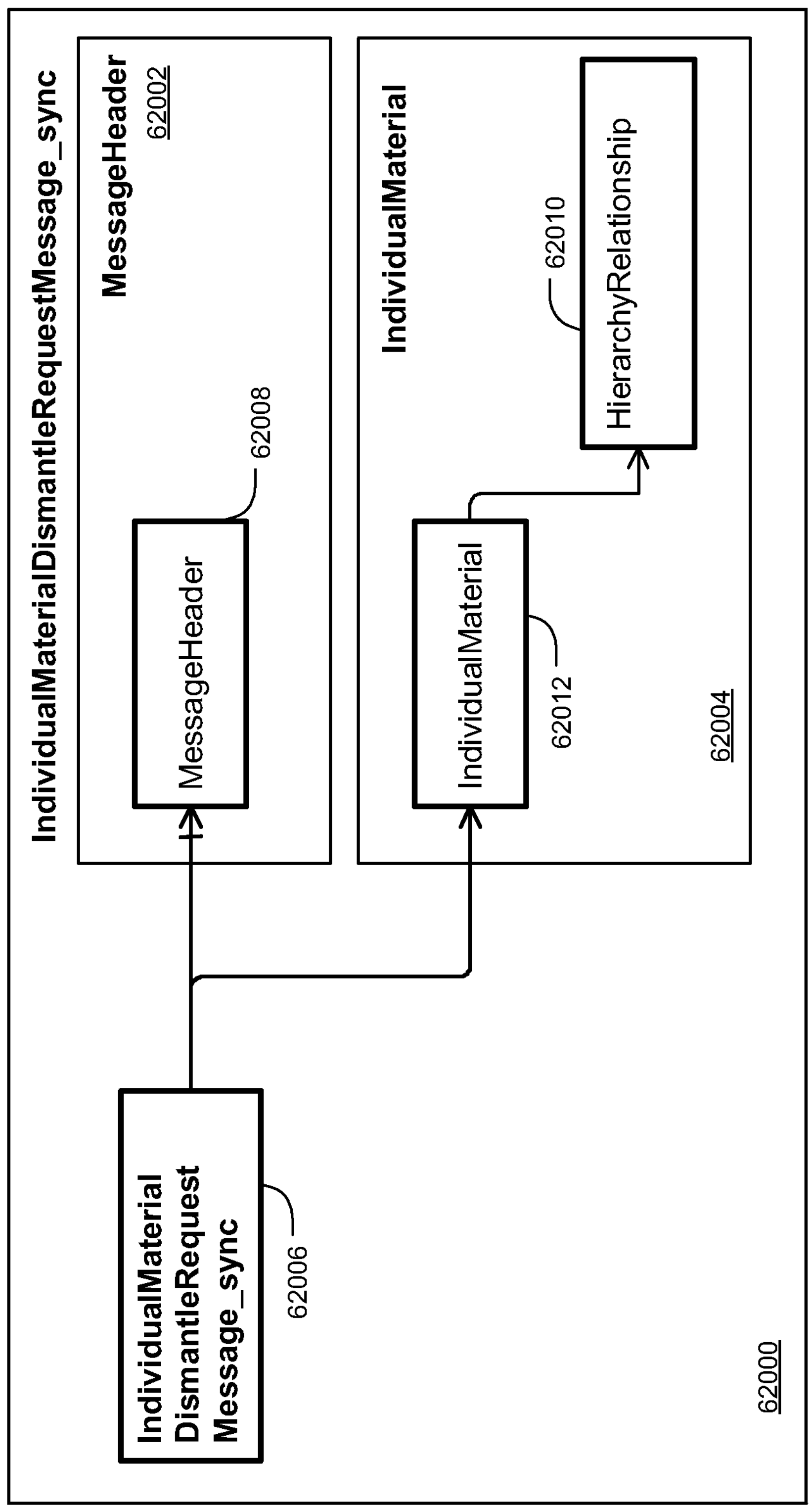
FIG. 62 shows an exemplary IndividualMaterialDismantleRequestMessage_sync Message Data Type.

Additionally, FIG. 62 illustrates one example logical configuration of IndividualMaterialDismantleRequestMessage_sync message 62000. Specifically, this figure depicts the arrangement and hierarchy of various components such as one or more levels of packages, entities, and datatypes, shown here as 62000 through 62010. As described above, packages may be used to represent hierarchy levels. Entities are discrete business elements that are used during a business transaction. Data types are used to type object entities and interfaces with a structure. For example, IndividualMaterialDismantleRequestMessage_sync message 62000 includes, among other things, IndividualMaterial 62004. Accordingly, heterogeneous applications may communicate using this consistent message configured as such.

Figure 63:
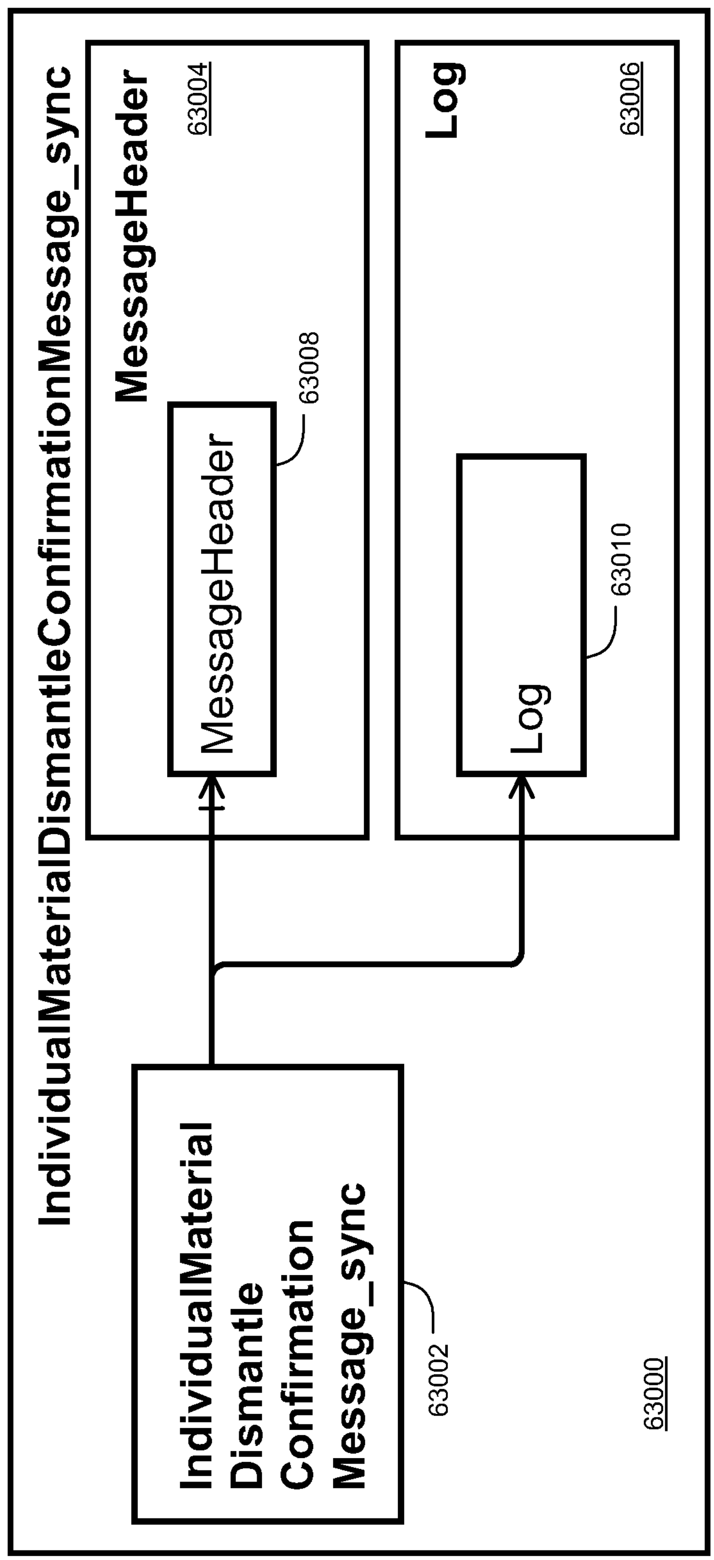
FIG. 63 shows an exemplary IndividualMaterialDismantleConfirmationMessage_sync Message Data Type.

Additionally, FIG. 63 illustrates one example logical configuration of IndividualMaterialDismantleConfirmationMessage_sync message 63000. Specifically, this figure depicts the arrangement and hierarchy of various components such as one or more levels of packages, entities, and datatypes, shown here as 63000 through 63010. As described above, packages may be used to represent hierarchy levels. Entities are discrete business elements that are used during a business transaction. Data types are used to type object entities and interfaces with a structure. For example, IndividualMaterialDismantleConfirmationMessage_sync message 63000 includes, among other things, Log 63006. Accordingly, heterogeneous applications may communicate using this consistent message configured as such.

Figure 64:
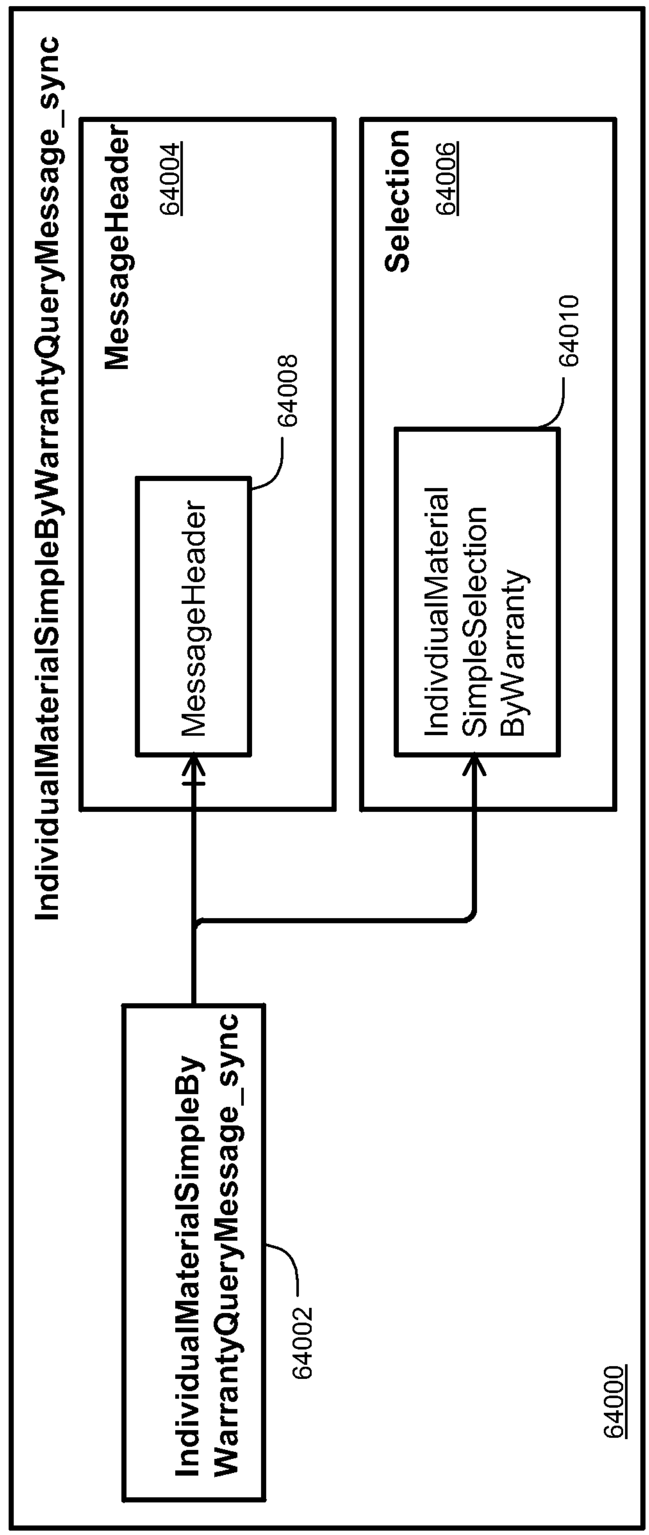
FIG. 64 shows an exemplary IndividualMaterialSimpleByWarrantyQueryMessage_sync Message Data Type.

Additionally, FIG. 64 illustrates one example logical configuration of IndividualMaterialSimpleByWarrantyQueryMessage_sync message 64000. Specifically, this figure depicts the arrangement and hierarchy of various components such as one or more levels of packages, entities, and datatypes, shown here as 64000 through 64010. As described above, packages may be used to represent hierarchy levels. Entities are discrete business elements that are used during a business transaction. Data types are used to type object entities and interfaces with a structure. For example, IndividualMaterialSimpleByWarrantyQueryMessage_sync message 64000 includes, among other things, Selection 64006. Accordingly, heterogeneous applications may communicate using this consistent message configured as such.

Figure 65:
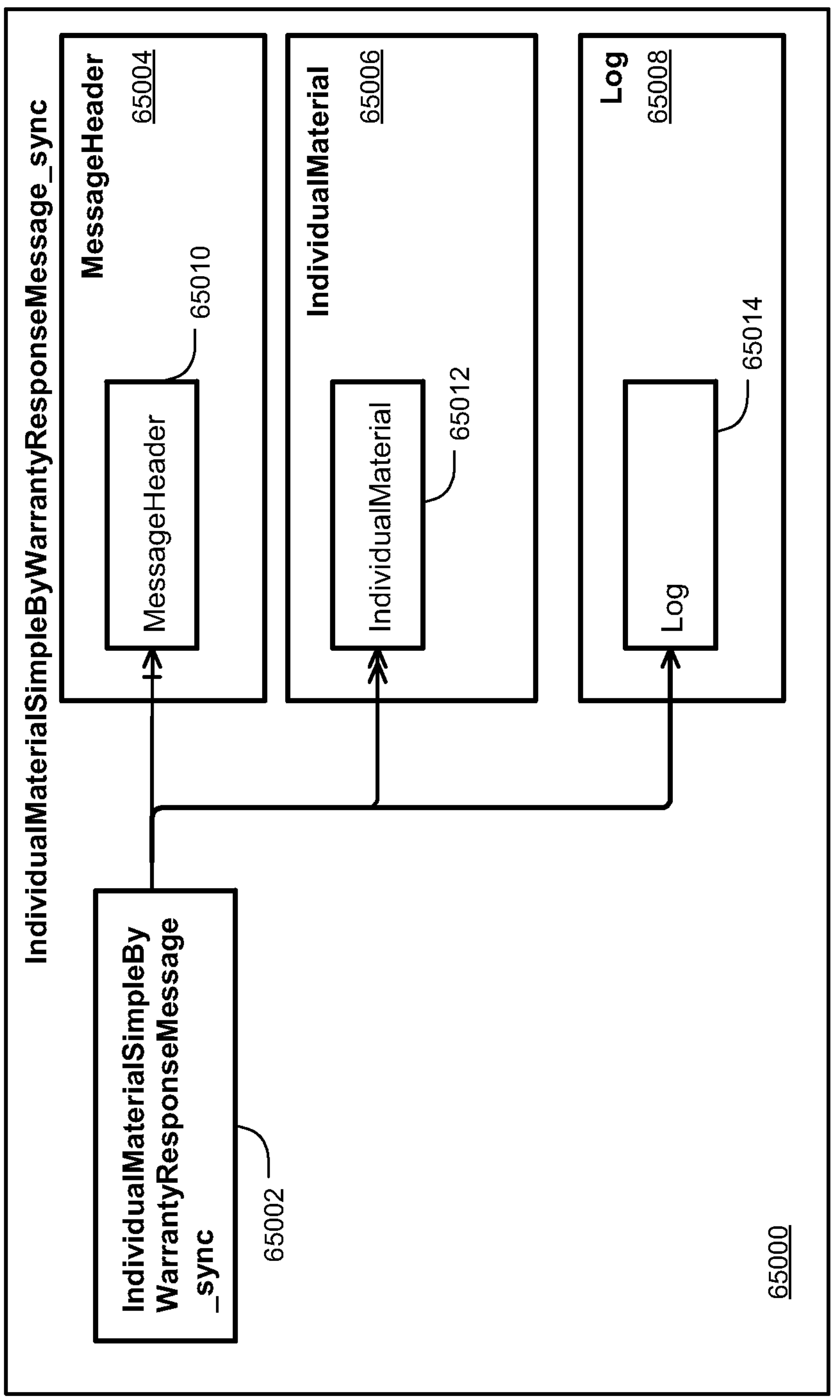
FIG. 65 shows an exemplary IndividualMaterialSimpleByWarrantyResponseMessage_sync Message Data Type.

Additionally, FIG. 65 illustrates one example logical configuration of IndividualMaterialSimpleByWarrantyResponseMessage_sync message 65000. Specifically, this figure depicts the arrangement and hierarchy of various components such as one or more levels of packages, entities, and datatypes, shown here as 65000 through 65014. As described above, packages may be used to represent hierarchy levels. Entities are discrete business elements that are used during a business transaction. Data types are used to type object entities and interfaces with a structure. For example, IndividualMaterialSimpleByWarrantyResponseMessage_sync message 65000 includes, among other things, IndividualMaterial 65006. Accordingly, heterogeneous applications may communicate using this consistent message configured as such.

Figure 66:
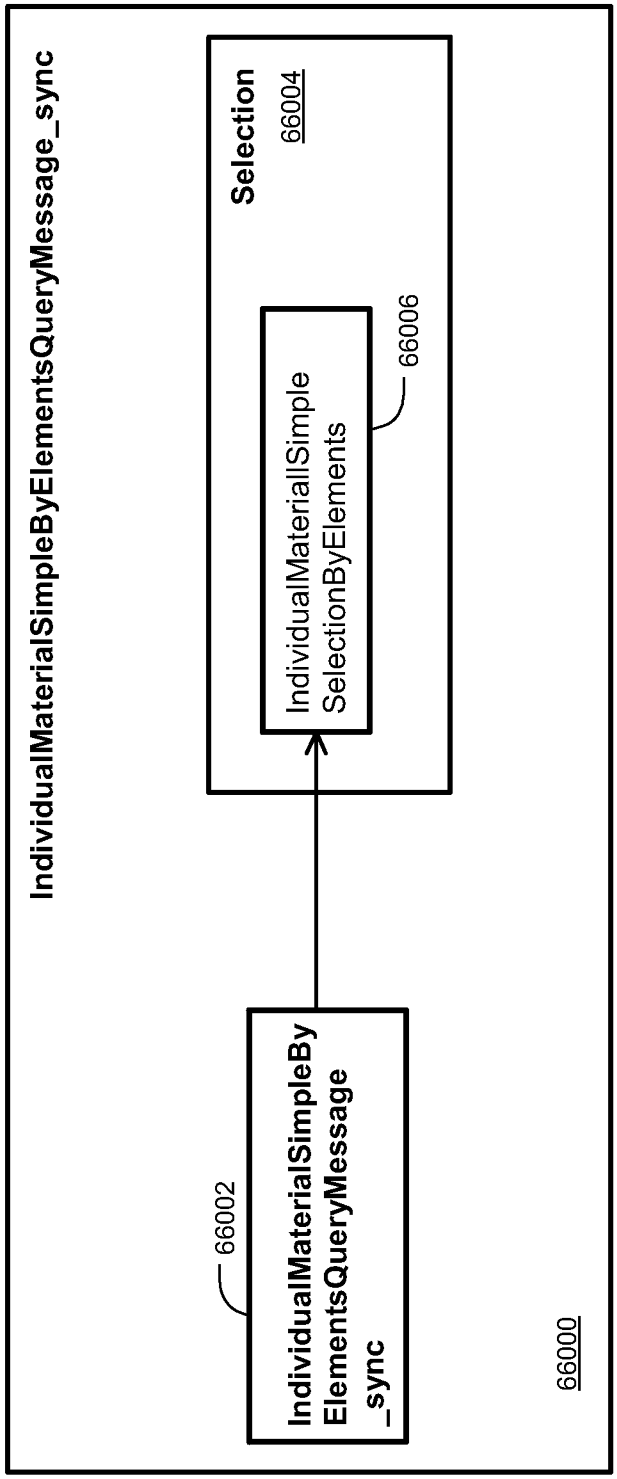
FIG. 66 shows an exemplary IndividualMaterialSimpleByElementsQueryMessage_sync Message Data Type.

Additionally, FIG. 66 illustrates one example logical configuration of IndividualMaterialSimpleByElementsQueryMessage_sync message 66000. Specifically, this figure depicts the arrangement and hierarchy of various components such as one or more levels of packages, entities, and datatypes, shown here as 66000 through 66006. As described above, packages may be used to represent hierarchy levels. Entities are discrete business elements that are used during a business transaction. Data types are used to type object entities and interfaces with a structure. For example, IndividualMaterialSimpleByElementsQueryMessage_sync message 66000 includes, among other things, Selection 66004. Accordingly, heterogeneous applications may communicate using this consistent message configured as such.

Figure 67:
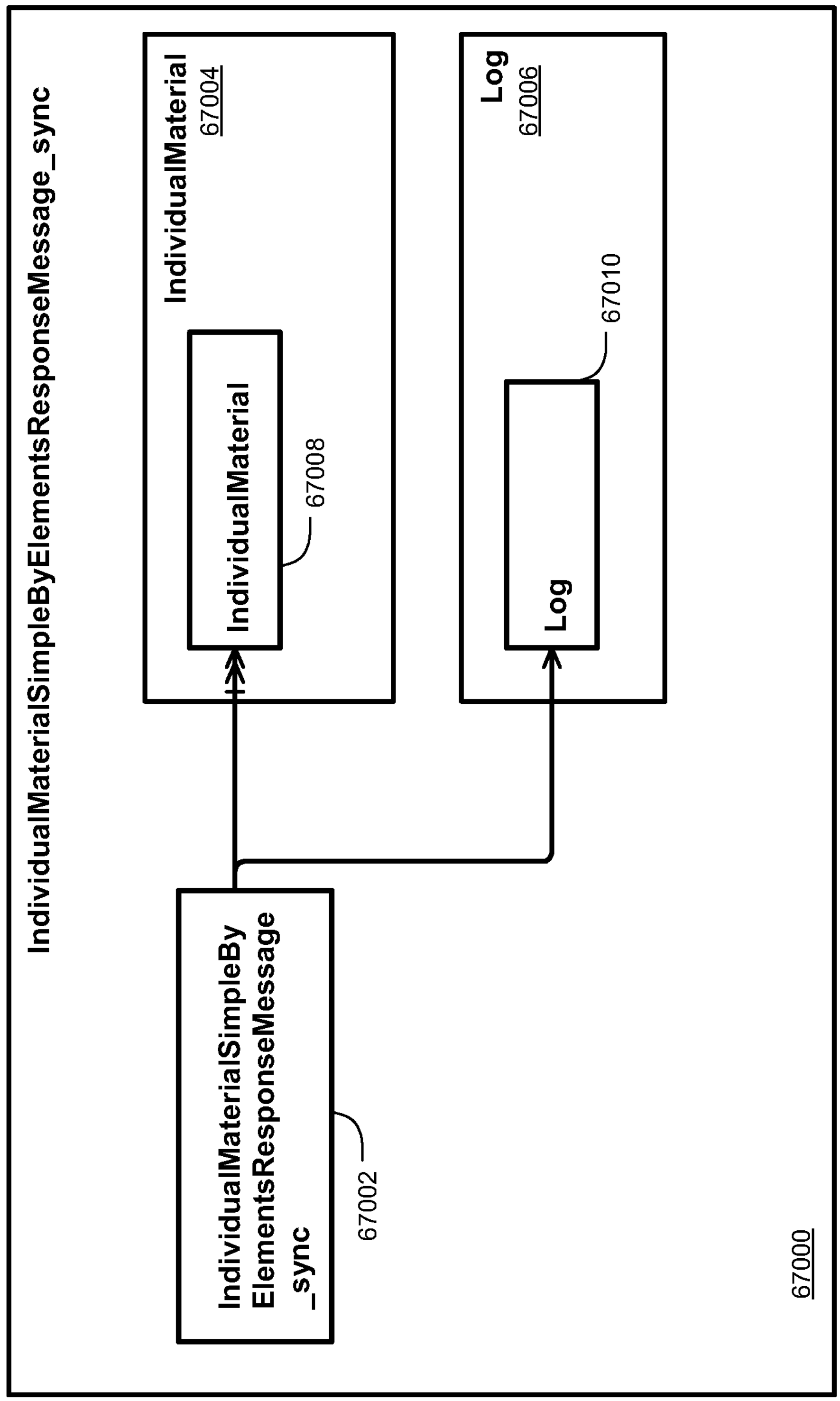
FIG. 67 shows an exemplary IndividualMaterialSimpleByElementsResponseMessage_sync Message Data Type.

Additionally, FIG. 67 illustrates one example logical configuration of IndividualMaterialSimpleByElementsResponseMessage_sync message 67000. Specifically, this figure depicts the arrangement and hierarchy of various components such as one or more levels of packages, entities, and datatypes, shown here as 67000 through 67010. As described above, packages may be used to represent hierarchy levels. Entities are discrete business elements that are used during a business transaction. Data types are used to type object entities and interfaces with a structure. For example, IndividualMaterialSimpleByElementsResponseMessage_sync message 67000 includes, among other things, Log 67006. Accordingly, heterogeneous applications may communicate using this consistent message configured as such.

Figure 68:
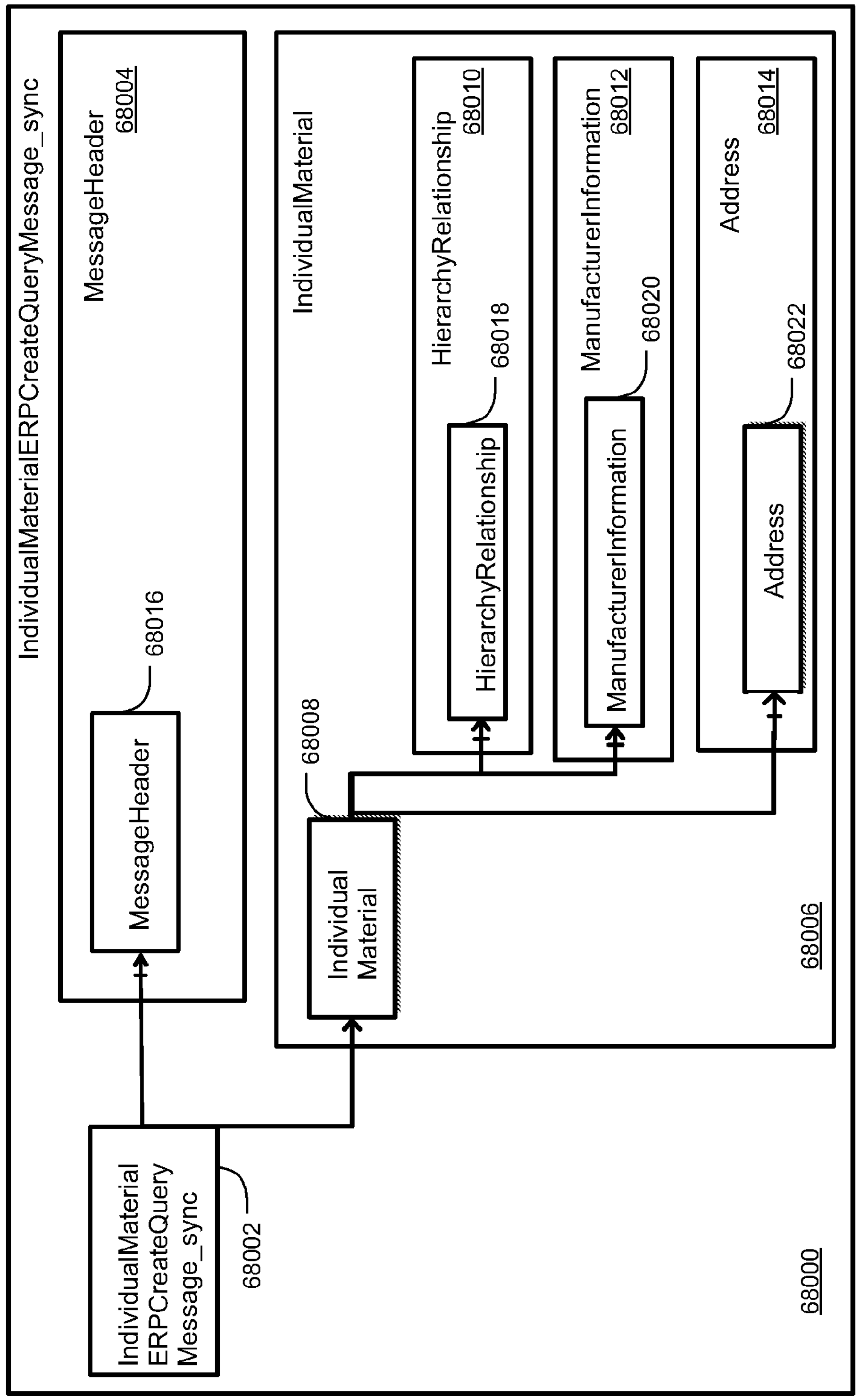
FIG. 68 shows an exemplary IndividualMaterialERPCreateRequestMessage_sync Message Data Type.

Additionally, FIG. 68 illustrates one example logical configuration of IndividualMaterialERPCreateQueryMessage_sync message 68000. Specifically, this figure depicts the arrangement and hierarchy of various components such as one or more levels of packages, entities, and datatypes, shown here as 68000 through 68022. As described above, packages may be used to represent hierarchy levels. Entities are discrete business elements that are used during a business transaction. Data types are used to type object entities and interfaces with a structure. For example, IndividualMaterialERPCreateQueryMessage_sync message 68000 includes, among other things, IndividualMaterial 68006. Accordingly, heterogeneous applications may communicate using this consistent message configured as such.

Figure 69:
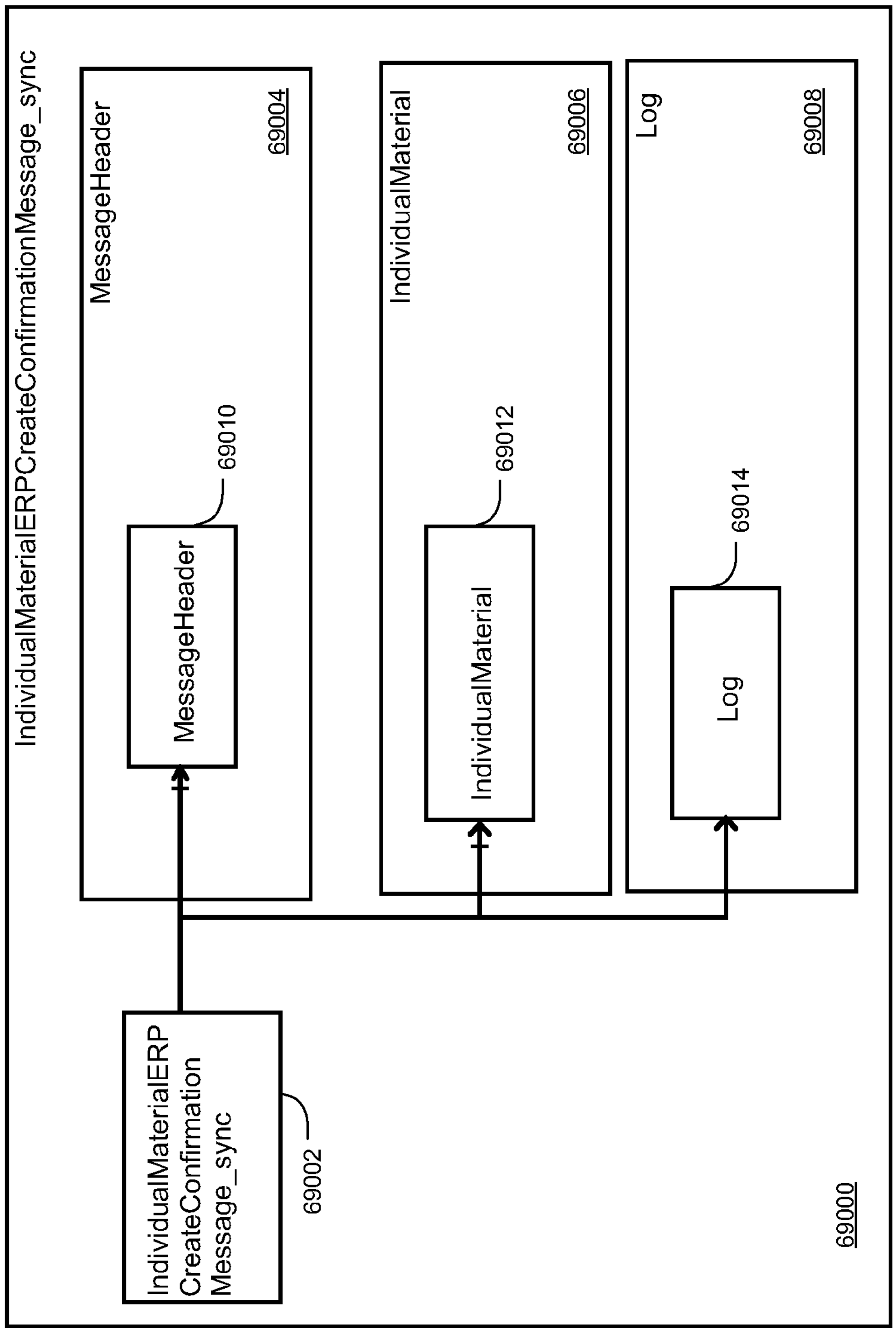
FIG. 69 shows an exemplary IndividualMaterialERPCreateConfirmationMessage_sync Message Data Type.

Additionally, FIG. 69 illustrates one example logical configuration of IndividualMaterialERPCreateConfirmationMessage_sync message 69000. Specifically, this figure depicts the arrangement and hierarchy of various components such as one or more levels of packages, entities, and datatypes, shown here as 69000 through 69014. As described above, packages may be used to represent hierarchy levels. Entities are discrete business elements that are used during a business transaction. Data types are used to type object entities and interfaces with a structure. For example, IndividualMaterialERPCreateConfirmationMessage_sync message 69000 includes, among other things, IndividualMaterial 69006. Accordingly, heterogeneous applications may communicate using this consistent message configured as such.

Figure 70:
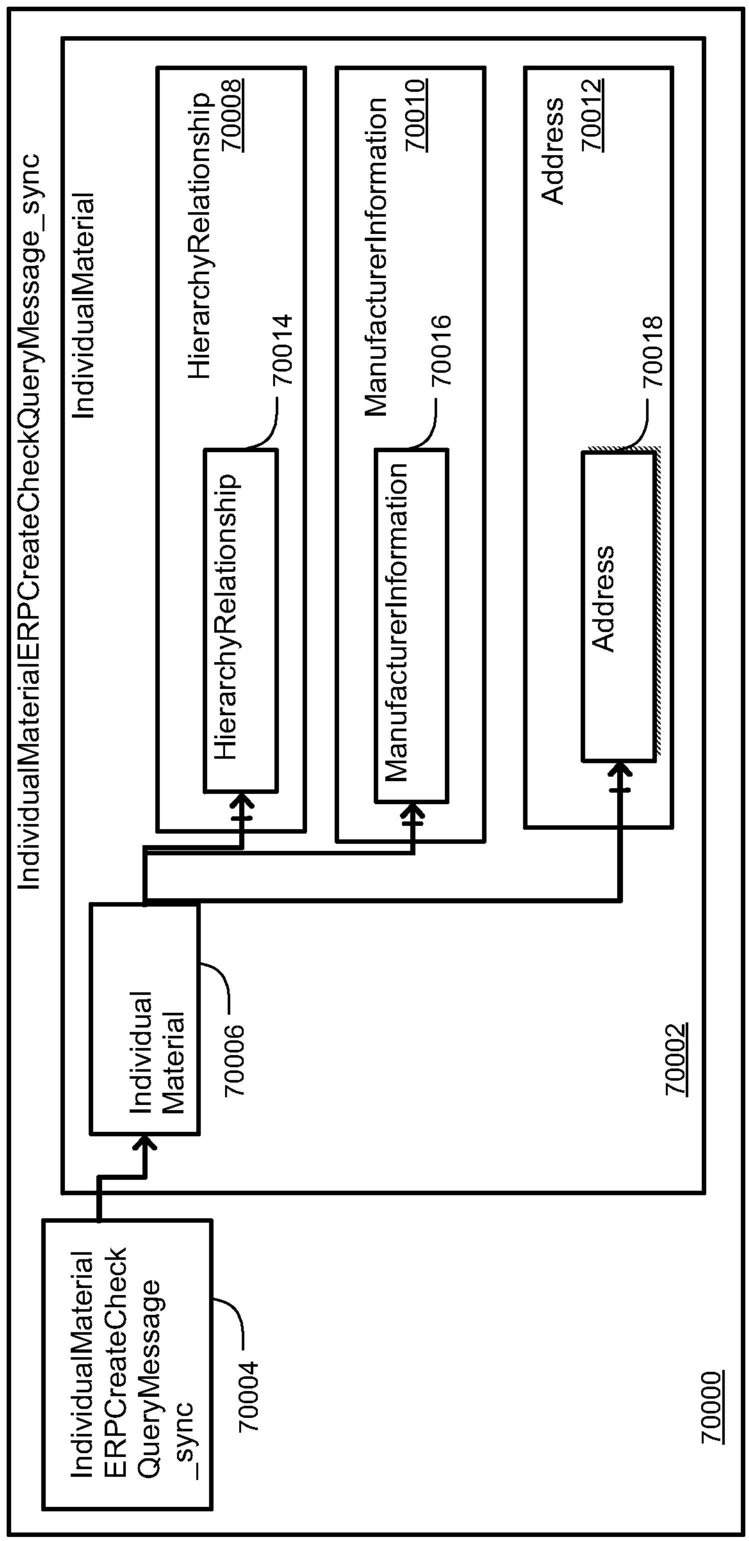
FIG. 70 shows an exemplary IndividualMaterialERPCreateCheckQueryMessage_sync Message Data Type.

Additionally, FIG. 70 illustrates one example logical configuration of IndividualMaterialERPCreateCheckQueryMessage_sync message 70000. Specifically, this figure depicts the arrangement and hierarchy of various components such as one or more levels of packages, entities, and datatypes, shown here as 70000 through 70018. As described above, packages may be used to represent hierarchy levels. Entities are discrete business elements that are used during a business transaction. Data types are used to type object entities and interfaces with a structure. For example, IndividualMaterialERPCreateCheckQueryMessage_sync message 70000 includes, among other things, IndividualMaterial 70002. Accordingly, heterogeneous applications may communicate using this consistent message configured as such.

Figure 71:
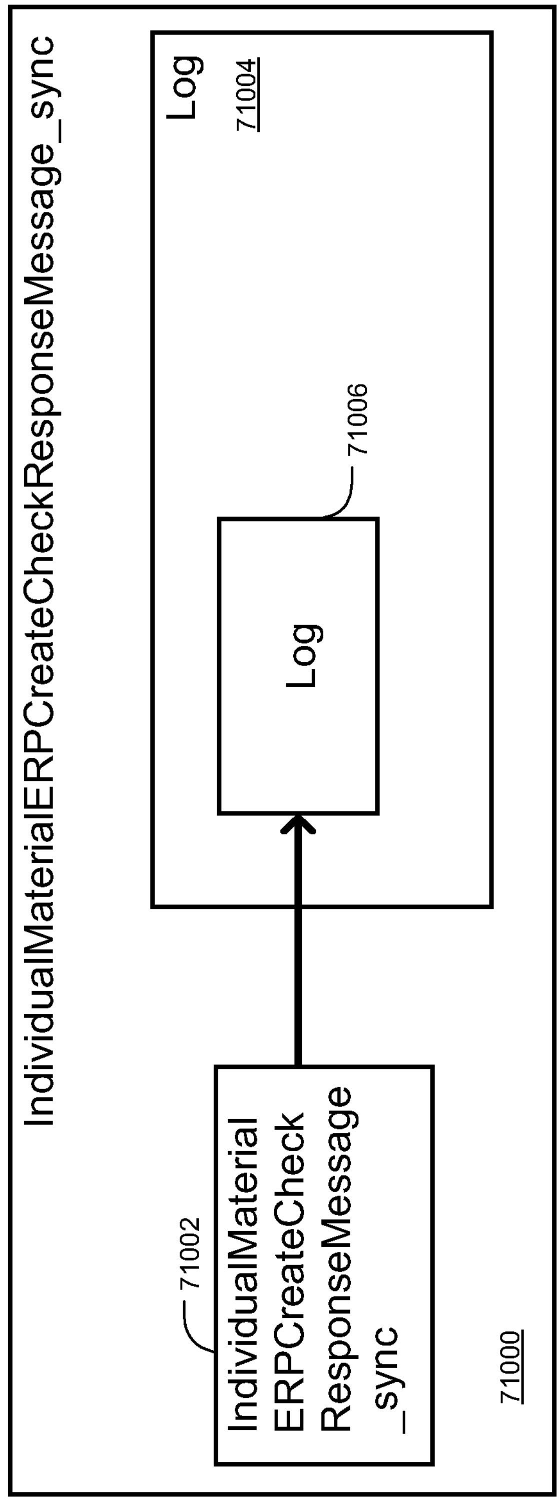
FIG. 71 shows an exemplary IndividualMaterialERPCreateCheckResponseMessage_sync Message Data Type.

Additionally, FIG. 71 illustrates one example logical configuration of IndividualMaterialERPCreateCheckResponseMessage_sync message 71000. Specifically, this figure depicts the arrangement and hierarchy of various components such as one or more levels of packages, entities, and datatypes, shown here as 71000 through 71006. As described above, packages may be used to represent hierarchy levels. Entities are discrete business elements that are used during a business transaction. Data types are used to type object entities and interfaces with a structure. For example, IndividualMaterialERPCreateCheckResponseMessage_sync message 71000 includes, among other things, Log 71004. Accordingly, heterogeneous applications may communicate using this consistent message configured as such.

Figure 72:
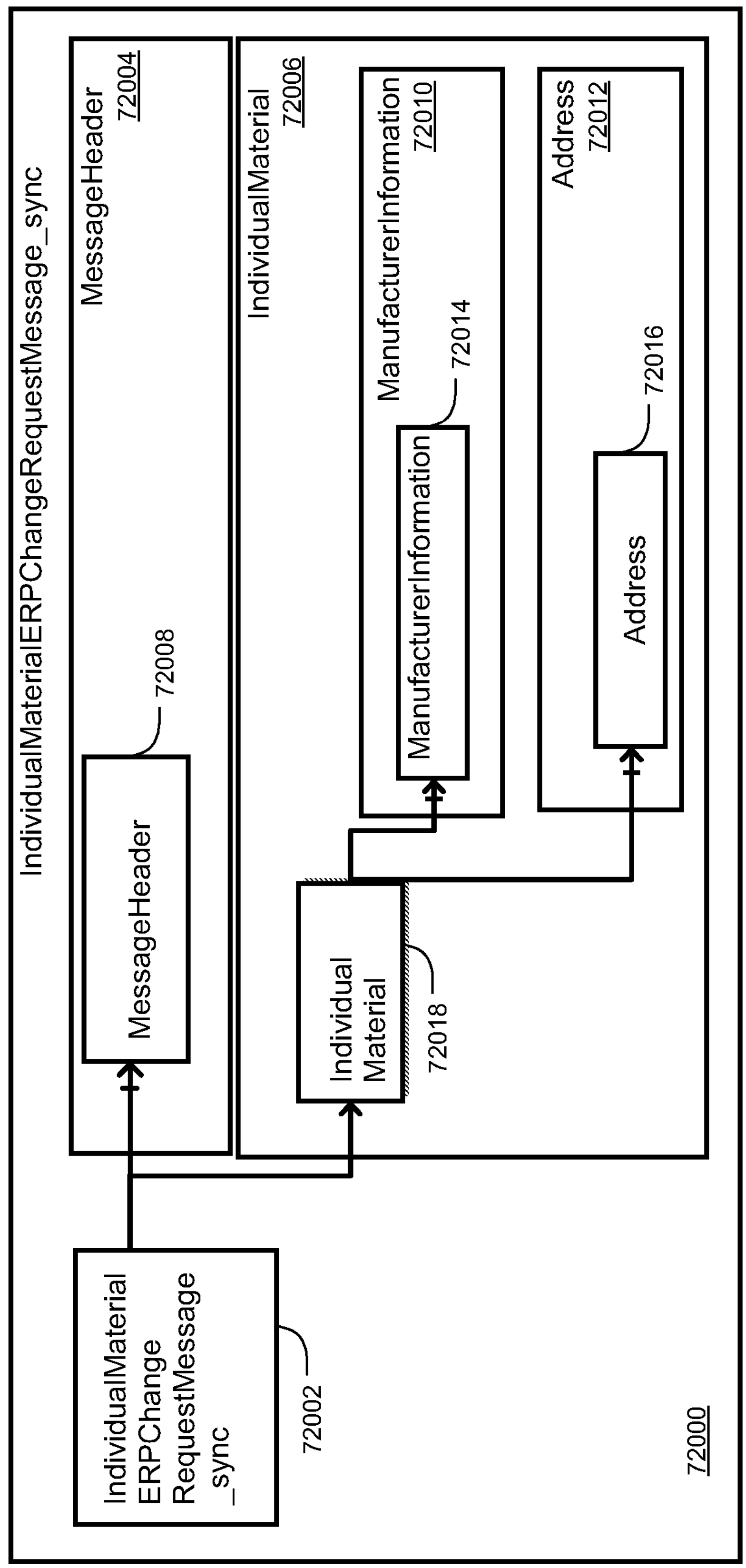
FIG. 72 shows an exemplary IndividualMaterialERPChangeRequestMessage_sync Message Data Type.

Additionally, FIG. 72 illustrates one example logical configuration of IndividualMaterialERPChangeRequestMessage_sync message 72000. Specifically, this figure depicts the arrangement and hierarchy of various components such as one or more levels of packages, entities, and datatypes, shown here as 72000 through 72018. As described above, packages may be used to represent hierarchy levels. Entities are discrete business elements that are used during a business transaction. Data types are used to type object entities and interfaces with a structure. For example, IndividualMaterialERPChangeRequestMessage_sync message 72000 includes, among other things, IndividualMaterial 72006. Accordingly, heterogeneous applications may communicate using this consistent message configured as such.

Figure 73:
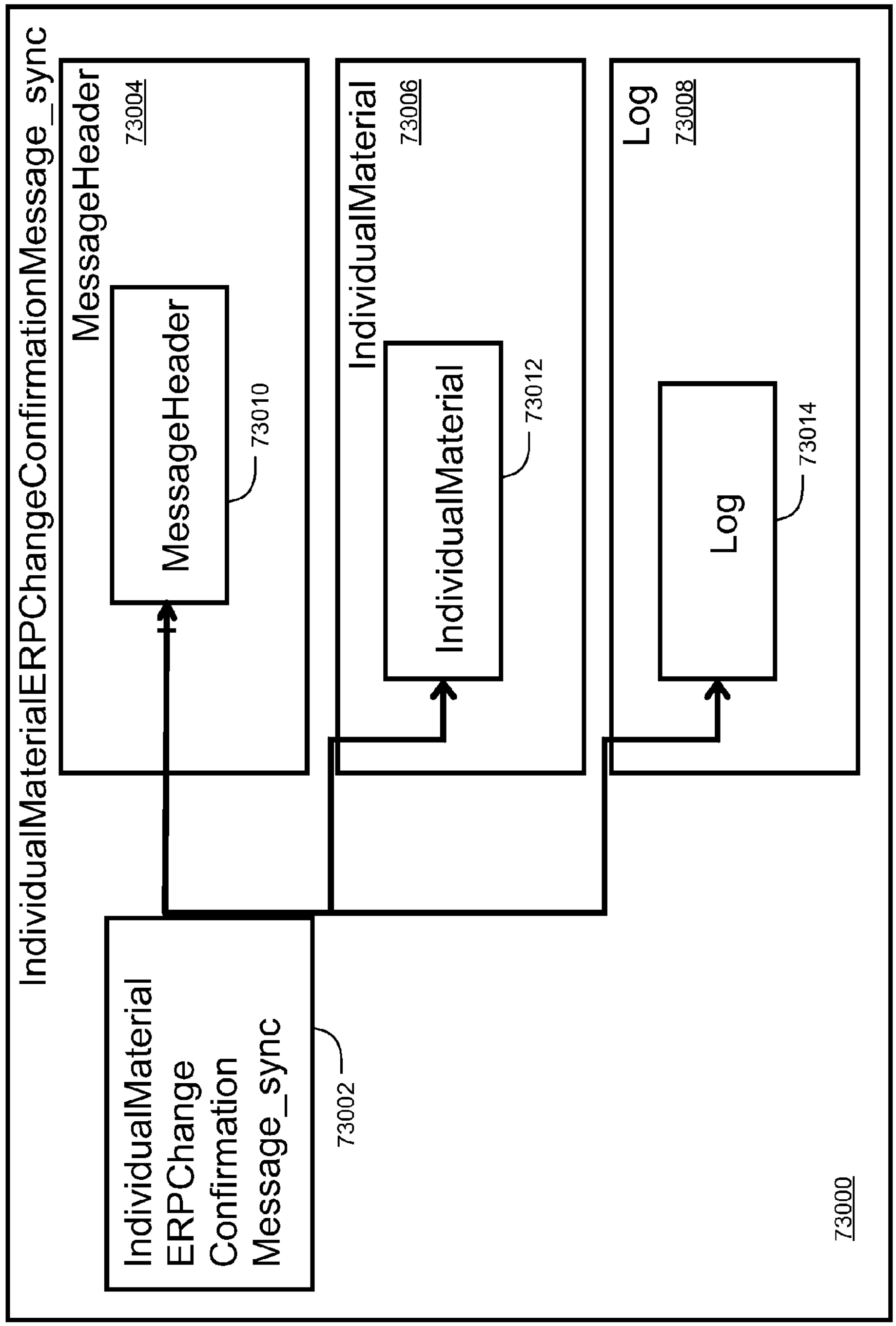
FIG. 73 shows an exemplary IndividualMaterialERPChangeConfirmationMessage_sync Message Data Type.

Additionally, FIG. 73 illustrates one example logical configuration of IndividualMaterialERPChangeConfirmationMessage_sync message 73000. Specifically, this figure depicts the arrangement and hierarchy of various components such as one or more levels of packages, entities, and datatypes, shown here as 73000 through 73014. As described above, packages may be used to represent hierarchy levels. Entities are discrete business elements that are used during a business transaction. Data types are used to type object entities and interfaces with a structure. For example, IndividualMaterialERPChangeConfirmationMessage_sync message 73000 includes, among other things, IndividualMaterial 73006. Accordingly, heterogeneous applications may communicate using this consistent message configured as such.

Figure 74:
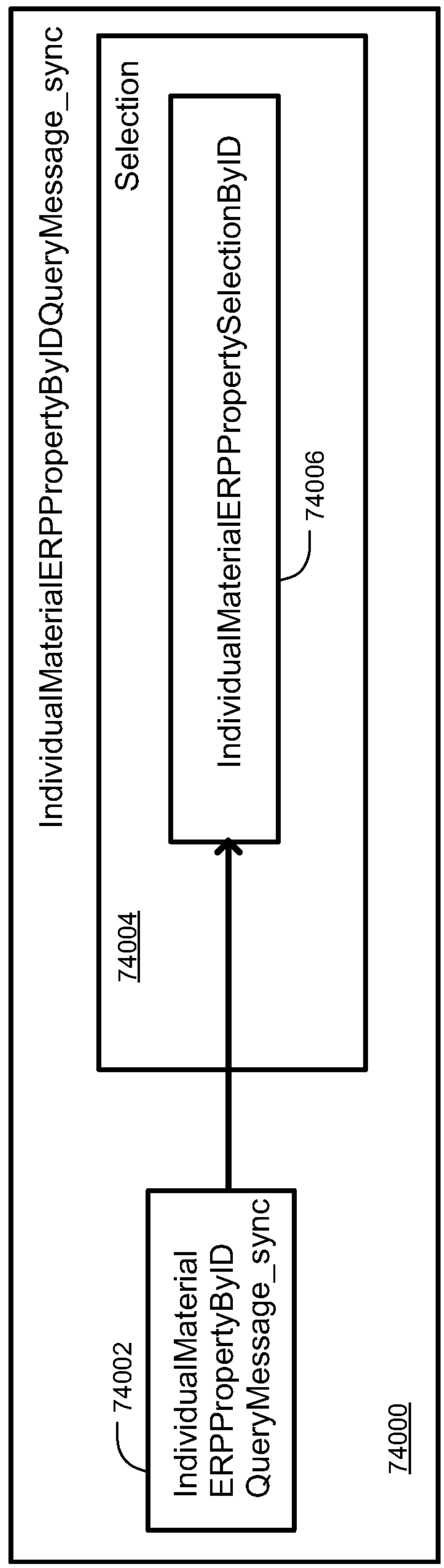
FIG. 74 shows an exemplary IndividualMaterialERPPropertyByIDQueryMessage_sync Message Data Type.

Additionally, FIG. 74 illustrates one example logical configuration of IndividualMaterialERPPropertyByIDQueryMessage_sync message 74000. Specifically, this figure depicts the arrangement and hierarchy of various components such as one or more levels of packages, entities, and datatypes, shown here as 74000 through 74006. As described above, packages may be used to represent hierarchy levels. Entities are discrete business elements that are used during a business transaction. Data types are used to type object entities and interfaces with a structure. For example, IndividualMaterialERPPropertyByIDQueryMessage_sync message 74000 includes, among other things, Selection 74004. Accordingly, heterogeneous applications may communicate using this consistent message configured as such.

Figure 75:
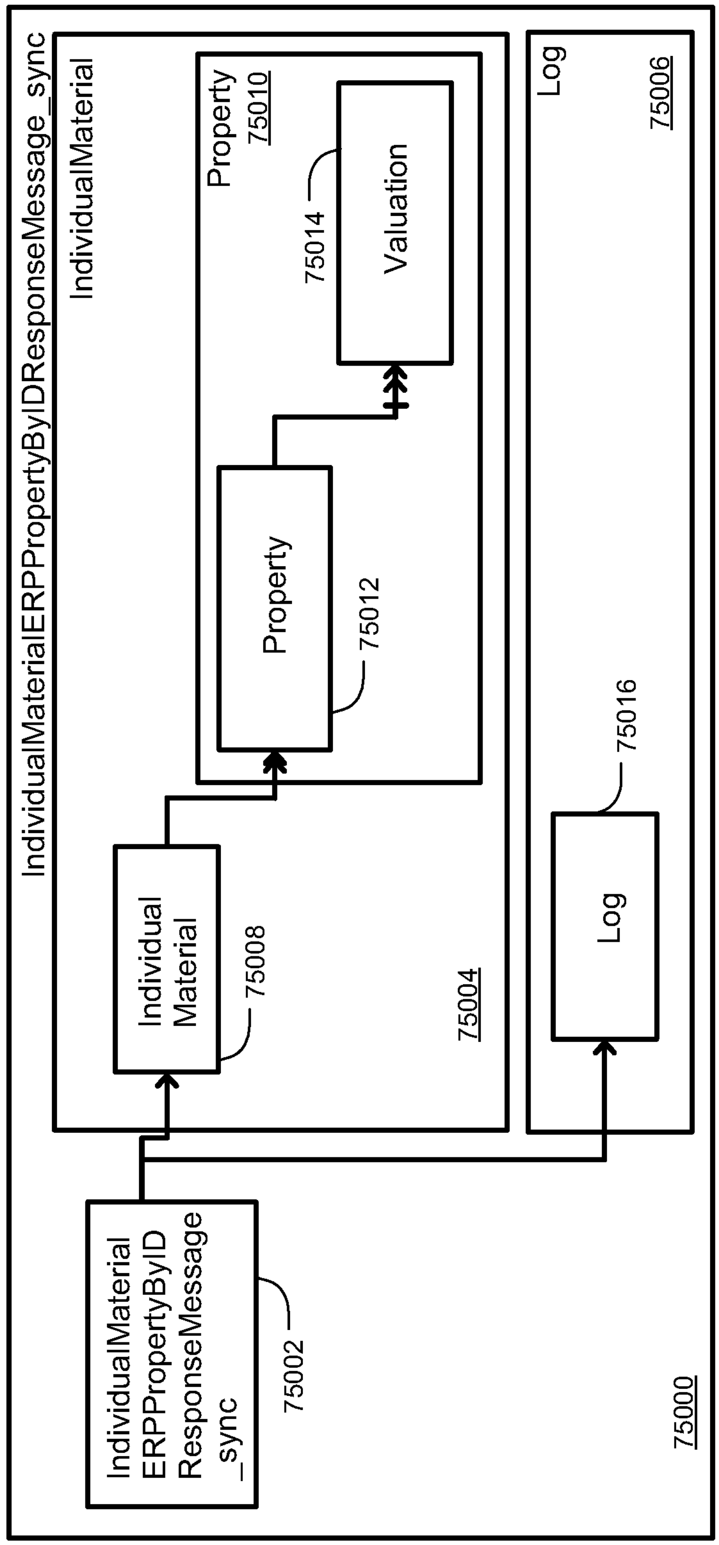
FIG. 75 shows an exemplary IndividualMaterialERPPropertyByIDResponseMessage_sync Message Data Type.

Additionally, FIG. 75 illustrates one example logical configuration of IndividualMaterialERPPropertyByIDResponseMessage_sync message 75000. Specifically, this figure depicts the arrangement and hierarchy of various components such as one or more levels of packages, entities, and datatypes, shown here as 75000 through 75016. As described above, packages may be used to represent hierarchy levels. Entities are discrete business elements that are used during a business transaction. Data types are used to type object entities and interfaces with a structure. For example, IndividualMaterialERPPropertyByIDResponseMessage_sync message 75000 includes, among other things, IndividualMaterial 75004. Accordingly, heterogeneous applications may communicate using this consistent message configured as such.

Figure 76:
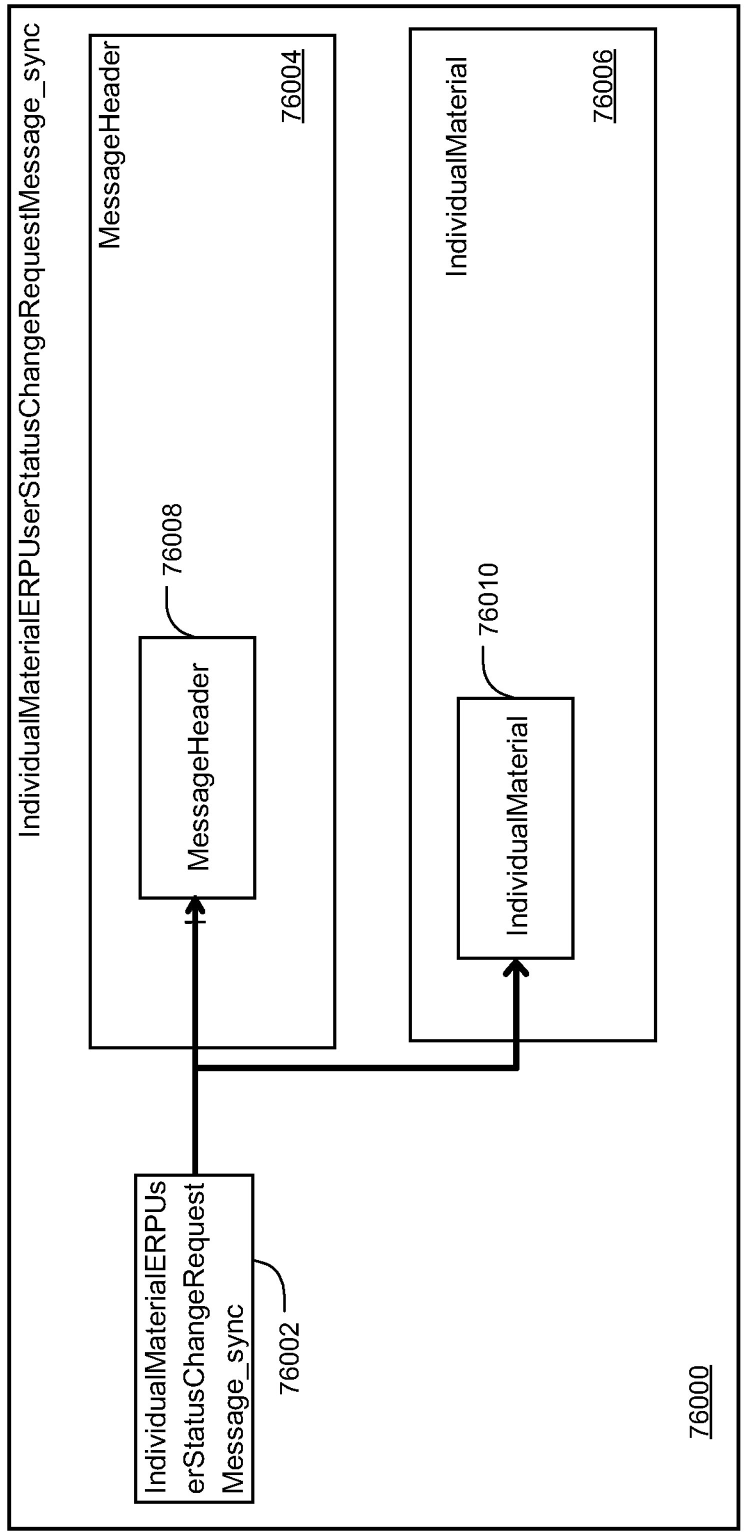
FIG. 76 shows an exemplary IndividualMaterialERPUserStatusChangeRequestMessage_sync Message Data Type.

Additionally, FIG. 76 illustrates one example logical configuration of IndividualMaterialERPUserStatusChangeRequestMessage_sync message 76000. Specifically, this figure depicts the arrangement and hierarchy of various components such as one or more levels of packages, entities, and datatypes, shown here as 76000 through 76010. As described above, packages may be used to represent hierarchy levels. Entities are discrete business elements that are used during a business transaction. Data types are used to type object entities and interfaces with a structure. For example, IndividualMaterialERPUserStatusChangeRequestMessage_sync message 76000 includes, among other things, IndividualMaterial 76006. Accordingly, heterogeneous applications may communicate using this consistent message configured as such.

Figure 77:
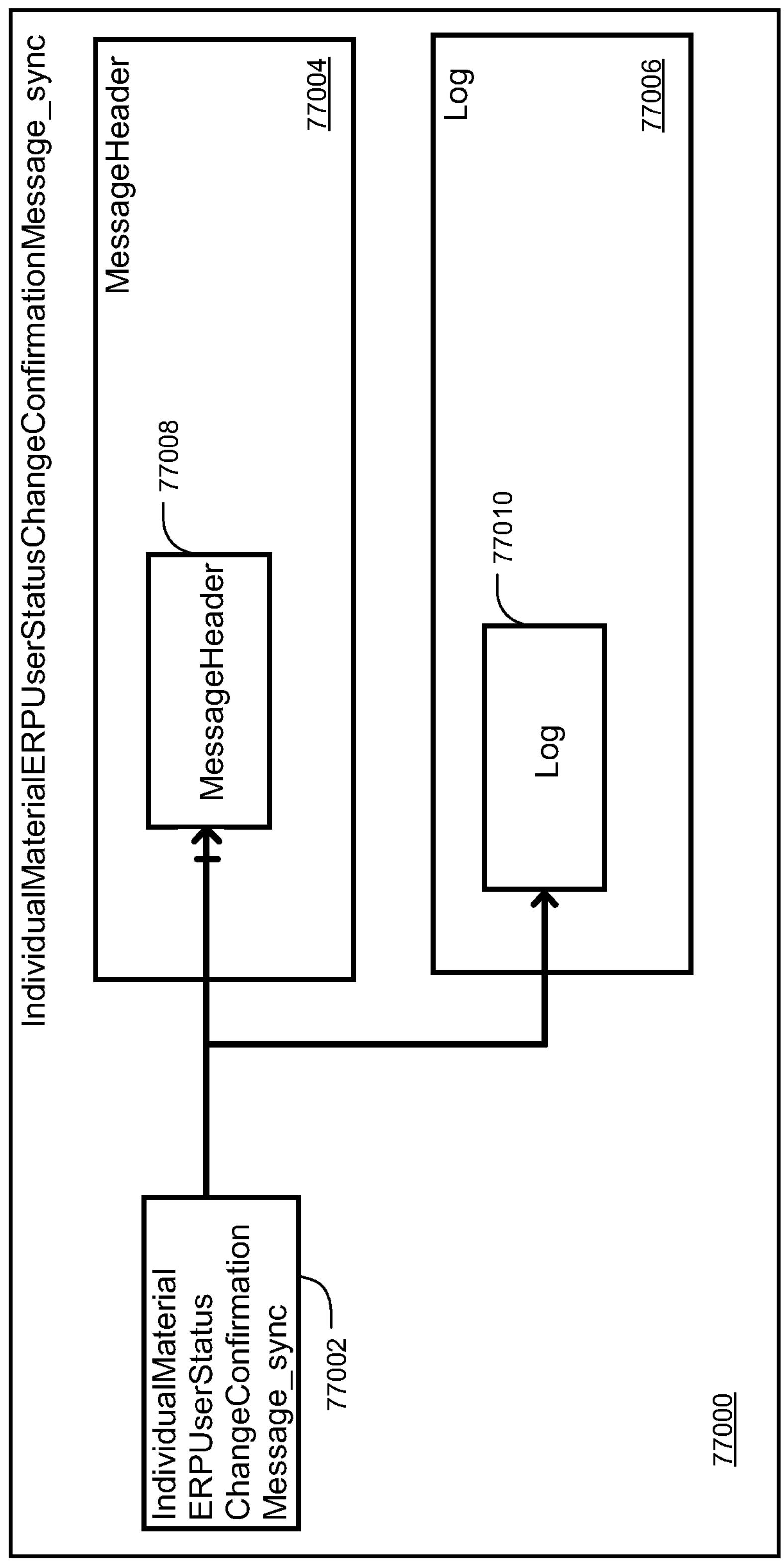
FIG. 77 shows an exemplary IndividualMaterialERPUserStatusChangeConfirmationMessage_sync Message Data Type.

Additionally, FIG. 77 illustrates one example logical configuration of IndividualMaterialERPUserStatusChangeConfirmationMessage_sync message 77000. Specifically, this figure depicts the arrangement and hierarchy of various components such as one or more levels of packages, entities, and datatypes, shown here as 77000 through 77010. As described above, packages may be used to represent hierarchy levels. Entities are discrete business elements that are used during a business transaction. Data types are used to type object entities and interfaces with a structure. For example, IndividualMaterialERPUserStatusChangeConfirmationMessage_sync message 77000 includes, among other things, Log 77006. Accordingly, heterogeneous applications may communicate using this consistent message configured as such.

Figure 78:
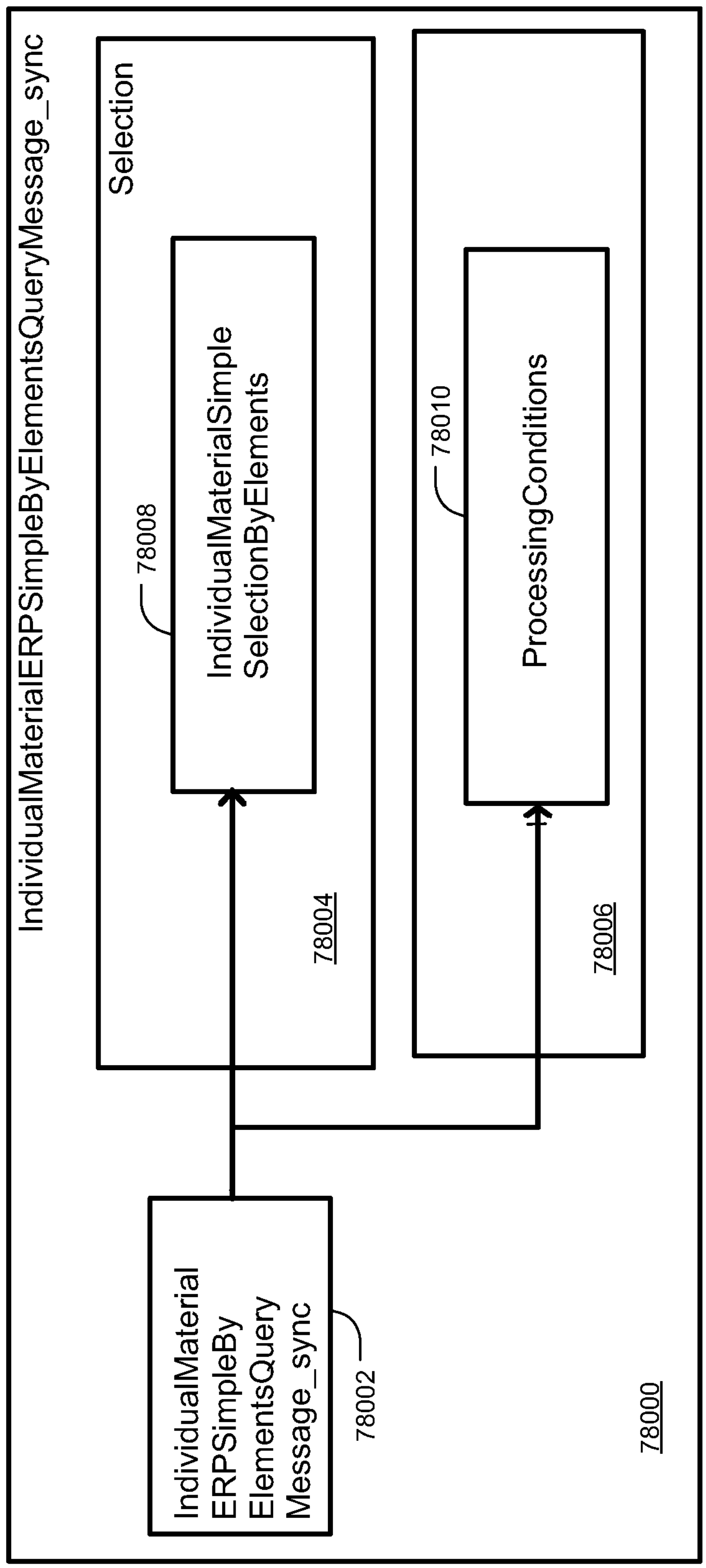
FIG. 78 shows an exemplary IndividualMaterialERPSimpleByElementsQueryMessage_sync Message Data Type.

Additionally, FIG. 78 illustrates one example logical configuration of IndividualMaterialERPSimpleByElementsQueryMessage_sync message 78000. Specifically, this figure depicts the arrangement and hierarchy of various components such as one or more levels of packages, entities, and datatypes, shown here as 78000 through 78010. As described above, packages may be used to represent hierarchy levels. Entities are discrete business elements that are used during a business transaction. Data types are used to type object entities and interfaces with a structure. For example, IndividualMaterialERPSimpleByElementsQueryMessage_sync message 78000 includes, among other things, Selection 78004. Accordingly, heterogeneous applications may communicate using this consistent message configured as such.

Figure 79:
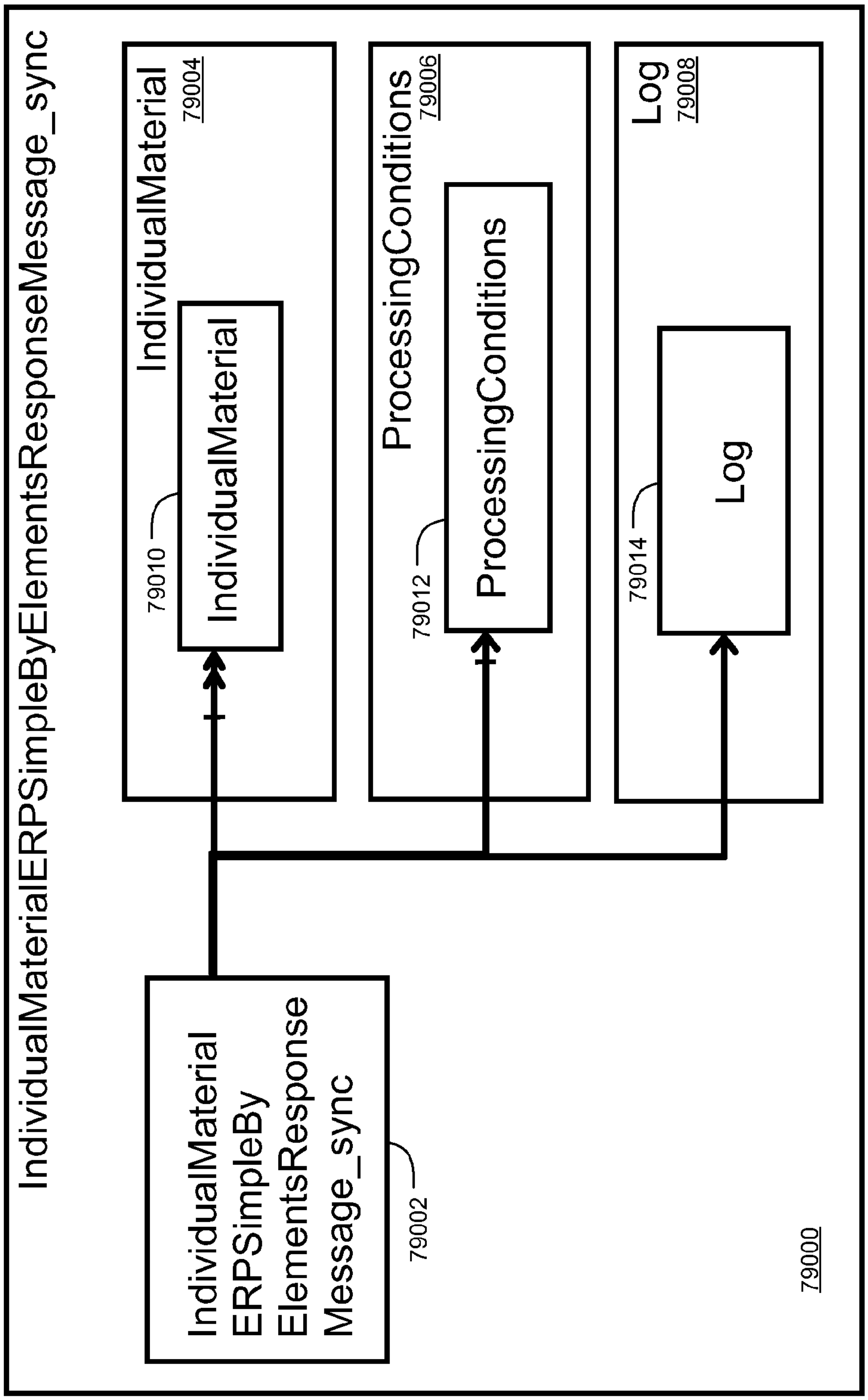
FIG. 79 shows an exemplary IndividualMaterialERPSimpleByElementsResponseMessage_sync Message Data Type.

Additionally, FIG. 79 illustrates one example logical configuration of IndividualMaterialERPSimpleByElementsResponseMessage_sync message 79000. Specifically, this figure depicts the arrangement and hierarchy of various components such as one or more levels of packages, entities, and datatypes, shown here as 79000 through 79014. As described above, packages may be used to represent hierarchy levels. Entities are discrete business elements that are used during a business transaction. Data types are used to type object entities and interfaces with a structure. For example, IndividualMaterialERPSimpleByElementsResponseMessage_sync message 79000 includes, among other things, IndividualMaterial 79004. Accordingly, heterogeneous applications may communicate using this consistent message configured as such.

Figure 80:
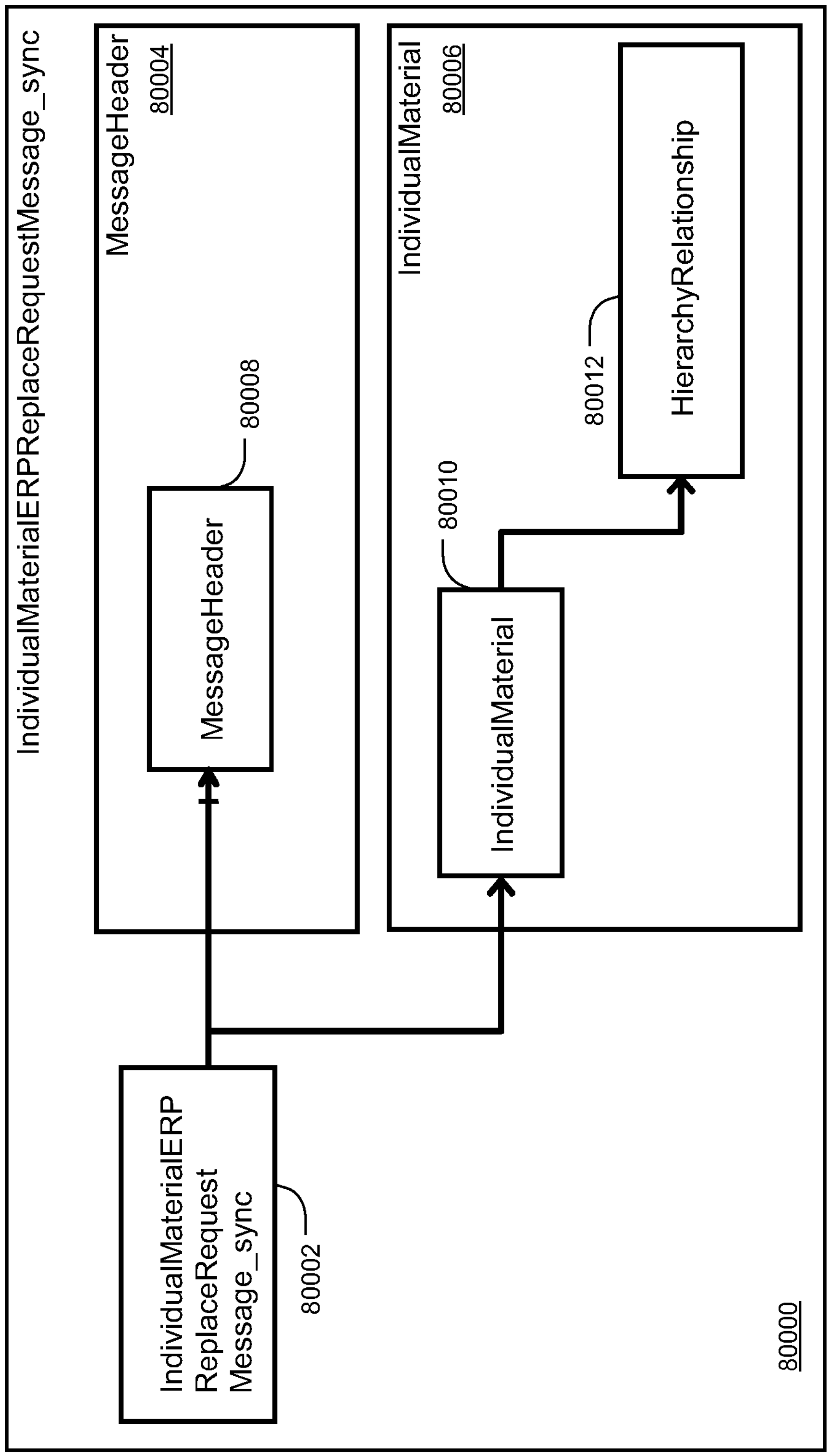
FIG. 80 shows an exemplary IndividualMaterialERPReplaceRequestMessage_sync Message Data Type.

Additionally, FIG. 80 illustrates one example logical configuration of IndividualMaterialERPReplaceRequestMessage_sync message 80000. Specifically, this figure depicts the arrangement and hierarchy of various components such as one or more levels of packages, entities, and datatypes, shown here as 80000 through 80012. As described above, packages may be used to represent hierarchy levels. Entities are discrete business elements that are used during a business transaction. Data types are used to type object entities and interfaces with a structure. For example, IndividualMaterialERPReplaceRequestMessage_sync message 80000 includes, among other things, IndividualMaterial 80006. Accordingly, heterogeneous applications may communicate using this consistent message configured as such.

Figure 81:
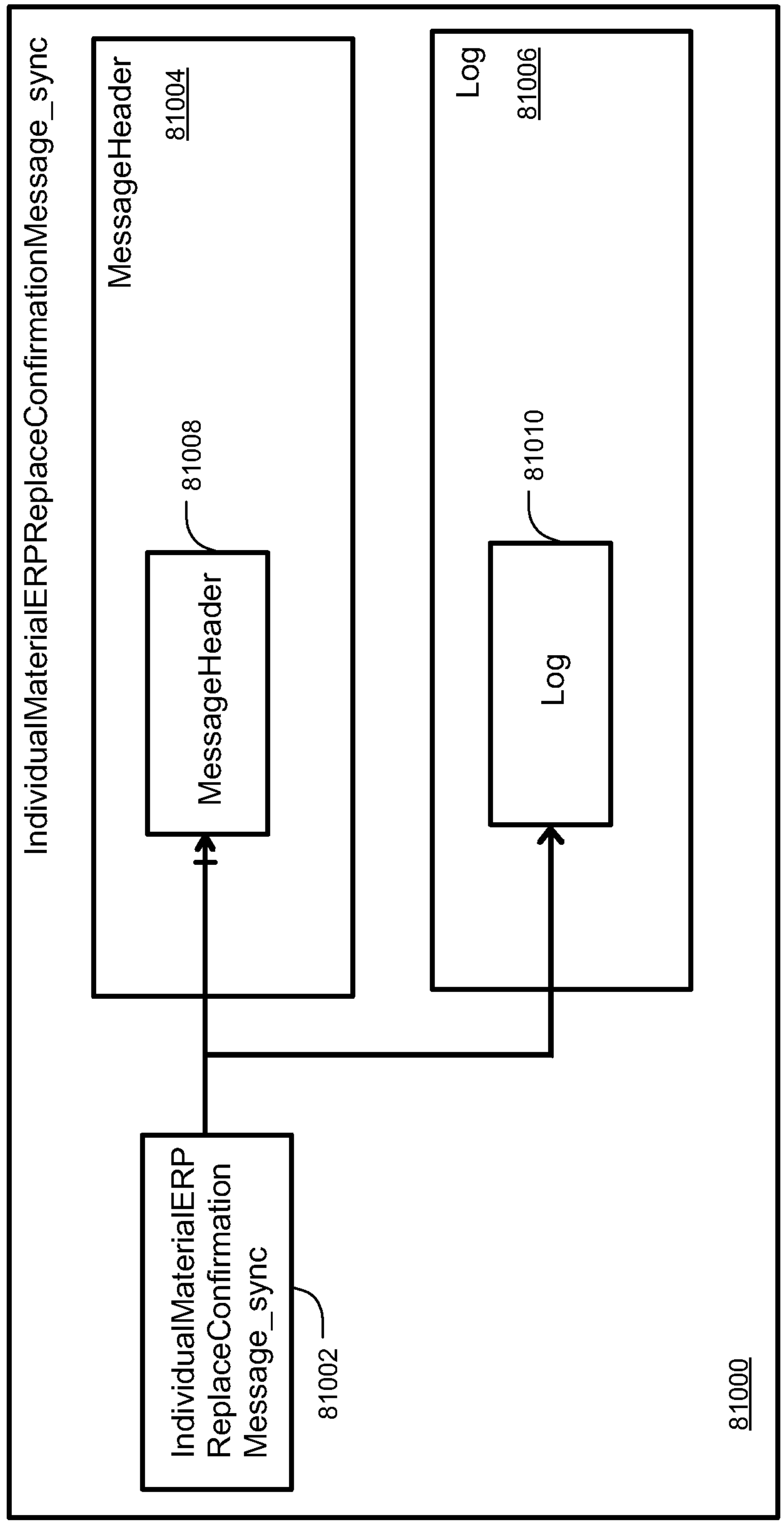
FIG. 81 shows an exemplary IndividualMaterialERPReplaceConfirmationMessage_sync Message Data Type.

Additionally, FIG. 81 illustrates one example logical configuration of IndividualMaterialERPReplaceConfirmationMessage_sync message 81000. Specifically, this figure depicts the arrangement and hierarchy of various components such as one or more levels of packages, entities, and datatypes, shown here as 81000 through 81010. As described above, packages may be used to represent hierarchy levels. Entities are discrete business elements that are used during a business transaction. Data types are used to type object entities and interfaces with a structure. For example, IndividualMaterialERPReplaceConfirmationMessage_sync message 81000 includes, among other things, Log 81006. Accordingly, heterogeneous applications may communicate using this consistent message configured as such.

Figure 82:
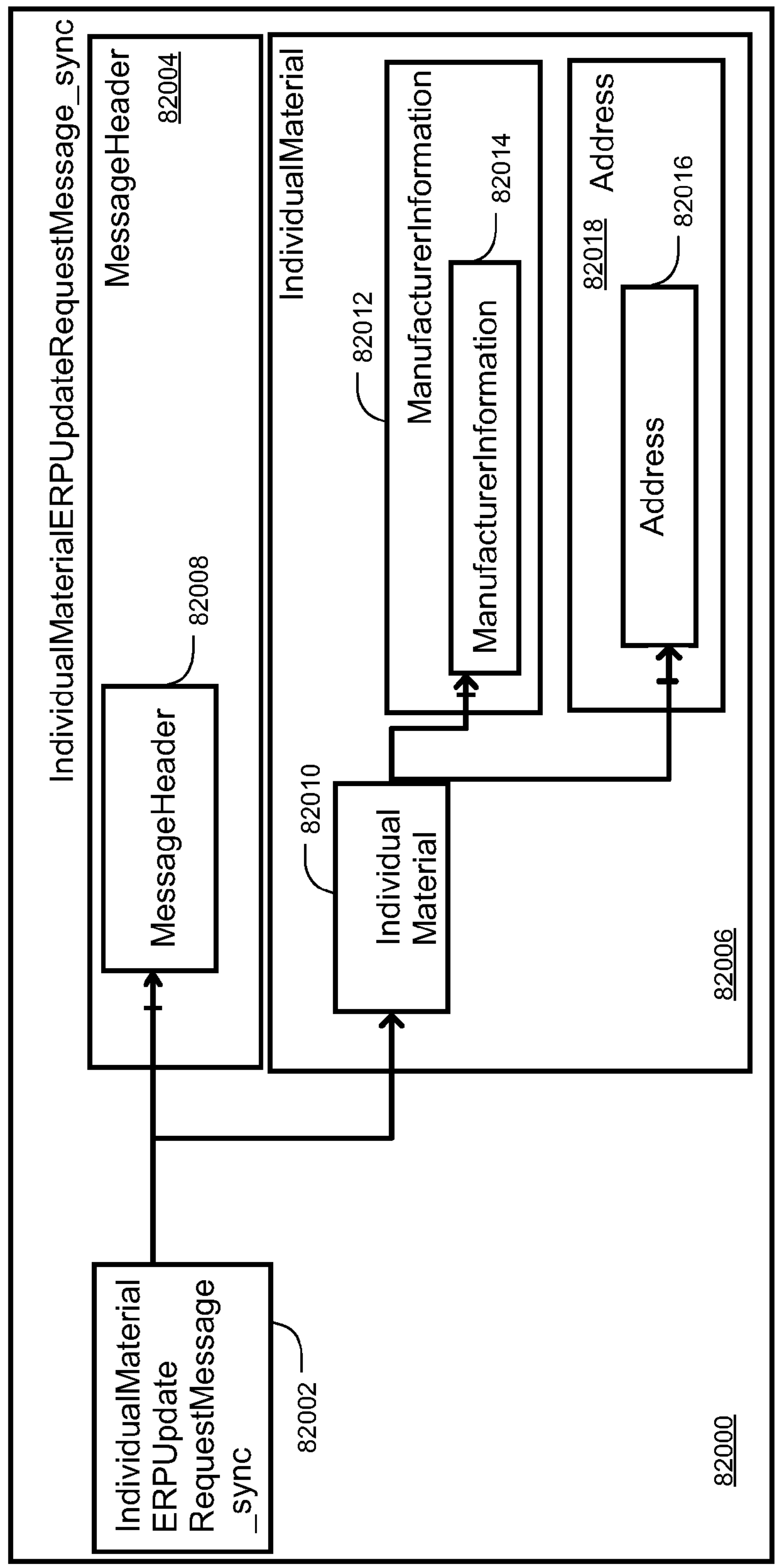
FIG. 82 shows an exemplary IndividualMaterialERPUpdateRequestMessage_sync Message Data Type.

Additionally, FIG. 82 illustrates one example logical configuration of IndividualMaterialERPUpdateRequestMessage_sync message 82000. Specifically, this figure depicts the arrangement and hierarchy of various components such as one or more levels of packages, entities, and datatypes, shown here as 82000 through 82018. As described above, packages may be used to represent hierarchy levels. Entities are discrete business elements that are used during a business transaction. Data types are used to type object entities and interfaces with a structure. For example, IndividualMaterialERPUpdateRequestMessage_sync message 82000 includes, among other things, IndividualMaterial 82006. Accordingly, heterogeneous applications may communicate using this consistent message configured as such.

Figure 83:
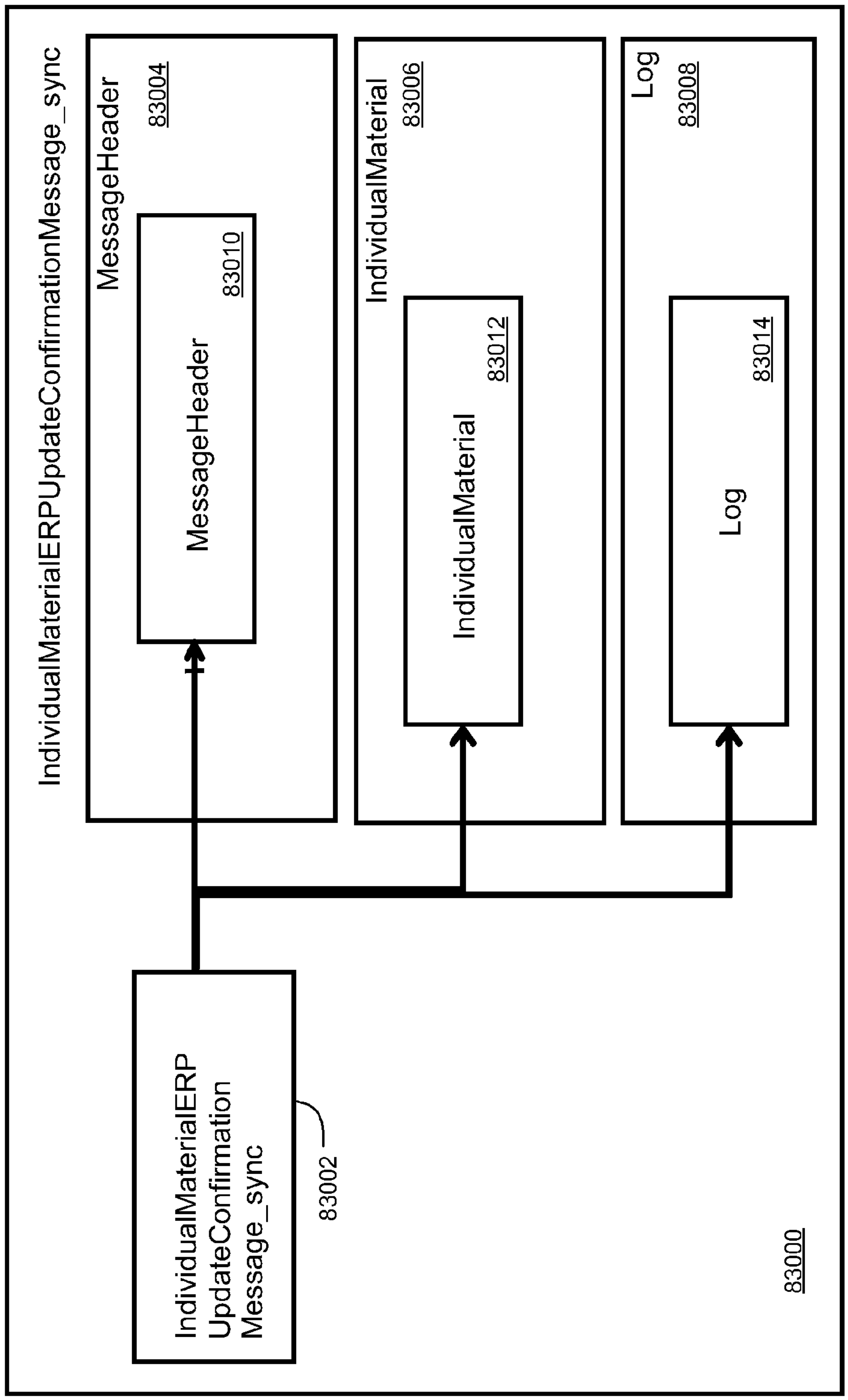
FIG. 83 shows an exemplary IndividualMaterialERPUpdateConfirmationMessage_sync Message Data Type.

Additionally, FIG. 83 illustrates one example logical configuration of IndividualMaterialERPUpdateConfirmationMessage_sync message 83000. Specifically, this figure depicts the arrangement and hierarchy of various components such as one or more levels of packages, entities, and datatypes, shown here as 83000 through 83014. As described above, packages may be used to represent hierarchy levels. Entities are discrete business elements that are used during a business transaction. Data types are used to type object entities and interfaces with a structure. For example, IndividualMaterialERPUpdateConfirmationMessage_sync message 83000 includes, among other things, IndividualMaterial 83006. Accordingly, heterogeneous applications may communicate using this consistent message configured as such.

Figure 84:
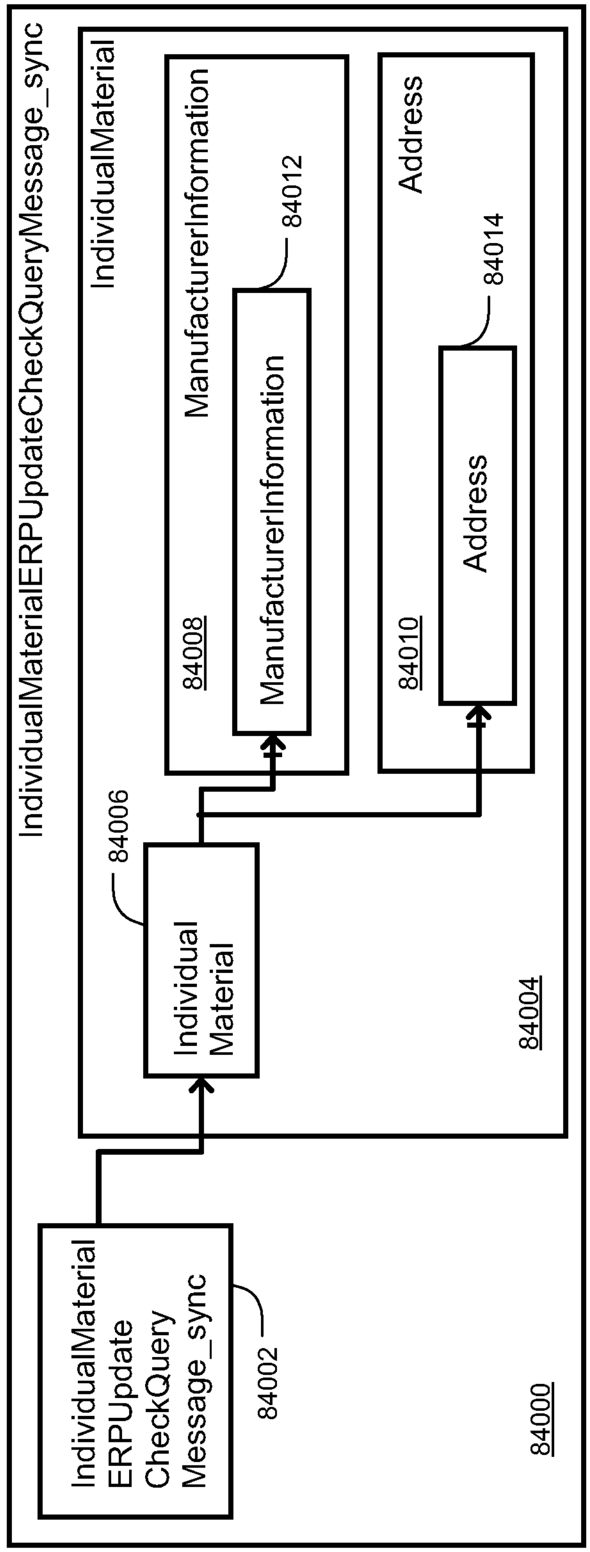
FIG. 84 shows an exemplary IndividualMaterialERPUpdateCheckQueryMessage_sync Message Data Type.

Additionally, FIG. 84 illustrates one example logical configuration of IndividualMaterialERPUpdateCheckQueryMessage_sync message 84000. Specifically, this figure depicts the arrangement and hierarchy of various components such as one or more levels of packages, entities, and datatypes, shown here as 84000 through 84014. As described above, packages may be used to represent hierarchy levels. Entities are discrete business elements that are used during a business transaction. Data types are used to type object entities and interfaces with a structure. For example, IndividualMaterialERPUpdateCheckQueryMessage_sync message 84000 includes, among other things, IndividualMaterial 84004. Accordingly, heterogeneous applications may communicate using this consistent message configured as such.

Figure 85:
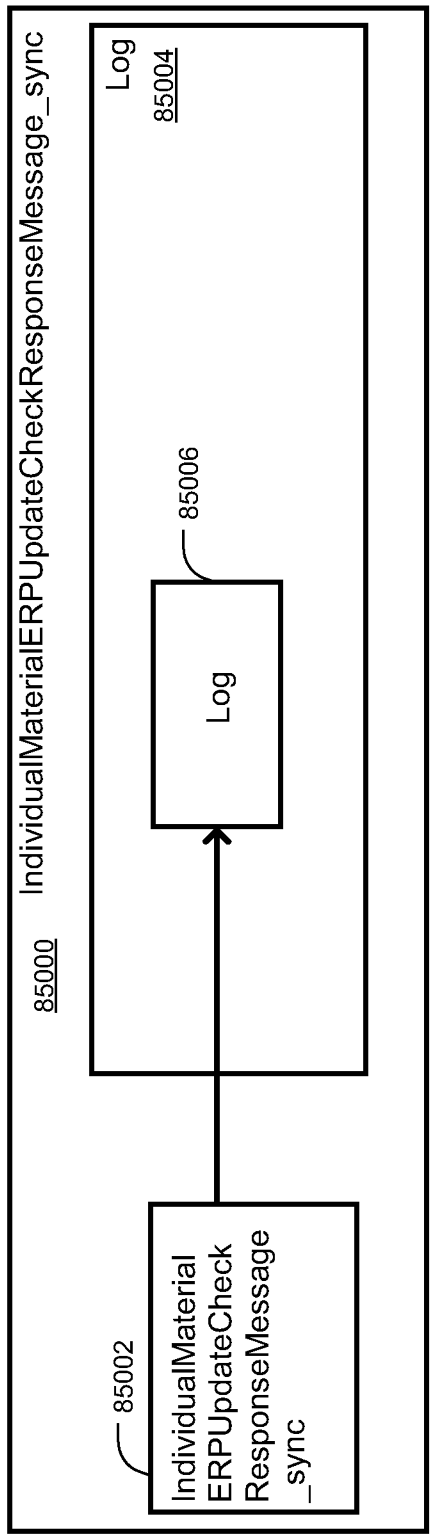
FIG. 85 shows an exemplary IndividualMaterialERPUpdateCheckResponseMessage_sync Message Data Type.

Additionally, FIG. 85 illustrates one example logical configuration of IndividualMaterialERPUpdateCheckResponseMessage_sync message 85000. Specifically, this figure depicts the arrangement and hierarchy of various components such as one or more levels of packages, entities, and datatypes, shown here as 85000 through 85006. As described above, packages may be used to represent hierarchy levels. Entities are discrete business elements that are used during a business transaction. Data types are used to type object entities and interfaces with a structure. For example, IndividualMaterialERPUpdateCheckResponseMessage_sync message 85000 includes, among other things, Log 85004. Accordingly, heterogeneous applications may communicate using this consistent message configured as such.

Figure 86:
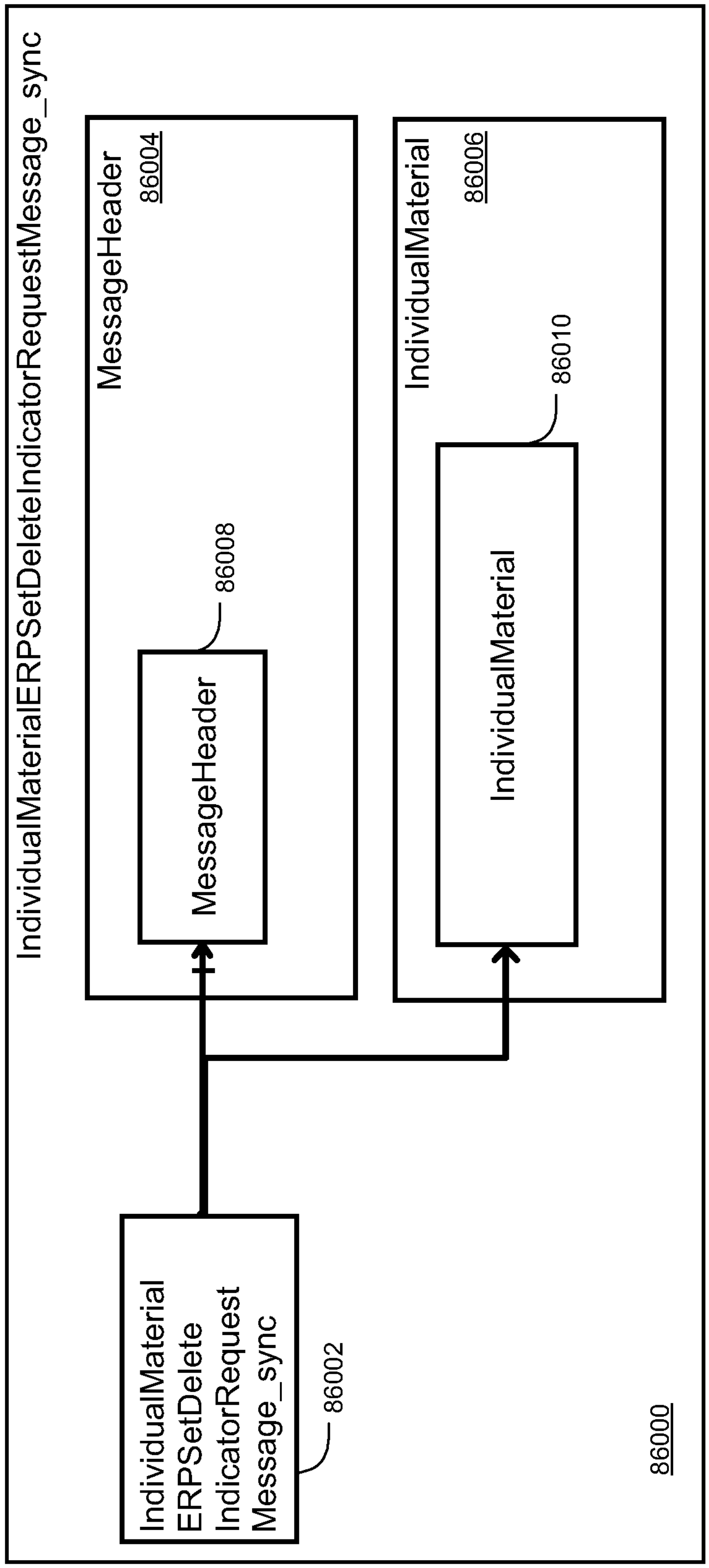
FIG. 86 shows an exemplary IndividualMaterialERPSetDeleteIndicatorRequestMessage_sync Message Data Type.

Additionally, FIG. 86 illustrates one example logical configuration of IndividualMaterialERPSetDeleteIndicatorRequestMessage_sync message 86000. Specifically, this figure depicts the arrangement and hierarchy of various components such as one or more levels of packages, entities, and datatypes, shown here as 86000 through 86010. As described above, packages may be used to represent hierarchy levels. Entities are discrete business elements that are used during a business transaction. Data types are used to type object entities and interfaces with a structure. For example, IndividualMaterialERPSetDeleteIndicatorRequestMessage_sync message 86000 includes, among other things, IndividualMaterial 86006. Accordingly, heterogeneous applications may communicate using this consistent message configured as such.

Figure 87:
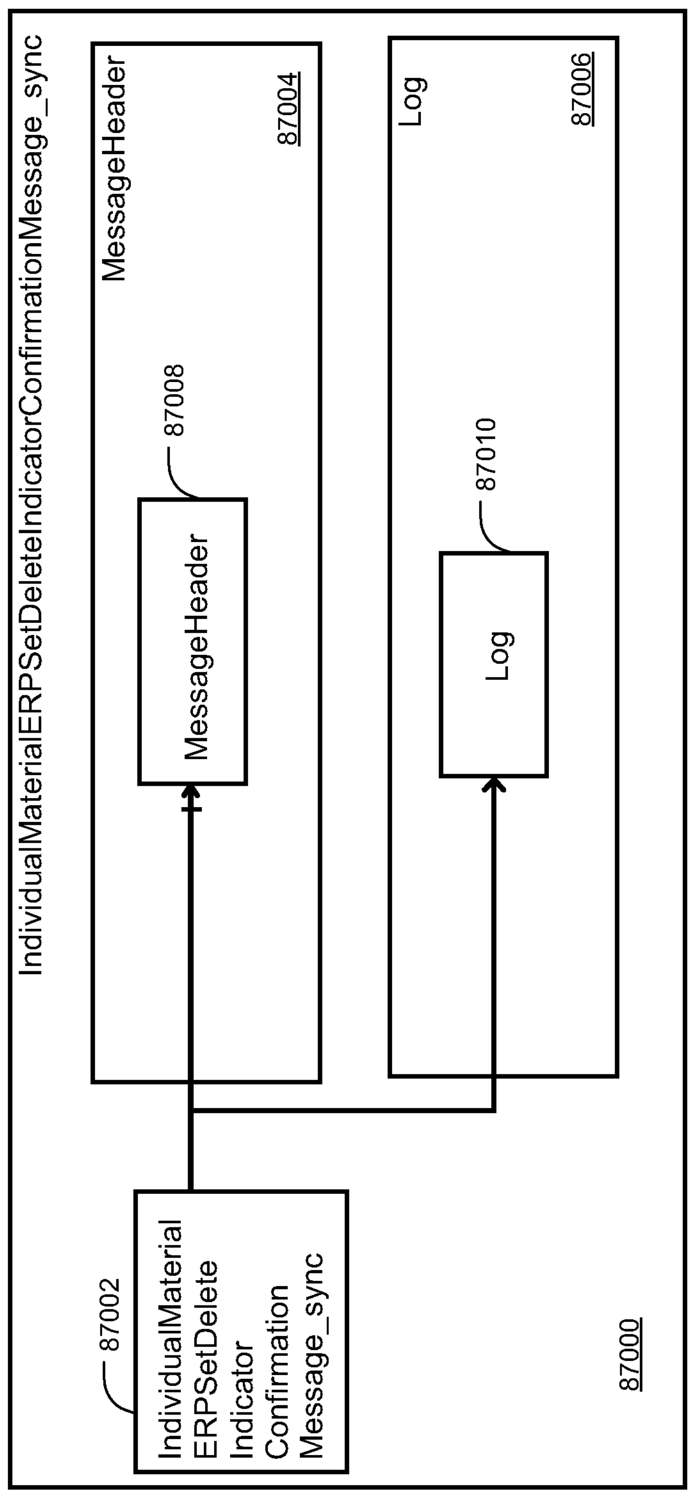
FIG. 87 shows an exemplary IndividualMaterialERPSetDeleteindicatorConfirmationMessage_sync Message Data Type.

Additionally, FIG. 87 illustrates one example logical configuration of IndividualMaterialERPSetDeleteIndicatorConfirmationMessage_sync message 87000. Specifically, this figure depicts the arrangement and hierarchy of various components such as one or more levels of packages, entities, and datatypes, shown here as 87000 through 87010. As described above, packages may be used to represent hierarchy levels. Entities are discrete business elements that are used during a business transaction. Data types are used to type object entities and interfaces with a structure. For example, IndividualMaterialERPSetDeleteIndicatorConfirmationMessage_sync message 87000 includes, among other things, Log 87006. Accordingly, heterogeneous applications may communicate using this consistent message configured as such.

Figure 88:
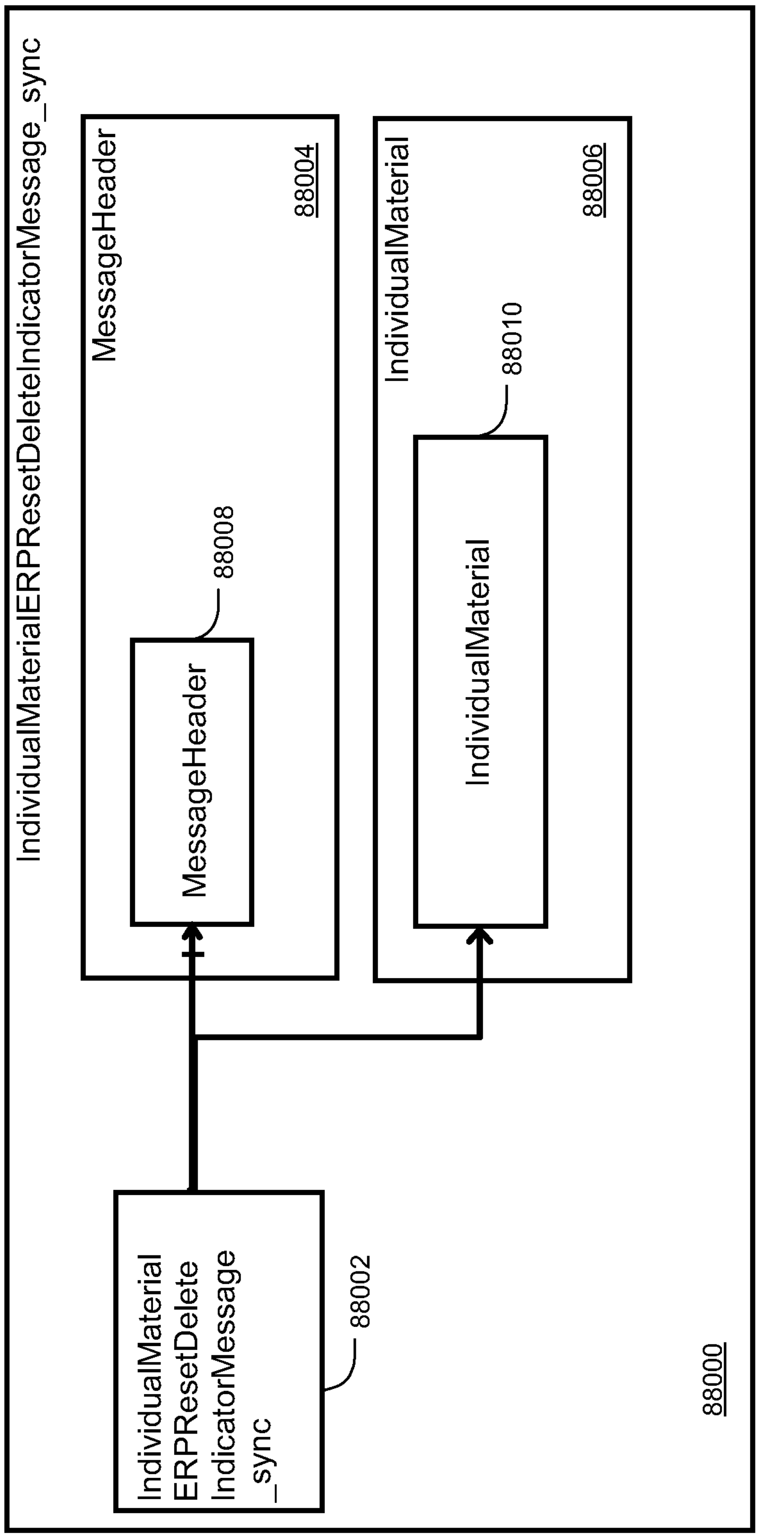
FIG. 88 shows an exemplary IndividualMaterialERPResetDeleteIndicatorRequestMessage_sync Message Data Type.

Additionally, FIG. 88 illustrates one example logical configuration of IndividualMaterialERPResetDeleteIndicatorMessage_sync message 88000. Specifically, this figure depicts the arrangement and hierarchy of various components such as one or more levels of packages, entities, and datatypes, shown here as 88000 through 88010. As described above, packages may be used to represent hierarchy levels. Entities are discrete business elements that are used during a business transaction. Data types are used to type object entities and interfaces with a structure. For example, IndividualMaterialERPResetDeleteIndicatorMessage_sync message 88000 includes, among other things, IndividualMaterial 88006. Accordingly, heterogeneous applications may communicate using this consistent message configured as such.

Figure 89:
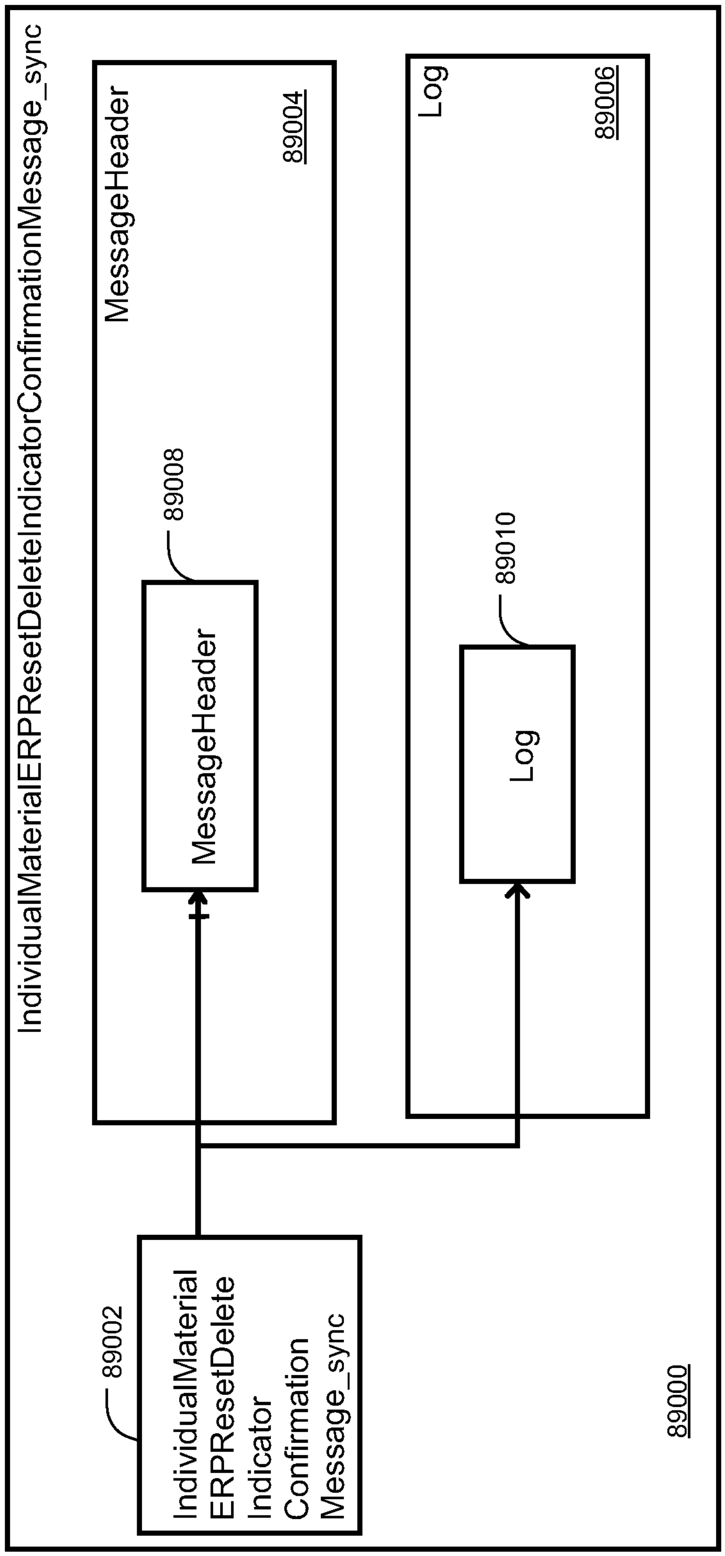
FIG. 89 shows an exemplary IndividualMaterialERPResetDeleteIndicatorConfirmationMessage_sync Message Data Type.

Additionally, FIG. 89 illustrates one example logical configuration of IndividualMaterialERPResetDeleteIndicatorConfirmationMessage_sync message 89000. Specifically, this figure depicts the arrangement and hierarchy of various components such as one or more levels of packages, entities, and datatypes, shown here as 89000 through 89010. As described above, packages may be used to represent hierarchy levels. Entities are discrete business elements that are used during a business transaction. Data types are used to type object entities and interfaces with a structure. For example, IndividualMaterialERPResetDeleteIndicatorConfirmationMessage_sync message 89000 includes, among other things, Log 89006. Accordingly, heterogeneous applications may communicate using this consistent message configured as such.

Figure 90:
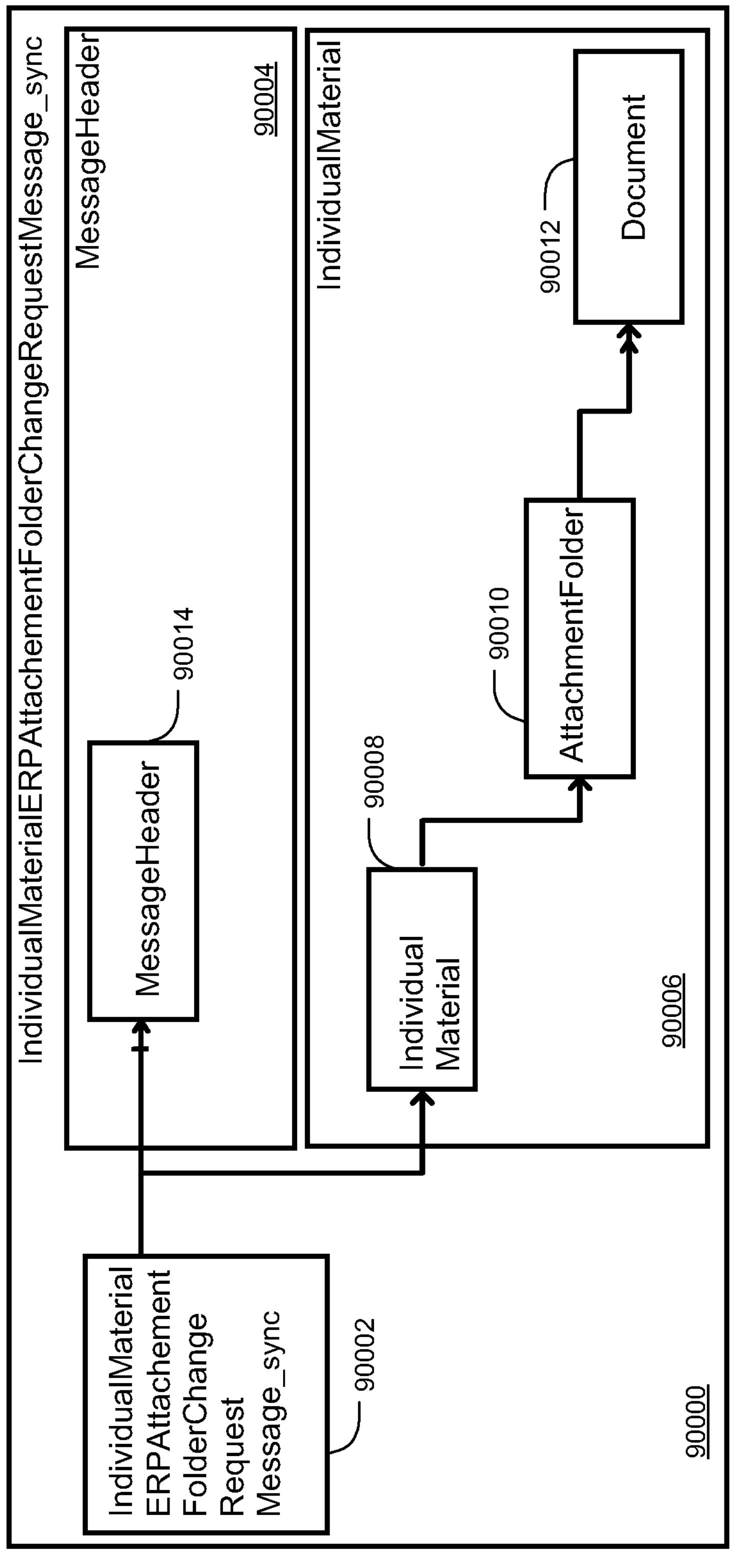
FIG. 90 shows an exemplary IndividualMaterialERPAttachmentFolderChangeRequestMessage_sync Message Data Type.

Additionally, FIG. 90 illustrates one example logical configuration of IndividualMaterialERPAttachmentFolderChangeRequestMessage_sync message 90000. Specifically, this figure depicts the arrangement and hierarchy of various components such as one or more levels of packages, entities, and datatypes, shown here as 90000 through 90012. As described above, packages may be used to represent hierarchy levels. Entities are discrete business elements that are used during a business transaction. Data types are used to type object entities and interfaces with a structure. For example, IndividualMaterialERPAttachmentFolderChangeRequestMessage_sync message 90000 includes, among other things, IndividualMaterial 90006. Accordingly, heterogeneous applications may communicate using this consistent message configured as such.

Figure 91:
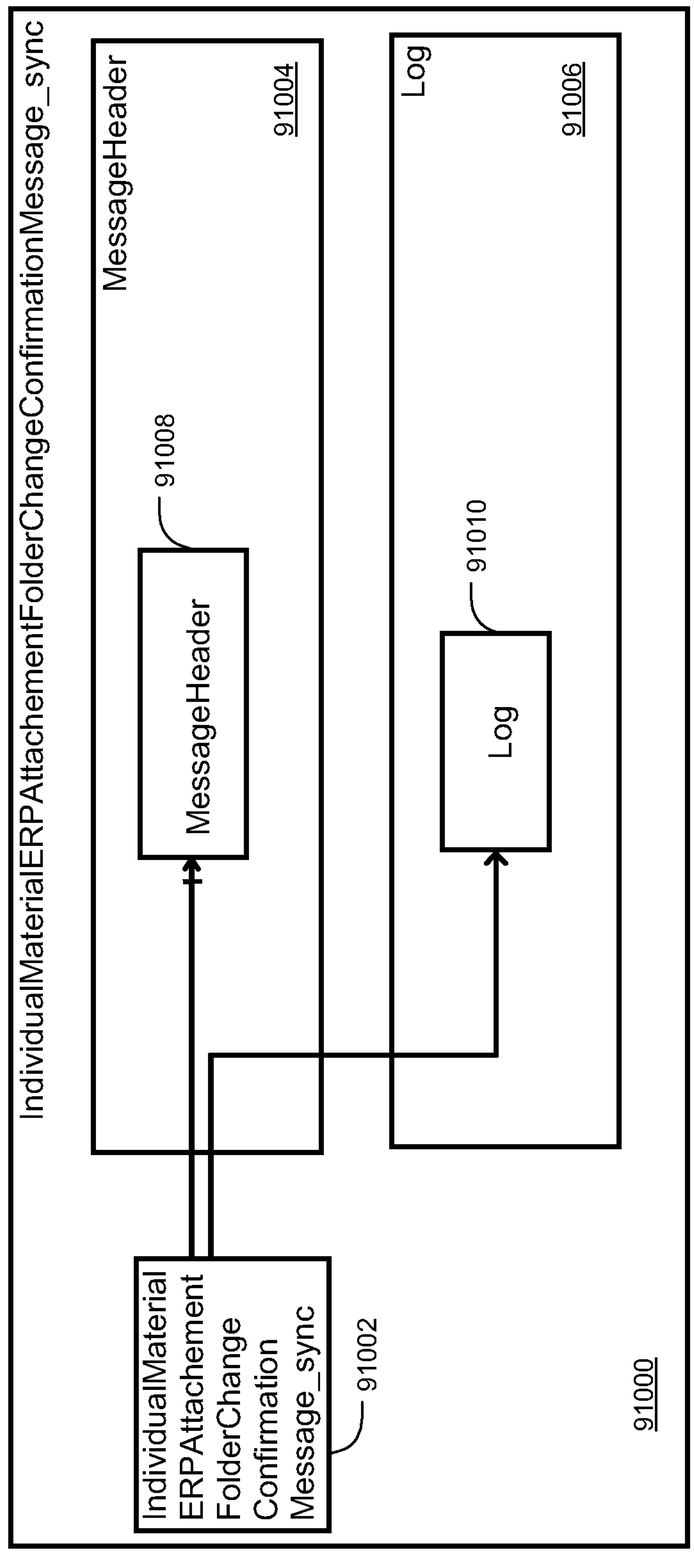
FIG. 91 shows an exemplary IndividualMaterialERPAttachmentFolderChangeConfirmationMessage_sync Message Data Type.

Additionally, FIG. 91 illustrates one example logical configuration of IndividualMaterialERPAttachmentFolderChangeConfirmationMessage_sync message 91000. Specifically, this figure depicts the arrangement and hierarchy of various components such as one or more levels of packages, entities, and datatypes, shown here as 91000 through 91010. As described above, packages may be used to represent hierarchy levels. Entities are discrete business elements that are used during a business transaction. Data types are used to type object entities and interfaces with a structure. For example, IndividualMaterialERPAttachmentFolderChangeConfirmationMessage_sync message 91000 includes, among other things, Log 91006. Accordingly, heterogeneous applications may communicate using this consistent message configured as such.

Figure 92:
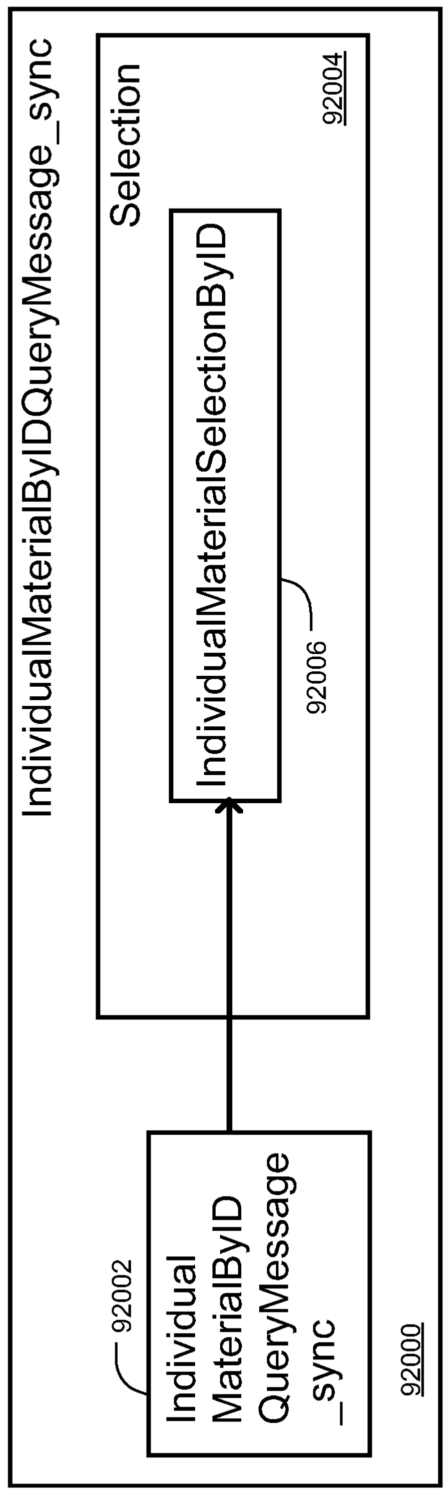
FIG. 92 shows an exemplary IndividualMaterialByIDQueryMessage_sync Message Data Type.

Additionally, FIG. 92 illustrates one example logical configuration of IndividualMaterialByIDQueryMessage_sync message 92000. Specifically, this figure depicts the arrangement and hierarchy of various components such as one or more levels of packages, entities, and datatypes, shown here as 92000 through 92006. As described above, packages may be used to represent hierarchy levels. Entities are discrete business elements that are used during a business transaction. Data types are used to type object entities and interfaces with a structure. For example, IndividualMaterialByIDQueryMessage_sync message 92000 includes, among other things, Selection 92004. Accordingly, heterogeneous applications may communicate using this consistent message configured as such.

Figure 93:
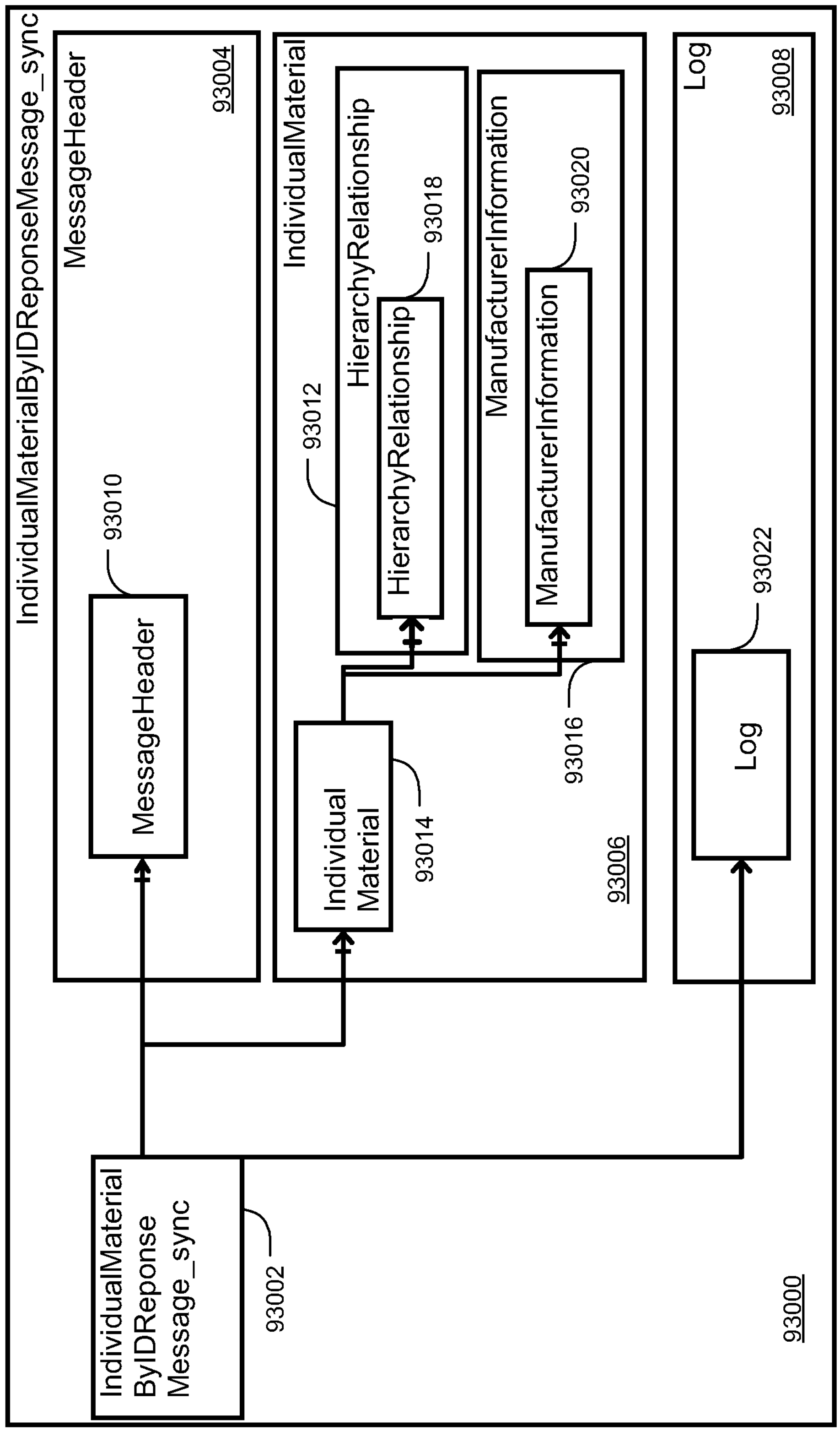
FIG. 93 shows an exemplary IndividualMaterialByIDResponseMessage_sync Message Data Type.

Additionally, FIG. 93 illustrates one example logical configuration of IndividualMaterialByIDResponseMessage_sync message 93000. Specifically, this figure depicts the arrangement and hierarchy of various components such as one or more levels of packages, entities, and datatypes, shown here as 93000 through 93022. As described above, packages may be used to represent hierarchy levels. Entities are discrete business elements that are used during a business transaction. Data types are used to type object entities and interfaces with a structure. For example, IndividualMaterialByIDResponseMessage_sync message 93000 includes, among other things, IndividualMaterial 93006. Accordingly, heterogeneous applications may communicate using this consistent message configured as such.

Figure 94:
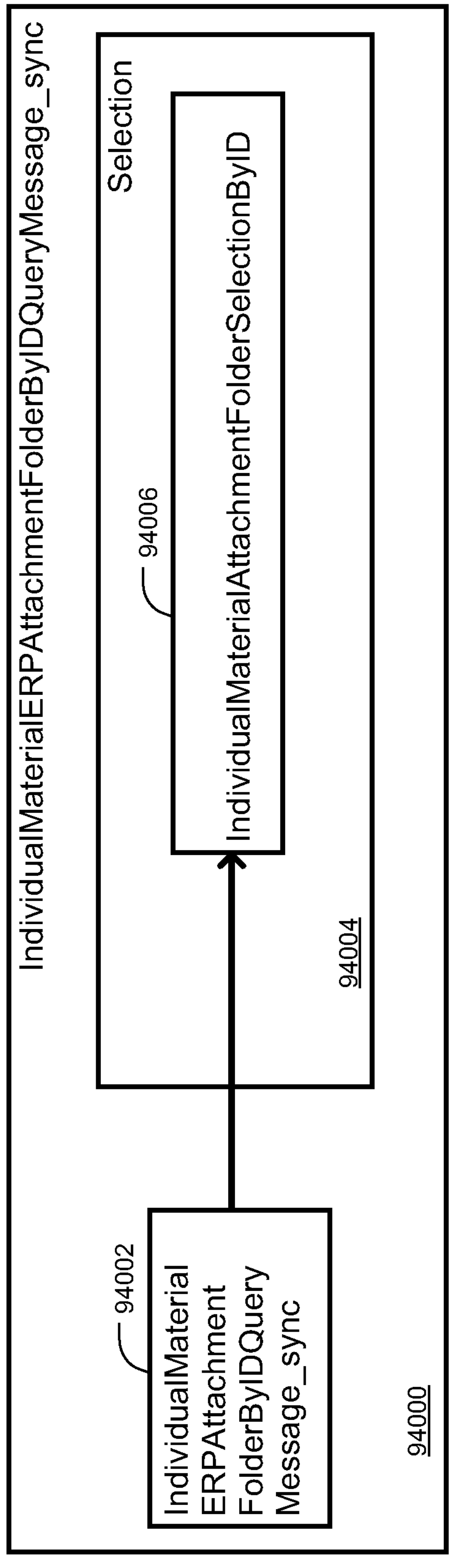
FIG. 94 shows an exemplary IndividualMaterialERPAttachmentFolderByIDQueryMessage_sync Message Data Type.

Additionally, FIG. 94 illustrates one example logical configuration of IndividualMaterialERPAttachmentFolderByIDQueryMessage_sync message 94000. Specifically, this figure depicts the arrangement and hierarchy of various components such as one or more levels of packages, entities, and datatypes, shown here as 94000 through 94006. As described above, packages may be used to represent hierarchy levels. Entities are discrete business elements that are used during a business transaction. Data types are used to type object entities and interfaces with a structure. For example, IndividualMaterialERPAttachmentFolderByIDQueryMessage_sync message 94000 includes, among other things, Selection 94004. Accordingly, heterogeneous applications may communicate using this consistent message configured as such.

Figure 95:
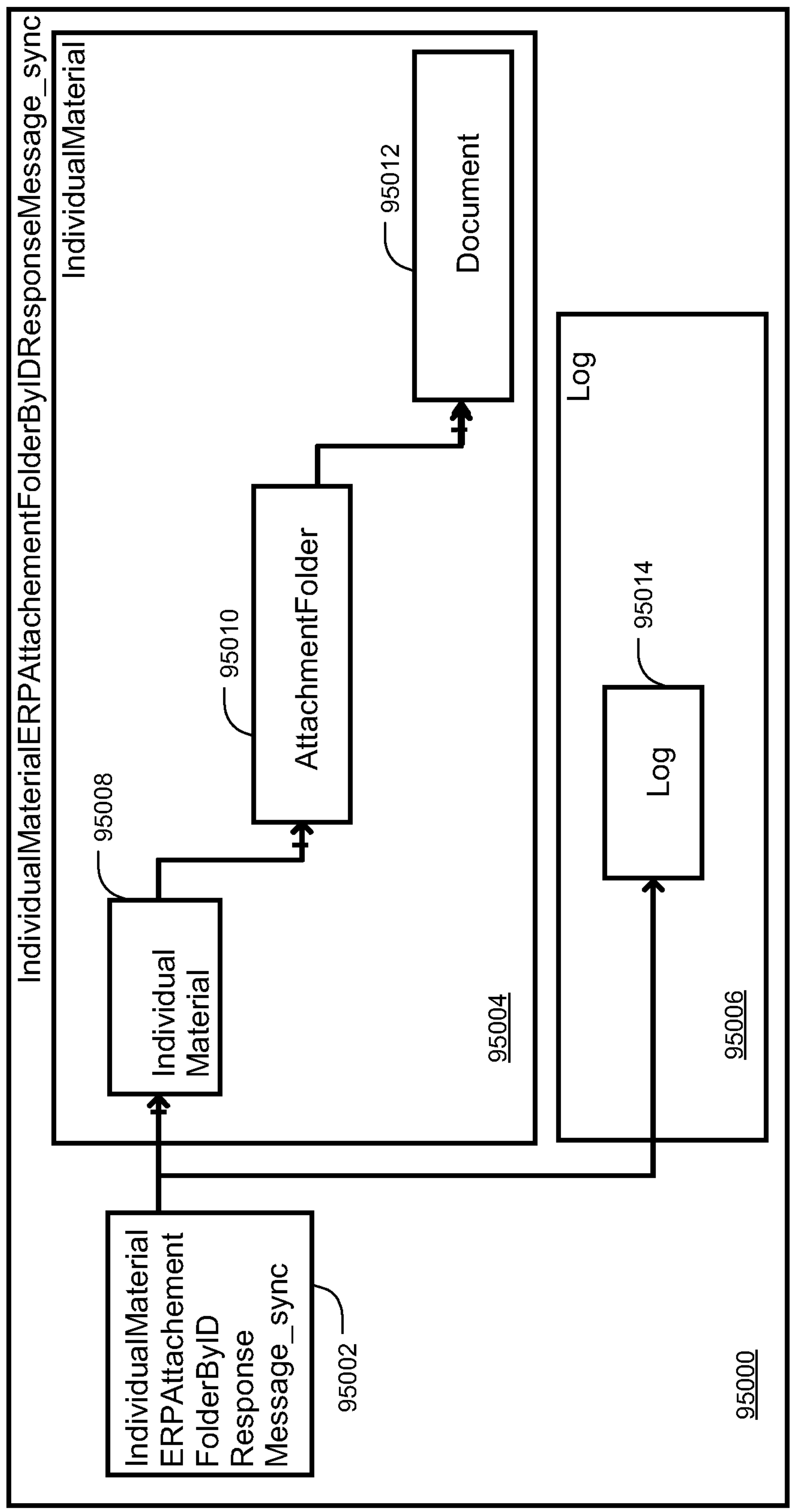
FIG. 95 shows an exemplary IndividualMaterialERPAttachmentFolderByIDResponseMessage_sync Message Data Type.

Additionally, FIG. 95 illustrates one example logical configuration of IndividualMaterialERPAttachmentFolderByIDResponseMessage_sync message 95000. Specifically, this figure depicts the arrangement and hierarchy of various components such as one or more levels of packages, entities, and datatypes, shown here as 95000 through 95014. As described above, packages may be used to represent hierarchy levels. Entities are discrete business elements that are used during a business transaction. Data types are used to type object entities and interfaces with a structure. For example, IndividualMaterialERPAttachmentFolderByIDResponseMessage_sync message 95000 includes, among other things, IndividualMaterial 95004. Accordingly, heterogeneous applications may communicate using this consistent message configured as such.

Figure 96:
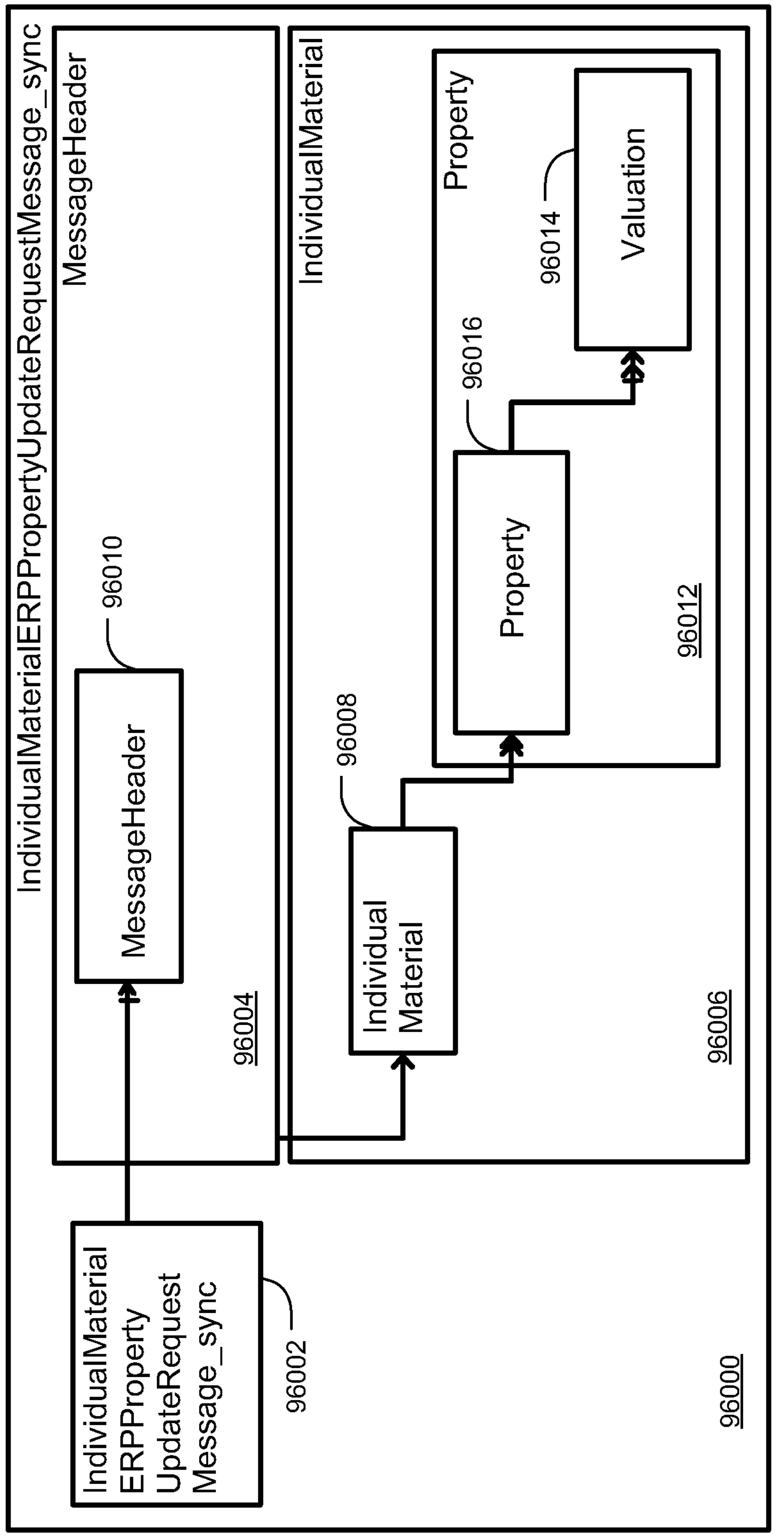
FIG. 96 shows an exemplary IndividualMaterialERPPropertyUpdateRequestMessage_sync Message Data Type.

Additionally, FIG. 96 illustrates one example logical configuration of IndividualMaterialERPPropertyUpdateRequestMessage_sync message 96000. Specifically, this figure depicts the arrangement and hierarchy of various components such as one or more levels of packages, entities, and datatypes, shown here as 96000 through 96016. As described above, packages may be used to represent hierarchy levels. Entities are discrete business elements that are used during a business transaction. Data types are used to type object entities and interfaces with a structure. For example, IndividualMaterialERPPropertyUpdateRequestMessage_sync message 96000 includes, among other things, IndividualMaterial 96006. Accordingly, heterogeneous applications may communicate using this consistent message configured as such.

Figure 97:
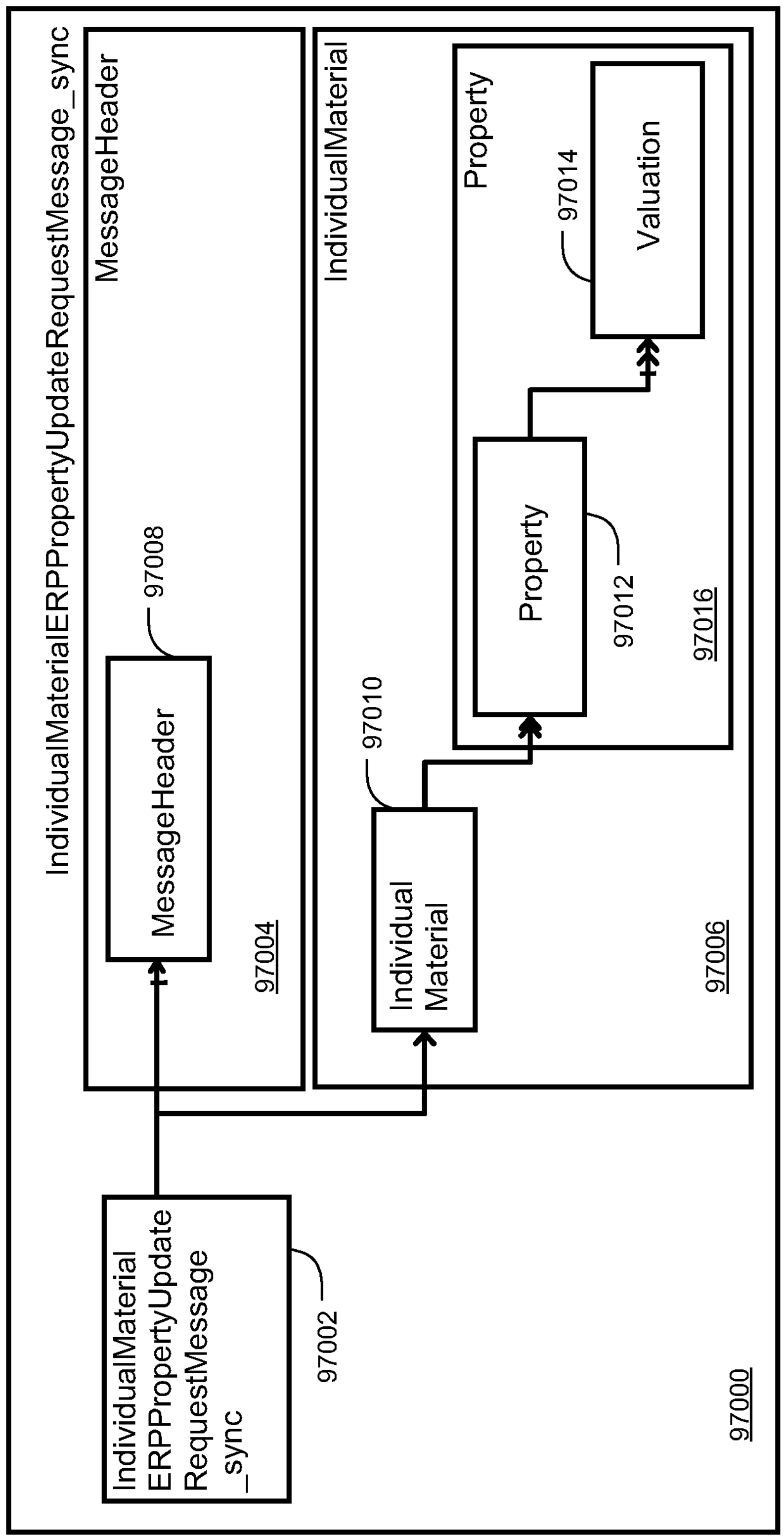
FIG. 97 shows an exemplary IndividualMaterialERPPropertyUpdateRequestMessage_sync Message Data Type.

Additionally, FIG. 97 illustrates one example logical configuration of IndividualMaterialERPPropertyUpdateRequestMessage_sync message 97000. Specifically, this figure depicts the arrangement and hierarchy of various components such as one or more levels of packages, entities, and datatypes, shown here as 97000 through 97016. As described above, packages may be used to represent hierarchy levels. Entities are discrete business elements that are used during a business transaction. Data types are used to type object entities and interfaces with a structure. For example, IndividualMaterialERPPropertyUpdateRequestMessage_sync message 97000 includes, among other things, IndividualMaterial 97006. Accordingly, heterogeneous applications may communicate using this consistent message configured as such.

Figure 98:
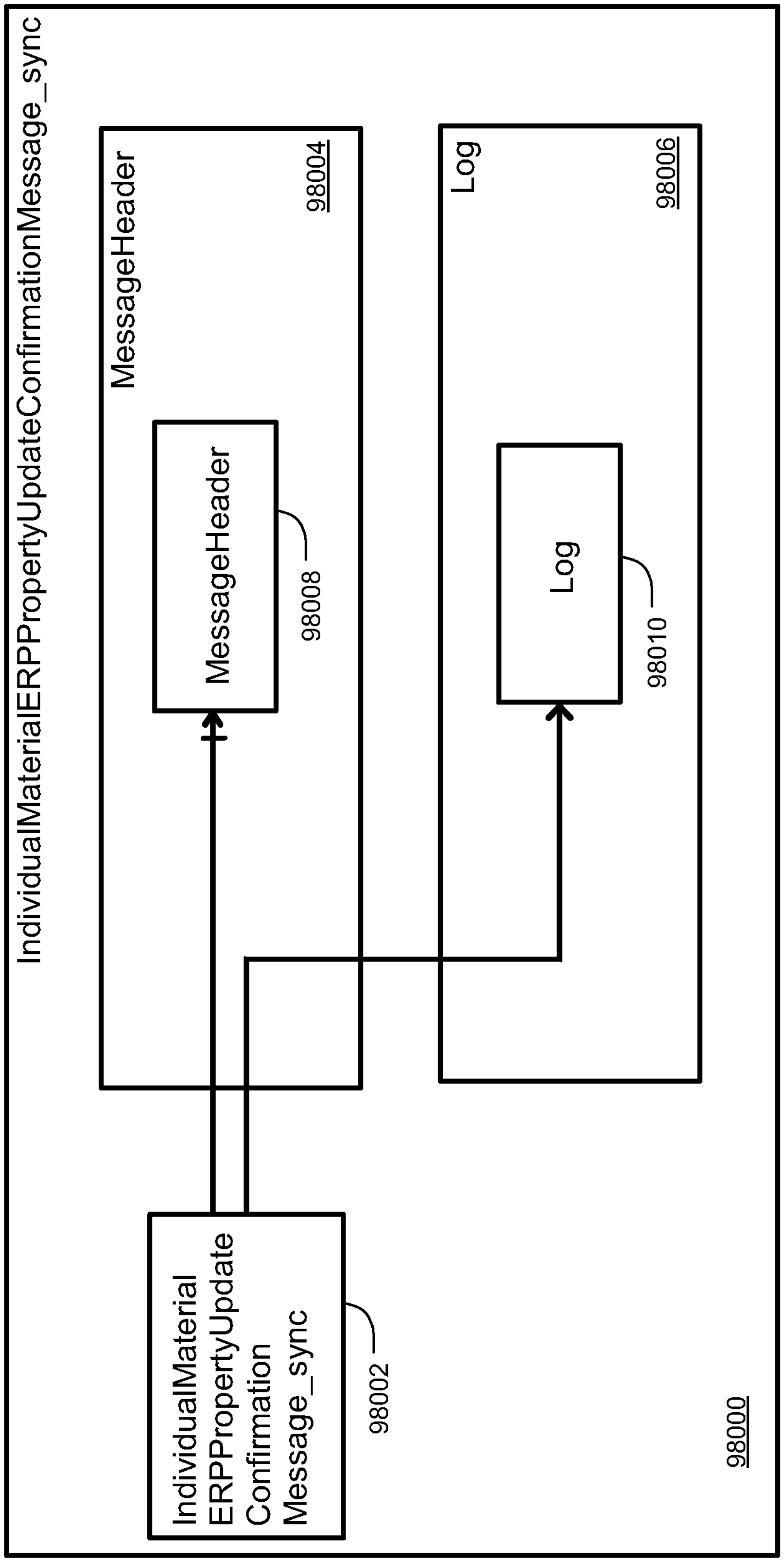
FIG. 98 shows an exemplary IndividualMaterialERPPropertyUpdateConfirmationMessage_sync Message Data Type.

Additionally, FIG. 98 illustrates one example logical configuration of IndividualMaterialERPPropertyUpdateConfirmationMessage_sync message 98000. Specifically, this figure depicts the arrangement and hierarchy of various components such as one or more levels of packages, entities, and datatypes, shown here as 98000 through 98010. As described above, packages may be used to represent hierarchy levels. Entities are discrete business elements that are used during a business transaction. Data types are used to type object entities and interfaces with a structure. For example, IndividualMaterialERPPropertyUpdateConfirmationMessage_sync message 98000 includes, among other things, Log 98006. Accordingly, heterogeneous applications may communicate using this consistent message configured as such.

FIGS. 99-1 through 99-5 illustrate one example logical configuration of an IndividualMaterialMessage_sync 99000 element structure. Specifically, these figures depict the arrangement and hierarchy of various components such as one or more levels of packages, entities, and datatypes, shown here as 99000 through 99122. As described above, packages may be used to represent hierarchy levels. Entities are discrete business elements that are used during a business transaction. Data types are used to type object entities and interfaces with a structure. For example, the IndividualMaterialMessage_sync 99000 includes, among other things, an IndividualMaterialMessage_sync 99002. Accordingly, heterogeneous applications may communicate using this consistent message configured as such.

FIG. 100 illustrates one example logical configuration of an IndividualMaterialByIDQueryMessage_sync 100000 element structure. Specifically, this figure depicts the arrangement and hierarchy of various components such as one or more levels of packages, entities, and datatypes, shown here as 100000 through 100024. As described above, packages may be used to represent hierarchy levels. Entities are discrete business elements that are used during a business transaction. Data types are used to type object entities and interfaces with a structure. For example, the IndividualMaterialByIDQueryMessage_sync 100000 includes, among other things, an IndividualMaterialByIDQueryMessage_sync 100002. Accordingly, heterogeneous applications may communicate using this consistent message configured as such.

FIGS. 101-1 through 101-4 illustrate one example logical configuration of an IndividualMaterialByIDResponseMessage_sync 101000 element structure. Specifically, these figures depict the arrangement and hierarchy of various components such as one or more levels of packages, entities, and datatypes, shown here as 101000 through 101110. As described above, packages may be used to represent hierarchy levels. Entities are discrete business elements that are used during a business transaction. Data types are used to type object entities and interfaces with a structure. For example, the IndividualMaterialByIDResponseMessage_sync 101000 includes, among other things, an IndividualMaterialByIDResponseMessage_sync 101002. Accordingly, heterogeneous applications may communicate using this consistent message configured as such.

FIGS. 102-1 through 102-2 illustrate one example logical configuration of an IndividualMaterialInstallRequestMessage_sync 102000 element structure. Specifically, these figures depict the arrangement and hierarchy of various components such as one or more levels of packages, entities, and datatypes, shown here as 102000 through 102048. As described above, packages may be used to represent hierarchy levels. Entities are discrete business elements that are used during a business transaction. Data types are used to type object entities and interfaces with a structure. For example, the IndividualMaterialInstallRequestMessage_sync 102000 includes, among other things, an IndividualMaterialInstallRequestMessage_sync 102002. Accordingly, heterogeneous applications may communicate using this consistent message configured as such.

FIG. 103 illustrates one example logical configuration of an IndividualMaterialInstallConfirmationMessage_sync 103000 element structure. Specifically, this figure depicts the arrangement and hierarchy of various components such as one or more levels of packages, entities, and datatypes, shown here as 103000 through 103020. As described above, packages may be used to represent hierarchy levels. Entities are discrete business elements that are used during a business transaction. Data types are used to type object entities and interfaces with a structure. For example, the IndividualMaterialInstallConfirmationMessage_sync 103000 includes, among other things, an IndividualMaterialInstallConfirmationMessage_sync 103002. Accordingly, heterogeneous applications may communicate using this consistent message configured as such.

FIGS. 104-1 through 104-2 illustrate one example logical configuration of an IndividualMaterialDismantleRequestMessage_sync 104000 element structure. Specifically, these figures depict the arrangement and hierarchy of various components such as one or more levels of packages, entities, and datatypes, shown here as 104000 through 104042. As described above, packages may be used to represent hierarchy levels. Entities are discrete business elements that are used during a business transaction. Data types are used to type object entities and interfaces with a structure. For example, the IndividualMaterialDismantleRequestMessage_sync 104000 includes, among other things, an IndividualMaterialDismantleRequestMessage_sync 104002. Accordingly, heterogeneous applications may communicate using this consistent message configured as such.

FIG. 105 illustrates one example logical configuration of an IndividualMaterialDismantleConfirmationMessage_sync 105000 element structure. Specifically, this figure depicts the arrangement and hierarchy of various components such as one or more levels of packages, entities, and datatypes, shown here as 105000 through 105020. As described above, packages may be used to represent hierarchy levels. Entities are discrete business elements that are used during a business transaction. Data types are used to type object entities and interfaces with a structure. For example, the IndividualMaterialDismantleConfirmationMessage_sync 105000 includes, among other things, an IndividualMaterialDismantleConfirmationMessage_sync 105002. Accordingly, heterogeneous applications may communicate using this consistent message configured as such.

FIGS. 106-1 through 106-2 illustrate one example logical configuration of an IndividualMaterialSimpleByElementsQueryMessage_sync 106000 element structure. Specifically, these figures depict the arrangement and hierarchy of various components such as one or more levels of packages, entities, and datatypes, shown here as 106000 through 106046. As described above, packages may be used to represent hierarchy levels. Entities are discrete business elements that are used during a business transaction. Data types are used to type object entities and interfaces with a structure. For example, the IndividualMaterialSimpleByElementsQueryMessage_sync 106000 includes, among other things, an IndividualMaterialSimpleByElementsQueryMessage_sync 106002. Accordingly, heterogeneous applications may communicate using this consistent message configured as such.

FIG. 107 illustrates one example logical configuration of an IndividualMaterialSimpleByElementsResponseMessage_sync 107000 element structure. Specifically, this figure depicts the arrangement and hierarchy of various components such as one or more levels of packages, entities, and datatypes, shown here as 107000 through 107030. As described above, packages may be used to represent hierarchy levels. Entities are discrete business elements that are used during a business transaction. Data types are used to type object entities and interfaces with a structure. For example, the IndividualMaterialSimpleByElementsResponseMessage_sync 107000 includes, among other things, an IndividualMaterialSimpleByElementsResponseMessage_sync 107002. Accordingly, heterogeneous applications may communicate using this consistent message configured as such.

FIG. 108 illustrates one example logical configuration of an IndividualMaterialSimpleByWarrantyQueryMessage_sync 108000 element structure. Specifically, this figure depicts the arrangement and hierarchy of various components such as one or more levels of packages, entities, and datatypes, shown here as 108000 through 108030. As described above, packages may be used to represent hierarchy levels. Entities are discrete business elements that are used during a business transaction. Data types are used to type object entities and interfaces with a structure. For example, the IndividualMaterialSimpleByWarrantyQueryMessage_sync 108000 includes, among other things, an IndividualMaterialSimpleByWarrantyQueryMessage_sync 108002. Accordingly, heterogeneous applications may communicate using this consistent message configured as such.

FIGS. 109-1 through 109-2 illustrate one example logical configuration of an IndividualMaterialSimpleByWarrantyResponseMessage_sync 109000 element structure. Specifically, these figures depict the arrangement and hierarchy of various components such as one or more levels of packages, entities, and datatypes, shown here as 109000 through 109038. As described above, packages may be used to represent hierarchy levels. Entities are discrete business elements that are used during a business transaction. Data types are used to type object entities and interfaces with a structure. For example, the IndividualMaterialSimpleByWarrantyResponseMessage_sync 109000 includes, among other things, an IndividualMaterialSimpleByWarrantyResponseMessage_sync 109002. Accordingly, heterogeneous applications may communicate using this consistent message configured as such.

A maintenance technician may use details of individual material to plan and execute maintenance activities on them. The information can be obtained by querying for individual material based on ID, basic data or based on warranty information. The IndividualMaterial interface performs various operations, namely an IndividualMaterialERPCreateRequestConfirmation_In, an IndividualMaterialERPCreateCheckQueryResponse_In, an IndividualMaterialERPChangeRequestConfirmation_In, an IndividualMaterialERPPropertyByIDQueryResponse_In, an IndividualMaterialERPUserStatusChangeRequestConfirmation_In, an IndividualMaterialSimpleByElementsQueryResponse_In, an IndividualMaterialERPReplaceRequestConfirmation_In, an IndividualMaterialERPUpdateRequestConfirmation_In, an IndividualMaterialERPUpdateCheckQueryResponse_In, an IndividualMaterialERPSetDeleteIndicatorRequestConfirmation_In, an IndividualMaterialERPResetDeleteIndicatorRequestConfirmation_In, an IndividualMaterialERPAttachmentCreateRequestConfirmation_In, an IndividualMaterialERPAttachmentFolderChangeRequestConfirmation_In, an IndividualMaterialERPAttachmentCancelRequestConfirmation_In, an IndividualMaterialERPAttachmentFolderByIDQueryResponse_In, an IndividualMaterialERPPropertyUpdateRequestConfirmation_In and an IndividualMaterialByIDQueryResponse_In.

The IndividualMaterialERPCreateRequestConfirmation_In is a request to Product Data Management to create an individual material and get its confirmation. The Create Individual Material inbound operation is used to create an individual material. The IndividualMaterialERPCreateRequestConfirmation_In operation includes various message types, namely an IndividualMaterialERPCreateRequest_sync and an IndividualMaterialERPCreateConfirmation_sync. The structure of the IndividualMaterialERPCreateRequest_sync message type is specified by an IndividualMaterialERPCreateRequestMessage_sync message data type. The structure of the IndividualMaterialERPCreateConfirmation_sync message type is specified by an IndividualMaterialERPCreateConfirmationMessage_sync message data type.

The IndividualMaterialERPCreateCheckQueryResponse_In is an enquiry to Product Data Management to check the consistency of the creation of an individual material. The Check Individual Material Creation inbound operation is used to check the consistency of the creation of an individual material. This operation simulates the creation of an individual material. The IndividualMaterialERPCreateCheckQueryResponse_In operation includes various message types, namely an IndividualMaterialERPCreateCheckQuery_sync and an IndividualMaterialERPCreateCheckResponse_sync. The structure of the IndividualMaterialERPCreateCheckQuery_sync message type is specified by an IndividualMaterialERPCreateCheckQueryMessage_sync message data type. The structure of the IndividualMaterialERPCreateCheckResponse_sync message type is specified by an IndividualMaterialERPCreateCheckResponseMessage_sync message data type.

The IndividualMaterialERPChangeRequestConfirmation_In is a request to Product Data Management to change an individual material and get its confirmation. The Change Individual Material inbound operation is used to change an individual material. The IndividualMaterialERPChangeRequestConfirmation_In operation includes various message types, namely an IndividualMaterialERPChangeRequest_sync and an IndividualMaterialERPChangeConfirmation_sync. The structure of the IndividualMaterialERPChangeRequest_sync message type is specified by an IndividualMaterialERPChangeRequestMessage_sync message data type. The structure of the IndividualMaterialERPChangeConfirmation_sync message type is specified by an IndividualMaterialERPChangeConfirmationMessage_sync message data type.

The IndividualMaterialERPPropertyByIDQueryResponse_In is an enquiry to Product Data Management to read the property information of an individual material. The Read Individual Material Property inbound operation is used to read the property information of an individual material. The IndividualMaterialERPPropertyByIDQueryResponse_In operation includes various message types, namely an IndividualMaterialERPPropertyByIDQuery_sync and an IndividualMaterialERPPropertyByIDResponse_sync. The structure of the IndividualMaterialERPPropertyByIDQuery_sync message type is specified by an IndividualMaterialERPPropertyByIDQueryMessage_sync message data type. The structure of the IndividualMaterialERPPropertyByIDResponse_sync message type is specified by an IndividualMaterialERPPropertyByIDResponseMessage_sync message data type.

The IndividualMaterialERPUserStatusChangeRequestConfirmation_In is a request to Product Data Management to change the user status of an individual material and get its confirmation. The Change Individual Material User Status inbound operation is used to change the user status of an individual material. The IndividualMaterialERPUserStatusChangeRequestConfirmation_In operation includes various message types, namely an IndividualMaterialERPUserStatusChangeRequest_sync and an IndividualMaterialERPUserStatusChangeConfirmation_sync. The structure of the IndividualMaterialERPUserStatusChangeRequest_sync message type is specified by an IndividualMaterialERPUserStatusChangeRequestMessage_sync message data type. The structure of the IndividualMaterialERPUserStatusChangeConfirmation_sync message type is specified by an IndividualMaterialERPUserStatusChangeConfirmationMessage_sync message data type.

The IndividualMaterialSimpleByElementsQueryResponse_In is an enquiry to Product Data Management to get a list of individual materials based on the selection criteria. The Find Individual Material By Elements inbound operation is used to get a list of Individual Materials based on the selection criteria. The IndividualMaterialSimpleByElementsQueryResponse_In operation includes various message types, namely an IndividualMaterialSimpleByElementsQuery_sync and an IndividualMaterialSimpleByElementsResponse_sync. The structure of the IndividualMaterialSimpleByElementsQuery_sync message type is specified by an IndividualMaterialSimpleByElementsQueryMessage_sync message data type. The structure of the IndividualMaterialSimpleByElementsResponse_sync message type is specified by an IndividualMaterialSimpleByElementsResponseMessage_sync message data type.

The IndividualMaterialERPReplaceRequestConfirmation_In is a request to Product Data Management to replace an individual material with another individual material and get its confirmation. The Replace Individual Material inbound operation is used to dismantle an individual material and install another individual material. The IndividualMaterialERPReplaceRequestConfirmation_In operation includes various message types, namely an IndividualMaterialERPReplaceRequest_sync and an IndividualMaterialERPReplaceConfirmation_sync. The structure of the IndividualMaterialERPReplaceRequest_sync message type is specified by an IndividualMaterialERPReplaceRequestMessage_sync message data type. The structure of the IndividualMaterialERPReplaceConfirmation_sync message type is specified by an IndividualMaterialERPReplaceConfirmationMessage_sync message data type.

The IndividualMaterialERPUpdateRequestConfirmation_In is a request to Product Data Management to update an individual material and get its confirmation. The Update Individual Material inbound operation is used to update an individual material. This operation simulates update of an individual material. The IndividualMaterialERPUpdateRequestConfirmation_In operation includes various message types, namely an IndividualMaterialERPUpdateRequest_sync and an IndividualMaterialERPUpdateConfirmation_sync. The structure of the IndividualMaterialERPUpdateRequest_sync message type is specified by an IndividualMaterialERPUpdateRequestMessage_sync message data type. The structure of the IndividualMaterialERPUpdateConfirmation_sync message type is specified by an IndividualMaterialERPUpdateConfirmationMessage_sync message data type.

The IndividualMaterialERPUpdateCheckQueryResponse_In is an enquiry to Product Data Management to check the consistency of the update of an individual material. The Check Individual Material Update inbound operation is used to check the consistency of the update of an individual material. The IndividualMaterialERPUpdateCheckQueryResponse_In operation includes various message types, namely an IndividualMaterialERPUpdateCheckQuery_sync and an IndividualMaterialERPUpdateCheckResponse_sync. The structure of the IndividualMaterialERPUpdateCheckQuery_sync message type is specified by an IndividualMaterialERPUpdateCheckQueryMessage_sync message data type. The structure of the IndividualMaterialERPUpdateCheckResponse_sync message type is specified by an IndividualMaterialERPUpdateCheckResponseMessage_sync message data type.

The IndividualMaterialERPSetDeleteIndicatorRequestConfirmation_In is a request to Product Data Management to set the delete indicator for an individual material and get its confirmation. The Set Individual Material Delete Indicator inbound operation is used to mark an individual material for deletion. The IndividualMaterialERPSetDeleteIndicatorRequestConfirmation_In operation includes various message types, namely an IndividualMaterialERPSetDeleteIndicatorRequest_sync and an IndividualMaterialERPSetDeleteIndicatorConfirmation_sync. The structure of the IndividualMaterialERPSetDeleteIndicatorRequest_sync message type is specified by an IndividualMaterialERPSetDeleteIndicatorRequestMessage_sync message data type. The structure of the IndividualMaterialERPSetDeleteIndicatorConfirmation_sync message type is specified by an IndividualMaterialERPSetDeleteIndicatorConfirmationMessage_sync message data type.

The IndividualMaterialERPResetDeleteIndicatorRequestConfirmation_In is a request to Product Data Management to reset the delete indicator for an individual material and get its confirmation. The Reset Individual Material Delete Indicator inbound operation is used to undo the marking of an individual material for deletion. The IndividualMaterialERPResetDeleteIndicatorRequestConfirmation_In operation includes various message types, namely an IndividualMaterialERPResetDeleteIndicatorRequest_sync and an IndividualMaterialERPResetDeleteIndicatorConfirmation_sync. The structure of the IndividualMaterialERPResetDeleteIndicatorRequest_sync message type is specified by an IndividualMaterialERPResetDeleteIndicatorRequestMessage_sync message data type. The structure of the IndividualMaterialERPResetDeleteIndicatorConfirmation_sync message type is specified by an IndividualMaterialERPResetDeleteIndicatorConfirmationMessage_sync message data type.

IndividualMaterialERPAttachmentCreateRequestConfirmation_In is a request to Product Data Management to create an attachment for an individual material and get its confirmation. The Create Individual Material Attachment inbound operation is used to create an attachment for an individual material. The IndividualMaterialERPAttachmentCreateRequestConfirmation_In operation includes various message types, namely an IndividualMaterialERPAttachmentCreateRequest_sync and an IndividualMaterialERPAttachmentCreateConfirmation_sync. The structure of the IndividualMaterialERPAttachmentCreateRequest_sync message type is specified by an IndividualMaterialERPAttachmentCreateRequestMessage_sync message data type. The structure of the IndividualMaterialERPAttachmentCreateConfirmation_sync message type is specified by an IndividualMaterialERPAttachmentCreateConfirmationMessage_sync message data type.

The IndividualMaterialERPAttachmentFolderChangeRequestConfirmation_In is a request to Product Data Management to change an attachment folder of an individual material and get its confirmation. The Change Individual Material Attachment Folder inbound operation is used to change an attachment folder of an individual material. This operation is used to create, change or delete a document from attachment folder of an individual material. The IndividualMaterialERPAttachmentFolderChangeRequestConfirmation_In operation includes various message types, namely an IndividualMaterialERPAttachmentFolderChangeRequest_sync and an IndividualMaterialERPAttachmentFolderChangeConfirmation_sync. The structure of the IndividualMaterialERPAttachmentFolderChangeRequest_sync message type is specified by an IndividualMaterialERPAttachmentFolderChangeRequestMessage_sync message data type. The structure of the IndividualMaterialERPAttachmentFolderChangeConfirmation_sync message type is specified by an IndividualMaterialERPAttachmentFolderChangeConfirmationMessage_sync message data type.

IndividualMaterialERPAttachmentCancelRequestConfirmation_In is a request to Product Data Management to delete an attachment of an individual material. The Cancel Individual Material Attachment inbound operation is used to delete an attachment of an individual material. The IndividualMaterialERPAttachmentCancelRequestConfirmation_In operation includes various message types, namely an IndividualMaterialERPAttachmentCancelRequest_sync and an IndividualMaterialERPAttachmentCancelConfirmation_sync. The structure of the IndividualMaterialERPAttachmentCancelRequest_sync message type is specified by an IndividualMaterialERPAttachmentCancelRequestMessage_sync message data type. The structure of the IndividualMaterialERPAttachmentCancelConfirmation_sync message type is specified by an IndividualMaterialERPAttachmentCancelConfirmationMessage_sync message data type.

The IndividualMaterialERPAttachmentFolderByIDQueryResponse_In is an enquiry to Product Data Management to read the attachment folder of an individual material. The Read Individual Material Attachment Folder inbound operation is used to read the attachment folder of an individual material. The IndividualMaterialERPAttachmentFolderByIDQueryResponse_In operation includes various message types, namely an IndividualMaterialERPAttachmentFolderByIDQuery_sync and an IndividualMaterialERPAttachmentFolderByIDResponse_sync. The structure of the IndividualMaterialERPAttachmentFolderByIDQuery_sync message type is specified by an IndividualMaterialERPAttachmentFolderByIDQueryMessage_sync message data type. The structure of the IndividualMaterialERPAttachmentFolderByIDResponse_sync message type is specified by an IndividualMaterialERPAttachmentFolderByIDResponseMessage_sync message data type.

The IndividualMaterialERPPropertyUpdateRequestConfirmation_In is a request to Product Data Management to update the property information of an individual material and get its confirmation. The Update Individual Material Property inbound operation is used to update property information of an individual material. The IndividualMaterialERPPropertyUpdateRequestConfirmation_In operation includes various message types, namely an IndividualMaterialERPPropertyUpdateRequest_sync and an IndividualMaterialERPPropertyUpdateConfirmation_sync. The structure of the IndividualMaterialERPPropertyUpdateRequest_sync message type is specified by an IndividualMaterialERPPropertyUpdateRequestMessage_sync message data type. The structure of the IndividualMaterialERPPropertyUpdateConfirmation_sync message type is specified by an IndividualMaterialERPPropertyUpdateConfirmationMessage_sync message data type.

The IndividualMaterialByIDQueryResponse_In is an enquiry to Product Data Management to read an individual material. The Read Individual Material inbound operation is used to read an individual material. The IndividualMaterialByIDQueryResponse_In operation includes various message types, namely an IndividualMaterialByIDQuery_sync and an IndividualMaterialByIDResponse_sync. The structure of the IndividualMaterialByIDQuery_sync message type is specified by an IndividualMaterialByIDQueryMessage_sync message data type. The structure of the IndividualMaterialByIDResponse_sync message type is specified by an IndividualMaterialByIDResponseMessage_sync message data type.

FIGS. 110-1 through 110-10 show an IndividualMaterialERPMessage_sync 110000 package. The IndividualMaterialERPMessage_sync 110000 package is a <MessageDataType> 110004 data type. The IndividualMaterialERPMessage_sync 110000 package includes an IndividualMaterialERPMessage_sync 110002 entity. The IndividualMaterialERPMessage_sync 110000 package includes various packages, namely a MessageHeader 110006 package, an IndividualMaterial 110012 package and a Log 110206 package.

The MessageHeader 110006 package is a BusinessDocumentMessageHeader 110010 data type. The MessageHeader 110006 package includes a MessageHeader 110008 entity.

The BasicBusinessDocumentMessageHeader is a collection of identification data of an instance of a business document message, or reference data to another instance of a business document message, or both. The subject of the identification data is the message instance that conveys them, whereas the reference data are related to a different message instance previously exchanged between the same interaction parties.

The IndividualMaterial 110012 package includes an IndividualMaterial 110014 entity. The IndividualMaterial 110012 package includes various packages, namely a HierarchyRelationship 110076 package, a ManufacturerInformation 110108 package, a Property 110128 package, an Address 110148 package and an AttachmentFolder 110180 package.

The IndividualMaterial 110014 entity includes various attributes, namely an ID 110016 attribute, a MaterialID 110020 attribute, a SerialID 110024 attribute, a MaintenancePlanningPlantID 110028 attribute, a WorkCentreID 110032 attribute, a WorkCentrePlantID 110036 attribute, an OperatingWorkCentreID 110040 attribute, an OperatingPlantID 110044 attribute, a CustomerID 110048 attribute, a ChangeStateID 110052 attribute, a ProfileIssueCategoryFilterCode 110056 attribute, a CategoryCode 110060 attribute, a Description 110064 attribute, a WorkCentreDescription 110068 attribute and a StatusObject 110072 attribute.

The ID 110016 attribute is a ProductInternalID 110018 data type. The IndividualMaterialID is a proprietary identifier for an individual material. The MaterialID 110020 attribute is a ProductInternalID 110022 data type. The MaterialID is a proprietary identifier for a material. The SerialID 110024 attribute is a SerialID 110026 data type. The SerialID is a unique identifier for an individual instance of a material that is assigned in the context of production.

The MaintenancePlanningPlantID 110028 attribute is a PlantID 110030 data type. The MaintenancePlanningPlantID is an identifier of a MaintenancePlanningPlant. The WorkCentreID 110032 attribute is a WorkCentreID 110034 data type. The WorkCentreID is an identifier of a WorkCentre. The WorkCentrePlantID 110036 attribute is a PlantID 110038 data type. The WorkCentrePlantID is an identifier of a plant to which work centre is assigned.

The OperatingWorkCentreID 110040 attribute is a WorkCentreID 110042 data type. The OperatingWorkCentreID is an identifier of a WorkCentre where individual material is located. The OperatingPlantID 110044 attribute is a PlantID 110046 data type. The OperatingPlantID is an identifier of a Plant where individual material is located. The CustomerID 110048 attribute is a CustomerID 110050 data type. The CustomerID is a unique identifier for a Customer.

The ChangeStateID 110052 attribute is a ChangeStateID 110054 data type. The ChangeStateId is a unique identifier for a change state. The ProfileIssueCategoryFilterCode 110056 attribute is an IssueCategoryFilterCode 110058 data type. The IssueCategoryFilter Code is a coded representation of the filter for issue categories in issue category catalogues. The CategoryCode 110060 attribute is an IndividualMaterialCategoryCode 110062 data type. The IndividualMaterialCategoryCode is the coded representation of the category of an individual material.

The Description 110064 attribute is a SHORT_Description 110066 data type. The description is a representation of the properties of an IndividualMaterial in natural language. The WorkCentreDescription 110068 attribute is a SHORT_Description 110070 data type. The description is a representation of the properties of a work centre in natural language. The StatusObject 110072 attribute is a StatusObject 110074 data type. The UserStatus is the representation of a business-related status of an object defined by a user.

The HierarchyRelationship 110076 package includes a HierarchyRelationship 110078 entity. The HierarchyRelationship 110078 entity includes various attributes, namely a ParentProductID 110080 attribute, an InstalledChildIndividualMaterialID 110084 attribute, a ReplacementChildIndividualMaterialID 110088 attribute, an InstallationPositionID 110092 attribute, an InstallationDateTime 110096 attribute, a DismantlingDateTime 110100 attribute and a ReplacementDateTime 110104 attribute.

The ParentProductID 110080 attribute is a ProductInternalID 110082 data type. The ParentProductID is a proprietary identifier for a parent of an individual material. The InstalledChildIndividualMaterialID 110084 attribute is a ProductInternalID 110086 data type. The InstalledChildIndividualMaterialID is a proprietary identifier for an installed individual material. The ReplacementChildIndividualMaterialID 110088 attribute is a ProductInternalID 110090 data type. The ReplacementChildIndividualMaterial is a proprietary identifier for an individual material used as replacement. The InstallationPositionID 110092 attribute is an InstallationPositionID 110094 data type. The InstallationPositionID is an identifier for the installation position of individual material at parent individual material. The InstallationDateTime 110096 attribute is a TIMEZONE_INDEPENDENT_DateTime 110098 data type. The InstallationDateTime is the date and time of installation of an individual material at another individual material accurate-to-the-second time-point of a calendar day.

The DismantlingDateTime 110100 attribute is a TIMEZONE_INDEPENDENT_DateTime 110102 data type. The DismantlingDateTime is the date and time of dismantling of an individual material from another individual material accurate-to-the-second time-point of a calendar day. The ReplacementDateTime 110104 attribute is a TIMEZONE_INDEPENDENT_DateTime 110106 data type. The ReplacementDateTime is the date and time of replacement of an individual material from another individual material accurate-to-the-second time-point of a calendar day.

The ManufacturerInformation 110108 package includes a ManufacturerInformation 110110 entity. The ManufacturerInformation 110110 entity includes various attributes, namely a PartNumberID 110112 attribute, a SerialID 110116 attribute, a PartyInternalID 110120 attribute and a ProductModelID 110124 attribute. The PartNumberID 110112 attribute is a ProductInternalID 110114 data type. The PartNumberID is the proprietary identifier for an individual material assigned by the manufacturer which identifies an individual material in the manufacturer's domain.

The SerialID 110116 attribute is a SerialID 110118 data type. The SerialID is a unique identifier for an individual instance of an individual material assigned by the manufacturer. The PartyInternalID 110120 attribute is a PartyInternalID 110122 data type. The PartyInternalID is a proprietary identifier for a manufacturer party. The ProductModelID 110124 attribute is a ProductModelID 110126 data type. The ProductModelID is a unique identifier for a model of an individual material in the manufacturer's domain.

The Property 110128 package includes a Property 110130 entity. The Property 110130 entity includes various attributes, namely a CollectionID 110132 attribute, a CollectionTypeCode 110136 attribute, an @actionCode 110140 attribute and a Valuation 110144 attribute. The CollectionID 110132 attribute is a PropertyCollectionID 110134 data type. The PropertyCollectionID is an identifier for a property collection.

The CollectionTypeCode 110136 attribute is a PropertyCollectionTypeCode 110138 data type. The PropertyCollectionTypeCode is a coded representation of the type of a property collection. The @actionCode 110140 attribute is an ActionCode 110142 data type. The ActionCode is a coded representation of an instruction to the recipient of a message telling it how to process a transmitted element. The Valuation 110144 attribute is a PropertyValuation 110146 data type. The PropertyValuation is the assignment of one or more values to a simple or complex property. It contains one or more ValueGroups. A ValueGroup assigns a property value to a simple property. The ValueGroup assigns several ValueGroups, and thus their values, to a complex property.

The Address 110148 package includes an Address 110150 entity. The Address 110150 entity includes various attributes, namely a HouseID 110152 attribute, a StreetPostalCode 110156 attribute, a CountryCode 110160 attribute, a CountryName 110164 attribute, a CityName 110168 attribute, a StreetName 110172 attribute and a Telephone 110176 attribute.

The HouseID 110152 attribute is a HouseID 110154 data type. The HouseID is a unique identifier of a building or building section within a street by means of a house number. The StreetPostalCode 110156 attribute is a PostalCode 110158 data type. The PostalCode is a coded representation of a postcode. The CountryCode 110160 attribute is a CountryCode 110162 data type. The CountryCode is a coded representation of a country defined by either national or administrative borders. The CountryName 110164 attribute is a MEDIUM_Name 110166 data type. The CountryName is the word that describes a country name.

The CityName 110168 attribute is a MEDIUM_Name 110170 data type. The MEDIUM_Name is the name of the city in address. The StreetName 110172 attribute is a StreetName 110174 data type. The StreetName is a word or combination of words that describe(s) a street name. The Telephone 110176 attribute is a Telephone 110178 data type. The Telephone is the information about a telephone number, with which a person or organization can be reached.

The AttachmentFolder 110180 package includes an AttachmentFolder 110182 entity. The AttachmentFolder 110182 entity includes a Document 110184 subordinate entity. The Document 110184 entity includes various attributes, namely a Name 110186 attribute, a TypeCode 110190 attribute, an AlternativeDocumentID 110194 attribute, a VersionID 110198 attribute and an @actioncode 110202 attribute. The Name 110186 attribute is a LANGUAGEINDEPENDENT_EXTENDED_NAME 110188 data type.

The TypeCode 110190 attribute is a DocumentTypeCode 110192 data type. The AlternativeDocumentID 110194 attribute is an AlternativeDocumentID 110196 data type. The VersionID 110198 attribute is a VersionID 110200 data type. The @actioncode 110202 attribute is an ActionCode 110204 data type.

The Log 110206 package is a Log 110210 data type. The Log 110206 package includes a Log 110208 entity. The Log is a sequence of messages that result when an application executes a task.

FIGS. 111-1 through 111-5 illustrate one example logical configuration of an IndividualMaterialERPCreateRequestMessage_sync 111000 element structure. Specifically, these figures depict the arrangement and hierarchy of various components such as one or more levels of packages, entities, and datatypes, shown here as 111000 through 111124. As described above, packages may be used to represent hierarchy levels. Entities are discrete business elements that are used during a business transaction. Data types are used to type object entities and interfaces with a structure. For example, the IndividualMaterialERPCreateRequestMessage_sync 111000 includes, among other things, an IndividualMaterialERPCreateRequestMessage_sync 111002. Accordingly, heterogeneous applications may communicate using this consistent message configured as such. The data types of the various packages, entities, and attributes are described with respect to FIG. 110.

FIG. 112 illustrates one example logical configuration of an IndividualMaterialERPCreateConfirmationMessage_sync 112000 element structure. Specifically, this figure depicts the arrangement and hierarchy of various components such as one or more levels of packages, entities, and datatypes, shown here as 112000 through 112024. As described above, packages may be used to represent hierarchy levels. Entities are discrete business elements that are used during a business transaction. Data types are used to type object entities and interfaces with a structure. For example, the IndividualMaterialERPCreateConfirmationMessage_sync 112000 includes, among other things, an IndividualMaterialERPCreateConfirmationMessage_sync 112002. Accordingly, heterogeneous applications may communicate using this consistent message configured as such. The data types of the various packages, entities, and attributes are described with respect to FIG. 110.

FIGS. 113-1 through 113-5 illustrate one example logical configuration of an IndividualMaterialERPCreateCheckQueryMessage_sync 113000 element structure. Specifically, these figures depict the arrangement and hierarchy of various components such as one or more levels of packages, entities, and datatypes, shown here as 113000 through 113122. As described above, packages may be used to represent hierarchy levels. Entities are discrete business elements that are used during a business transaction. Data types are used to type object entities and interfaces with a structure. For example, the IndividualMaterialERPCreateCheckQueryMessage_sync 113000 includes, among other things, an IndividualMaterialERPCreateCheckQueryMessage_sync 113002. Accordingly, heterogeneous applications may communicate using this consistent message configured as such. The data types of the various packages, entities, and attributes are described with respect to FIG. 110.

FIG. 114 illustrates one example logical configuration of an IndividualMaterialERPCreateCheckResponseMessage_sync 114000 element structure. Specifically, this figure depicts the arrangement and hierarchy of various components such as one or more levels of packages, entities, and datatypes, shown here as 114000 through 114008. As described above, packages may be used to represent hierarchy levels. Entities are discrete business elements that are used during a business transaction. Data types are used to type object entities and interfaces with a structure. For example, the IndividualMaterialERPCreateCheckResponseMessage_sync 114000 includes, among other things, an IndividualMaterialERPCreateCheckResponseMessage_sync 114002. Accordingly, heterogeneous applications may communicate using this consistent message configured as such. The data types of the various packages, entities, and attributes are described with respect to FIG. 110.

FIGS. 115-1 through 115-4 illustrate one example logical configuration of an IndividualMaterialERPChangeRequestMessage_sync 115000 element structure. Specifically, these figures depict the arrangement and hierarchy of various components such as one or more levels of packages, entities, and datatypes, shown here as 115000 through 115098. As described above, packages may be used to represent hierarchy levels. Entities are discrete business elements that are used during a business transaction. Data types are used to type object entities and interfaces with a structure. For example, the IndividualMaterialERPChangeRequestMessage_sync 115000 includes, among other things, an IndividualMaterialERPChangeRequestMessage_sync 115002. Accordingly, heterogeneous applications may communicate using this consistent message configured as such. The data types of the various packages, entities, and attributes are described with respect to FIG. 110.

FIG. 116 illustrates one example logical configuration of an IndividualMaterialChangeConfirmationMessage_sync 116000 element structure. Specifically, this figure depicts the arrangement and hierarchy of various components such as one or more levels of packages, entities, and datatypes, shown here as 116000 through 116024. As described above, packages may be used to represent hierarchy levels. Entities are discrete business elements that are used during a business transaction. Data types are used to type object entities and interfaces with a structure. For example, the IndividualMaterialChangeConfirmationMessage_sync 116000 includes, among other things, an IndividualMaterialERPChangeConfirmationMessage_sync 116002. Accordingly, heterogeneous applications may communicate using this consistent message configured as such. The data types of the various packages, entities, and attributes are described with respect to FIG. 110.

FIG. 117 illustrates one example logical configuration of an IndividualMaterialERPPropertyByIDQueryMessage_sync 117000 element structure. Specifically, this figure depicts the arrangement and hierarchy of various components such as one or more levels of packages, entities, and datatypes, shown here as 117000 through 117012. As described above, packages may be used to represent hierarchy levels. Entities are discrete business elements that are used during a business transaction. Data types are used to type object entities and interfaces with a structure. For example, the IndividualMaterialERPPropertyByIDQueryMessage_sync 117000 includes, among other things, an IndividualMaterialERPPropertyByIDQueryMessage_sync 117002. Accordingly, heterogeneous applications may communicate using this consistent message configured as such. The data types of the various packages, entities, and attributes are described with respect to FIG. 110.

FIGS. 118-1 through 118-2 illustrate one example logical configuration of an IndividualMaterialERPPropertyByIDResponseMessage_sync 118000 element structure. Specifically, these figures depict the arrangement and hierarchy of various components such as one or more levels of packages, entities, and datatypes, shown here as 118000 through 118048. As described above, packages may be used to represent hierarchy levels. Entities are discrete business elements that are used during a business transaction. Data types are used to type object entities and interfaces with a structure. For example, the IndividualMaterialERPPropertyByIDResponseMessage_sync 118000 includes, among other things, an IndividualMaterialERPPropertyByIDResponseMessage_sync 118002. Accordingly, heterogeneous applications may communicate using this consistent message configured as such. The data types of the various packages, entities, and attributes are described with respect to FIG. 110.

FIG. 119 illustrates one example logical configuration of an IndividualMaterialERPUserStatusChangeRequestMessage_sync 119000 element structure. Specifically, this figure depicts the arrangement and hierarchy of various components such as one or more levels of packages, entities, and datatypes, shown here as 119000 through 119022. As described above, packages may be used to represent hierarchy levels. Entities are discrete business elements that are used during a business transaction. Data types are used to type object entities and interfaces with a structure. For example, the IndividualMaterialERPUserStatusChangeRequestMessage_sync 119000 includes, among other things, an IndividualMaterialERPUserStatusChangeRequestMessage_sync 119002. Accordingly, heterogeneous applications may communicate using this consistent message configured as such. The data types of the various packages, entities, and attributes are described with respect to FIG. 110.

FIG. 120 illustrates one example logical configuration of an IndividualMaterialERPUserStatusChangeConfirmationMessage_sync 120000 element structure. Specifically, this figure depicts the arrangement and hierarchy of various components such as one or more levels of packages, entities, and datatypes, shown here as 120000 through 120014. As described above, packages may be used to represent hierarchy levels. Entities are discrete business elements that are used during a business transaction. Data types are used to type object entities and interfaces with a structure. For example, the IndividualMaterialERPUserStatusChangeConfirmationMessage_sync 120000 includes, among other things, an IndividualMaterialERPUserStatusChangeConfirmationMessage_sync 120002. Accordingly, heterogeneous applications may communicate using this consistent message configured as such. The data types of the various packages, entities, and attributes are described with respect to FIG. 110.

FIGS. 121-1 through 121-3 illustrate one example logical configuration of an IndividualMaterialERPSimpleByElementsQueryMessage_sync 121000 element structure. Specifically, these figures depict the arrangement and hierarchy of various components such as one or more levels of packages, entities, and datatypes, shown here as 121000 through 121066. As described above, packages may be used to represent hierarchy levels. Entities are discrete business elements that are used during a business transaction. Data types are used to type object entities and interfaces with a structure. For example, the IndividualMaterialERPSimpleByElementsQueryMessage_sync 121000 includes, among other things, an IndividualMaterialERPSimpleByElementsQueryMessage_sync 121002. Accordingly, heterogeneous applications may communicate using this consistent message configured as such. The data types of the various packages, entities, and attributes are described with respect to FIG. 110.

FIGS. 122-1 through 122-2 illustrate one example logical configuration of an IndividualMaterialERPSimpleByElementsResponseMessage_sync 122000 element structure. Specifically, these figures depict the arrangement and hierarchy of various components such as one or more levels of packages, entities, and datatypes, shown here as 122000 through 122040. As described above, packages may be used to represent hierarchy levels. Entities are discrete business elements that are used during a business transaction. Data types are used to type object entities and interfaces with a structure. For example, the IndividualMaterialERPSimpleByElementsResponseMessage_sync 122000 includes, among other things, an IndividualMaterialERPSimple- ByElementsResponseMessage_sync 122002. Accordingly, heterogeneous applications may communicate using this consistent message configured as such. The data types of the various packages, entities, and attributes are described with respect to FIG. 110.

FIGS. 123-1 through 123-2 illustrate one example logical configuration of an IndividualMaterialERPReplaceRequestMessage_sync 123000 element structure. Specifically, these figures depict the arrangement and hierarchy of various components such as one or more levels of packages, entities, and datatypes, shown here as 123000 through 123036. As described above, packages may be used to represent hierarchy levels. Entities are discrete business elements that are used during a business transaction. Data types are used to type object entities and interfaces with a structure. For example, the IndividualMaterialERPReplaceRequestMessage_sync 123000 includes, among other things, an IndividualMaterialERPReplaceRequestMessage_sync 123002. Accordingly, heterogeneous applications may communicate using this consistent message configured as such. The data types of the various packages, entities, and attributes are described with respect to FIG. 110.

FIG. 124 illustrates one example logical configuration of an IndividualMaterialERPReplaceConfirmationMessage_sync 124000 element structure. Specifically, this figure depicts the arrangement and hierarchy of various components such as one or more levels of packages, entities, and datatypes, shown here as 124000 through 124014. As described above, packages may be used to represent hierarchy levels. Entities are discrete business elements that are used during a business transaction. Data types are used to type object entities and interfaces with a structure. For example, the IndividualMaterialERPReplaceConfirmationMessage_sync 124000 includes, among other things, an IndividualMaterialERPReplaceConfirmationMessage_sync 124002. Accordingly, heterogeneous applications may communicate using this consistent message configured as such. The data types of the various packages, entities, and attributes are described with respect to FIG. 110.

FIGS. 125-1 through 125-5 illustrate one example logical configuration of an IndividualMaterialERPUpdateRequestMessage_sync 125000 element structure. Specifically, these figures depict the arrangement and hierarchy of various components such as one or more levels of packages, entities, and datatypes, shown here as 125000 through 125110. As described above, packages may be used to represent hierarchy levels. Entities are discrete business elements that are used during a business transaction. Data types are used to type object entities and interfaces with a structure. For example, the IndividualMaterialERPUpdateRequestMessage_sync 125000 includes, among other things, an IndividualMaterialERPUpdateRequestMessage_sync 125002. Accordingly, heterogeneous applications may communicate using this consistent message configured as such. The data types of the various packages, entities, and attributes are described with respect to FIG. 110.

FIG. 126 illustrates one example logical configuration of an IndividualMaterialChangeConfirmationMessage_sync 126000 element structure. Specifically, this figure depicts the arrangement and hierarchy of various components such as one or more levels of packages, entities, and datatypes, shown here as 126000 through 126024. As described above, packages may be used to represent hierarchy levels. Entities are discrete business elements that are used during a business transaction. Data types are used to type object entities and interfaces with a structure. For example, the IndividualMaterialChangeConfirmationMessage_sync 126000 includes, among other things, an IndividualMaterialERPUpdateConfirmationMessage_sync 126002. Accordingly, heterogeneous applications may communicate using this consistent message configured as such. The data types of the various packages, entities, and attributes are described with respect to FIG. 110.

FIGS. 127-1 through 127-4 illustrate one example logical configuration of an IndividualMaterialERPUpdateCheckQueryMessage_sync 127000 element structure. Specifically, these figures depict the arrangement and hierarchy of various components such as one or more levels of packages, entities, and datatypes, shown here as 127000 through 127092. As described above, packages may be used to represent hierarchy levels. Entities are discrete business elements that are used during a business transaction. Data types are used to type object entities and interfaces with a structure. For example, the IndividualMaterialERPUpdateCheckQueryMessage_sync 127000 includes, among other things, an IndividualMaterialERPUpdateCheckQueryMessage_sync 127002. Accordingly, heterogeneous applications may communicate using this consistent message configured as such. The data types of the various packages, entities, and attributes are described with respect to FIG. 110.

FIG. 128 illustrates one example logical configuration of an IndividualMaterialERPUpdateCheckResponseMessage_sync 128000 element structure. Specifically, this figure depicts the arrangement and hierarchy of various components such as one or more levels of packages, entities, and datatypes, shown here as 128000 through 128008. As described above, packages may be used to represent hierarchy levels. Entities are discrete business elements that are used during a business transaction. Data types are used to type object entities and interfaces with a structure. For example, the IndividualMaterialERPUpdateCheckResponseMessage_sync 128000 includes, among other things, an IndividualMaterialERPUpdateCheckResponseMessage_sync 128002. Accordingly, heterogeneous applications may communicate using this consistent message configured as such. The data types of the various packages, entities, and attributes are described with respect to FIG. 110.

FIG. 129 illustrates one example logical configuration of an IndividualMaterialERPSetDeleteIndicatorRequestMessage_sync 129000 element structure. Specifically, this figure depicts the arrangement and hierarchy of various components such as one or more levels of packages, entities, and datatypes, shown here as 129000 through 129018. As described above, packages may be used to represent hierarchy levels. Entities are discrete business elements that are used during a business transaction. Data types are used to type object entities and interfaces with a structure. For example, the IndividualMaterialERPSetDeleteIndicatorRequestMessage_sync 129000 includes, among other things, an IndividualMaterialERPSetDeleteIndicatorRequestMessage_sync 129002. Accordingly, heterogeneous applications may communicate using this consistent message configured as such. The data types of the various packages, entities, and attributes are described with respect to FIG. 110.

FIG. 130 illustrates one example logical configuration of an IndividualMaterialERPSetDeleteIndicatorConfirmationMessage_sync 130000 element structure. Specifically, this figure depicts the arrangement and hierarchy of various components such as one or more levels of packages, entities, and datatypes, shown here as 130000 through 130014. As described above, packages may be used to represent hierarchy levels. Entities are discrete business elements that are used during a business transaction. Data types are used to type object entities and interfaces with a structure. For example, the IndividualMaterialERPSetDeleteIndicatorConfirmationMessage_sync 130000 includes, among other things, an IndividualMaterialERPSetDeleteIndicatorConfirmationMessage_sync 130002. Accordingly, heterogeneous applications may communicate using this consistent message configured as such. The data types of the various packages, entities, and attributes are described with respect to FIG. 110.

FIG. 131 illustrates one example logical configuration of an IndividualMaterialERPResetDeleteIndicatorRequestMessage_sync 131000 element structure. Specifically, this figure depicts the arrangement and hierarchy of various components such as one or more levels of packages, entities, and datatypes, shown here as 131000 through 131018. As described above, packages may be used to represent hierarchy levels. Entities are discrete business elements that are used during a business transaction. Data types are used to type object entities and interfaces with a structure. For example, the IndividualMaterialERPResetDeleteIndicatorRequestMessage_sync 131000 includes, among other things, an IndividualMaterialERPResetDeleteIndicatorRequestMessage_sync 131002. Accordingly, heterogeneous applications may communicate using this consistent message configured as such. The data types of the various packages, entities, and attributes are described with respect to FIG. 110.

FIG. 132 illustrates one example logical configuration of an IndividualMaterialERPResetDeleteIndicatorConfirmationMessage_sync 132000 element structure. Specifically, this figure depicts the arrangement and hierarchy of various components such as one or more levels of packages, entities, and datatypes, shown here as 132000 through 132014. As described above, packages may be used to represent hierarchy levels. Entities are discrete business elements that are used during a business transaction. Data types are used to type object entities and interfaces with a structure. For example, the IndividualMaterialERPResetDeleteIndicatorConfirmationMessage_sync 132000 includes, among other things, an IndividualMaterialERPResetDeleteIndicatorConfirmationMessage_sync 132002. Accordingly, heterogeneous applications may communicate using this consistent message configured as such. The data types of the various packages, entities, and attributes are described with respect to FIG. 110.

FIGS. 133-1 through 133-2 illustrate one example logical configuration of an IndividualMaterialERPAttachmentFolderChangeRequestMessage_sync 133000 element structure. Specifically, these figures depict the arrangement and hierarchy of various components such as one or more levels of packages, entities, and datatypes, shown here as 133000 through 133048. As described above, packages may be used to represent hierarchy levels. Entities are discrete business elements that are used during a business transaction. Data types are used to type object entities and interfaces with a structure. For example, the IndividualMaterialERPAttachmentFolderChangeRequestMessage_sync 133000 includes, among other things, an IndividualMaterialERPAttachmentFolderUpdateRequestMessage_sync 133002. Accordingly, heterogeneous applications may communicate using this consistent message configured as such. The data types of the various packages, entities, and attributes are described with respect to FIG. 110.

FIG. 134 illustrates one example logical configuration of an IndividualMaterialERPAttachmentFolderChangeConfirmationMessage_sync 134000 element structure. Specifically, this figure depicts the arrangement and hierarchy of various components such as one or more levels of packages, entities, and datatypes, shown here as 134000 through 134014. As described above, packages may be used to represent hierarchy levels. Entities are discrete business elements that are used during a business transaction. Data types are used to type object entities and interfaces with a structure. For example, the IndividualMaterialERPAttachmentFolderChangeConfirmationMessage_sync 134000 includes, among other things, an IndividualMaterialERPAttachmentFolderChangeConfirmationMessage_sync 134002. Accordingly, heterogeneous applications may communicate using this consistent message configured as such. The data types of the various packages, entities, and attributes are described with respect to FIG. 110.

FIG. 135 illustrates one example logical configuration of an IndividualMaterialByIDQueryMessage_sync 135000 element structure. Specifically, this figure depicts the arrangement and hierarchy of various components such as one or more levels of packages, entities, and datatypes, shown here as 135000 through 135012. As described above, packages may be used to represent hierarchy levels. Entities are discrete business elements that are used during a business transaction. Data types are used to type object entities and interfaces with a structure. For example, the IndividualMaterialByIDQueryMessage_sync 135000 includes, among other things, an IndividualMaterialByIDQueryMessage_sync 135002. Accordingly, heterogeneous applications may communicate using this consistent message configured as such. The data types of the various packages, entities, and attributes are described with respect to FIG. 110.

FIGS. 136-1 through 136-3 illustrate one example logical configuration of an IndividualMaterialByIDResponseMessage_sync 136000 element structure. Specifically, these figures depict the arrangement and hierarchy of various components such as one or more levels of packages, entities, and datatypes, shown here as 136000 through 136080. As described above, packages may be used to represent hierarchy levels. Entities are discrete business elements that are used during a business transaction. Data types are used to type object entities and interfaces with a structure. For example, the IndividualMaterialByIDResponseMessage_sync 136000 includes, among other things, an IndividualMaterialByIDResponseMessage_sync 136002. Accordingly, heterogeneous applications may communicate using this consistent message configured as such. The data types of the various packages, entities, and attributes are described with respect to FIG. 110.

FIG. 137 illustrates one example logical configuration of an IndividualMaterialERPAttachmentFolderByIDQueryMessage_sync 137000 element structure. Specifically, this figure depicts the arrangement and hierarchy of various components such as one or more levels of packages, entities, and datatypes, shown here as 137000 through 137012. As described above, packages may be used to represent hierarchy levels. Entities are discrete business elements that are used during a business transaction. Data types are used to type object entities and interfaces with a structure. For example, the IndividualMaterialERPAttachmentFolderByIDQueryMessage_sync 137000 includes, among other things, an IndividualMaterialERPAttachmentFolderByIDQueryMessage_sync 137002. Accordingly, heterogeneous applications may communicate using this consistent message configured as such. The data types of the various packages, entities, and attributes are described with respect to FIG. 110.

FIGS. 138-1 through 138-2 illustrate one example logical configuration of an IndividualMaterialERPAttachmentFolderByIDResponseMessage_sync 138000 element structure. Specifically, these figures depict the arrangement and hierarchy of various components such as one or more levels of packages, entities, and datatypes, shown here as 138000 through 138044. As described above, packages may be used to represent hierarchy levels. Entities are discrete business elements that are used during a business transaction. Data types are used to type object entities and interfaces with a structure. For example, the IndividualMaterialERPAttachmentFolderByIDResponseMessage_sync 138000 includes, among other things, an IndividualMaterialERPAttachmentFolderByIDResponseMessage_sync 138002. Accordingly, heterogeneous applications may communicate using this consistent message configured as such. The data types of the various packages, entities, and attributes are described with respect to FIG. 110.

FIGS. 139-1 through 139-2 illustrate one example logical configuration of an IndividualMaterialERPPropertyUpdateRequestMessage_sync 139000 element structure. Specifically, these figures depict the arrangement and hierarchy of various components such as one or more levels of packages, entities, and datatypes, shown here as 139000 through 139040. As described above, packages may be used to represent hierarchy levels. Entities are discrete business elements that are used during a business transaction. Data types are used to type object entities and interfaces with a structure. For example, the IndividualMaterialERPPropertyUpdateRequestMessage_sync 139000 includes, among other things, an IndividualMaterialERPPropertyUpdateRequestMessage_sync 139002. Accordingly, heterogeneous applications may communicate using this consistent message configured as such. The data types of the various packages, entities, and attributes are described with respect to FIG. 110.

FIGS. 140-1 through 140-2 illustrate one example logical configuration of an IndividualMaterialERPPropertyUpdateRequestMessage_sync 140000 element structure. Specifically, these figures depict the arrangement and hierarchy of various components such as one or more levels of packages, entities, and datatypes, shown here as 140000 through 140040. As described above, packages may be used to represent hierarchy levels. Entities are discrete business elements that are used during a business transaction. Data types are used to type object entities and interfaces with a structure. For example, the IndividualMaterialERPPropertyUpdateRequestMessage_sync 140000 includes, among other things, an IndividualMaterialERPPropertyUpdateRequestMessage_sync 140002. Accordingly, heterogeneous applications may communicate using this consistent message configured as such. The data types of the various packages, entities, and attributes are described with respect to FIG. 110.

FIG. 141 illustrates one example logical configuration of an IndividualMaterialERPPropertyUpdateConfirmationMessage_sync 141000 element structure. Specifically, this figure depicts the arrangement and hierarchy of various components such as one or more levels of packages, entities, and datatypes, shown here as 141000 through 141014. As described above, packages may be used to represent hierarchy levels. Entities are discrete business elements that are used during a business transaction. Data types are used to type object entities and interfaces with a structure. For example, the IndividualMaterialERPPropertyUpdateConfirmationMessage_sync 141000 includes, among other things, an IndividualMaterialERPPropertyUpdateConfirmationMessage_sync 141002. Accordingly, heterogeneous applications may communicate using this consistent message configured as such. The data types of the various packages, entities, and attributes are described with respect to FIG. 110.

Message Data Type IndividualMaterialMessage_sync

The message data type IndividualMaterialMessage_sync includes the business information that is relevant for sending a business document in a message, the IndividualMaterial included in the business document, and the business information that is relevant for sending information, warning or error messages when processing operations for the IndividualMaterial. It includes the following packages: MessageHeader, IndividualMaterial, and Log. The IndividualMaterialMessage_sync is used as an abstract maximal message data type, which unifies all packages and entities for the following concrete message data types, as illustrated in the following tables:

| Message data type | Entity cardinality | |
|---|---|---|
| | IndividualMaterial | Log |
| IndividualMaterialByIDResponse_sync | 0 . . . 1 | 1 |
| IndividualMaterialInstallRequest_sync | 1 | 0 |
| IndividualMaterialInstallConfirmation_sync | 0 | 1 |
| IndividualMaterialDismantleRequest_sync | 1 | 0 |
| IndividualMaterialDismantleConfirmation_sync | 0 | 1 |
| IndividualMaterialSimpleByWarrantyResponse_sync | 0 . . . n | 1 |
| IndividualMaterialSimpleByElementsResponse_sync | 0 . . . n | 1 |

| Message data type | IndividualMaterial (Root Node) | HierarchyRelationship | ManufacturerInformation |
|---|---|---|---|
| IndividualMaterialByIDResponse_sync | X | X | X |
| IndividualMaterialInstallRequest_sync | X | X | |
| IndividualMaterialInstallConfirmation_sync | | | |
| IndividualMaterialDismantleRequest_sync | X | X | |

-continued

| Message data type | IndividualMaterial (Root Node) | HierarchyRelationship | ManufacturerInformation |
|---|---|---|---|
| IndividualMaterialDismantleConfirmation_sync | | | |
| IndividualMaterialSimpleByWarrantyResponse_sync | X | | |
| IndividualMaterialSimpleByElementsResponse_sync | X | | |

A MessageHeader package groups the business information that is relevant for sending a business document in a message. It includes the MessageHeader entity. A MessageHeader groups business information from the perspective of the sending application, such as information to identify the business document in a message. It is of type GDT: BasicBusinessDocumentMessageHeader, whereby the following elements of the GDT are used: ID and ReferenceID. The IndividualMaterial package groups all the relevant information for individual material. It includes the IndividualMaterial entity. IndividualMaterial is a material that occurs once in the real world and is therefore uniquely identifiable. An IndividualMaterial is an individual, physical object that can be maintained independently. It can be installed in a technical system or in part of a technical system. It has the information about the hierarchical relationship between the individual material and a parent individual material. It includes the following nodes: HierarchyRelationship and ManufacturerInformation. In some implementations, the elements located directly at IndividualMaterial include: ID, MaterialID, SerialID, MaintenancePlanningPlantID, WorkCentreID, WorkCentrePlantID, Description, and WorkCentreDescription.

A HierarchyRelationship is information about the hierarchical structure of an individual material. It describes the hierarchical relationship between the individual material and a parent individual material. In some implementations, Hierarchy includes the following elements: ParentProductID, InstallationDateTime, DismantlingDateTime, and InstallationPositionID. ParentProductID, which may be based on GDT: ProductInternalID and Qualifier: Parent, is an Identifier for the parent individual material. InstallationDateTime, which may be based on GDT: TIMEZONEINDEPENDENT_DateTime and Qualifier: Installation, is a date and time of installation of individual material at another individual material. DismantlingDateTime, which may be based on GDT: TIMEZONEINDEPENDENT_DateTime and Qualifier: Dismantling, is a date and time of dismantling of individual material from a parent individual material. InstallationPositionID, which may be based on GDT: InstallationPositionID, is an identifier for the installation position of an installed object within an individual material or installation point.

ManufacturerInformation is a collection of information related to the manufacturer of the individual material. Manufacturer information can include information, such as manufacturer name, manufacturing country, manufacturer model number, manufacturer part number, manufacturer serial number, and construction year and month. In some implementations, ManufacturerInformation includes PartNumberID and SerialID. PartNumberID, which may be based on GDT: ProductInternalID, is an identifier that is assigned by the manufacturer which identifies a material in the manufacturer's domain. SerialID, which may be based on GDT: SerialID, is an identifier assigned by the manufacturer which identifies individual instances of a material in the manufacturer's domain.

A Log package groups the messages used for user interaction. It includes the Log entity. A Log is a sequence of messages that result when an application executes a task. The entity Log is of type GDT: Log.

Message Data Type IndividualMaterialByIDQueryMessage_Sync

The message data type IndividualMaterialByIDQueryMessage_sync includes the business information that is relevant for sending a business document in a message, and the Selection included in the business document and it includes the MessageHeader and Selection packages. The Selection package collects all the selection criteria for individual material. It includes the IndividualMaterialSelectionByID entity.

The IndividualMaterialSelectionByID specifies selection criteria for an individual material selection. In some implementations, the element located directly below the node IndividualMaterialSelectionByID is IndividualMaterialID. IndividualMaterialID may be based on GDT: ProductInternalID and is an identifier for an individual material.

Message Data Type IndividualMaterialByIDResponseMessage_Sync

The message data IndividualMaterialByIDResponseMessage_sync includes the business information that is relevant for sending a business document in a message, the IndividualMaterial included in the business document, and the business information that is relevant for sending information, warning or error messages when processing operations for the IndividualMaterial. It includes the MessageHeader, IndividualMaterial, and Log packages. The IndividualMaterial package groups all the relevant information for individual material. It includes the IndividualMaterial entity. IndividualMaterial is a material that occurs once in the real world and is therefore uniquely identifiable. An IndividualMaterial is an individual, physical object that can be maintained independently. It can be installed in a technical system or in part of a technical system.

IndividualMaterial includes the following nodes: HierarchyRelationship and ManufacturerInformation. In some implementations, the elements located directly at IndividualMaterial include: ID, MaterialID, SerialID, MaintenancePlanningPlantID, WorkCentreID, WorkCentrePlantID, Description, and WorkCentreDescription. ID, which may be based on GDT: ProductInternalID, is an identifier for an individual material. MaterialID, which may be based on GDT: ProductInternalID, is an identifier for a material. SerialID, which may be based on GDT: SerialID, is an identifier for an individual instance of a material. MaintenancePlanningPlantID, which may be based on GDT: PlantID and Qualifier: MaintenancePlanning, is an identifier for a plant in which maintenance tasks for the individual material are planned. WorkCentreID, which may be based on GDT: WorkCentreID, is an identifier for a work centre and is unique within the context of a plant. WorkCentrePlantID, which may be based on GDT: PlantID and Qualifier: WorkCentre, is an identifier for a plant to which a work centre is assigned. Description, which may be based on GDT: SHORT_Description and Qualifier: IndividualMaterial, is a description of an individual material. WorkCentreDescription, which may be based on GDT: SHORT_Description and Qualifier: WorkCentre, is a description of a work centre.

A HierarchyRelationship is information about the hierarchical structure of an individual material. It describes the hierarchical relationship between the individual material and a parent individual material. In some implementations, HierarchyRelationship includes the ParentProductID and InstallationPositionID. ParentProductID, which may be based on GDT: ProductInternalID and Qualifier: Parent, is an identifier for the parent individual material. InstallationPositionID, which may be based on GDT: InstallationPositionID, is an identifier for the installation position of an installed object within an individual material or installation point.

ManufacturerInformation is a collection of information related to the manufacturer of the individual material. Manufacturer information can include information, such as manufacturer name, manufacturing country, manufacturer model number, manufacturer part number, manufacturer serial number, and construction year and month.

In some implementations, ManufacturerInformation includes the PartNumberID and SerialID elements. PartNumberID, which may be based on GDT: ProductInternalID, is an identifier that is assigned by the manufacturer, which identifies a material in the manufacturer's domain. SerialID, which may be based on GDT: SerialID, is an identifier assigned by the manufacturer which identifies individual instances of a material in the manufacturer's domain.

Message Data Type IndividualMaterialInstallRequestMessage_Sync

The message data type IndividualMaterialInstallRequestMessage includes the business information that is relevant for sending a business document in a message and the IndividualMaterial included in the business document. It includes the MessageHeader and IndividualMaterial packages. The IndividualMaterial package groups all the relevant information for an individual material. It includes the IndividualMaterial entity. IndividualMaterial is a material that occurs once in the real world and is therefore uniquely identifiable. IndividualMaterial is an individual, physical object that can be maintained independently. It can be installed in a technical system or in part of a technical system. It includes the HierarchyRelationship node. In some implementations, the elements located directly at IndividualMaterial include ID. ID, which may be based on GDT: ProductInternalID, is an identifier for an individual material. A HierarchyRelationship is information about the hierarchical structure of an individual material. It describes the hierarchical relationship between the individual material and a parent individual material. In some implementations, HierarchyRelationship can include the following elements: ParentProductID, InstallationDateTime, and InstallationPositionID. ParentProductID, which may be based on GDT: ProductInternalID and Qualifier: Parent, is an identifier for the parent individual material. InstallationDateTime, which may be based on GDT: TIMEZONEINDEPENDENT_DateTime and Qualifier: Installation, is a date and time of installation of individual material at another individual material. InstallationPositionID, which may be based on GDT: InstallationPositionID, is an identifier for the installation position of an installed object within an individual material or installation point.

Message Data Type IndividualMaterialInstallConfirmationMessage_Sync

The message data type IndividualMaterialInstallConfirmationMessage_sync includes the business information that is relevant for sending a business document in a message and the business information that is relevant for sending information, warning or error messages when processing operations for the IndividualMaterial. It includes the following packages: MessageHeader and Log.

Message Data Type IndividualMaterialDismantleRequestMessage_Sync

The message data type IndividualMaterialIDismantleRequestMessage_sync includes the business information that is relevant for sending a business document in a message and the IndividualMaterial included in the business document. It includes the following packages: MessageHeader and IndividualMaterial. The IndividualMaterial package includes the IndividualMaterial entity. IndividualMaterial is a material that occurs once in the real world and is therefore uniquely identifiable. IndividualMaterial is an individual, physical object that can be maintained independently. It can be installed in a technical system or in part of a technical system. IndividualMaterial includes the HierarchyRelationship node.

The elements located directly at IndividualMaterial can include ID, which may be based on GDT: ProductInternalID, and which is an identifier for an individual material. A HierarchyRelationship is information about the hierarchical structure of an individual material. It describes the hierarchical relationship between the individual material and a parent individual material. In some implementations, HierarchyRelationship can include the following elements: ParentProductID and DismantlingDateTime. ParentProductID, which may be based on GDT: ProductInternalID and Qualifier: Parent, is an identifier for the parent individual material. DismantlingDateTime, which may be based on GDT: TIMEZONEINDEPENDENT_DateTime and Qualifier: Dismantling, is a date and time of dismantling of individual material from a parent individual material.

Message Data Type IndividualMaterialDismantleConfirmationMessage_Sync

The message data type IndividualMaterialDismantleConfirmationMessage_sync includes the business information that is relevant for sending a business document in a message and the business information that is relevant for sending information, warning or error messages when processing operations for the IndividualMaterial. IndividualMaterialDismantleConfirmationMessage_sync includes the MessageHeader package and the Log package.

Message Data Type IndividualMaterialSimpleByWarrantyQueryMessage_Sync

The message data type IndividualMaterialSimpleByWarrantyQueryMessage_sync includes the Selection included in the business document and the business information that is relevant for sending a business document in a message. IndividualMaterialSimpleByWarrantyQueryMessage_sync includes the MessageHeader and Selection packages. The Selection package collects selection criteria for individual material. It includes the IndividualMaterialSimpleSelectionByWarranty entity.

The IndividualMaterialSimpleSelectionByWarranty specifies selection criteria for individual material selection. In some implementations, the elements directly located under IndividualMaterialSimpleSelectionByWarranty include IndividualMaterialWarrantyID and IndividualMaterialWarrantyType. IndividualMaterialWarrantyID, which may be based on GDT: ProductInternalID, is an identifier which uniquely identifies a warranty. IndividualMaterialWarrantyType, which may be based on GDT: WarrantyTypeCode, specifies the type of warranty (e.g., Customer Warranty, Supplier Warranty).

Message Data Type IndividualMaterialSimpleByWarrantyResponseMessage_Sync

The message data type IndividualMaterialSimpleByWarrantyResponseMessage_sync includes the IndividualMaterial included in the business document, the business information that is relevant for sending a business document in a message, and the business information that is relevant for sending information, warning or error messages when processing operations for the IndividualMaterial. IndividualMaterialSimpleByWarrantyResponseMessage_sync includes the following packages: MessageHeader, IndividualMaterial, and Log.

The IndividualMaterial package groups the IndividualMaterial with its packages. It includes the IndividualMaterial entity. An IndividualMaterial is a material that only occurs once in the real world and is therefore uniquely identifiable. An IndividualMaterial is an individual, physical object that can be maintained independently. It can be installed in a technical system or in part of a technical system. In some implementations, the elements located directly at IndividualMaterial include ID and Description. ID, which may be based on GDT: ProductInternalID, is an identifier for an IndividualMaterial. Description, which may be based on GDT: SHORT_Description and Qualifier: IndividualMaterial, is a description of an individual material.

Message Data Type IndividualMaterialSimpleByElementsQueryMessage_Sync

The message data type IndividualMaterialSimpleByElementsQueryMessage_sync includes the Selection included in the business document. It includes the Selection package. The Selection package collects selection criteria for IndividualMaterial information. Selection includes the IndividualMaterialSimpleSelectionByElements entity. The IndividualMaterialSimpleSelectionByElements entity specifies selection criteria for an IndividualMaterial selection.

In some implementations, IndividualMaterialSimpleSelectionByElements includes the following elements: IndividualMaterialMaterialID, IndividualMaterialSerialID, IndividualMaterialWorkCentreID, IndividualMaterialWorkCentrePlantID, IndividualMaterialManufacturerInformationPartNumberID, and IndividualMaterialManufacturerInformationSerialID. IndividualMaterialMaterialID, which may be based on GDT: ProductInternalID, is an identifier for a material. IndividualMaterialSerialID, which may be based on GDT: SerialID, is an identifier for individual instance of a material.

IndividualMaterialWorkCentreID, which may be based on GDT: WorkCentreID, is an identifier for work centre(s) where any activity is performed on the IndividualMaterial. This identifier is unique within the context of a plant. IndividualMaterialWorkCentrePlantID, which may be based on GDT: PlantID and Qualifier: WorkCentre, is an identifier for a plant to which work centre is assigned. IndividualMaterialManufacturerInformationPartNumberID, which may be based on GDT: ProductInternalID, is an identifier that is assigned by the manufacturer which identifies a material in the manufacturer's domain. IndividualMaterialManufacturerInformationSerialID, which may be based on GDT: SerialID, is an identifier assigned by the manufacturer, which identifies individual instances of a material in the manufacturer's domain. In some implementations, this service may be for serialized IndividualMaterial. In some implementations, at least one of the elements listed above are filled. In some implementations, if IndividualMaterialSerialID is filled, then IndividualMaterialMaterialID is also filled. In some implementations, if IndividualMaterialManufacturerInformationSerialID is filled, then IndividualMaterialManufacturerInformationPartNumberID is also filled. In some implementations, if IndividualMaterialWorkCentreID is filled then IndividualMaterialWorkCentrePlantID is also filled and vice versa.

Message Data Type IndividualMaterialSimpleByElementsResponseMessage_Sync

The message data type IndividualMaterialSimpleByElementsResponseMessage_sync includes the IndividualMaterial included in the business document and the business information that is relevant for sending information, warning or error messages when processing operations for the IndividualMaterial. It includes the IndividualMaterial package and the Log package.

The IndividualMaterial package groups the IndividualMaterial with its packages. It includes the IndividualMaterial entity. IndividualMaterial is a material that only occurs once in the real world and is therefore uniquely identifiable. An IndividualMaterial is an individual, serialized, physical object that can be maintained independently. It can be installed in a technical system or in part of a technical system. In some implementations, the elements located directly at IndividualMaterial include ID and Description. ID, which may be based on GDT: ProductInternalID, is an identifier for an individual material. Description, which may be based on GDT: SHORT_Description and Qualifier: IndividualMaterial, is a description of an individual material. In some implementations, this service is for serialized IndividualMaterial.

MeasuringDevice Interfaces

A Measuring device is used to take measurement readings at technical object (Installation point and Individual Material). Maintenance activities are performed on the technical object based on the measurement readings. For example, in a storeroom of fruits, a certain room temperature has to be maintained. The temperature is checked regularly by a thermometer. The storeroom can be represented in the system as an installation point and the thermometer as the measuring device for the installation point. The MeasuringDevice interface performs various operations, namely a MeasuringDeviceERPCreateRequestConfirmation_In, a MeasuringDeviceERPByIDQueryResponse_In and a MeasuringDeviceERPSimpleByElementsQueryResponse_In.

FIG. 142 illustrates an example MeasuringDevice business object model 142008. Specifically, this model depicts interactions among various components of the MeasuringDevice, as well as external components that interact with the MeasuringDevice (shown here as 142000 through 142006 and 142010 through 142022).

A Measuring Device is a measuring device located at a point on an individual material or an installation point with which a specific characteristic of the individual material or installation point is measured. The business object Measuring Device belongs to the process component Measurement Master Data Management The measurement reading recorded can be either quantitative, qualitative or both. A counter is a special type of measuring device. While the values measured by a simple measuring device can increase or decrease at any point in time, the values measured by a counter run either forwards or backwards. Quantitative measurement can be used for a counter.

A number of inbound aggregation relationships can exist, such as from the business object Installation Point/node Installation Point, a relationship including InstallationPoint with a cardinality of C:CN; from the business object MaintenanceIssueCategoryCatalogue/node Category, a relationship including MaintenanceIssueCategoryCatalogueCategory with a cardinality of C:CN; from the business object Measuring Device Template/node MeasuringDeviceTemplate, a relationship including MeasuringDeviceTemplate with a cardinality of C:CN; from the business object Product_Template/node Individual Material, a relationship including IndividualMaterial with a cardinality of C:CN; and from the business object Product_Template/node Material, a relationship including Material with a cardinality of C:CN (to the MeasuringDevice root node 142024).

The message choreography of FIG. 143 describes a possible logical sequence of messages that can be used to realize a Measuring Device business scenario.

A "MaintenancePlanner" system 143000 can request the creation of a measuring device using a MeasuringDeviceERPCreateRequest_sync message 143006 as shown, for example, in FIG. 143. A "Measurement Master Data Management" system 143004 can confirm the request using a MeasuringDeviceERPCreateConfirmation_sync message 143008 as shown, for example, in FIG. 143.

The "MaintenancePlanner" system 143000 can query measuring devices by ID using a MeasuringDeviceERPByIDQuery_sync message 143010 as shown, for example, in FIG. 143. The "Measurement Master Data Management" system 143004 can respond to the query using a MeasuringDeviceERPByIDResponse_sync message 143012 as shown, for example, in FIG. 143.

The "MaintenancePlanner" system 143000 can query measuring devices by elements using a MeasuringDeviceERPSimpleByElementsQuery_sync message 143014 as shown, for example, in FIG. 143. The "Measurement Master Data Management" system 143004 can respond to the query using a MeasuringDeviceERPSimpleByElementsResponse_sync message 143016 as shown, for example, in FIG. 143.

The MeasuringDeviceERPCreateRequestConfirmation_In is a request to and confirmation from Measurement Master Data Management to create a measuring device. The Maintenance Planner can use the inbound operation Create Measuring Device to create a measuring device. The MeasuringDeviceERPCreateRequestConfirmation_In operation includes various message types, namely a MeasuringDeviceERPCreateRequest_sync and a MeasuringDeviceERPCreateConfirmation_sync. The structure of the MeasuringDeviceERPCreateRequest_sync message type is specified by a MeasuringDeviceERPCreateRequestMessage_sync message data type. The structure of the MeasuringDeviceERPCreateConfirmation_sync message type is specified by a MeasuringDeviceERPCreateConfirmationMessage_sync message data type.

The MeasuringDeviceERPByIDQueryResponse_In is a query to and response from Measurement Master Data Management to read a measuring device. The Maintenance Planner can use the inbound operation Read Measuring Device to read a measuring device. The MeasuringDeviceERPByIDQueryResponse_In operation includes various message types, namely a MeasuringDeviceERPByIDQuery_sync and a MeasuringDeviceERPByIDResponse_sync. The structure of the MeasuringDeviceERPByIDQuery_sync message type is specified by a MeasuringDeviceERPByIDQueryMessage_sync message data type. The structure of the MeasuringDeviceERPByIDResponse_sync message type is specified by a MeasuringDeviceERPByIDResponseMessage_sync message data type.

The MeasuringDeviceERPSimpleByElementsQueryResponse_In is a query to and response from Measurement Master Data Management to list measuring devices based on the selection criteria. The Maintenance Planner can use the inbound operation Find Measuring Device by Elements to get a list of measuring devices based on the selection criteria. The MeasuringDeviceERPSimpleByElementsQueryResponse_In operation includes various message types, namely a MeasuringDeviceERPSimpleByElementsQuery_sync and a MeasuringDeviceERPSimpleByElementsResponse_sync. The structure of the MeasuringDeviceERPSimpleByElementsQuery_sync message type is specified by a MeasuringDeviceERPSimpleByElementsQueryMessage_sync message data type. The structure of the MeasuringDeviceERPSimpleByElementsResponse_sync message type is specified by a MeasuringDeviceERPSimpleByElementsResponseMessage_sync message data type.

FIG. 144 illustrates one example logical configuration of MeasuringDeviceERPCreateRequestMessage_sync message 144000. Specifically, this figure depicts the arrangement and hierarchy of various components such as one or more levels of packages, entities, and datatypes, shown here as 144000 through 144010. As described above, packages may be used to represent hierarchy levels. Entities are discrete business elements that are used during a business transaction. Data types are used to type object entities and interfaces with a structure. For example, MeasuringDeviceERPCreateRequestMessage_sync message 144000 includes, among other things, MeasuringDevice 144006. Accordingly, heterogeneous applications may communicate using this consistent message configured as such.

Additionally, FIG. 145 illustrates one example logical configuration of MeasuringDeviceERPCreateConfirmationMessage_sync message 145000. Specifically, this figure depicts the arrangement and hierarchy of various components such as one or more levels of packages, entities, and datatypes, shown here as 145000 through 145014. As described above, packages may be used to represent hierarchy levels. Entities are discrete business elements that are used during a business transaction. Data types are used to type object entities and interfaces with a structure. For example, MeasuringDeviceERPCreateConfirmationMessage_sync message 145000 includes, among other things, MeasuringDevice 145006. Accordingly, heterogeneous applications may communicate using this consistent message configured as such.

Additionally, FIG. 146 illustrates one example logical configuration of MeasuringDeviceERPByIDQueryMessage_sync message 146000. Specifically, this figure depicts the arrangement and hierarchy of various components such as one or more levels of packages, entities, and datatypes, shown here as 146000 through 146006. As described above, packages may be used to represent hierarchy levels. Entities are discrete business elements that are used during a business transaction. Data types are used to type object entities and interfaces with a structure. For example, MeasuringDeviceERPByIDQueryMessage_sync message 146000 includes, among other things, Selection 146004. Accordingly, heterogeneous applications may communicate using this consistent message configured as such.

Additionally, FIG. 147 illustrates one example logical configuration of MeasuringDeviceERPByIDResponseMessage_sync message 147000. Specifically, this figure depicts the arrangement and hierarchy of various components such as one or more levels of packages, entities, and datatypes, shown here as 147000 through 147010. As described above, packages may be used to represent hierarchy levels. Entities are discrete business elements that are used during a business transaction. Data types are used to type object entities and interfaces with a structure. For example, MeasuringDeviceERPByIDResponseMessage_sync message 147000 includes, among other things, MeasuringDevice 147004. Accordingly, heterogeneous applications may communicate using this consistent message configured as such.

Additionally, FIG. 148 illustrates one example logical configuration of MeasuringDeviceERPSimpleByElementsQueryMessage_sync message 148000. Specifically, this figure depicts the arrangement and hierarchy of various components such as one or more levels of packages, entities, and datatypes, shown here as 148000 through 148010. As described above, packages may be used to represent hierarchy levels. Entities are discrete business elements that are used during a business transaction. Data types are used to type object entities and interfaces with a structure. For example, MeasuringDeviceERPSimpleByElementsQueryMessage_sync message 148000 includes, among other things, Selection 148004. Accordingly, heterogeneous applications may communicate using this consistent message configured as such.

Additionally, FIG. 149 illustrates one example logical configuration of MeasuringDeviceERPSimpleByElementsResponseMessage_sync message 149000. Specifically, this figure depicts the arrangement and hierarchy of various components such as one or more levels of packages, entities, and datatypes, shown here as 149000 through 149014. As described above, packages may be used to represent hierarchy levels. Entities are discrete business elements that are used during a business transaction. Data types are used to type object entities and interfaces with a structure. For example, MeasuringDeviceERPSimpleByElementsResponseMessage_sync message 149000 includes, among other things, MeasuringDevice 149004. Accordingly, heterogeneous applications may communicate using this consistent message configured as such.

FIGS. 150-1 through 150-6 show a MeasuringDeviceRequestMessage 150000 package. The MeasuringDeviceRequestMessage 150000 package is a <MessageDataType> 150004 data type. The MeasuringDeviceRequestMessage 150000 package includes a MeasuringDeviceRequestMessage 150002 entity. The MeasuringDeviceRequestMessage 150000 package includes various packages, namely a MessageHeader 150006 package, a MeasuringDevice 150012 package and a ProcessingConditions 150120 package.

The MessageHeader 150006 package is a BasicBusinessDocumentMessageHeader 150010 data type. The MessageHeader 150006 package includes a MessageHeader 150008 entity.

The BasicBusinessDocumentMessageHeader is a collection of identification data of an instance of a business document message, or reference data to another instance of a business document message, or both. The subject of the identification data is the message instance that conveys them, whereas the reference data are related to a different message instance previously exchanged between the same interaction parties.

The MeasuringDevice 150012 package includes a MeasuringDevice 150014 entity. The MeasuringDevice 150014 entity includes various attributes, namely an ID 150016 attribute, an IndividualMaterialID 150020 attribute, an InstallationPointID 150024 attribute, a MaterialInternalID 150028 attribute, a PositionID 150032 attribute, a PropertyID 150036 attribute, a MeasurementReadingSourceMeasuringDeviceID 150040 attribute, a MeasurementMaintenanceIssueCategoryCatalogueID 150044 attribute, a MeasurementParentMaintenanceIssueCategoryID 150048 attribute, a CategoryCode 150052 attribute, a TypeCode 150056 attribute, a TargetMeasure 150060 attribute, a MaximumMeasure 150064 attribute, a MinimumMeasure 150068 attribute, an AnnualEstimatedMeasure 150072 attribute, a ResetThresholdMeasure 150076 attribute, a MeasurementReadingCopyIndicator 150080 attribute, a MeasurementReadingCopyValidityPeriod 150084 attribute, a QuantitativeMeasurementOptionalIndicator 150088 attribute, a DescendingIndicator 150092 attribute, a TemplateIndicator 150096 attribute, a Description 150100 attribute, a CategoryName 150104 attribute, a TypeName 150108 attribute, a Comment 150112 attribute and an ActiveIndicator 150116 attribute.

The ID 150016 attribute is a MeasuringDeviceID 150018 data type. The MeasuringDeviceID is a unique identifier for a measuring device. The IndividualMaterialID 150020 attribute is a ProductInternalD 150022 data type. The IndividualMaterialID is a proprietary identifier for an individual material. The InstallationPointID 150024 attribute is an InstallationPointID 150026 data type. The InstallationPointID is a unique identifier for an installation point.

The MaterialInternalID 150028 attribute is a ProductInternalID 150030 data type. The MaterialInternalID is a proprietary identifier for the material in the given individual material/installation point at which measuring device is located. The PositionID 150032 attribute is a MeasuringDevicePositionID 150034 data type. The MeasuringDevicePositionID is an identifier for the position of the measuring device and is unique for an installation point or an individual material. The PropertyID 150036 attribute is a PropertyID 150038 data type. The PropertyID is a unique identifier of the property which is to be measured at the measuring device.

The MeasurementReadingSourceMeasuringDeviceID 150040 attribute is a MeasuringDeviceID 150042 data type. The MeasurementReadingSourceMeasuringDeviceID is the unique identifier of the measuring device from which the measurement reading is copied. The MeasurementMaintenanceIssueCategoryCatalogueID 150044 attribute is a MaintenanceIssueCategoryCatalogueID 150046 data type. The MeasurementMaintenanceIssueCategoryCatalogueID is an identifier for a catalogue of categories for measurement-related issue. The MeasurementParentMaintenanceIssueCategoryID 150048 attribute is a MaintenanceIssueCategoryID 150050 data type. The MeasurementParentMaintenanceIssueCategoryID is an identifier for a category of a measurement-related issue.

The CategoryCode 150052 attribute is a MeasuringDeviceCategoryCode 150054 data type. The MeasuringDeviceCategoryCode is the coded representation of the category of measuring device. The TypeCode 150056 attribute is a MeasuringDeviceTypeCode 150058 data type. The MeasuringDeviceTypeCode is the coded representation of the type of a measuring device. The TargetMeasure 150060 attribute is a Measure 150062 data type. The IdealMeasure is the ideal measurement for the measuring device.

The MaximumMeasure 150064 attribute is a Measure 150066 data type. The MaximumMeasure is the maximum value that can be measured. The MinimumMeasure 150068 attribute is a Measure 150070 data type. The MinimumMeasure is the minimum value that can be measured. The AnnualEstimatedMeasure 150072 attribute is a Measure 150074 data type. The AnnualEstimatedMeasure is the annual estimated measurement value.

The ResetThresholdMeasure 150076 attribute is a Measure 150078 data type. The ResetThresholdMeasure is the maximum value that the counter can measure. The MeasurementReadingCopyIndicator 150080 attribute is an Indicator 150082 data type. The MeasurementReadingCopyIndicator is an indicator which indicates copy of measurement reading. The MeasurementReadingCopyValidityPeriod 150084 attribute is an UPPEROPEN_TIMEZONEINDEPENDENT_DateTimePeriod 150086 data type. The MeasurementReadingCopyValidityPeriod is the validity period for copying the measurement reading.

The QuantitativeMeasurementOptionalIndicator 150088 attribute is an Indicator 150090 data type. The QuantitativeMeasurementOptionalIndicator is an indicator which makes the quantitative measurement optional. The DescendingIndicator 150092 attribute is an Indicator 150094 data type. The DescendingIndicator is an indicator which indicates that the successive readings are in descending order. The TemplateIndicator 150096 attribute is an Indicator 150098 data type. The TemplateIndicator is an indicator which indicates that the measuring device is a template.

The Description 150100 attribute is a SHORT_Description 150102 data type. The Description is a representation of the properties of a measuring device in natural language. The CategoryName 150104 attribute is a MEDIUM_Name 150106 data type. The CategoryName is the name of the measuring device category. The TypeName 150108 attribute is a MEDIUM_Name 150110 data type. The TypeName is the name of the measuring device type.

The Comment 150112 attribute is a Comment 150114 data type. The Comment is a representation of the properties of a measuring device in natural language. The ActiveIndicator 150116 attribute is an Indicator 150118 data type. The ActiveIndicator indicates whether an object is commercially active and whether it can be used in a process or not.

The ProcessingConditions 150120 package includes a ProcessiongConditions 150122 entity. The ProcessiongConditions 150122 entity includes various attributes, namely a QueryHitsMaximumNumberValue 150124 attribute, an UnlimitedQueryHitsIndicator 150128 attribute, a ReturnedQueryHitsNumberValue 150132 attribute, a MoreElementsAvailableIndicator 150136 attribute and a LastProvidedMeasuringDeviceID 150140 attribute.

The QueryHitsMaximumNumberValue 150124 attribute is a NumberValue 150126 data type. The NumberValue is a number. The NumberValue can be used for cardinal numbers. The UnlimitedQueryHitsIndicator 150128 attribute is an Indicator 150130 data type. The Indicator is the representation of a situation that has exactly two mutually exclusive Boolean values. The ReturnedQueryHitsNumberValue 150132 attribute is a NumberValue 150134 data type. The NumberValue is a number. It can be used for cardinal numbers.

The MoreElementsAvailableIndicator 150136 attribute is a MoreElementsAvailableIndicator 150138 data type. The Indicator is the representation of a situation that has two mutually exclusive Boolean values. The LastProvidedMeasuringDeviceID 150140 attribute is a MeasuringDeviceID 150142 data type. The MeasuringDeviceID is a unique identifier for a measuring device.

FIGS. 151-1 through 151-5 illustrate one example logical configuration of a MeasuringDeviceERPCreateRequestMessage_sync 151000 element structure. Specifically, these figures depict the arrangement and hierarchy of various components such as one or more levels of packages, entities, and datatypes, shown here as 151000 through 151102. As described above, packages may be used to represent hierarchy levels. Entities are discrete business elements that are used during a business transaction. Data types are used to type object entities and interfaces with a structure. For example, the MeasuringDeviceERPCreateRequestMessage_sync 151000 includes, among other things, a MeasuringDeviceERPCreateRequestMessage_sync 151002. Accordingly, heterogeneous applications may communicate using this consistent message configured as such. The data types of the various packages, entities, and attributes are described with respect to FIG. 150.

FIG. 152 illustrates one example logical configuration of an In-MeasuringDeviceERPCreateConfirmationMessage_sync 152000 element structure. Specifically, this figure depicts the arrangement and hierarchy of various components such as one or more levels of packages, entities, and datatypes, shown here as 152000 through 152024. As described above, packages may be used to represent hierarchy levels. Entities are discrete business elements that are used during a business transaction. Data types are used to type object entities and interfaces with a structure. For example, the In-MeasuringDeviceERPCreateConfirmationMessage_sync 152000 includes, among other things, an In-MeasuringDeviceERPCreateConfirmationMessage_sync 152002. Accordingly, heterogeneous applications may communicate using this consistent message configured as such. The data types of the various packages, entities, and attributes are described with respect to FIG. 150.

FIG. 153 illustrates one example logical configuration of a MeasuringDeviceERPByIDQueryMessage_sync 153000 element structure. Specifically, this figure depicts the arrangement and hierarchy of various components such as one or more levels of packages, entities, and datatypes, shown here as 153000 through 153012. As described above, packages may be used to represent hierarchy levels. Entities are discrete business elements that are used during a business transaction. Data types are used to type object entities and interfaces with a structure. For example, the MeasuringDeviceERPByIDQueryMessage_sync 153000 includes, among other things, a MeasuringDeviceERPByIDQueryMessage_sync 153002. Accordingly, heterogeneous applications may communicate using this consistent message configured as such. The data types of the various packages, entities, and attributes are described with respect to FIG. 150.

FIGS. 154-1 through 154-5 illustrate one example logical configuration of a MeasuringDeviceERPByIDResponse_sync 154000 element structure. Specifically, these figures depict the arrangement and hierarchy of various components such as one or more levels of packages, entities, and datatypes, shown here as 154000 through 154118. As described above, packages may be used to represent hierarchy levels. Entities are discrete business elements that are used during a business transaction. Data types are used to type object entities and interfaces with a structure. For example, the MeasuringDeviceERPByIDResponse_sync 154000 includes, among other things, a MeasuringDeviceERPByIDResponse_sync 154002. Accordingly, heterogeneous applications may communicate using this consistent message configured as such. The data types of the various packages, entities, and attributes are described with respect to FIG. 150.

FIGS. 155-1 through 155-4 illustrate one example logical configuration of a MeasuringDeviceERPSimpleByElementsQueryMessage_sync 155000 element structure. Specifically, these figures depict the arrangement and hierarchy of various components such as one or more levels of packages, entities, and datatypes, shown here as 155000 through 155076. As described above, packages may be used to represent hierarchy levels. Entities are discrete business elements that are used during a business transaction. Data types are used to type object entities and interfaces with a structure. For example, the MeasuringDeviceERPSimpleByElementsQueryMessage_sync 155000 includes, among other things, a MeasuringDeviceERPSimpleByElementsQueryMessage_sync 155002. Accordingly, heterogeneous applications may communicate using this consistent message configured as such. The data types of the various packages, entities, and attributes are described with respect to FIG. 150.

FIGS. 156-1 through 156-2 illustrate one example logical configuration of a MeasuringDeviceERPSimpleByElementsResponseMessage_sync 156000 element structure. Specifically, these figures depict the arrangement and hierarchy of various components such as one or more levels of packages, entities, and datatypes, shown here as 156000 through 156040. As described above, packages may be used to represent hierarchy levels. Entities are discrete business elements that are used during a business transaction. Data types are used to type object entities and interfaces with a structure. For example, the MeasuringDeviceERPSimpleByElementsResponseMessage_sync 156000 includes, among other things, a MeasuringDeviceERPSimpleByElementsResponseMessage_sync 156002. Accordingly, heterogeneous applications may communicate using this consistent message configured as such. The data types of the various packages, entities, and attributes are described with respect to FIG. 150.

A number of implementations have been described. Nevertheless, it will be understood that various modifications may be made without departing from the spirit and scope of the disclosure. For example, processing can mean creating, updating, deleting, or some other massaging of information. Accordingly, other implementations are within the scope of the following claims.

What is claimed is:

1. A non-transitory computer readable medium including program code for providing a message-based interface for planning and executing maintenance activities on at least one individual material, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message to an enterprise asset management system for requesting installation of a first individual material at a second individual material that includes a first message package derived from the common business object model and hierarchically organized in memory as:

an individual material install request message entity; and an individual material package comprising an individual material entity and a hierarchy relationship package, where the individual material entity includes an individual material ID, and where the hierarchy relationship package includes a hierarchy relationship entity, where the hierarchy relationship entity includes a parent product ID;

program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

2. The computer readable medium of claim 1, wherein the hierarchy relationship entity further includes at least one of the following: an installation date and time and an installation position ID.

3. A distributed system operating in a landscape of computer systems providing message-based services defined in a service registry, the system comprising:

a graphical user interface comprising computer readable instructions, embedded on tangible media and executable by a first processor, for requesting an enterprise asset management system to install a first individual material at a second individual material using a request;

a first memory storing a user interface controller for processing, by a second processor, the request and involving a message including a message package derived from a common business object model, where the common business object model includes business objects having relationships that enable derivation of message-based service interfaces and message packages, the message package hierarchically organized as:

an individual material install request message entity; and an individual material package comprising an individual material entity and a hierarchy relationship package, where the individual material entity includes an individual material ID, and where the hierarchy relationship package includes a hierarchy relationship entity, where the hierarchy relationship entity includes a parent product ID; and a second memory, remote from the graphical user interface, storing a plurality of message-based service interfaces derived from the common business object model to provide consistent semantics with messages derived from the common business object model, where one of the message-based service interfaces processes the message, by a third processor, according to the hierarchical organization of the message package, where processing the message includes unpacking the message package based on the common business object model.

4. The distributed system of claim 3, wherein the first memory is remote from the graphical user interface.

5. A non-transitory computer readable medium including program code for providing a message-based interface for planning and executing maintenance activities on at least one individual material, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for inquiring an enterprise asset management system to identify elements of individual materials based on warranty information that includes a first message package derived from the common business object model and hierarchically organized in memory as:

an individual material simple by warranty query message entity; and a selection package comprising an individual material simple selection by warranty entity, where the individual material simple selection by warranty entity includes a warranty ID and a warranty type;

program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

6. A distributed system operating in a landscape of computer systems providing message-based services defined in a service registry, the system comprising:

a graphical user interface comprising computer readable instructions, embedded on tangible media and executable by a first processor, for inquiring an enterprise asset management system to identify elements of individual materials based on warranty information using a request;

a first memory storing a user interface controller for processing, by a second processor, the request and involving a message including a message package derived from a common business object model, where the common business object model includes business objects having relationships that enable derivation of message-based service interfaces and message packages, the message package hierarchically organized as:

an individual material simple by warranty query message entity; and a selection package comprising an individual material simple selection by warranty entity, where the individual material simple selection by warranty entity includes a warranty ID and a warranty type; and a second memory, remote from the graphical user interface, storing a plurality of message-based service interfaces derived from the common business object model to provide consistent semantics with messages derived from the common business object model, where one of the message-based service interfaces processes the message, by a third processor, according to the hierarchical organization of the message package, where processing the message includes unpacking the message package based on the common business object model.

7. The distributed system of claim 6, wherein the first memory is remote from the second memory.

8. A non-transitory computer readable medium including program code for providing a message-based interface for planning and executing maintenance activities on at least one individual material, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for requesting a product data management system to create an individual material and confirm its creation that includes a first message package derived from the common business object model and hierarchically organized in memory as:

an individual material ERP create request message entity; and an individual material package comprising an individual material entity, a hierarchy relationship package, a manufacturer information package, and an address package, where the individual material entity includes an individual material ID and a category code, where the hierarchy relationship package includes a hierarchy relationship entity, and further wherein the hierarchy relationship entity includes a parent product ID, where the manufacturing information package includes a manufacturing information entity, and where the address package includes a country code;

program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

9. The computer readable medium of claim 8, wherein the individual material entity further includes at least one of the following: a material ID, a serial ID, a maintenance planning plant ID, a work center ID, an operating plant ID, an operating work center ID, a profile issue category filter code, a status object, and a description.

10. A distributed system operating in a landscape of computer systems providing message-based services defined in a service registry, the system comprising:

a graphical user interface comprising computer readable instructions, embedded on tangible media and executable by a first processor, for requesting a product data management system to create an individual material and confirm its creation using a request;

a first memory storing a user interface controller for processing, by a second processor, the request and involving a message including a message package derived from a common business object model, where the common business object model includes business objects having relationships that enable derivation of message-based service interfaces and message packages, the message package hierarchically organized as:

an individual material ERP create request message entity; and an individual material package comprising an individual material entity, a hierarchy relationship package, a manufacturer information package, and an address package, where the individual material entity includes an individual material ID and a category code, where the hierarchy relationship package includes a hierarchy relationship entity, and further wherein the hierarchy relationship entity includes a parent product ID, where the manufacturing information package includes a manufacturing information entity, and where the address package includes a country code; and a second memory, remote from the graphical user interface, storing a plurality of message-based service interfaces derived from the common business object model to provide consistent semantics with messages derived from the common business object model, where one of the message-based service interfaces processes the message, by a third processor, according to the hierarchical organization of the message package, where processing the message includes unpacking the message package based on the common business object model.

* * * * *